US011220620B2

(12) United States Patent
Schultz et al.

(10) Patent No.: US 11,220,620 B2
(45) Date of Patent: Jan. 11, 2022

(54) LOWER GWP REFRIGERANT COMPOSITIONS

(71) Applicant: TRANE INTERNATIONAL INC., Davidson, NC (US)

(72) Inventors: Kenneth J. Schultz, Onalaska, WI (US); Stephen A. Kujak, Brownsville, MN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 16/891,900

(22) Filed: Jun. 3, 2020

(65) Prior Publication Data
US 2020/0291282 A1 Sep. 17, 2020

Related U.S. Application Data

(63) Continuation of application No. 15/994,868, filed on May 31, 2018, now abandoned, which is a
(Continued)

(51) Int. Cl.
*C09K 5/04* (2006.01)
*F25B 45/00* (2006.01)

(52) U.S. Cl.
CPC ............. *C09K 5/045* (2013.01); *C09K 5/044* (2013.01); *F25B 45/00* (2013.01);
(Continued)

(58) Field of Classification Search
CPC ........ C09K 2205/126; C09K 2205/122; C09K 5/044
See application file for complete search history.

(56) References Cited

U.S. PATENT DOCUMENTS 9,175,201 B2 11/2015 Singh et al.
9,862,868 B2 1/2018 Fukushima
(Continued)

FOREIGN PATENT DOCUMENTS

CN 105349105 A 2/2016
CN 106460840 A 2/2017
(Continued)

OTHER PUBLICATIONS

Fukushima et al., "Development of Low-GWP Refrigerants", JRAIA International Symposium, 2014 (12 pages).
(Continued)

*Primary Examiner* — John R Hardee
(74) *Attorney, Agent, or Firm* — Hamre, Schumann, Mueller & Larson, P.C.

(57) ABSTRACT

Refrigerant compositions for an HVACR system that includes R1123, R32 and at least one more refrigerant. The refrigerant composition has a reduced GWP of about or less than 1500. Some of the refrigerant composition may be suitable for replacing R410A, R32, and/or R22. Methods for making the refrigerant composition including mixing an amount of R1123, and amount of R32, and an amount of at least one more refrigerant. Methods of retrofitting an existing refrigerant composition include adding an amount of at least one refrigerant to an existing refrigerant composition to produce a retrofitted refrigerant composition. The retrofitted refrigerant composition includes at least R1123 and R32.

17 Claims, 58 Drawing Sheets

Related U.S. Application Data continuation-in-part of application No. 15/859,159, filed on Dec. 29, 2017, now Pat. No. 10,655,039.

(60) Provisional application No. 62/612,198, filed on Dec. 29, 2017.

(52) U.S. Cl.
CPC .. *C09K 2205/122* (2013.01); *C09K 2205/126* (2013.01); *C09K 2205/22* (2013.01); *C09K 2205/40* (2013.01)

(56) References Cited

U.S. PATENT DOCUMENTS

| | | | |
|---|---|---|---|
| 2008/0157022 A1* | 7/2008 | Singh | C09K 5/045 252/68 |
| 2012/0187330 A1 | 7/2012 | Singh et al. | |
| 2015/0337191 A1 | 11/2015 | Fukushima | |
| 2016/0320111 A1 | 11/2016 | Saikusa et al. | |
| 2016/0333243 A1 | 11/2016 | Fukushima et al. | |
| 2016/0333244 A1 | 11/2016 | Fukushima | |
| 2016/0347980 A1 | 12/2016 | Okamoto | |
| 2017/0002245 A1 | 1/2017 | Fukushima | |
| 2017/0121581 A1 | 5/2017 | Horiike et al. | |
| 2017/0137682 A1 | 5/2017 | Hulse et al. | |
| 2017/0138641 A1 | 5/2017 | Fujitaka et al. | |
| 2017/0146265 A1 | 5/2017 | Fujitaka et al. | |

FOREIGN PATENT DOCUMENTS

| | | |
|---|---|---|
| CN | 109844422 A | 6/2019 |
| WO | 2016/194847 A1 | 12/2016 |
| WO | 2017/126447 | 7/2017 |

OTHER PUBLICATIONS

Asahi Glass Co., Ltd. AGC Chemicals, "Request for Refrigerant Number Designation and Safety Classification for HFO-1123", Jun. 2015 (42 pages).

Asahi Glass Co., Ltd. AGC Chemicals, "Request for Refrigerant Number Designation and Safety Classification for Refrigerant Blend for HFO-1123/R32 (40.0/60.0) by mass%", Jun. 2015 (77 pages).

Asahi Glass Co., Ltd. AGC Chemicals, "Request for Refrigerant Number Designation and Safety Classification for Refrigerant Blend for HFO-1123/R32 (45.0/55.0) by mass%", Jun. 2015 (77 pages).

Fukushima et al. "Thermodynamic Properties of Low-GWP Alternative Refrigerants", Aug. 16-22, Yokohama, Japan, 2015, (9 pages).

Tanaka et al. "Development of a new low-GWP refrigerant composed of HFO-1123 (trifluoroethylene)", Proceedings of the 2014 AIChE Annual Meeting, Nov. 16-21, 2014, Atlanta, GA, USA. (8 pages).

Extended European Search Report; European Patent Application No. 18213893.3; dated May 23, 2019 (6 pages).

Office Action, Chinese Patent Application No. 2018116392294, dated May 7, 2021, with partial English translation (11 pages).

* cited by examiner

LOWER GWP REFRIGERANT COMPOSITIONS

This is a continuation of U.S. patent application Ser. No. 15/994,868, filed May 31, 2018, now abandoned, which is a continuation in part of U.S. patent application Ser. No. 15/859,159, filed Dec. 29, 2017, now U.S. Pat. No. 10,655,039, which claims the benefit of U.S. Provisional Application 62/612,198, filed Dec. 29, 2017.

FIELD

The disclosure herein relates to refrigerant compositions, which can be used in, for example, refrigeration, air conditioning, and/or heat pump systems, which, for example, can be incorporated into a heating, ventilation, air conditioning, and refrigeration (HVACR) system or unit.

BACKGROUND

Concern about environmental impact (e.g., ozone depletion) and the approval of the Montreal Protocol have resulted in a movement to replace ozone depleting refrigerants such as chlorofluorocarbons (CFCs) and hydrochlorfluorocarbons (HCFCs). Refrigerants, such as hydrofluorocarbons (HFCs) refrigerants and hydrofluoroolefins (HFOs) refrigerants have been utilized as replacements for previous refrigerants containing CFCs and HFCs. However, there has been recent movement (e.g., the Kigali Amendment to the Montreal Protocol, the Paris Agreement, United States' Significant New Alternatives Policy ("SNAP")) to phase out refrigerants that have a high global warming potential (GWP) such as some HFCs.

BRIEF SUMMARY

Refrigerant compositions that have a capacity similar to R410A, R32, or R22 and methods of making such refrigerant compositions are described. Refrigerant compositions that have a GWP lower than R410A and methods of making such refrigerant compositions are described. Refrigerant compositions that perform similar to R410A are described. Refrigerant compositions that perform similar to R32 are described. Refrigerant compositions that perform similar to R22 are described. Refrigerant compositions, methods of making refrigerant compositions, and methods of retrofitting refrigerant compositions for servicing, controlling flammability, decreasing GWP, improving performance, and/or improving safety of an HVACR system are described.

In an embodiment, a refrigerant composition includes R32, R1123, and one or more refrigerants. The one or more refrigerants may include $CF_3I$, R125, and R1234yf. In an embodiment, a refrigerant composition includes at least three refrigerants that include R32 and R1123. In an embodiment, a refrigerant composition includes at least four refrigerants that include R32 and R1123.

In an embodiment, a refrigerant composition includes R32, R1123, and $CF_3I$. In an embodiment, the refrigerant composition has a capacity that is at or about 85% or greater than 85% of the capacity of R410A refrigerant. In an embodiment, the refrigerant composition has a capacity that is at or about 85% or greater than 85% of the capacity of R32 refrigerant.

In an embodiment, the refrigerant composition has a GWP of at or about 300 or less than 300. In an embodiment, the refrigerant composition has a GWP of at or about 150 or less than 150. In an embodiment, the refrigerant composition has a GWP of at or about 150 to at or about 300.

In an embodiment, the refrigerant composition is a non-flammable composition.

In an embodiment, the refrigerant composition has a temperature glide of at or about 10° F. or less than 10° F.

In an embodiment, the ratio of the R32 to the R1123 by weight is at or about 40:60 to at or about 60:40.

In an embodiment, a refrigerant composition includes R32, R1123, and R125. In an embodiment, the refrigerant composition has a capacity that is at or about 85% or greater than 85% of the capacity of R410A refrigerant and a GWP of at or about 1500 or less than 1500. In an embodiment, the refrigerant composition has a capacity that is in a range from at or about 85% to at or about 110% of the capacity of R410A refrigerant and a GWP of at or about 1500 or less than 1500. In an embodiment, the refrigerant composition has a capacity that is at or about 85% or greater than 85% of the capacity of R32 refrigerant and a GWP of at or about 1500 or less than 1500.

In an embodiment, the refrigerant composition has a GWP of at or about 1000 or less than 1000. In an embodiment, the refrigerant composition has a GWP of at or about 750 or less than 750. In an embodiment, the refrigerant composition has a GWP of at or about 675 or less than 675. In an embodiment, the refrigerant composition has a GWP of at or about 600 or less than 600. In an embodiment, the refrigerant composition has a GWP of at or about 500 or less than 500. In an embodiment, the refrigerant composition has a GWP of at or about 400 or less than 400. In an embodiment, the refrigerant composition has a GWP of at or about 300 or less than 300. In an embodiment, the refrigerant composition has a GWP of at or about 200 or less than 200.

In an embodiment, the refrigerant composition is a non-flammable composition.

In an embodiment, the ratio of the R32 to the R1123 by weight is at or about 20:80 to at or about 80:20. In an embodiment, the ratio of the R32 to the R1123 by weight is at or about 40:60 to at or about 60:40.

In an embodiment, the refrigerant composition has a temperature glide of at or about 1° F. or less than 1° F. In an embodiment, the refrigerant composition has a temperature glide of at or about 0.5° F. or less than 0.5° F.

In an embodiment, a refrigerant composition includes R32, R1123, and R125, and $CF_3I$. In an embodiment, the refrigerant composition has a capacity that is at or about 85% or greater than 85% of the capacity of R410A refrigerant and a GWP of at or about 1500 or less than 1500. In an embodiment, the refrigerant composition has a capacity that is in a range from at or about 85% to at or about 110% of the capacity of R410A refrigerant and a GWP of at or about 1500 or less than 1500. In an embodiment, the refrigerant composition has a capacity that is at or about 85% or greater than 85% of the capacity of R32 refrigerant and a GWP of at or about 1500 or less than 1500.

In an embodiment, the refrigerant composition has a GWP of at or about 1000 or less than 1000. In an embodiment, the refrigerant composition has a GWP of at or about 750 or less than 750. In an embodiment, the refrigerant composition has a GWP of at or about 675 or less than 675. In an embodiment, the refrigerant composition has a GWP of at or about 600 or less than 600. In an embodiment, the refrigerant composition has a GWP of at or about 500 or less than 500. In an embodiment, the refrigerant composition has a GWP of at or about 400 or less than 400. In an embodiment, the refrigerant composition has a GWP of at or about 300 or less than 300. In an embodiment, the refrigerant composition has a GWP of at or about 200 or less than 200.

In an embodiment, the refrigerant composition is a nonflammable composition.

In an embodiment, the refrigerant composition has a temperature glide of at or about 15° F. or less than 15° F. In an embodiment, the refrigerant composition has a temperature glide of at or about 12° F. or less than 12° F. In an embodiment, the refrigerant composition has a temperature glide of at or about 10° F. or less than 10° F. In an embodiment, the refrigerant composition has a temperature glide of at or about 5° F. or less than 5° F.

In an embodiment, a refrigerant composition includes R32, R1123, and R125, and R1234yf. In an embodiment, the refrigerant composition has a capacity that is at or about 85% or greater than 85% of the capacity of R410A refrigerant and a GWP of at or about 1500 or less than 1500. In an embodiment, the refrigerant composition has a capacity that is in a range from at or about 85% to at or about 110% of the capacity of R410A refrigerant and a GWP of at or about 1500 or less than 1500. In an embodiment, the refrigerant composition has a capacity that is at or about 85% or greater than 85% of the capacity of R32 refrigerant and a GWP of at or about 1500 or less than 1500. In an embodiment, the refrigerant composition has a capacity that in a range from at or about 85% to at or about 110% of the capacity of R22 refrigerant and a GWP of at or about 1500 or less than 1500.

In an embodiment, the refrigerant composition has a GWP of at or about 1000 or less than 1000. In an embodiment, the refrigerant composition has a GWP of at or about 750 or less than 750. In an embodiment, the refrigerant composition has a GWP of at or about 675 or less than 675. In an embodiment, the refrigerant composition has a GWP of at or about 600 or less than 600. In an embodiment, the refrigerant composition has a GWP of at or about 500 or less than 500. In an embodiment, the refrigerant composition has a GWP of at or about 400 or less than 400. In an embodiment, the refrigerant composition has a GWP of at or about 300 or less than 300. In an embodiment, the refrigerant composition has a GWP of at or about 200 or less than 200.

In an embodiment, the refrigerant composition is a nonflammable composition.

In an embodiment, the refrigerant composition has a temperature glide of at or about 15° F. or less than 15° F. In an embodiment, the refrigerant composition has a temperature glide of at or about 12° F. or less than 12° F. In an embodiment, the refrigerant composition has a temperature glide of at or about 10° F. or less than 10° F. In an embodiment, the refrigerant composition has a temperature glide of at or about 5° F. or less than 5° F.

In an embodiment, a refrigerant composition includes R32, R1123, and $CF_3I$, and R1234yf. In an embodiment, the refrigerant composition has a capacity that is at or about 85% or greater than 85% of the capacity of R410A refrigerant. In an embodiment, the refrigerant composition has a capacity that is at or about 85% or greater than 85% of the capacity of R32 refrigerant.

In an embodiment, the refrigerant composition has a GWP of at or about 500 or less than 500. In an embodiment, the refrigerant composition has a GWP of at or about 400 or less than 400. In an embodiment, the refrigerant composition has a GWP of at or about 300 or less than 300. In an embodiment, the refrigerant composition has a GWP of at or about 200 or less than 200.

In an embodiment, the refrigerant composition is a nonflammable composition.

In an embodiment, the refrigerant composition has a temperature glide of at or about 15° F. or less than 15° F. In an embodiment, the refrigerant composition has a temperature glide of at or about 12° F. or less than 12° F. In an embodiment, the refrigerant composition has a temperature glide of at or about 10° F. or less than 10° F.

In an embodiment, a method of making a refrigerant composition for a HVACR system includes mixing an amount of R1123, an amount of R32, and an amount of $CF_3I$. In an embodiment, the refrigerant composition has a capacity that is at or about 85% or greater than 85% of a capacity of R410A refrigerant. In an embodiment, the mixing includes an amount of R1234yf. In an embodiment, a method of making a refrigerant composition includes mixing at least an amount of R1123, an amount of R32, and an amount of one or more refrigerants to obtain a refrigerant composition that has a GWP of at or about 1500 or less than 1500. In an embodiment, the one or more refrigerants include $CF_3I$.

In an embodiment, the one or more refrigerants include $CF_3I$. In an embodiment, the one or more refrigerants include R125. In an embodiment, the one or more refrigerants include R125 and $CF_3I$. In an embodiment, the one or more refrigerants include $CF_3I$ and R1234yf. In an embodiment, the one or more refrigerants include R125 and R1234yf.

In an embodiment, a method of retrofitting a refrigerant composition includes adding an amount of at least one refrigerant to an existing refrigerant composition to produce a retrofitted refrigerant composition that has a GWP of at or about 1500 or less than 1500. The retrofitted refrigerant composition includes R1123 refrigerant, R32 refrigerant, and one or more refrigerants.

In an embodiment, the retrofitted refrigerant composition includes R32, R1123, and $CF_3I$. In an embodiment, the retrofitted refrigerant composition includes R32, R1123, and R125. In an embodiment, the retrofitted refrigerant composition includes R32, R1123, R125, and $CF_3I$. In an embodiment, the retrofitted refrigerant composition includes R32, R1123, $CF_3I$, and R1234yf. In an embodiment, the retrofitted refrigerant composition includes R32, R1123, R125, and R1234yf.

BRIEF DESCRIPTION OF THE DRAWINGS

Both described and other features, aspects, and advantages of refrigerant compositions, methods of making refrigerant compositions, and methods of retrofitting a refrigerant composition in an HVACR will be better understood with reference to the following drawings:

FIGS. 20-22 each illustrate a matrix based on a respective one of FIGS. 14-16 that can be used to select a refrigerant composition with a desired set of properties in an embodiment.

DETAILED DESCRIPTION

Figure 1:
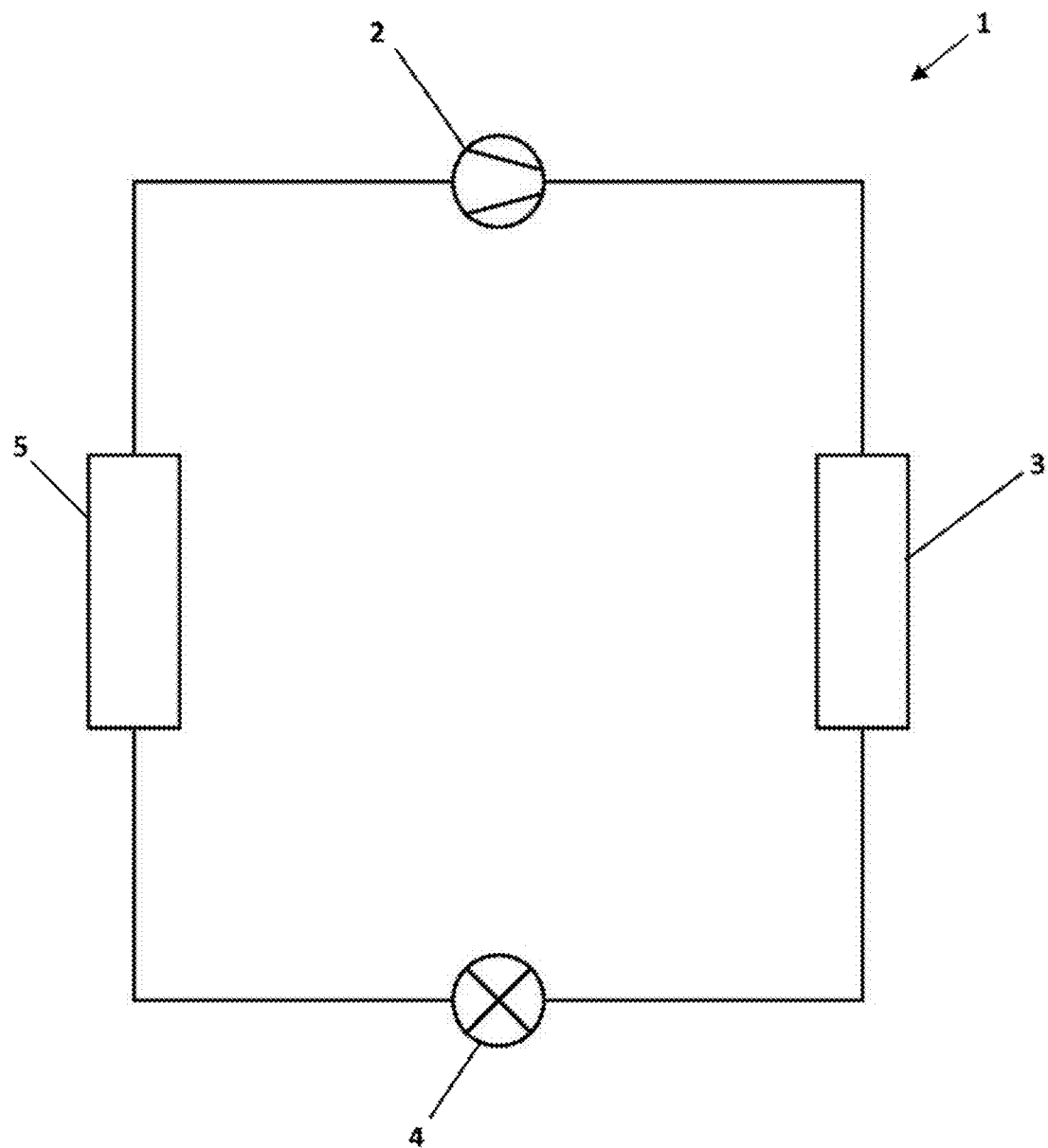
FIG. 1 illustrates a heat transfer circuit of a HVACR system in an embodiment.

Compositions and methods are described for reducing flammability and/or GWP in a heating, ventilation, air conditioning and refrigeration (HVACR) system, for example, by having a refrigerant composition that includes a blend of refrigerants. Refrigerant compositions and methods of use are described which can be used for retrofitting; servicing; controlling flammability; improving performance, lubricant solubility, and miscibility; and improving the safety of an HVACR system.

Refrigerant compositions that include R1123 and R32 are proposed as alternatives for R410A, R32, and/or R22 and as a refrigerant for HVACR systems designed for R410, R32, and/or R22. Refrigerant compositions that include R1123 and R32, and one or more additional refrigerants are proposed as alternatives for R410A, R32, and/or R22 and as a refrigerant in HVACR systems designed for R410, R32, and/or R22.

Some refrigerant compositions described include R1123, R32, and $CF_3I$, and are proposed as alternatives for R410A and/or R32 and as a refrigerant for HVACR systems designed for R410 and/or R32. Some refrigerant compositions described include R1123, R32, and R125, and are proposed as alternatives for R410A and/or R32 as a refrigerant for HVACR systems designed for R410 and/or R32.

Some refrigerant compositions described include R1123, R32, $CF_3I$, and R125 and are proposed as alternatives for R410A and/or R32 as a refrigerant for HVACR systems designed for R410 and/or R32. Some refrigerant compositions described include R1123, R32, R125, and R123yf and are proposed as alternatives for R410A and/or R32 and as a refrigerant for HVACR systems designed for R410 and/or R32. Some refrigerant compositions described include R1123, R32, $CF_3I$, and R1234yf and are proposed as alternatives for R410A and/or R32 and as a refrigerant for HVACR systems designed for R410 and/or R32.

R32 (e.g., difluoromethane or difluoroethane) has a GWP of 677 and is mildly flammable (burning velocity of about 6.7 cm/s; classification A2 under ASHRAE Standard 34). GWP described herein is based on the values reported in the Fifth Assessment Report of the Intergovernmental Panel on Climate Change ("AR5").

R125 (e.g., pentafluoroethane) has a GWP of 3,170 and is nonflammable (classification A1 under ASHRAE Standard 34). Refrigerants or refrigerant compositions may be defined as nonflammable as defined by ASHRAE standard 34 (e.g., flame propagation of less than 90° when tested in a spherical vessel under specified conditions). For example, R125 has a capacity that is approximately 71% of the capacity of R32 and approximately 76% of the capacity of R410A, when utilized in normal air-conditioning operating condition (e.g., Tevap=52.5° F. with 15° F. suction superheat and Tcond=115° F. with 15° F. of exit liquid subcooling). For example, R125 has a thermodynamic efficiency that is approximately 96.6% of the thermodynamic efficiency of R32 and 97.5% of the thermodynamic efficiency R410A, when utilized in normal air-conditioning operating conditions.

R410A is a mixture of equal parts by weight of R32 and R125. R410A has a high GWP of 1924, and is nonflammable (classified as A1 under ASHRAE Standard 34).

R22 (e.g., chlorodifluoromethane and/or difluoromonochloromethane) has a GWP of 1810, and is nonflammable (classified as A1 under ASHRAE Standard 34). R22 has a lower capacity than R410A and R32, and a higher thermodynamic efficiency relative to R410A and R32. For example, R22 has a capacity of approximately 63% relative to R32 and 68% relative to R410A, when utilized in normal air-conditioning operating conditions (e.g., Tevap=52.5° F. with 15° F. suction superheat and Tcond=115° F. with 15° F. of exit liquid subcooling). For example, the thermodynamic efficiency of R22 is equal to 105% of R32 and 106% of R410A, when utilized in normal air-conditioning operating conditions. When utilized in normal air-conditioning operating conditions, R22 has a compressor discharge temperature of about 5° F. greater than R410A, a density in the liquid phase of 92% relative to R410A, and a mass flow rate of 72% relative to R410A.

R1123 (e.g. trifluoroethene and/or trifluoroethylene) has a GWP of less than 1 and is mildly flammable (burning velocity of about 6.6 cm/s; requested classification as A2L under ASHRAE Standard 34). R1123 has a similar flammability to R32. R1123 has a higher capacity than R410A and R32, but a lower thermodynamic efficiency relative to R410A and R32. For example, R1123 has a capacity of approximately 102.6% relative to R32 and 110.6% relative to R410A, when utilized in normal air-conditioning operating conditions. For example, the thermodynamic efficiency of R1123 is equal to 90.8% of R32 and 91.8% of R410A, when utilized in normal air-conditioning operating conditions. The efficiency of a refrigerant composition decreases almost linearly as the concentration of R1123 increases relative to the concentration of R32. For example, thermodynamic efficiency monotonically decreases as the concentration of R1123 increases and the concentration of R32 decreases.

R1123 and R32 can form an azeotrope near 80%-90% R1123. Near-azeotropic behavior exists over essentially the full range of compositions of R1123 and R32 with a maximum temperature glide of ≤1° F.d. The low critical temperature and reduced capacity and efficiency in this region may make the binary blend less suitable. R1123 has a critical temperature (139° F.) that is lower than the critical temperature of R32 (173° F.), and a saturation dome that is relatively narrow relative to R32 (Δhfg @ 115° F. is −68 Btu/lbm for R1123 vs 95 Btu/lbm for R32). Compositions having a blend of R1123 and R32 have shown lower burning velocities than the R1123 or R32 alone. For example, a composition including about 40 to 45 wt % of R1123 and about 55 to 60 wt % of R32 has a burning velocity of about 3 cm/s.

R1123, when used by itself as a working fluid in a HVACR system, can potentially undergo decomposition. Experimentation has shown that mixing R1123 with another refrigerant, such as R32, can prevent decomposition of R1123. R1234yf, $CF_3I$, and R125 are likely to similarly prevent R1123 from undergoing decomposition when mixed with R1123 and used as the working fluid in an HVACR system. R1123 may be used with other refrigerants to provide a refrigerant composition with a lower GWP.

R1234yf (e.g., 2,3,3,3-tetrafluoroethene or 2,3,3,3-tetrafluoropropene) has a GWP of less than 1 and is mildly flammable (burning velocity of about 1.5 cm/s; classified as A2L under ASHRAE Standard 34). R1234yf has a capacity that is much less than R32 or R410A. For example, R1234yf has a capacity that is approximately 40.3% of R32 and 43.4% of R410A, when utilized in normal air-conditioning operating conditions. For example, the thermodynamic efficiency of R1234yf is equal to 105.4% of R32 and 106.5% of R410A, when utilized in normal air-conditioning operating conditions.

$CF_3I$ is a fire suppressant with a low GWP (approximately 0.4 in AR5) and has thermodynamic properties similar to R410A and R32. $CF_3I$ may be used with other refrigerants to provide a refrigerant blend that has a lower GWP. $CF_3I$ may be used with other refrigerants to provide a refrigerant blend that has a lower GWP and is nonflammable.

Embodiments disclosed are directed to refrigerant compositions, methods of retrofitting a refrigerant composition, and methods of making a refrigerant composition. In some embodiments, the refrigerant compositions have a capacity that is at or about 85% or greater than 85% of the capacity of R410A. In some embodiments, the refrigerant compositions have a capacity that is at or about 85% or greater than 85% of the capacity R410A and are nonflammable. In some embodiments, the GWP of the refrigerant compositions is at or about R410A or less than R410A. In some embodiments, the GWP of the refrigerant compositions is at or about 1500 or less than 1500. In some embodiments, the GWP of the refrigerant compositions is at or about 750 or less than 750.

In some embodiments, the GWP of the refrigerant compositions is at or about 675 or less than 675. In some embodiments, the GWP of the refrigerant compositions is at or about 300 or less than 300.

In some embodiments, the refrigerant compositions have a capacity that is at or about 85% or greater than 85% of the capacity R32. In some embodiments, the refrigerant compositions have a capacity that is at or about 85% or greater than 85% of the capacity R32 and are nonflammable. In some embodiments, the GWP of the refrigerant compositions is at or about 1500 or less than 1500. In some embodiments, the GWP of the refrigerant compositions is at or about 750 or less than 750. In some embodiments, the GWP of the refrigerant composition is at or about 675 or less than 675. In some embodiments, the GWP of the said refrigerant compositions is at or about R32 or less than R32. In some embodiments, the GWP of the refrigerant compositions is at or about 300 or less than 300.

In some embodiments, the refrigerant compositions have a capacity that is at or about 85% or greater than 85% of the capacity R22. In some embodiments, the refrigerant compositions have a capacity that is at or about 85% or greater than 85% of the capacity R22 and are nonflammable. In some embodiments, the GWP of the said refrigerant compositions is at or about R22 or less than R22. In some embodiments, the GWP of the refrigerant compositions is less at or about 1500 or less than 1500. In some embodiments, the GWP of the refrigerant compositions is at or about 750 or less than 750. In some embodiments, the GWP of the refrigerant compositions is at or about 675 or less than 675. In some embodiments, the GWP of the refrigerant compositions is at or about 300 or less than 300.

In an embodiment, a refrigerant composition with a specific set of performance properties may be desired. In some embodiments, the refrigerant composition may be utilized in an HVACR designed for R410A. In such embodiments, it would be desired for the refrigerant composition to perform similar to R410A so that the HVACR system does not have to be modified. In some embodiments, the refrigerant composition may be utilized in an HVACR designed for R32. In such embodiments, it would be desired for the refrigerant composition or retrofitted composition to perform similar to R32 so that the HVACR system does not have to be modified. In some embodiments, the refrigerant composition may be utilized in an HVACR designed for R22. In such embodiments, it would be desired for the refrigerant composition or retrofitted composition to perform similar to R22 so that the HVACR system does not have to be modified.

Performance of a refrigerant may be based on one or more properties of the refrigerant composition. For example, properties that affect performance are capacity, temperature glide, coefficient of performance (thermodynamic efficiency), a compressor discharge temperature, mass flow rate, and a density of the refrigerant when in the liquid phase. In an embodiment, a composition having a specific capacity and one or more of the other performance properties may be desired. In some embodiments, a composition with a capacity that is at or about 85% or greater than 85% of the capacity of R410A may be desired. In some embodiments, a composition with a capacity that is at or about 85% or greater than 85% of the capacity of R32 may be desired. In some embodiments, a composition with a capacity that is at or about 85% or greater than 85% of the capacity of R22 may be desired.

A HVACR system may be designed to utilize a specific refrigerant (e.g., R410A, R32, R22). If the HVACR system is modified to utilize a working fluid that has a capacity less than 85% of the specific refrigerant, it may result in, for example, requiring a compressor with a larger volumetric displacement, larger amounts of process fluid, and/or larger temperature differences that decrease the efficiency of the HVACR system. In some embodiments, a working fluid with a capacity that is at or about 85% or greater than 85% of the capacity of the specific refrigerant (e.g., R410A, R32, R22) may be desired. In some embodiments, a working fluid with a capacity that is at or about 90% or greater than 90% of the capacity of the specific refrigerant (e.g., R410A, R32, R22) may be desired. For example, a working fluid with a capacity that is at or about 10% or less than 10% from the specified refrigerant can have a minimal impact on the efficiency of the HVACR system designed for the specific refrigerant. A working fluid with a capacity that greater than 5% from the capacity of the specific refrigerant (e.g., R410A, R32, R22) can result in, for example, an even lesser impact on the efficiency of the HVACR system designed for the specific refrigerant (e.g., R410A, R32, R22). The performance properties may be relative to the performance properties of R410A, R32, or R22. In some embodiments, one or more properties of a refrigerant composition may be simulated and/or estimated by an Excel-based vapor compression thermodynamic cycle tool utilizing NIST's REFPROP program to compute thermodynamic properties.

An HVACR system can be used to cool or heat one or more conditioned spaces. A HVACR system may utilize a refrigerant in a circuit to cool or heat a process fluid (e.g., air, water). For example, an HVACR system in some instances will cool or heat an area by performing work on a refrigerant that is in a heat exchange relationship with air. The cooled or heated air may then be ventilated to an area to cool or heat the area.

FIG. 1 is a schematic diagram of a heat transfer circuit 1 of a HVACR system, according to an embodiment. The heat transfer circuit 1 includes a compressor 2, a condenser 3, an expansion device 4, and an evaporator 5. In an embodiment, the heat transfer circuit 1 can be modified to include additional components. For example, the heat transfer circuit 1 in an embodiment can include an economizer heat exchanger, one or more flow control devices, a receiver tank, a dryer, a suction-liquid heat exchanger, or the like.

The components of the heat transfer circuit 1 are fluidly connected. The heat transfer circuit 1 can be configured as a cooling system (e.g., a fluid chiller of an HVACR, an air conditioning system, and the like) that can be operated in a cooling mode, and/or the heat transfer circuit 1 can be configured to operate as a heat pump system that can run in a cooling mode and a heating mode.

The heat transfer circuit 1 as described applies known principles of gas compression and heat transfer. The heat transfer circuit can be configured to heat or cool a process fluid (e.g., water, air). In an embodiment, the heat transfer circuit 1 may represent a chiller that cools a process fluid such as water or the like. In an embodiment, the heat transfer circuit 1 may represent an air conditioner and/or heat pump that includes a process fluid such as air or the like.

During the operation of the refrigerant circuit 1, a working fluid (e.g., refrigerant, refrigerant mixture) flows into the compressor 2 from the evaporator 5 at a relatively lower pressure in a gaseous state. The compressor 2 compresses the gas into a high pressure state, which also heats the gas. After being compressed, the relatively higher pressure and higher temperature gas flows from the compressor 2 to the condenser 3. In addition to the refrigerant flowing through the condenser 3, an external fluid (e.g., external air, external water, chiller water, and the like) also flows through the condenser 3. The external fluid absorbs the heat from the working fluid as it flows through the condenser 3. The working fluid condenses to liquid and then flows into the expansion device 4. The expansion device 4 reduces the pressure of the working fluid. The reduced pressure allows the working fluid to expand and be converted to a mixed vapor and liquid state. The relatively lower temperature, vapor/liquid working fluid then flows into the evaporator 5. A process fluid (e.g., air, water, and the like) also flows through the evaporator 5. In accordance with known principles, the working fluid absorbs heat from the process fluid as it flows through the evaporator 5. As the working fluid absorbs heat, the working fluid evaporates to vapor. The working fluid then returns to the compressor 2. The above-described process continues while the heat transfer circuit 1 is operated, for example, in a cooling mode.

The refrigerant compositions and methods described herein may be used in the heat transfer circuit 1 of the HVACR system. For example, methods of retrofitting a refrigeration composition may be applied to the heat circuit 1 of FIG. 1 and/or to retrofit the refrigerant composition of the working fluid in the HVACR system. Further, refrigeration compositions described herein may be used as a working fluid in the heat transfer circuit 1 of FIG. 1. Additionally, methods for retrofitting a refrigerant composition described here may be carried out on the working fluid in the heat transfer circuit 1 of FIG. 1.

Refrigerant Compositions Including R32, R1123, and $CF_3I$

Figure 2:
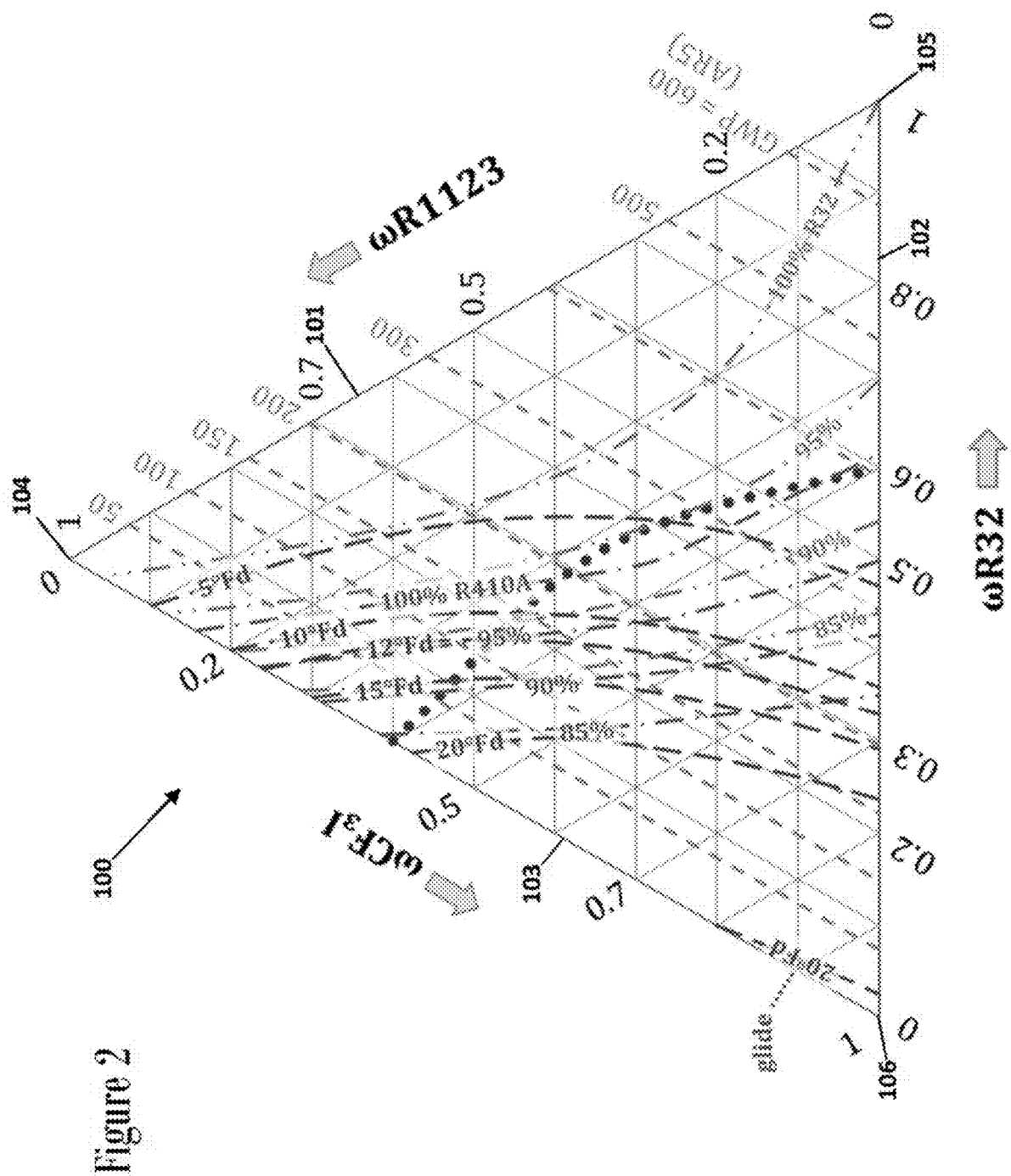
FIG. 2 illustrates a matrix of compositions of R1123, R32, and $CF_3I$ that includes plots of GWP, flammability, temperature glide, capacity relative to R410A, and capacity relative to R32.

FIG. 2 illustrates a matrix 100 of refrigerant compositions of R1123, R32, and $CF_3I$ that was developed to show plots of GWP, flammability, temperature glide, capacity relative to R410A, and capacity relative to R32 as function of the concentration of R1123, R32, and $CF_3I$. Each side 101, 102, 103 of the triangle corresponds to weight percentages of R1123, R32, and $CF_3I$, respectively. Each vertex 104, 105, 106 of the triangle corresponds to a composition of 100 wt % R1123, 100 wt % R32, and 100 wt % $CF_3I$, respectively. Properties (e.g., GWP, flammability, capacity relative to R410A or R32) of a refrigerant composition with a weight percent of R1123, R32, and $CF_3I$ can be estimated using the matrix 100.

Properties of the compositions for the matrix 100 were estimated using a thermodynamic model. The boundary between flammable and non-flammable compositions is shown by the dotted line extending from side 102 to side 103. Flammable compositions are on the right side of the boundary and non-flammable compositions are on the left side of the boundary. The boundary is based on the flammability characteristics of R1123, R32, $CF_3I$, R410A, and the flame suppressant properties of $CF_3I$. GWP is based on the GWP of individual components and the method described in ASHRAE Standard 34 for calculating the GWP of refrigerant blends. The flammability boundary is estimated based on known characteristics of the individual components and various binary mixtures of the components. Accordingly, the amount of each refrigerant in a composition along the flammability boundary may, for example, vary by up to about 5 percent in an embodiment. It should be appreciated the compositions and ranges shown and/or described may be updated based on further testing to confirm the location of the flammability boundary.

Figure 3:
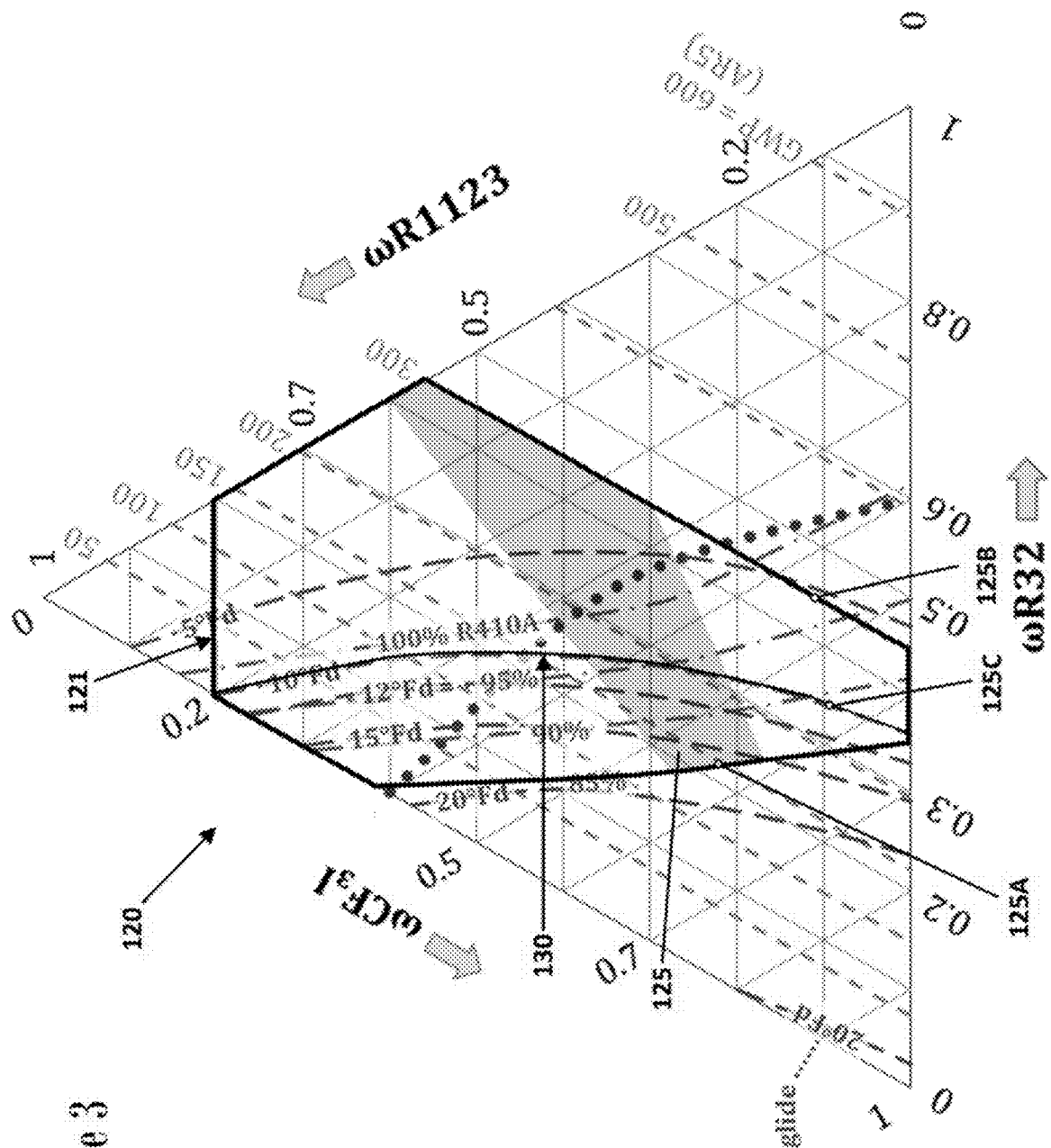
FIGS. 3-6 each illustrate a matrix based on the matrix of FIG. 2 that can be used to select a refrigerant composition with a desired set of properties in an embodiment.
Figure 4:
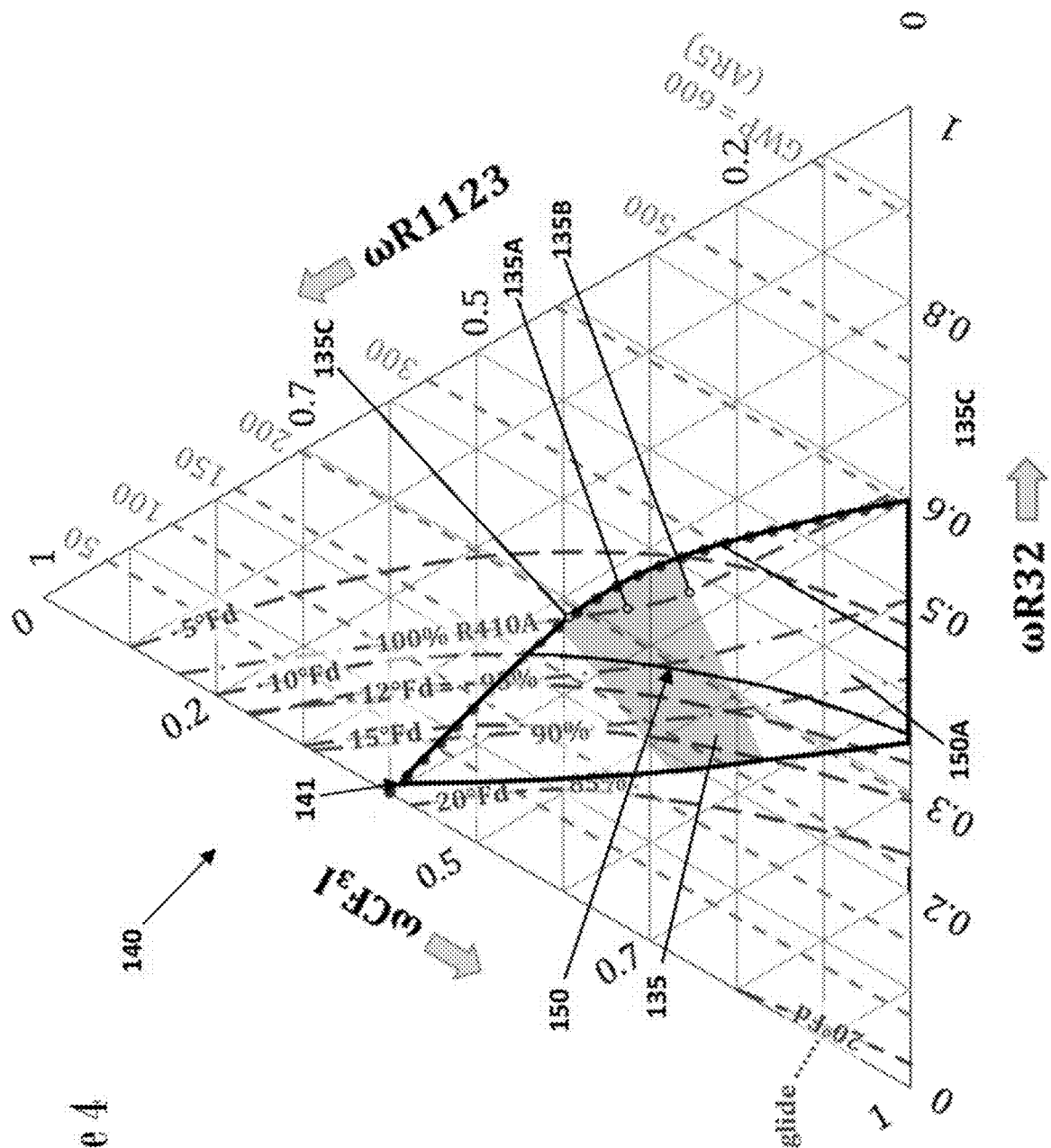

Each of FIGS. 3 and 4 illustrate a matrix 120, 140 based on matrix 100 of FIG. 2 and that has the same sides and vertices as the matrix 100 of FIG. 2. Each matrix 120, 140 is the same as the matrix 100 of FIG. 2, except the matrices 120, 140 do not include the capacities relative to R32 and illustrates ranges of refrigerant compositions. Each matrix 120, 140 can be used in a method of making a refrigerant composition including R1123, R32, and CF$_3$I and/or in a method of retrofitting a refrigerant composition so that the resulting refrigerant composition or retrofitted refrigerant composition has one or more desired properties. As shown in FIG. 2, an increase in the weight percentage of R32 (shown by side 102) in a composition also increases the GWP of the composition.

In an embodiment, a desired set of properties of a useful refrigerant composition includes a GWP of at or about 300 or less than 300 and a capacity that is at or about 85% or greater than 85% of the capacity of R410A. As discussed above, R1123 when used by itself as a working fluid decomposes. R1123 may be stable when mixed another refrigerant such as R32 or CF$_3$I and the mixture contains at or about 80 wt % or less than 80 wt % of the R1123. This is estimated based on the characteristics of R1123, CF$_3$I and R32. Accordingly, this maximum for the amount of R1123 may be updated based on further testing.

Based on these desired properties, a range of useful refrigerant compositions 121 is shown in matrix 120 of FIG. 3. The useful refrigerant compositions 121 include at or about 44 wt %, or less than 44 wt % and greater than 0 wt % of R32; at or about 80 wt %, or less than 80 wt % of R1123 and greater than 0 wt % of R1123; and at or about 65 wt %, or less than 65% and greater than 0 wt % of CF$_3$I.

In an embodiment, the useful compositions 121 may include preferred compositions 130 as shown in FIG. 3. The properties of the preferred compositions 130 include a capacity at or about 85% or greater than 85% of the capacity of R410A, a GWP at or about 300 or less than 300, and a temperature glide at or about 10° F. or less than 10° F. The preferred compositions 130 include at or about 44 wt %, or less than 44 wt % and greater than 0 wt % of R32; at or about 80 wt %, or less than 80 wt % of R1123 and greater than 0 wt % of R1123; and at or about 64 wt %, or less than 64% and greater than 0 wt % of CF$_3$I.

FIG. 3 also includes a shaded area 125. The compositions within the shaded area 125 have a ratio of R1123 to R32 (R1123:R32) by weight that is from at or about 60:40 to at or about 40:60. In an embodiment, compositions having a ratio of R1123 to R32 that is from about 60:40 to about 40:60 have high stability and similar thermodynamic properties as R410A as discussed below regarding FIGS. 7A-7D. In some embodiments, a set of desired properties may include the high stability and advantageous thermodynamic properties provided by the compositions within the shaded area 125. In such embodiments, desired compositions may be selected from the compositions shown in FIG. 3 (e.g., useful compositions 121 and/or preferred compositions 130) and described with respect to FIG. 3 so as to be within the shaded area 125.

Of the compositions within the shaded area 125, compositions 125A, 125B, and 125C may be desired as they have thermodynamic properties similar to R410A. Composition 125A includes at or about 22 wt % of R1123, at or about 22 wt % of R32, and at or about 56 wt % of CF$_3$I. Composition 125B includes at or about 11 wt % of R1123, at or about 44 wt % of R32, and at or about 45 wt % of CF$_3$I. Composition 125C includes at or about 9 wt % of R1123, at or about 35 wt % of R32, and at or about 56 wt % of CF$_3$I. Table 1 below shows various properties of compositions 125A-125B. Table 1 also includes the reference values used for R410A. In calculating thermodynamic properties, the assumption is that compressor volumetric displacement is constant. The increase in isentropic enthalpy may be used in specific types of compressors, such as centrifugal compressors. In an embodiment, one or more end points in the ranges of each component (R1123/R32/CF$_3$I) for compositions 125A-125C may be used as an end point for a desired composition.

TABLE 1

Properties of R410A and Compositions 125A, 125B, 125C

|  | R410A | 125A | 125B | 125C |
| --- | --- | --- | --- | --- |
| Capacity* | 0.912[1] | 85.7% | 97.4% | 90.1% |
| GWP | 1,924 | 150 | 298 | 238 |
| Coefficient of Performance* | 4.467 | 100.6% | 100% | 100.1% |
| Compressor Discharge Temperature* | 173.2° F. | +20° F. | +19° F. | +21° F. |
| Mass Flow Rate* | 162.0 | 135% | 109.6% | 120.7% |
| Density (Liquid)* | 58.4 lb$_m$/ft$^3$ | 16.7% | 120% | 132% |
| Temperature Glide (at compressor) | 0.2° F. | 16.7° F. | 5.5° F. | 10.1° F. |
| Compressor Pressure Ratio (Discharge Pressure:Suction Pressure)* | 2.58 | 102.5% | 99.9% | 100.9% |
| Average Pressure in Condenser | 406.4 psia | 342 psia | 388 psia | 359 psia |
| Average Pressure in Evaporator | 157.5 psia | 129 psia | 151 psia | 138 psia |
| Temperature Critical Point | 160.4° F. | 187° F. | 184° F. | 191° F. |

*Property for Compositions 125A, 125B, and 125C are relative to R410A (100% being equal to R410A).
[1]Tons per CFM of compressor displacement (assumed to be fixed).

In an embodiment, the desired property of the GWP being equal or less than 300 may be different. In an embodiment, a composition having a GWP of at or about 200 or less than 200 may be desired. In an embodiment, a composition having a GWP of at or about 150 or less than 150 may be desired. In an embodiment, a composition having a GWP of at or about 150 to at or about 300 may be desired. In such embodiments, desired compositions may be selected from the compositions shown in FIG. 3 (e.g., useful compositions 121 and/or preferred compositions 130) and described with respect to FIG. 3 to include compositions with the desired GWP.

In an embodiment, the desired property of the capacity being at or about 85% or greater than 85% of the capacity of R410A may be different. In an embodiment, a composition having a capacity at or about 90% or greater than 90% of the capacity of R410A may be desired. In an embodiment, a composition having a capacity at or about 95% or greater than 95% of the capacity of R410A may be desired. In an embodiment, a composition having a capacity at or about the capacity of R410A or greater than the capacity of R410A may be desired. In such embodiments, desired compositions may be selected from the compositions shown in FIG. 3 (e.g., useful compositions 121 and/or preferred compositions 130) and described with respect to FIG. 3 to include compositions with the desired capacity.

In an embodiment, a desired property of the temperature glide may be different than 10° F. In an embodiment, a composition having a temperature glide at or about 15° F. or less than 15° F. may be desired. In an embodiment, a composition having a temperature glide at or about 12° F. or less than 12° F. may be desired. In an embodiment, a composition having a temperature glide at or about 5° F. or less than 5° F. may be desired. In such embodiments, desired compositions may be selected from the compositions shown in FIG. 3 (e.g., useful compositions 121 and/or preferred compositions 130) and described with respect to FIG. 3 to include compositions with the desired capacity.

In an embodiment, a desired set of properties of a refrigerant composition includes being nonflammable and a capacity that is at or about 85% or greater than 85% of the capacity of R410A. Based on these desired properties, a range of useful refrigerant compositions 141 is shown in matrix 140 of FIG. 4. The useful refrigerant compositions 141 includes at or about 2% to at or about 60 wt % of R32; at or about 58 wt %, or less than 58 wt % of R1123 and greater than 0 wt % of R1123; and at or about 32 wt % to at or about 65% of $CF_3I$.

In an embodiment, the useful compositions 141 may include preferred compositions 150 as shown in FIG. 4. The properties of the preferred compositions 150 include being high stability and similar thermodynamic properties relative to R410A as discussed below regarding FIGS. 7A-7D. In some embodiments, a set of desired properties may include high stability and one or more of the advantageous thermodynamic properties provided by compositions within the shaded area 135. In such embodiments, desired compositions may be selected from the compositions shown in FIG. 4 (e.g., useful compositions 141 and/or preferred compositions 150) and described with respect to FIG. 4 so as to include compositions within the shaded area 135.

Of the compositions within the shaded area 135, compositions 135A, 135B, and 135C may be desired as they have thermodynamic properties similar to R410A. Composition 135A includes at or about 32.5 wt % of R1123, at or about 32.5 wt % R32, and at or about 35 wt % of $CF_3I$. Composition 135B includes at or about 40 wt % of R1123, at or about 38 wt % of R32, and at or about 37 wt % of $CF_3I$. Composition 135C includes at or about 39 wt % of R1123, at or about 29 wt % of R32, and at or about 32 wt % of $CF_3I$. Table 2 below shows various properties of compositions 135A-135C. Table 2 also includes the reference values used for R410A. In calculating thermodynamic properties, the assumption is that compressor volumetric displacement is constant. The increase in isentropic enthalpy may be used in specific types of compressors, such as centrifugal compressors. In an embodiment, one or more end points in the ranges of each component (R1123/R32/$CF_3I$) for compositions 135A-135C may be used as an end point for a desired composition.

TABLE 2

Properties of R410A and Compositions 135A, 135B, 135C

|  | R410A | 135A | 135B | 135C |
|---|---|---|---|---|
| Capacity* | 0.912[1] | 100.0% | 99.9 | 100.3% |
| GWP | 1,924 | 221 | 258 | 190 |
| Coefficient of Performance* | 4.467 | 98.1% | .988 | 97.5% |
| Compressor Discharge Temperature* | 173.2° F. | + 17.1° F. | +17.6 | +16.5° F. |
| Mass Flow Rate* | 162.0 | 112.4% | 110.0 | 114% |
| Density (Liquid)* | 58.4 $lb_m/ft^3$ | 1.119% | 112.6 | 111% |
| Temperature Glide (at compressor) | 0.2° F. | 7.2° F. | 6.1° F. | 7.9° F. |
| Compressor Pressure Ratio (Discharge Pressure:Suction Pressure)* | 2.58 | 100.7% | 100.2% | 101.1% |
| Isentropic Enthalpy Increase | 11.61 | 90.7% | 92.1% | 89.9% |
| Average Pressure in Condenser | 406.4 psia | 408.6 psia | 404.5 psia | 413.5 psia |
| Average Pressure in Evaporator | 157.5 psia | 157.3 psia | 156.5 psia | 158.6 psia |
| Temperature Critical Point | 160.4° F. | 173.5° F. | 176.7° F. | 170.1° F. |

*Property for Compositions 135A, 135B, and 135C are relative to R410A (100% being equal to R410A).
[1]Tons per CFM of compressor displacement (assumed to be fixed).

nonflammable, a capacity greater than 85% of the capacity of R410A, and a temperature glide at or about 10° F. or less than 10° F. The preferred compositions 150 include at or about 22 wt % to at or about 60 wt % of R32; at or about 44 wt %, or less than 44 wt % of R1123 and greater than 0 wt % of R1123; and at or about 32 wt % to at or about 64 wt % of $CF_3I$. Of preferred compositions 150, compositions 150A may be desired in an embodiment as they have a GWP of at or about 300 or less than 300. Compositions 150A are an example of a particular range of compositions that may be desired depending upon the set of desired properties in an embodiment.

FIG. 4 also includes a shaded area 135. The compositions within the shaded area 135 have a ratio of R1123 to R32 (R1123:R32) by weight that is from at or about 60:40 to at or about 40:60. In an embodiment, compositions having a ratio of R1123 to R32 from about 60:40 to about 40:60 have In an embodiment, the set of desired properties may include a specific GWP. In an embodiment, a composition having a GWP of at or about 300 or less than 300 may be desired. In an embodiment, a composition having a GWP of at or about 200 or less than 200 may be desired. In an embodiment, a composition having a GWP of at or about 150 or less than 150 may be desired. In an embodiment, a composition having a GWP of at or about 150 to at or about 300 may be desired. In such embodiments, desired compositions may be selected from the compositions shown in FIG. 4 (e.g., useful compositions 141 and/or preferred compositions 150) and described with respect to FIG. 4 to include compositions with the desired GWP.

In an embodiment, the desired property of the capacity being equal or greater than 85% of the capacity of R410A may be different. In an embodiment, a composition having a capacity at or about 90% or greater than 90% of the capacity of R410A may be desired. In an embodiment, a composition having a capacity at or about 95% or greater than 95% of the capacity of R410A may be desired. In an embodiment, a composition having a capacity at or about the capacity of R410A or greater than the capacity of R410A may be desired. In such embodiments, desired compositions may be selected from the compositions shown in FIG. 4 (e.g., useful compositions 141 and/or preferred compositions 150) and described with respect to FIG. 4 so as to include compositions with the desired capacity.

In an embodiment, a desired property of the temperature glide may be different than 10° F. In an embodiment, a composition having a temperature glide at or about 15° F. or less than 15° F. may be desired. In an embodiment, a composition having a temperature glide at or about 12° F. or less than 12° F. may be desired. In an embodiment, a composition having a temperature glide at or about 5° F. or less than 5° F. may be desired. In such embodiments, desired compositions may be selected from the compositions shown in FIG. 4 (e.g., useful compositions 141 and/or preferred compositions 150) and described with respect to FIG. 4 so as to include compositions with the desired temperature glide.

Figure 5:
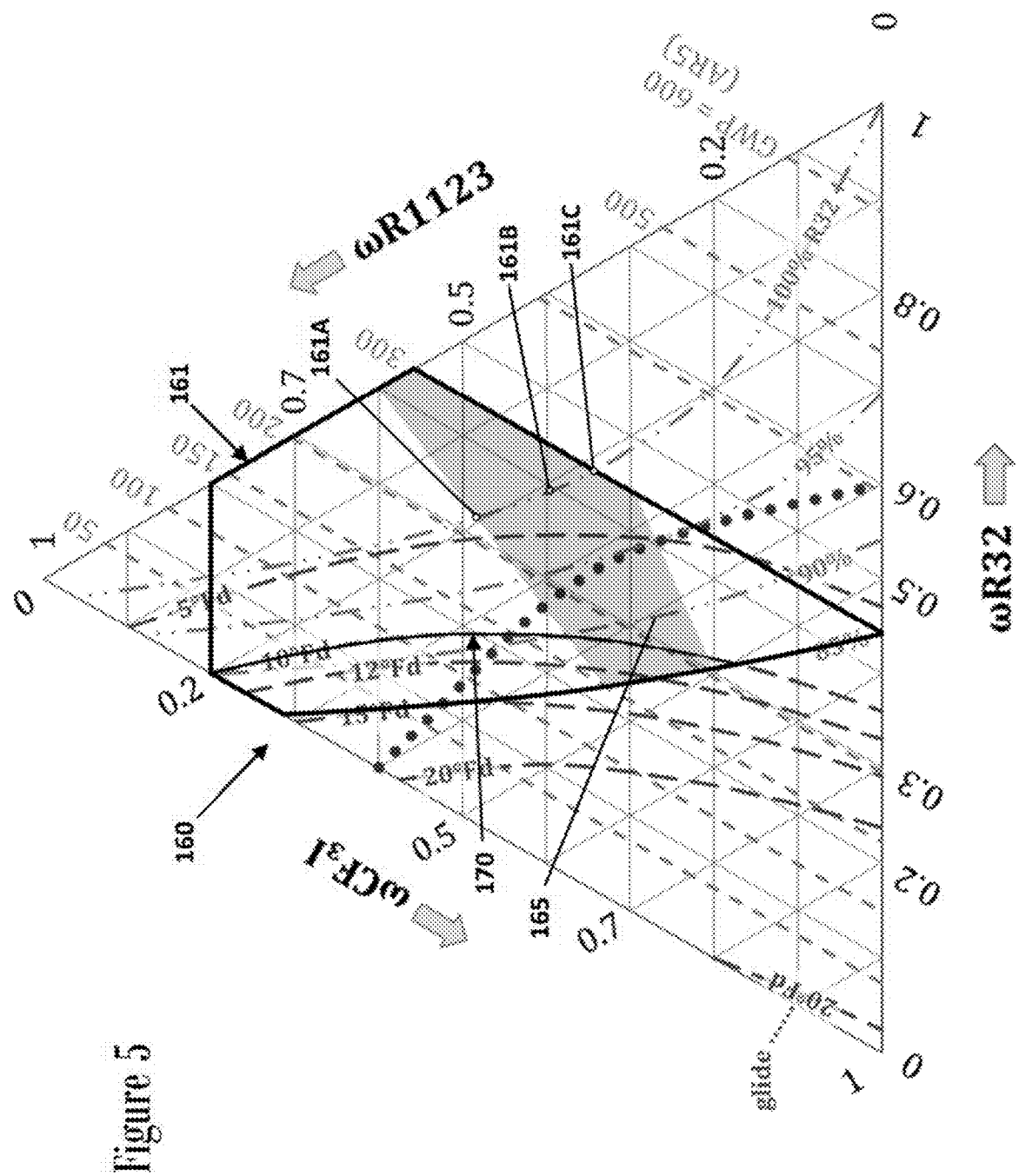
Figure 6:
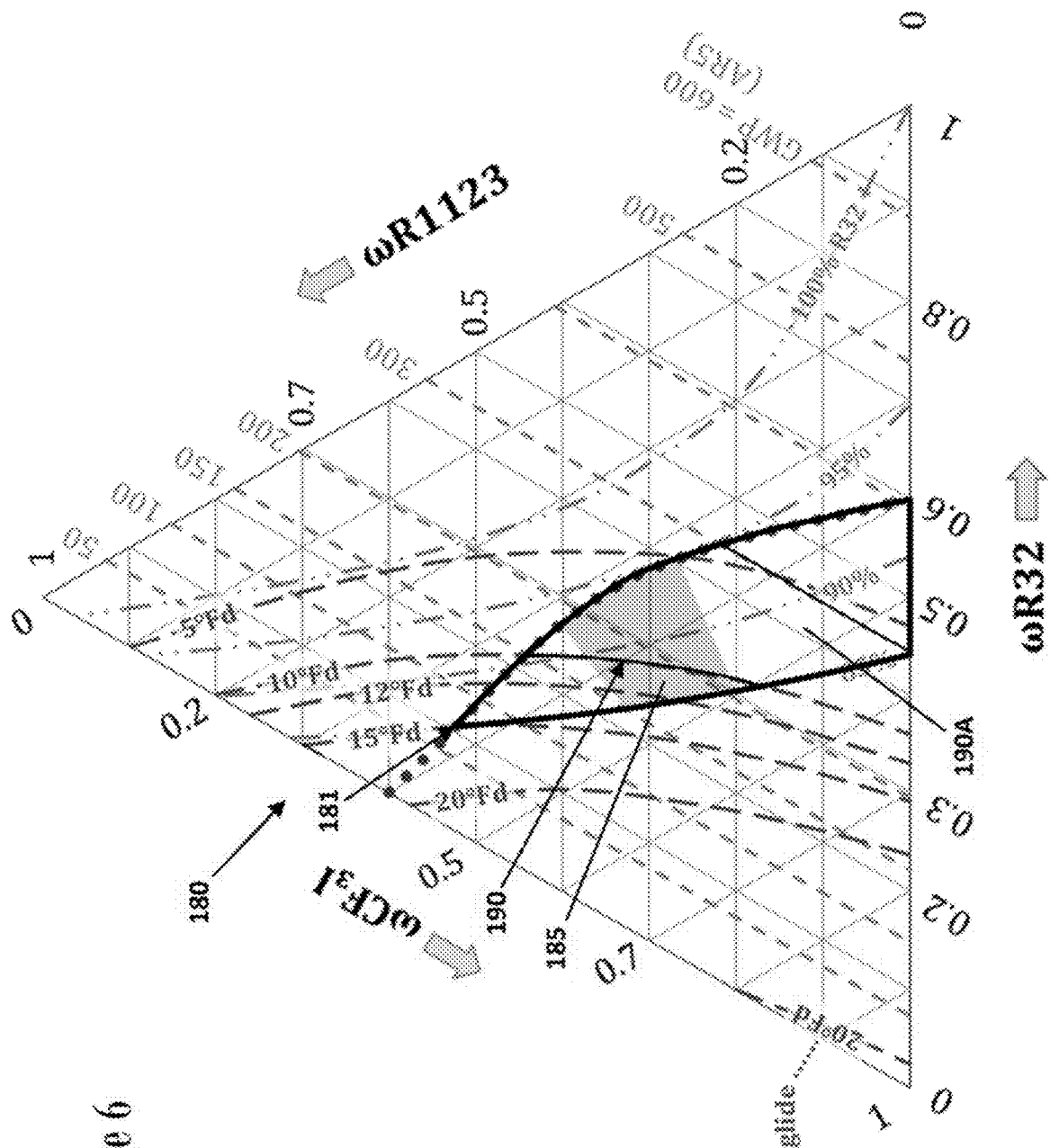

Each of FIGS. 5 and 6 illustrate a matrix 160, 180 based on matrix 100 of FIG. 2 and has the same sides and vertices as the matrix 100 of FIG. 2. Each matrix 160, 180 is the same as the matrix 100 of FIG. 2, except the matrices 160, 180 do not include capacities relative to R410A and illustrate ranges of compositions that may be desirable based on a specific set of desired properties. Each matrix 160, 180 can be used in a method of making a refrigerant composition including R1123, R32, and CF$_3$I and/or in a method of retrofitting a refrigerant composition so that the produced refrigerant composition or retrofitted refrigerant composition has one or more desired properties.

In an embodiment, a desired set of properties of a refrigerant composition includes being stable, a GWP at or about 300 or less than 300, and a capacity that is at or about 85% or greater than 85% of the capacity of R32. Based on these desired properties, a range of useful refrigerant compositions 161 is shown in matrix 160 of FIG. 5. As discussed above, a composition having at or about 80 wt % or less than 80 wt % of R1123 may be stable as the composition contains a large enough amount of other refrigerants (e.g., CF$_3$I and R32) to prevent the R1123 from decomposing. Accordingly, the upper end point for the amount of R1123 being at or about 80% or less than 80% may be updated based on further testing. The useful refrigerant compositions 161 include at or about 44 wt %, or less than 44 wt % and greater than 0 wt % of R32; at or about 80 wt %, or less than 80 wt % of R1123 and greater than 0 wt % of R1123; and at or about 56 wt %, or less than about 56 wt % and greater than 0 wt % of CF$_3$I.

In an embodiment, the useful compositions 161 may include preferred compositions 170 as shown in FIG. 5. The properties of the preferred compositions 170 include a capacity at or about 85% or greater than 85% of the capacity of R32, a GWP at or about 300 or less than 300, and a temperature glide at or about 10° F. or less than 10° F. The preferred compositions 170 include at or about 44 wt %, or less than 44 wt % and greater than 0 wt % of R32; at or about 80 wt %, or less than 80 wt % and greater than 0 wt % of R1123; and at or about 56 wt %, or less than 56% and greater than 0 wt % of CF$_3$I.

FIG. 5 also includes a shaded area 165. The compositions within the shaded area 165 have a ratio of R1123 to R32 (R1123:R32) by weight that is from at or about 60:40 to at or about 40:60. In an embodiment, compositions having a ratio of R1123 to R32 that is from about 60:40 to about 40:60 have higher stability. In some embodiments, a set of desired properties may include higher stability. In such embodiments, desired compositions may be selected from the compositions shown in FIG. 5 (e.g., useful compositions 161 and/or preferred compositions 170) and described with respect to FIG. 5 so as to include compositions within the shaded area 165.

Of the useful compositions 161, compositions 161A-161C may be desired in an embodiment as they have a capacity that is comparable to R32. Composition 161B has a ratio of R1123 to R32 (R1123:R32) of 50:50. Composition 161A includes at or about 48.6 wt % of R1123, about or about 32.4 wt % of R32, and at or about 19 wt % of CF$_3$I. Composition 161B includes at or about 39.5 wt % of R1123, at or about 39.5 wt % of R32, and at or about 21.0 wt % of CF$_3$I. Composition 161C includes at or about 34 wt % of R1123, at or about 44 wt % of R32, and at or about 22 wt % of CF$_3$I. Thermodynamic properties for compositions 161A-161C are shown below in Table 3. Table 3 also includes the reference properties used for R32. The properties in Table 3 were calculated in a similar manner as discussed above regarding Table 2.

TABLE 3

Properties of R32 and Compositions 161A, 161B, 161C

|  | R32 | 161A | 161B | 161C |
| --- | --- | --- | --- | --- |
| Capacity** | 0.983[1] | 100.2% | 100.0% | 99.8% |
| GWP | 677 | 220 | 268 | 298 |
| Coefficient of Performance* | 4.513 | 95.5% | 96.4% | 97.0% |
| Compressor Discharge Temperature* | 202.0 | +14.3° F. | +13.0° F. | +12.2° F. |
| Mass Flow Rate* | 108.6 lb$_m$/ft$^3$ | 160.2% | 154.2% | 150.4% |
| Density (Liquid)* | 53.77 | 111.2% | 112.2% | 112.7% |
| Temperature Glide (at compressor) | 0.0 | 3.3° F. | 3.6° F. | 4.1° F. |
| Compressor Pressure Ratio (Discharge Pressure:Suction Pressure)* | 2.59 | 99.2% | 99.3% | 99.6% |
| Isentropic Enthalpy Increase | 17.14 | 65.4% | 67.2% | 68.5% |

*Property for Compositions 161A, 161B, and 161C are relative to R410A (100% being equal to R410A).
**Capacity for Compositions 161A, 161B, and 161C are relative to R32 (100% being equal to R32)
[1]Tons per CFM of compressor displacement (assumed to be fixed).

In an embodiment, the desired property of the GWP being equal or less than 300 may be different. In an embodiment, a composition having a GWP of at or about 200 or less than 200 may be desired. In an embodiment, a composition having a GWP of at or about 150 or less than 150 may be desired. In an embodiment, a composition having a GWP of at or about 150 to at or about 300 may be desired. In such embodiments, desired compositions may be selected from the compositions shown in FIG. 5 (e.g., useful compositions 161 and/or preferred compositions 170) and described with respect to FIG. 5 to include compositions with the desired GWP.

In an embodiment, the desired property of the capacity being at or about 85% or greater than 85% of the capacity of R32 may be different. In an embodiment, a composition having a capacity at or about 90% or greater than 90% of the capacity of R32 may be desired. In an embodiment, a composition having a capacity at or about 95% or greater than 95% of the capacity of R32 may be desired. In an embodiment, a composition having a capacity at or about the capacity of R32 or greater than the capacity of R32 may be desired. In such embodiments, desired compositions may be selected from the compositions shown in FIG. 5 (e.g., useful compositions 161 and/or preferred compositions 170) and described with respect to FIG. 5 to include compositions with the desired capacity.

In an embodiment, a desired property of the temperature glide may be different than 10° F. In an embodiment, a composition having a temperature glide at or about 15° F. or less than 15° F. may be desired. In an embodiment, a composition having a temperature glide at or about 12° F. or less than 12° F. may be desired. In such embodiments, the useful compositions shown in FIG. 5 would include those compositions with the desired temperature glide. In an embodiment, a composition having a temperature glide at or about 5° F. or less than 5° F. may be desired. In such embodiments, desired compositions may be selected from the compositions shown in FIG. 5 (e.g., useful compositions 161 and/or preferred compositions 170) and described with respect to FIG. 4 to include compositions with the desired temperature glide.

In an embodiment, a desired set of properties of a refrigerant composition includes being nonflammable and a capacity that is at or about 85% or greater than 85% of the capacity of R32. Based on these desired properties, a range of useful refrigerant compositions 180 is shown in matrix 180 of FIG. 6. The useful refrigerant compositions 181 include at or about 10% to at or about 60 wt % of R32; at or about 53 wt %, or less than 53 wt % and greater than 0 wt % of R1123; and at or about 32 wt % to at or about 56% of $CF_3I$.

In an embodiment, the useful compositions 181 may include preferred compositions 190 as shown in FIG. 6. The properties of the preferred compositions 190 include a capacity at or about 85% or greater than 85% of the capacity of R32, a GWP at or about 300 or less than 300, and a temperature glide at or about 10° F. or less than 10° F. The preferred compositions 190 include at or about 23% to at or about 60 wt % of R32; at or about 43 wt %, or less than 43 wt % and greater than 0 wt % of R1123; and at or about 32 wt % to at or about 56% of $CF_3I$.

FIG. 6 also includes a shaded area 185. The compositions within the shaded area 185 have a ratio of R1123 to R32 (R1123:R32) by weight that is from at or about 60:40 to at or about 40:60. In an embodiment, compositions having a ratio of R1123 to R32 that is from about 60:40 to about 40:60 have higher stability. In some embodiments, a set of desired properties may include higher stability. In such embodiments, desired compositions may be selected from the compositions shown in FIG. 6 (e.g., useful compositions 181 and/or preferred compositions 190) and described with respect to FIG. 6 so as to include those compositions within the shaded area 185.

In an embodiment, the set of desired properties may include a specific GWP. In an embodiment, a composition having a GWP of at or about 300 or less than 300 may be desired. In an embodiment, a composition having a GWP of at or about 200 or less than 200 may be desired. In an embodiment, a composition having a GWP of at or about 150 or less than 150 may be desired. In an embodiment, a composition having a GWP of at or about 150 to at or about 300 may be desired. In such embodiments, desired compositions may be selected from the compositions shown in FIG. 6 (e.g., useful compositions 181 and/or preferred compositions 190) and described with respect to FIG. 6 to include compositions with the desired GWP.

In an embodiment, the desired property of the capacity at or about 85% or greater than 85% of the capacity of R32 may be different. In an embodiment, a composition having a capacity at or about 90% or greater than 90% of the capacity of R32 may be desired. In an embodiment, a composition having a capacity at or about 95% or greater than 95% of the capacity of R32 may be desired. In such embodiments, desired compositions may be selected from the compositions shown in FIG. 6 (e.g., useful compositions 181 and/or preferred compositions 190) and described with respect to FIG. 6 to include compositions with the desired capacity.

In an embodiment, a desired property of the temperature glide may be different than 10° F. In an embodiment, a composition having a temperature glide at or about 12° F. or less than 12° F. may be desired. In such an embodiment, the useful compositions 181 shown in FIG. 6 would include those compositions with the desired temperature glide. In an embodiment, a composition having a temperature glide at or about 5° F. or less than 5° F. may be desired. In such embodiments, desired compositions may be selected from the compositions shown in FIG. 6 (e.g., useful compositions 181 and/or preferred compositions 190) and described with respect to FIG. 6 to include compositions with the GWP.

Each of FIGS. 7A-7D illustrates a matrix 200, 210, 220, 230 of a thermodynamic property for compositions of R1123, R32, and $CF_3I$ by weight percentage. Compositions in each matrix 200, 210, 220, 230 are calculated similarly to the matrices 100, 120, 140, 160, 180 in FIGS. 2-6. Accordingly, in FIGS. 7A-7D, the axes of R1123 are horizontal and parallel to the side for R32, the axes for R32 are parallel to the side for $CF_3I$, and the axes for $CF_3I$ are parallel to the side for R1123. Each matrix 200, 210, 220, 230 shows values at each 10 wt % of R1123, R32, and $CF_3I$. For example, composition 201 in FIG. 7A corresponds to a composition of 70 wt % R1123, 20 wt % R32, and 10 wt % $CF_3I$.

Figure 7A:
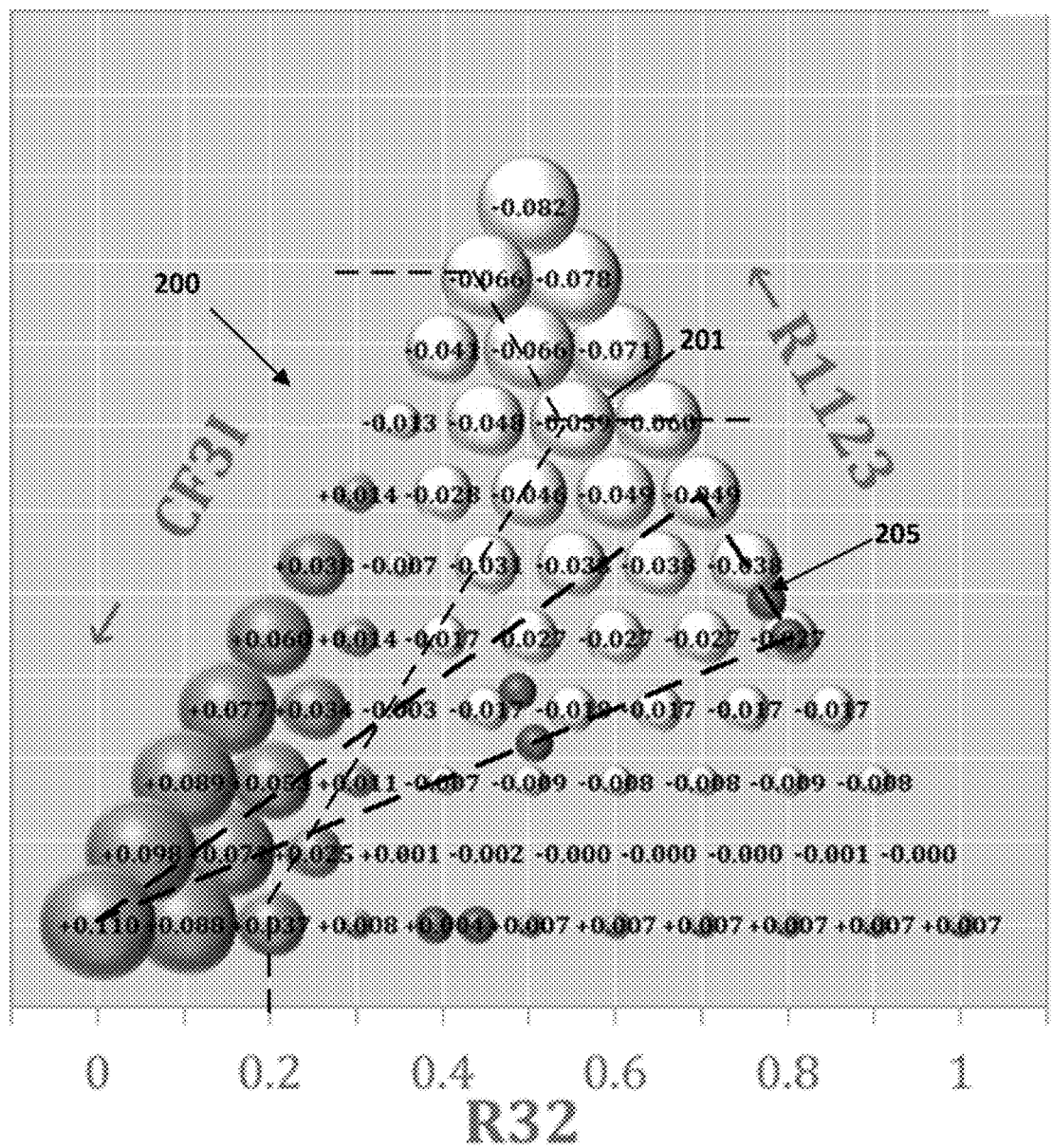
FIGS. 7A-7D each illustrate a matrix of a thermodynamic property of compositions of R1123, R32, and $CF_3I$.
Figure 7B:
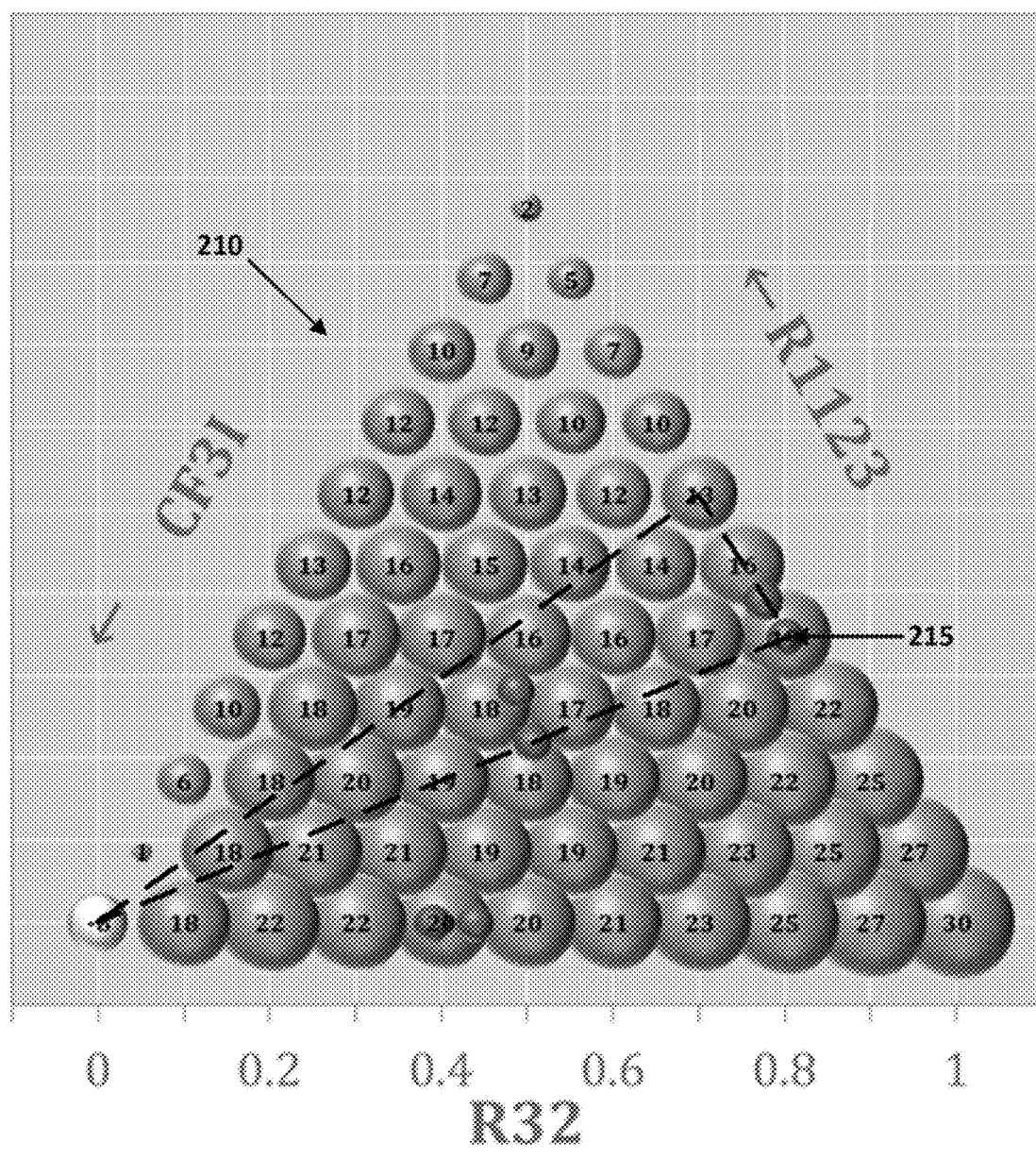
Figure 7C:
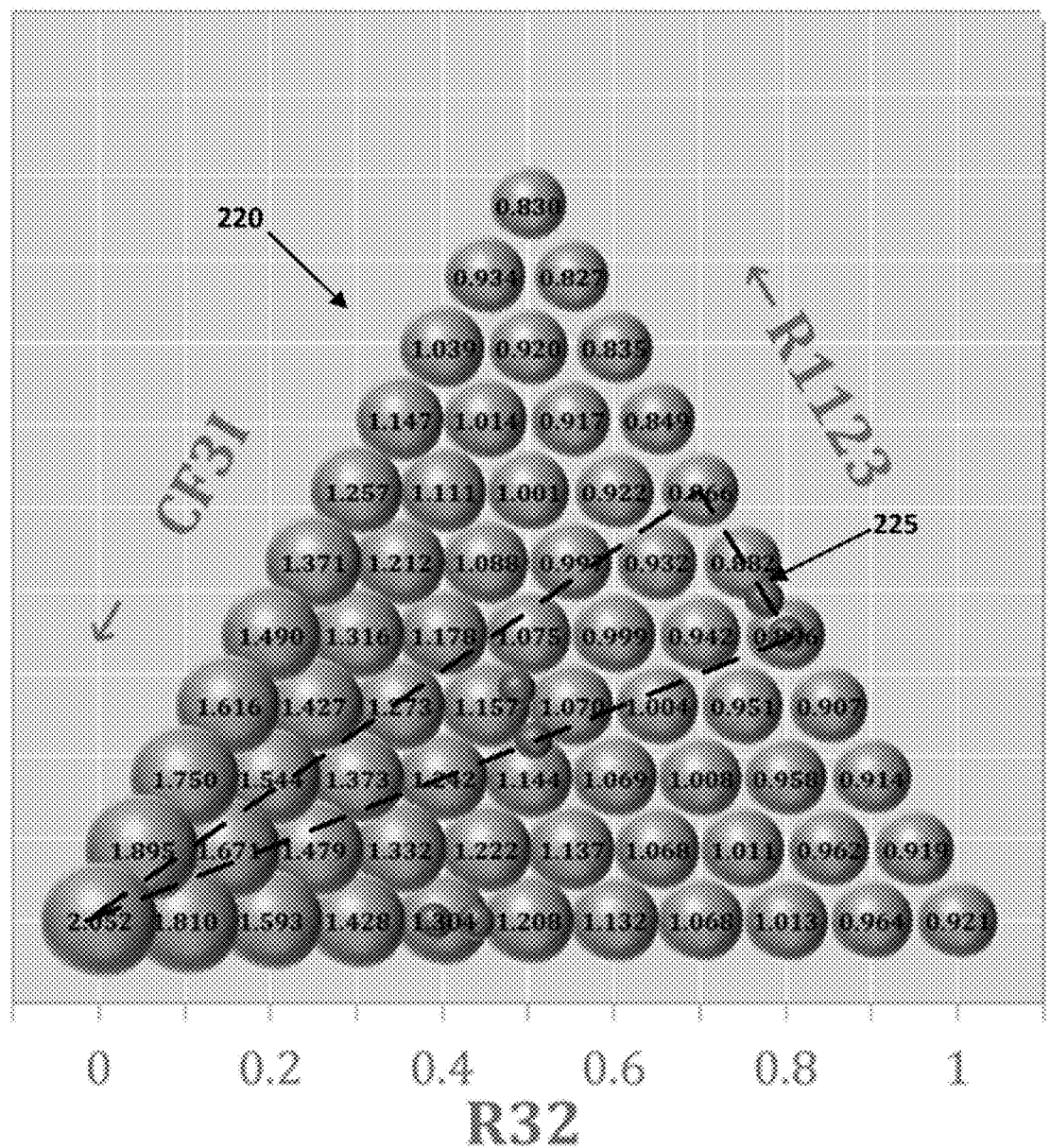
Figure 7D:
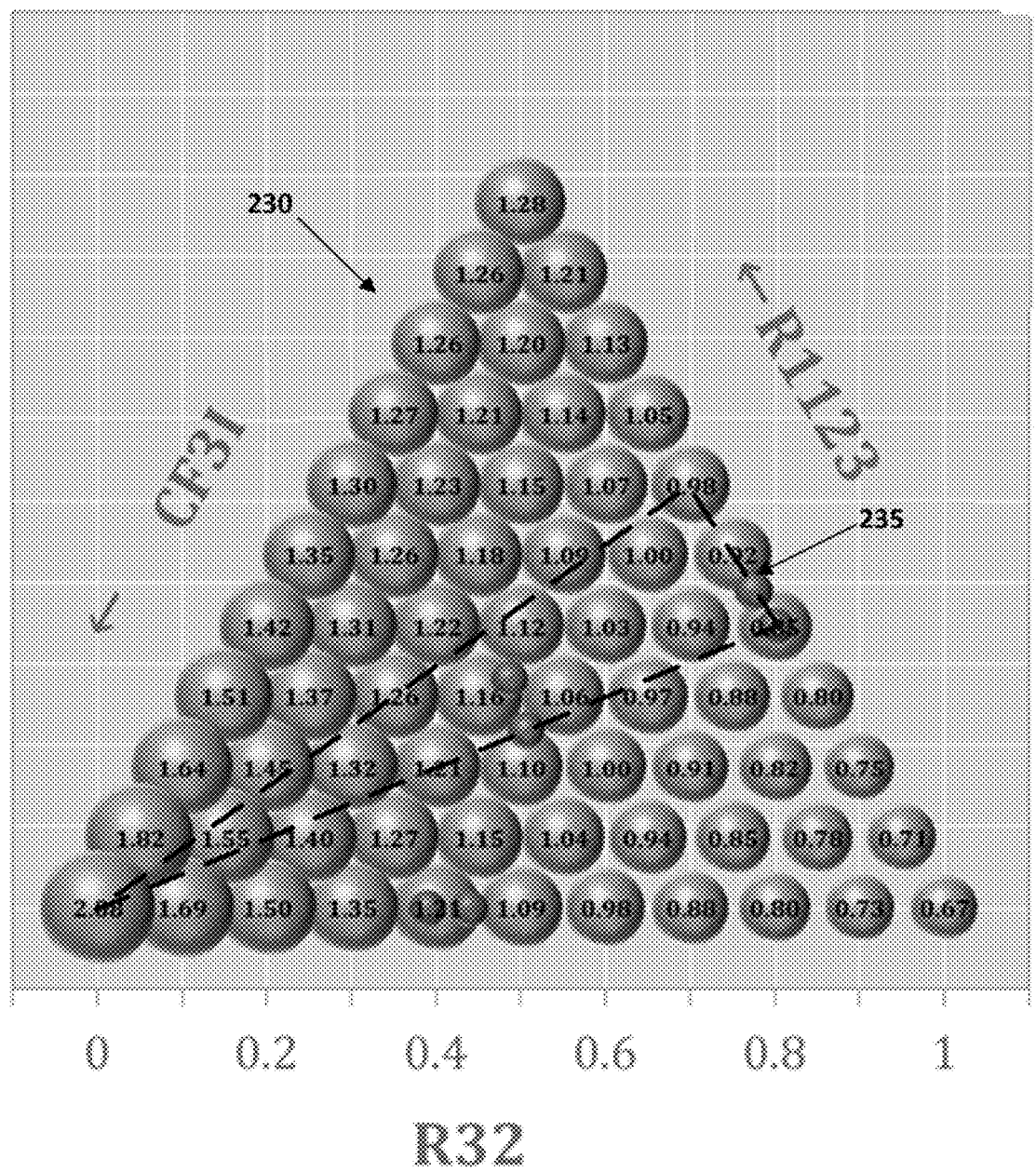

FIG. 7A illustrates a matrix 200 of coefficients of performance relative to R410A (e.g., a coefficient of performance of a composition minus the coefficient of performance for R410A divided by the coefficient of performance for R410A) for compositions of R1123, R32, and $CF_3I$. FIG. 7B illustrates a matrix 210 of compressor discharge temperatures in Fahrenheit relative to R410A (e.g., compressor discharge temperatures of a composition minus the compressor discharge temperature for R410A) for compositions of R1123, R32, and $CF_3I$. FIG. 7C illustrates a matrix 220 of densities of each composition when in a liquid phase relative to R410 (e.g., density of a composition divided by the density in the liquid phase of R410A) for compositions of R1123, R32, and $CF_3I$. FIG. 7D illustrates a matrix 230 of mass flow rates relative to R410A (e.g., mass flow rate of a composition divided by the mass flow rate for R410A) for compositions of R1123, R32, and $CF_3I$.

Each matrix 200, 210, 220, 230 also specifies a range of compositions 205, 215, 225, 235. The compositions within the range 205, 215, 225, 235 have a ratio of R1123 to R32 (R1123:R32) by weight that is from at or about 60:40 to at or about 40:60. As shown by FIG. 7A, the thermodynamic efficiency increases as the amount of $CF_3I$ in a composition decreases. Compositions within the range 205 and near the middle of the matrix 200 (e.g., near compositions have equal amounts of R1123/R32/$CF_3I$) having a similar thermodynamic efficiency as R410A. As shown by FIG. 7B, compositions in the range 215 result in a moderate change in compressor discharge temperature of about 15° F. to about 20° F. This range is higher than may be produced when using R452B (another proposed alternative to R410A), but is less than the about 30° F. that occurs with using R32. As shown by FIG. 7C, the compositions in the range 225 have a density that is comparable to R410A. Compositions near the middle of the matrix 220 within the range 225 have a density that is about the same as R410A. As shown in FIG. 7D, compositions in the range 235 have slightly higher flow rates, but are similar near the middle of the matrix 235.

Performance of a refrigerant composition may be based on one or more of a coefficient of performance, compressor discharge temperature, liquid density, and mass flow rate. In an embodiment, the desired set of properties includes one or more of a coefficient of performance, compressor discharge temperature, mass flow rate, and operating pressure. In an embodiment, the set of desired properties result in the refrigerant composition performing in a comparable manner to R410A. In an embodiment, the set of desired properties result in the refrigerant composition performing in a comparable manner to a R32. In an embodiment, a composition that has a coefficient of performance of greater than 97% relative to R410A or R32 is desired. In an embodiment, a composition that results in a change in the compressor discharge temperature, relative to R410A or R32 is at or about 32° or less than 32° F. may be desired. In an embodiment, a composition that results in a change in the compressor discharge temperature, relative to R410A or R32, that is at or about 20° F. or less than 20° F. may be preferred. In an embodiment, a composition that results in a mass flow rate of at or about 1.5 or less than 1.5 times greater than R410A or R32 may be desired. In an embodiment, a composition that results in a mass flow rate of at or about 1.2 or less than 1.2 times greater than R410A or R32 may be desired. In an embodiment, a composition that results in a mass flow rate of at or about 1.1 or less than 1.1 times greater than R410A or R32 may be desired. In an embodiment, a composition that has a liquid density that is at or about 1.5 or less than 1.5 may be desired. FIGS. 7A-7D provide values relative to R410A. The coefficient of performance and compressor discharge temperature, are provided in Tables 2 and 3 for both R410A and R32. For example, the matrices 200, 210, 220, and 230 may be modified based on the values for R410 and R32 in Tables 2 and 3 to approximate values relative to R32.

In such embodiments, one or more of FIGS. 7A-7D may be utilized to select compositions having a desired coefficient of performance, compressor discharge temperature, mass flow rate, and/or operating pressure. For example, desired compositions may be selected from the compositions shown in and/or described with respect to one of the FIGS. 3-6 to have a desired coefficient of performance, compressor discharge temperature, mass flow rate, and/or operating pressure by utilizing one or more of FIGS. 7A-7D. In an embodiment, a method of making a refrigerant composition and/or a method of retrofitting a refrigerant composition utilizes one or more of the matrices of FIGS. 2-7D so that the resulting refrigerant composition or retrofitted refrigerant composition has the desired set of properties.

Refrigerant Compositions Including R32, R1123, and R125

Figure 8:
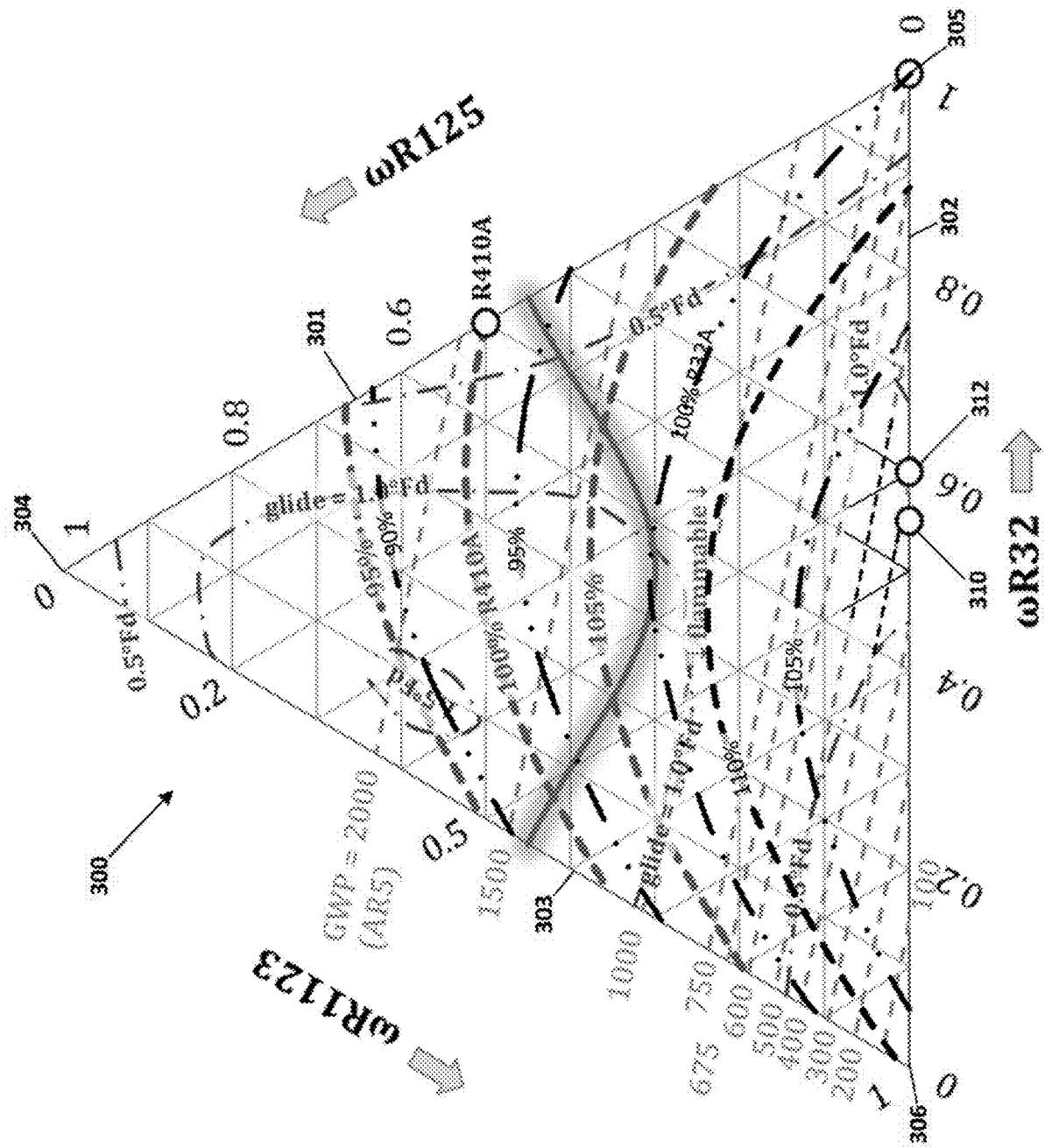
FIG. 8 illustrates a matrix of compositions of R1123, R32, and R125 that includes plots of GWP, flammability, temperature glide, capacity relative to R410A, and capacity relative to R32.

FIG. 8 illustrates a matrix 300 of refrigerant compositions of R1123, R32, and R125 that was developed to show plots of GWP, flammability, temperature glide, capacity relative to R410A, and capacity relative to R32 as function of the concentration of R1123, R32, and R125. The sides 303, 302, 301 of the triangle correspond to weight percentages of R1123, R32, and R125, respectively. The vertices 304, 305, 306 of the triangle corresponds to a composition of 100 wt % R1123, 100 wt % R32, and 100 wt % R125, respectively. Properties (e.g., GWP, flammability, capacity relative to R410A or R32) of a refrigerant composition with a weight percent of R1123, R32, and R125 can be estimated using the matrix 300.

In FIG. 8, refrigerant compositions containing various amounts of R1123 and R32 are blended with R125. For example, the data points 310 and 312 along the bottom side 302 of the matrix 300 represent a refrigerant composition containing 45 wt % of R1123 and 55 wt % of R32 and a refrigerant composition containing 40 wt % of R1123 and 60 wt % of R32, respectively. These are binary blends of R1123 and R32. These binary blends are seen to provide capacities well in excess of R410A and well in excess of R32. This may be a result of the interaction between R1123 and R32, which produces an azeotrope with higher pressures than R1123 and R32 individually.

Properties of the compositions for the matrix 300 were estimated using a thermodynamic model. The boundary between flammable and nonflammable compositions is shown by the thick solid line that extends from side 303 (at about 55 wt % R1123) to side 301 (at about 45 wt % R125). Flammable compositions are below the boundary and nonflammable compositions are above the boundary. The boundary is based on the flammability characteristics of R1123, R32, R125, and R410A. GWP is based on the GWP of individual components and the method described in ASHRAE Standard 34 for calculating the GWP of refrigerant blends. The flammability boundary is estimated based on characteristics of the individual components and various binary mixtures of the components. Accordingly, the amount of each refrigerant in a composition along the flammability boundary may, for example, vary by up to about 5 percent in an embodiment. It should be appreciated that the compositions and ranges shown and/or described may be updated based on further testing to confirm the location of the flammability boundary.

Figure 9:
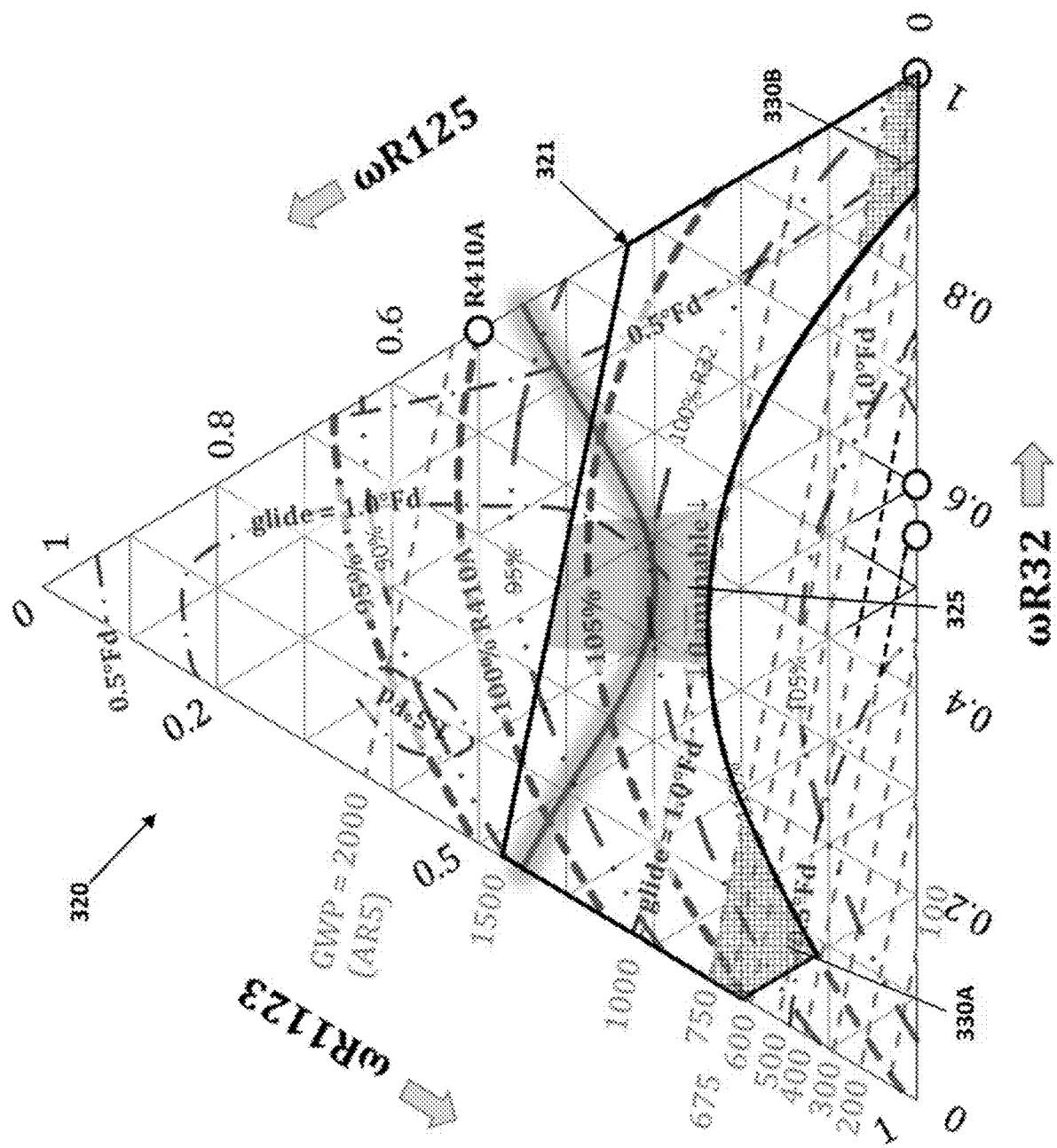
FIGS. 9-12 each illustrate a matrix based on the matrix of FIG. 8 that can be used to select a refrigerant composition with a desired set of properties in an embodiment.
Figure 10:
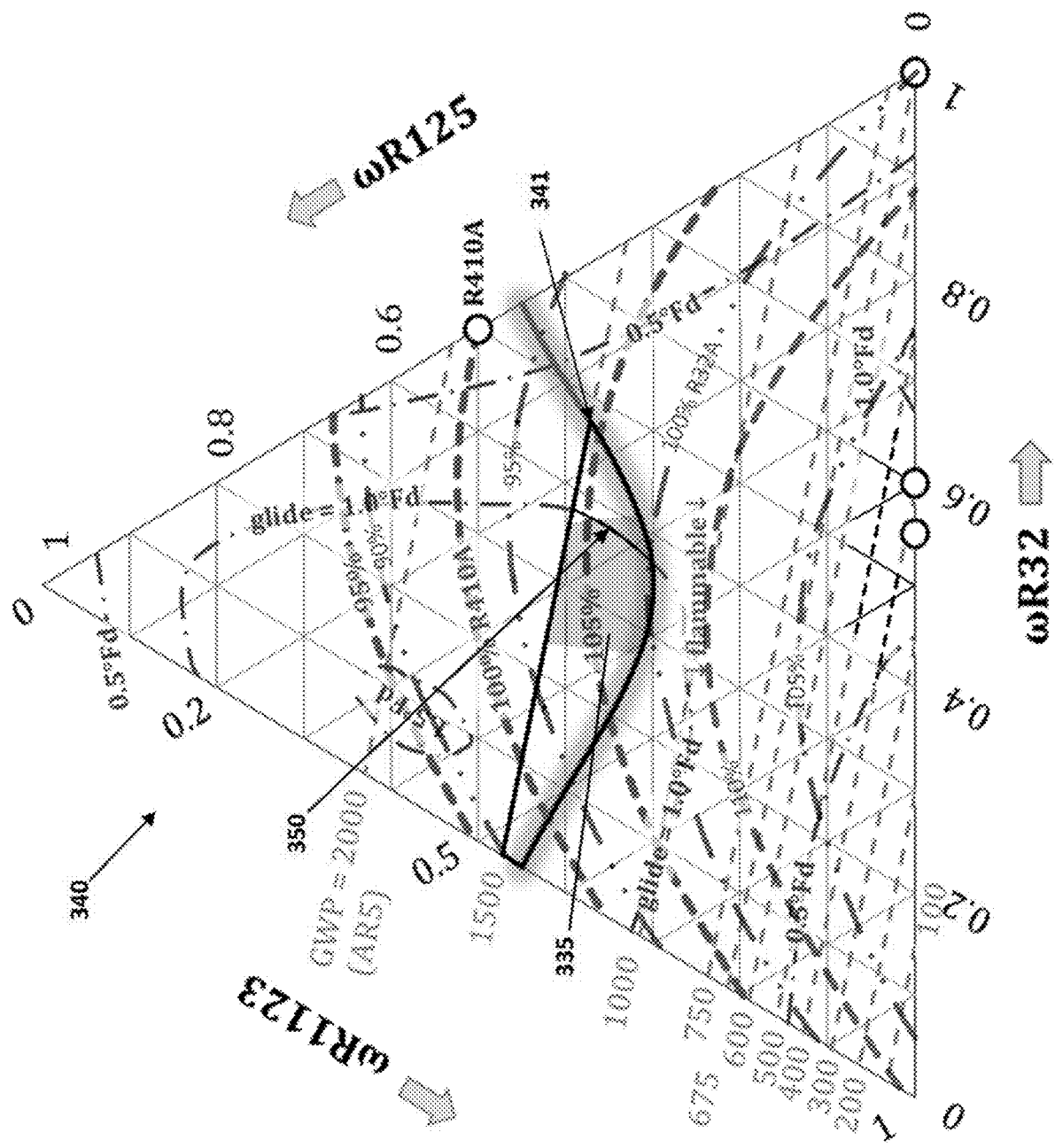

Each of FIGS. 9 and 10 illustrate a matrix 320, 340 based on matrix 300 of FIG. 8 and has the same sides and vertices as the matrix 300 of FIG. 8. Each matrix 320, 340 is the same as the matrix 300, except that the matrices 320, 340 illustrate specific ranges of refrigerant compositions. In some embodiments, the compositions proposed in FIGS. 9 and 10 may have properties to be suitable as a replacement for R410A. One or more of the matrices 320, 340 can be used to determine composition(s) with a desired set of properties.

In an embodiment, a desired set of properties of a useful refrigerant composition includes being stable (e.g., relative to R1123), a GWP of at or about 1500 or less than 1500, and a capacity that is in a range from at or about 85% to at or about 110% of the capacity of R410A. As discussed above, R1123 decomposes when used by itself as a working fluid. R1123 may be stable when mixed another refrigerant such as R32 and/or R125 and the mixture contains at or about 80 wt % or less than about 80 wt % of the R1123. Thus, a desired property of a useful refrigerant composition in such an embodiment includes containing at or about 80% or less than 80% of R1123. This concentration of R1123 (at or about than 80%) to provide stability is estimated based on the characteristics of R1123, R32, and R125. Accordingly, this upper end point for the amount of R1123 may be updated based on further testing.

Based on these desired properties, a range of useful refrigerant compositions 321 is shown in matrix 320 of FIG. 9. The useful refrigerant compositions 321 include greater than 0 wt % and less than 100 wt % of R32; at or about 80 wt %, or less than 80 wt % and greater than 0 wt % of R1123; and at or about 47 wt %, or less than 47 wt % and greater than 0 wt % of R125.

In an embodiment, the useful compositions 321 may include preferred compositions 330A, 330B as shown in FIG. 9. The properties of the preferred compositions 330A, 330B include a capacity greater than 100% of the capacity of R410A and at or about 110% or less than 110% of the capacity of R410A, and a GWP of at or about 750 or less than 750. As shown in FIG. 9, the preferred compositions 330A, 330B are in two separate regions of the matrix. The preferred compositions 330A include at or about 18 wt %, or less than 18 wt % and greater than 0 wt % of R32; from at or about 62 wt % to at or about 80 wt % of R1123; and from at or about 11 wt % to at or about 24 wt % of R125. The preferred compositions 330B include at or about 78 wt %, or greater than 78 wt % and less than 100 wt % of R32; at or about 15 wt %, or less than 15 wt % of R1123 and greater than 0 wt % of R1123; and at or about 7 wt %, or less than 7 wt % and greater than 0 wt % of R125.

FIG. 9 also includes a shaded area 325. The compositions within the shaded area 125 have a ratio of R1123 to R32 (R1123:R32) by weight that is from at or about 60:40 to at or about 40:60. In an embodiment, compositions having a ratio of R1123 to R32 that is from about 60:40 to about 40:60 provide higher stability. In some embodiments, a set of desired properties may include the high stability and advantageous thermodynamic properties provided by compositions within the shaded area 325. In such embodiments, desired compositions may be selected from the compositions shown in FIG. 9 (e.g., useful compositions 321) and described with respect to FIG. 9 so as to include those compositions also within the shaded area 325.

In an embodiment, the desired property of the GWP being equal or less than 1500 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In such embodiments, desired compositions may be selected from the compositions shown in FIG. 9 (e.g., useful compositions 321 and/or preferred compositions 330A, 330B) and described with respect to FIG. 9 to include those compositions with the desired GWP.

In an embodiment, the desired property of the capacity at or about 85% or greater than 85% of the capacity of R410A may be different. In an embodiment, a composition having a capacity at or about the capacity of R410A or greater than the capacity of R410A may be desired. In an embodiment, a composition having a capacity from at or about 95% to at or about 105% of the capacity of R410A may be desired. In such embodiments, desired compositions may be selected from the compositions shown in FIG. 9 (e.g., useful compositions 321 and/or preferred compositions 330A, 330B) and described with respect to FIG. 9 to include those compositions with the desired capacity.

In an embodiment, the set of desired properties may include a specific temperature glide. In an embodiment, a composition having a temperature glide of at or about 1° F. or less than 1° F. may be desired. In an embodiment, a composition having a temperature glide at or about 0.5° F. or less than 0.5° F. may be desired. In such embodiments, desired compositions may be selected from the compositions shown in FIG. 9 (e.g., useful compositions 321 and/or preferred compositions 330A, 330B) and described with respect to FIG. 9 to include those compositions with the desired temperature glide In an embodiment, a desired set of properties of a refrigerant composition includes being nonflammable, a capacity that is at or about 85% or greater than 85% of the capacity of R410A, and a GWP of at or about 1500 or less than 1500. Based on these desired properties, a range of useful refrigerant compositions 341 is shown in matrix 340 of FIG. 10. The useful refrigerant compositions 341 include at or about 48 wt %, or less than 48 wt % and greater than 0 wt % of R32; from at or about 15 wt % to 55 wt % of R1123; and from at or about 30 wt % to at or about 47% of R125.

In an embodiment, the useful compositions 341 may include preferred compositions 350 as shown in FIG. 10. The properties of the preferred compositions 350 include a capacity greater than 95% of the capacity of R410A, a GWP at or about 1500 or less than 1500, and a temperature glide at or about 1° F. or less than 1° F. The preferred compositions 350 include from at or about 37 wt % to at or about 48 wt % of R32, from at or about 15 wt % to at or about 33 wt % of R1123, and from at or about 30 wt % to at or about 39 wt % of R125.

FIG. 10 also includes a shaded area 335. The compositions within the shaded area 335 have a ratio of R1123 to R32 (R1123:R32) by weight that is from at or about 60:40 to at or about 40:60. In an embodiment, compositions having a ratio of R1123 to R32 from about 60:40 to about 40:60 have high stability. In some embodiments, a set of desired properties may include high stability and one or more of the advantageous thermodynamic properties provided by compositions within the shaded area 335. In such embodiments, desired compositions may be selected from the compositions shown in FIG. 10 (e.g., useful compositions 341 and/or preferred compositions 350) and described with respect to FIG. 10 so as to include those compositions also within the shaded area 335.

In an embodiment, the desired property of the capacity at or about 85% or greater than 85% of the capacity of R410A may be different. In an embodiment, a composition having a capacity at or about 105% or less than 105% of the capacity of R410A may be desired. In such embodiments, desired compositions may be selected from the compositions shown in FIG. 10 (e.g., useful compositions 341 and/or preferred compositions 350) and described with respect to FIG. 10 to include those compositions having the desired capacity.

Figure 11:
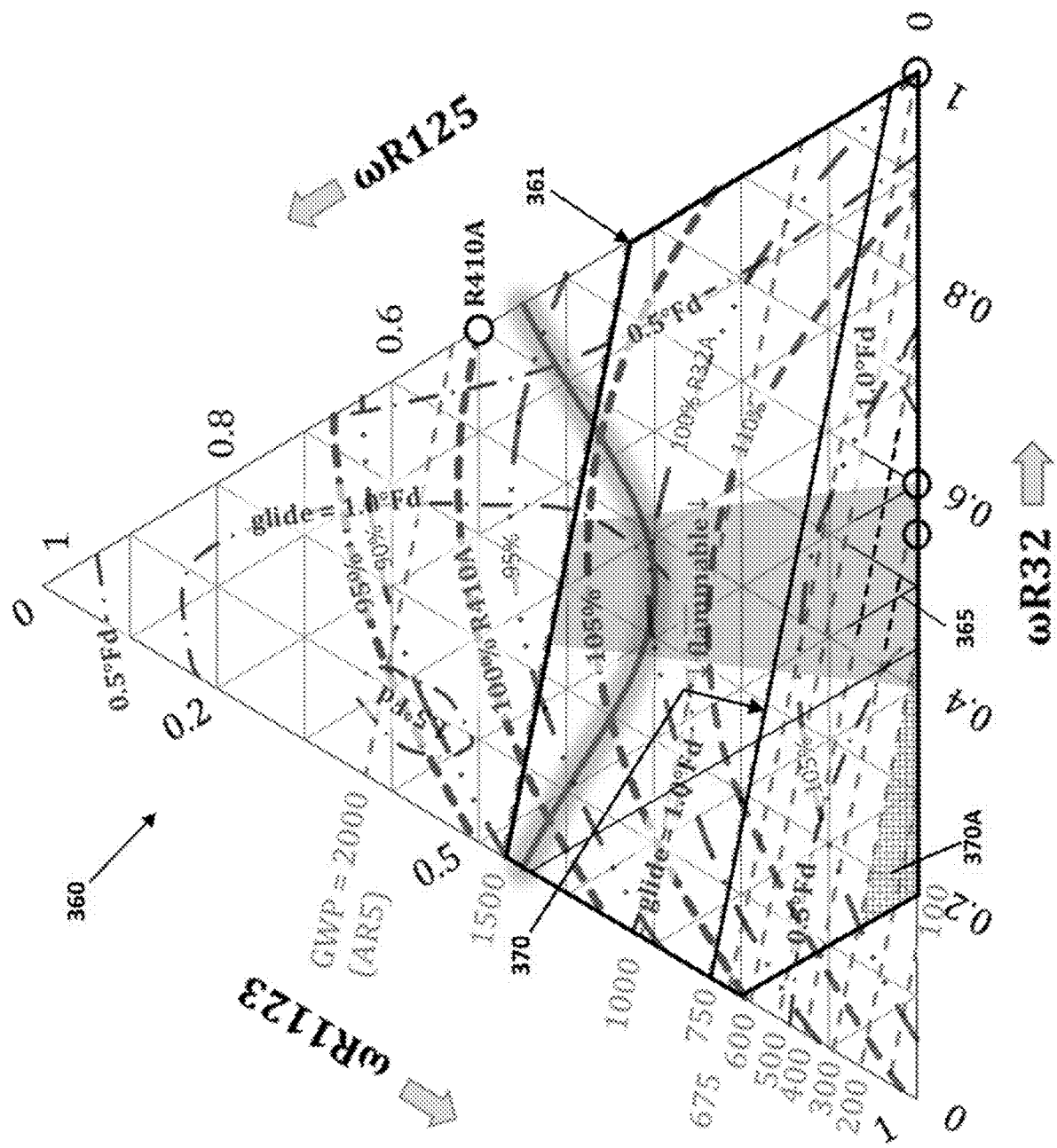
Figure 12:
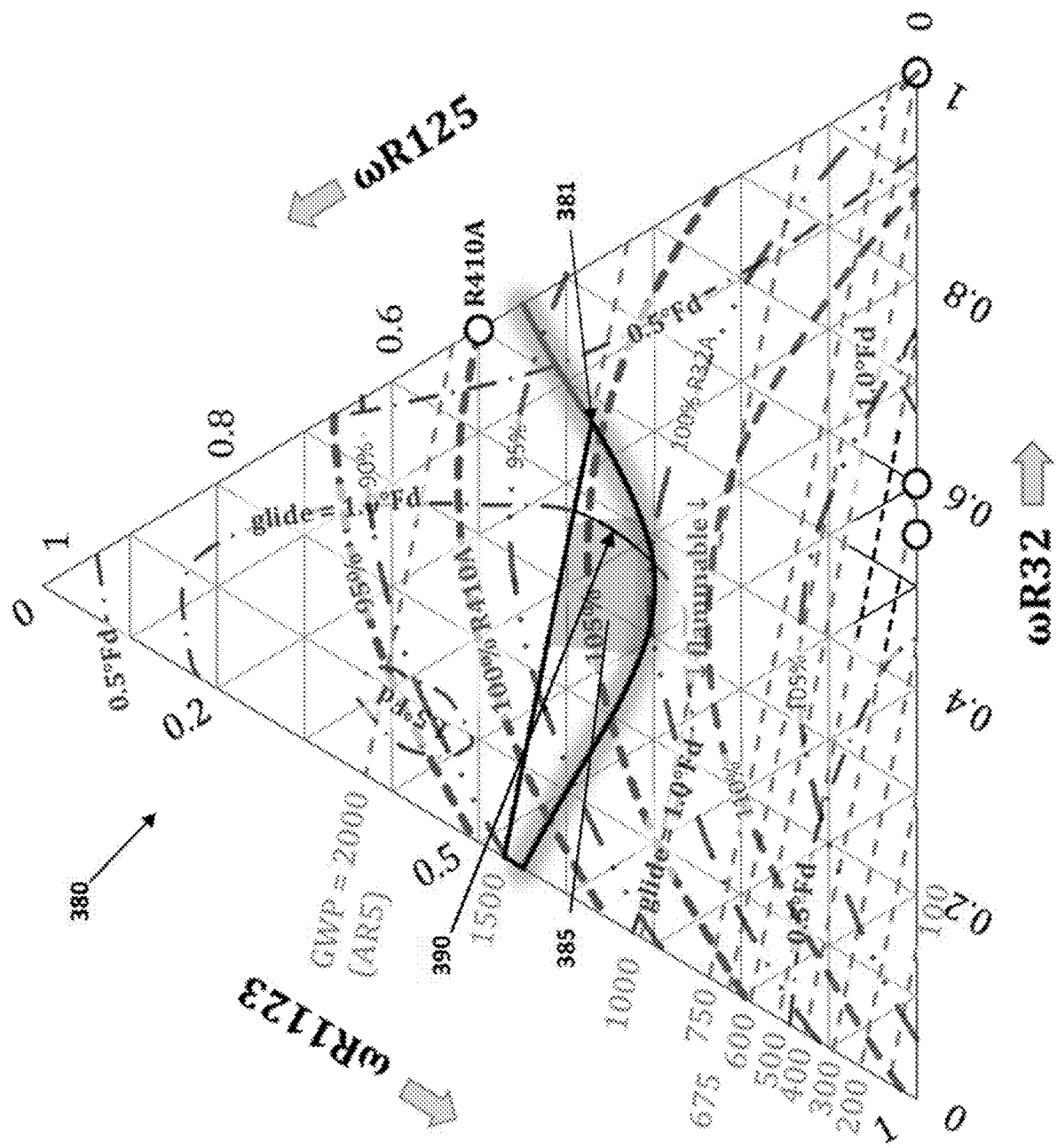

Each of FIGS. 11 and 12 illustrates a matrix 360, 380 based on matrix 300 of FIG. 8 and that has the same sides and vertices as the matrix 300 of FIG. 8. Each matrix 360, 380 is the same as the matrix 300 of FIG. 8, except the matrices 360, 380 illustrate ranges of compositions that may be desirable based on a specific set of desired properties. In some embodiments, the compositions proposed in FIGS. 10 and 11 may have properties to be suitable as a replacement for R32.

In an embodiment, a desired set of properties of a refrigerant composition includes being stable (e.g., with respect to R1123), a GWP at or about 1500 or less than 1500, and having a capacity that is at or about 85% or greater than 85% of the capacity of R32. Based on these desired properties, a range of useful refrigerant compositions 361 is shown in matrix 360 of FIG. 11. As discussed above, a composition having at or about 80 wt % or less than 80 wt % of R1123 may be stable as the composition contains a large enough amount of other refrigerants (e.g., R125 and R32) to prevent the R1123 from decomposing. Accordingly, this upper limit for the concentration of R1123 (e.g., at or about 80 wt % or less than 80 wt %) may be updated based on further testing. The useful refrigerant compositions 361 include less than 100 wt % and greater than 0 wt % of R32; at or about 80 wt %, or less than 80 wt % and greater than 0 wt % of R1123; and at or about 47 wt %, or less than 47 wt % and greater than 0 wt % of R125.

In an embodiment, the useful compositions 361 may include preferred compositions 370 as shown in FIG. 11. The properties of the preferred compositions 370 include being stable (e.g., with respect to the stability of R1123), a capacity at or about 90% or greater than 90% of the capacity of R32, and a GWP at or about 750 or less than 750. The preferred compositions 370 include less than 100 wt % and greater than 0 wt % of R32; at or about 80 wt %, or less than 80 wt % and greater than 0 wt % of R1123; and at or about 24 wt %, or less than 24 wt % and greater than 0 wt % of R125.

In an embodiment, the preferred compositions 370 may include compositions 370A as shown in FIG. 11. The compositions 370A may be desired in an embodiment as they are stable (e.g., with respect to the stability of R1123), have a capacity greater than 100% of the capacity of R32, a GWP at or about 300 or less than 300, and a temperature glide of less than 0.5° F. The compositions 370A include from at or about 14 wt % to at or about 44 wt % of R32; from at or about 56 wt % to at or about 80 wt % of R1123; and at or about 7 wt %, or less than 7 wt % and greater than 0 wt % of R125.

FIG. 11 also includes a shaded area 365. The compositions within the shaded area 365 have a ratio of R1123 to R32 (R1123:R32) by weight that is from at or about 60:40 to at or about 40:60. In an embodiment, compositions having a ratio of R1123 to R32 that is from about 60:40 to about 40:60 have higher stability. In some embodiments, a set of desired properties may include higher stability. In such embodiments, desired compositions may be selected from the compositions shown in FIG. 11 (e.g., useful compositions 361, preferred compositions 370, and/or compositions 370A) and described with respect to FIG. 11 so as to include those compositions also within the shaded area 365.

In an embodiment, the desired property of the GWP being equal or less than 1500 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the compositions shown in FIG. 11 (e.g., useful compositions 361, preferred compositions 370, and/or compositions 370A) and described with respect to FIG. 11 to include those compositions with the desired GWP.

In an embodiment, the desired property of the capacity being at or about 85% or greater than 85% of the capacity of R32 may be different. In an embodiment, a composition having a capacity at or about 95% or greater than 95% of the capacity of R32 may be desired. In an embodiment, a composition having a capacity at or about the capacity of R32 or greater than the capacity of R32 may be desired. In an embodiment, a composition having a capacity at or about 95% of the capacity or R32 to at or about 105% of the capacity or R32 may be desired. In an embodiment, a composition having a capacity at or about the capacity of R32 to at or about 105% of the capacity or R32 may be desired. In such embodiments, desired compositions may be selected from the compositions shown in FIG. 11 (e.g., useful compositions 361 and/or preferred compositions 370) and described with respect to FIG. 11 to include those compositions with the desired capacity.

In an embodiment, the set of desired properties may include a specific temperature glide. In an embodiment, a composition having a temperature glide at or about 1.0° F. or less than 1.0° F. may be desired. In an embodiment, a composition having a temperature glide at or about 0.5° F. or less than 0.5° F. may be desired. In such embodiments, desired compositions may be selected from the compositions shown in FIG. 11 (e.g., useful compositions 361 and/or preferred compositions 370) and described with respect to FIG. 11 to include those compositions with the desired temperature glide.

In an embodiment, a desired set of properties of a refrigerant composition includes being nonflammable and having a capacity that is at or about 85% or greater than 85% of the capacity of R32. Based on these desired properties, a range of useful refrigerant compositions 381 is shown in matrix 380 of FIG. 12. The useful refrigerant compositions 381 include at or about 48 wt %, or less than 48 wt % and greater than 0 wt % of R32; from at or about 15 wt % to at or about 55 wt % of R1123; and from at or about 30 wt % to at or about 47 wt % of R125.

In an embodiment, the useful compositions 381 may include preferred compositions 390 as shown in FIG. 12. The preferred compositions 390 may be desirable in an embodiment as they have a capacity at or about 95% or greater than 95% of the capacity of R32, a GWP at or about 1500 or less than 1500, and a temperature glide at or about 1.0° F. or less than 1.0° F. The preferred compositions 390 include from at or about 37 wt % to at or about 48 wt % of R32, from at or about 15 wt % to at or about 33 wt % of R1123, and from at or about 30 wt % to at or about 39 wt % of R125.

FIG. 12 also includes a shaded area 385. The compositions within the shaded area 385 have a ratio of R1123 to R32 (R1123:R32) by weight that is from at or about 60:40 to at or about 40:60. In an embodiment, compositions having a ratio of R1123 to R32 that is from about 60:40 to about 40:60 provide higher stability. In some embodiments, a set of desired properties may include higher stability. In such embodiments, desired compositions may be selected from the compositions shown in FIG. 12 (e.g., useful compositions 381 and/or preferred compositions 390) and described with respect to FIG. 12 so as to include those compositions also within the shaded area 385.

In an embodiment, the desired property of the capacity at or about 85% or greater than 85% of the capacity of R32 may be different. In an embodiment, a composition having a capacity at or about 95% or greater than 95% of the capacity of R32 may be desired. In such embodiments, desired compositions may be selected from the compositions shown in FIG. 12 (e.g., useful compositions 381) and described with respect to FIG. 12 to include those compositions with the desired capacity.

Figure 13A:
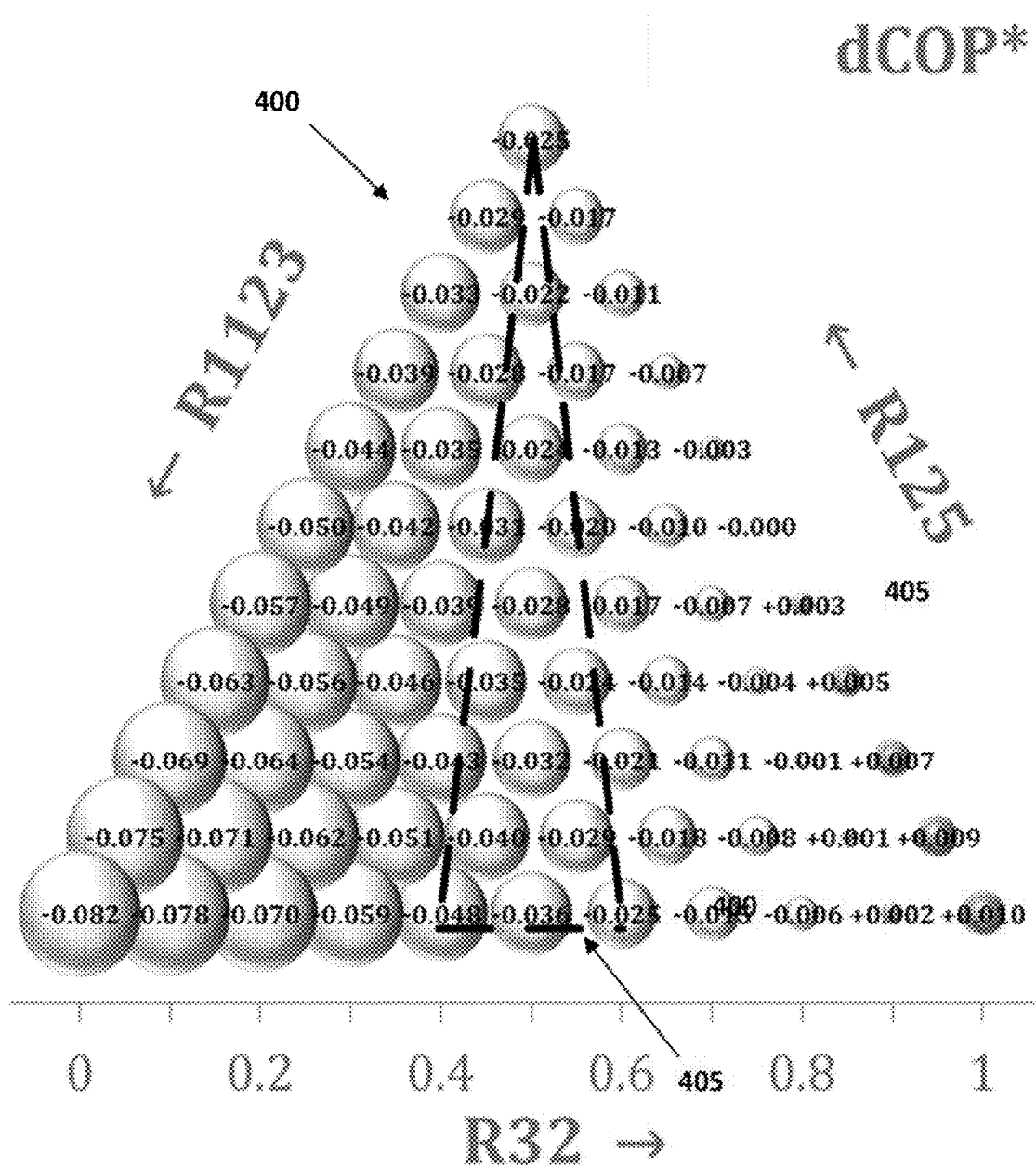
FIGS. 13A and 13B each illustrate a matrix of a thermodynamic property of compositions of R1123, R32, and R125.
Figure 13B:
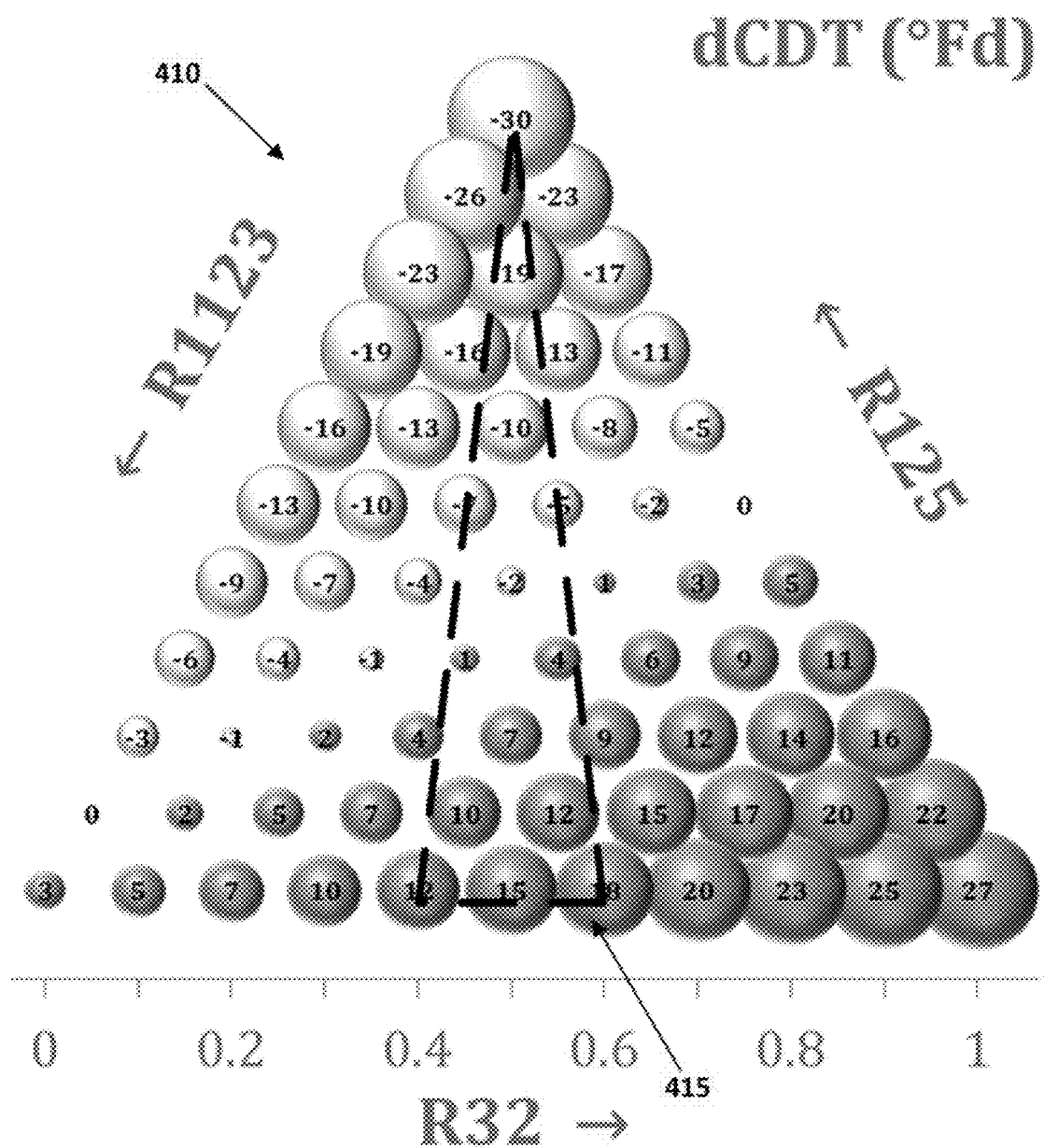

Each of FIGS. 13A and 13B illustrates a matrix 400, 410, of a thermodynamic property for compositions of R1123, R32, and R125 by weight percentage. Accordingly, in FIGS. 13A and 13B, the axes of R125 are horizontal and parallel to the side for R32, the axes for R32 are parallel to the side for R1123, and the axes for R1123 are parallel to the side for R125. Each matrix 400, 410 includes values at each 10 wt % of R1123, R32, and $CF_3I$. Compositions in each matrix 400, 410 are calculated in a similar manner as previously discussed regarding matrix 200 in FIG. 7A.

FIG. 13A illustrates a matrix 400 of coefficients of performance relative to R410A (e.g., a coefficient of performance of a composition minus the coefficient of performance for R410A divided by the coefficient of performance for R410A) for compositions of R1123, R32, and R125. FIG. 13B illustrates a matrix 210 of compressor discharge temperatures in Fahrenheit relative to R410A (e.g., compressor discharge temperatures of a composition minus the compressor discharge temperature for R410A) for compositions of R1123, R32, and R125. Each matrix 400, 410, also specifies a range of compositions 405, 415. The compositions within the ranges 405, 415 have a ratio of R1123 to R32 (R1123:R32) by weight that is from at or about 60:40 to at or about 40:60. As shown by FIG. 13A, the thermodynamic efficiency increases as the amount of R32 in a composition increases, and the amount of R1123 in the composition decreases. As shown by FIG. 13A, the compositions within the range 405 have thermodynamic efficiencies that are from about 98% to about 95% of the thermodynamic efficiency of R410A. As shown by FIG. 13B, compositions in the range 415 result in a change in the compressor discharge temperature (relative to R410A) of at or about −30° F. to at or about 18° F. However, in the lower portion of the range 415, the compositions result in a change in the compressor discharge temperature of at or about −2° F. to at or about 18° F. This range is higher than may be produced when using R452B (another proposed alternative to R410A), but is less than at or about 30° F. that occurs produced by R32 alone.

Performance of a refrigerant composition may be based on one or more of a coefficient of performance and compressor discharge temperature. In an embodiment, the desired set of properties includes one or more of a coefficient of performance and compressor discharge temperature. In an embodiment, the set of desired properties result in the refrigerant composition performing in a comparable manner to R410A. In an embodiment, the set of desired properties result in the refrigerant composition performing in a comparable manner to a R32.

In an embodiment, a composition that has a coefficient of performance of greater than 97% relative to R410A or R32 may be preferred. In an embodiment, a composition that results in a change in the compressor discharge temperature relative to R410A or R32 that is at or about 32° F. or less than 32° F. may be desired. In an embodiment, a composition that results in a change in the compressor discharge temperature relative to R410A or R32 that is at or about 20° F. or less than 20° F. may be preferred. For values relative to R32, the matrices 400 and 410 may be modified based on the values for R410 and R32 in Tables 2 and 3 to approximate values relative to R32. In such embodiments, one or more of FIGS. 13A and 13B may be utilized to select compositions having a desired coefficient of performance and/or compressor discharge temperature. For example, desired compositions may be selected from the compositions shown in and/or described with respect to one or more of the FIGS. 8-12 to have a desired coefficient of performance and/or compressor discharge temperature by utilizing one or more of FIGS. 13A and 13B.

In an embodiment, a method of making a refrigerant composition and/or a method of retrofitting a refrigerant composition utilizes one or more of the matrices of FIGS. 8-13B so that the resulting refrigerant composition or retrofitted refrigerant composition has the desired set of properties.

Compositions Including R32, R1123, R125, and $CF_3I$

Figure 14:
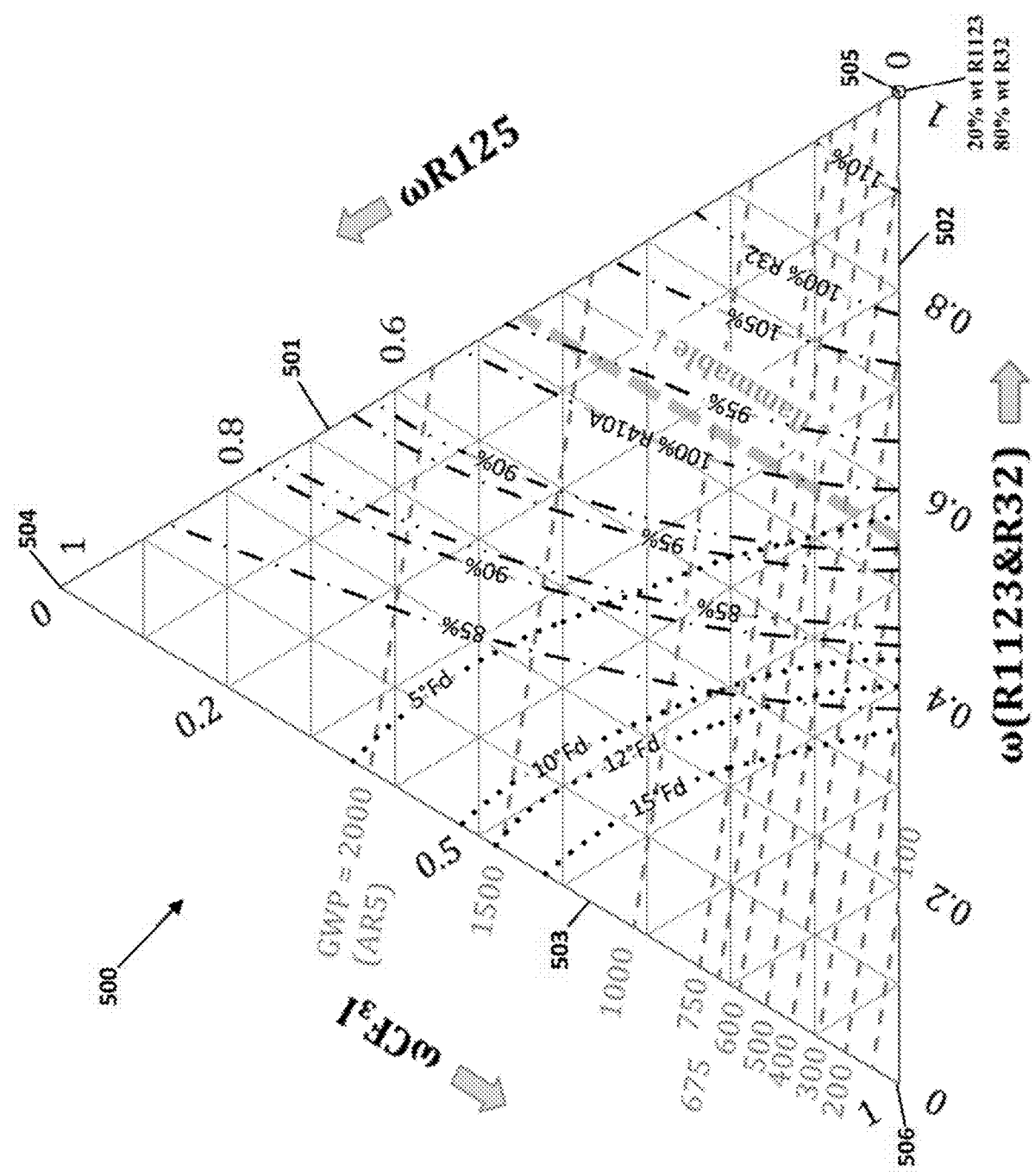
FIGS. 14-16 illustrate a matrix of compositions of R1123, R32, R125, and $CF_3I$ that includes plots of GWP, flammability, temperature glide, capacity relative to R410A, and capacity relative to R32.

FIG. 14 illustrates a matrix 500 that was developed to show plots of GWP, flammability, temperature glide, capacity relative to R410A, and capacity relative to R32 as a function of the concentration of R125, a mixture 80 wt % R32 and 20 wt % of R1123, and $CF_3I$. The sides 501, 502, 503 of the triangle corresponds to weight percentages of R125, the mixture of 80 wt % R32 and 20 wt % of R1123, and $CF_3I$, respectively. The vertices 504, 505, 506 of the triangle correspond to 100 wt % R125, 80 wt % R32 and 20 wt % R1123, and 100 wt % $CF_3I$, respectively.

Figure 15:
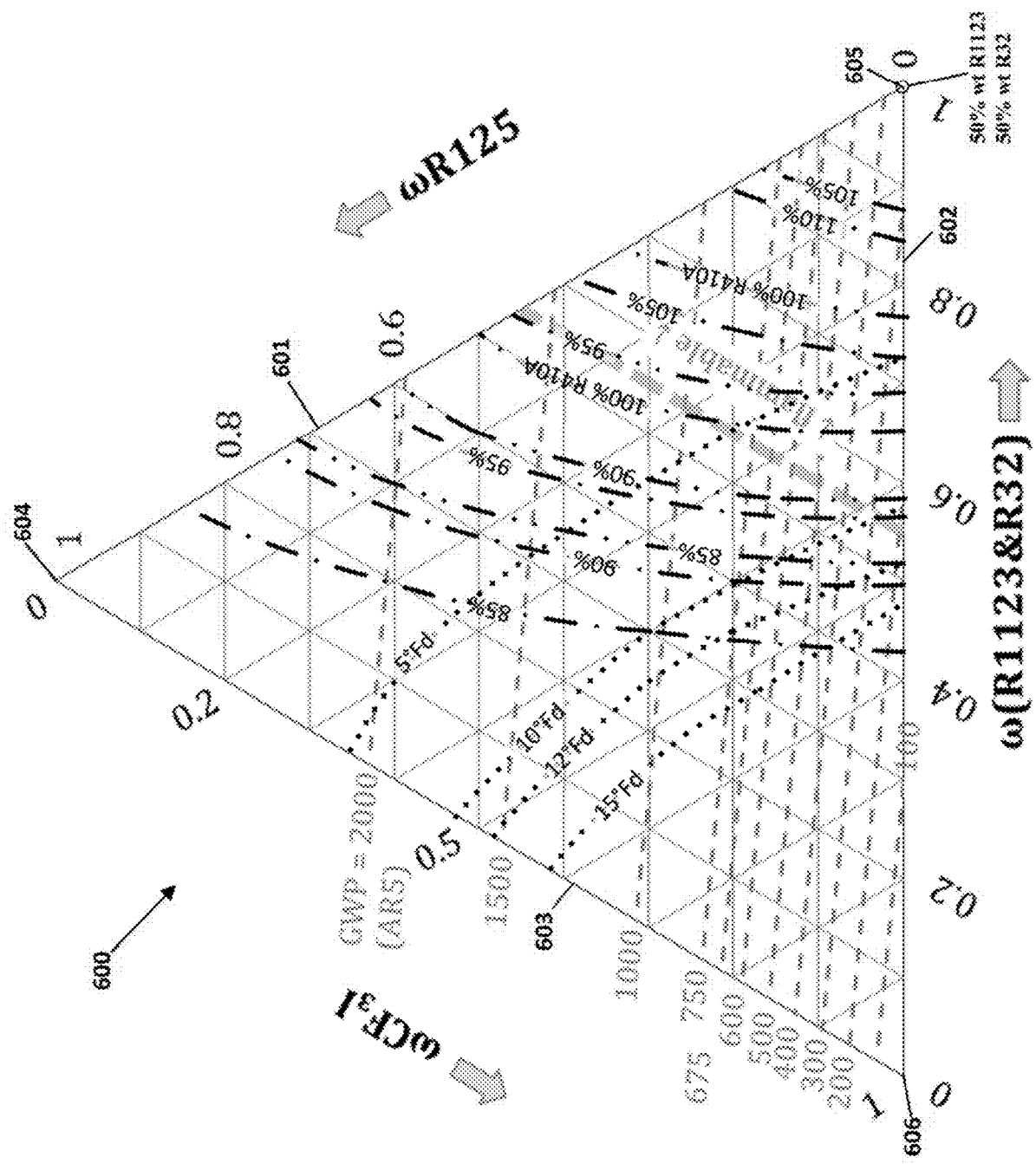

FIG. 15 illustrates a matrix 600 that was developed to show plots of GWP, flammability, temperature glide, capacity relative to R410A, and capacity relative to R32 as a function of the concentration of R125, a mixture of 50 wt % R32 and 50 wt % of R1123, and $CF_3I$. The sides 601, 602, 603 of the triangle correspond to weight percentages of R125, the mixture of 50 wt % R32 and 50 wt % of R1123, and $CF_3I$, respectively. The vertices 604, 605, 606 of the triangle correspond to 100 wt % R125, 50 wt % R32 and 50 wt % R1123, and 100 wt % $CF_3I$, respectively.

Figure 16:
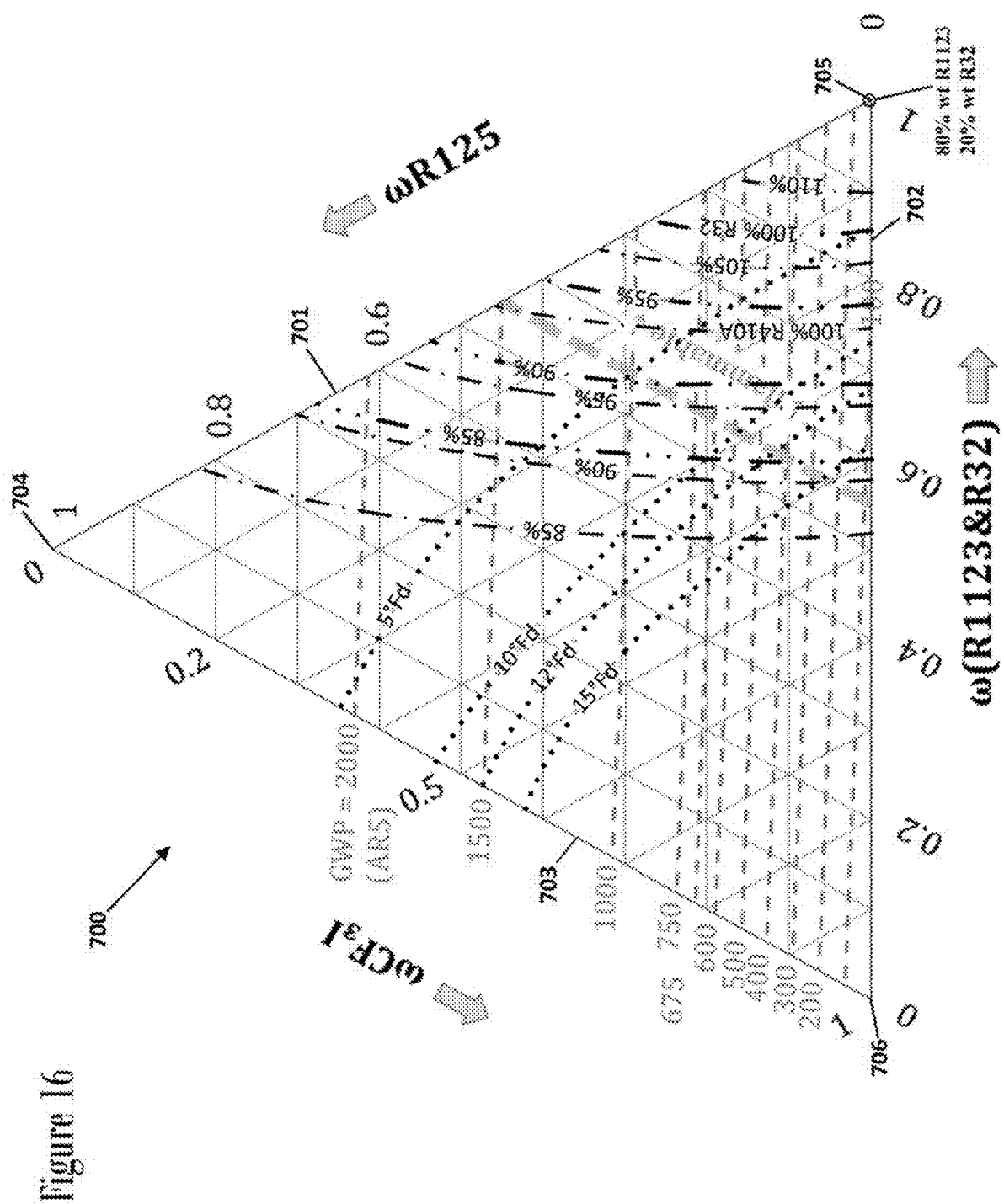

FIG. 16 illustrates a matrix 700 that was developed to show plots of GWP, flammability, temperature glide, capacity relative to R410A, and capacity relative to R32 as a function of the concentration of R125, a mixture of 20 wt % R32 and 80 wt % of R1123, and $CF_3I$. The sides 701, 702, 703 of the triangle correspond to weight percentages of R125, the mixture of 20 wt % R32 and 80 wt % of R1123, and $CF_3I$, respectively. The vertices 704, 705, 706 of the triangle correspond to 100 wt % R125, the mixture of 20 wt % R32 and 80 wt % R1123, and 100 wt % $CF_3I$, respectively.

Properties (e.g., GWP, flammability, temperature glide, capacity relative to R410A or R32) of a refrigerant composition with a weight percent of R125, R1123, R32, and $CF_3I$ can be estimated by interpolating the matrix 500 in FIG. 14, the matrix 600 in FIG. 15, and the matrix 700 in FIG. 16. Alternatively, a matrix similar to the matrices 500, 600, 700 in FIGS. 14-16 can be calculated in the same manner as discussed above for ratios of R1123 and R32 that are between 50:50 and 80:20 and between 50:50 and 20:80. The upper limit of 80 wt % was selected for R1123 as R1123 may decompose when a composition contains greater than 80 wt % R1123. Accordingly, the upper limit for R1123 (e.g., at or about 80%) may be updated based on further testing. The upper limit of at or about 80% of R32 was selected as greater amounts of R32 result in compositions with higher GWPs.

Properties of the compositions for each matrix 500, 600, 700 were estimated using a thermodynamic model. In FIGS. 14-16, the boundary between flammable and non-flammable compositions is shown by the large dashed line that extends from the bottom side 502, 602, 702 to the right side 501, 601, 701 of the triangle. The flammable compositions are to the right of the boundary. The boundary is based on the flammability characteristics of R1123, R32, CF$_3$I, R410A, and R125, and the flame suppressant properties of CF$_3$I. GWP is based on the GWP of the individual components and the method described in ASHRAE Standard 34 for calculating the GWP of refrigerant blends. The flammability boundary is estimated based on characteristics of the individual components and various binary mixtures of the components. The flammability line was estimated based on the ratio of R32 to R1123 being 50:50 in a composition, while the amounts of R125 and CF$_3$I in the composition were varied. Accordingly, the amount of each refrigerant in a composition along the flammability boundary may, for example, vary by up to about 5 percent in an embodiment. It should be appreciated the compositions and ranges shown and/or described may be updated based on further testing to confirm the location of the flammability boundary.

Figure 17:
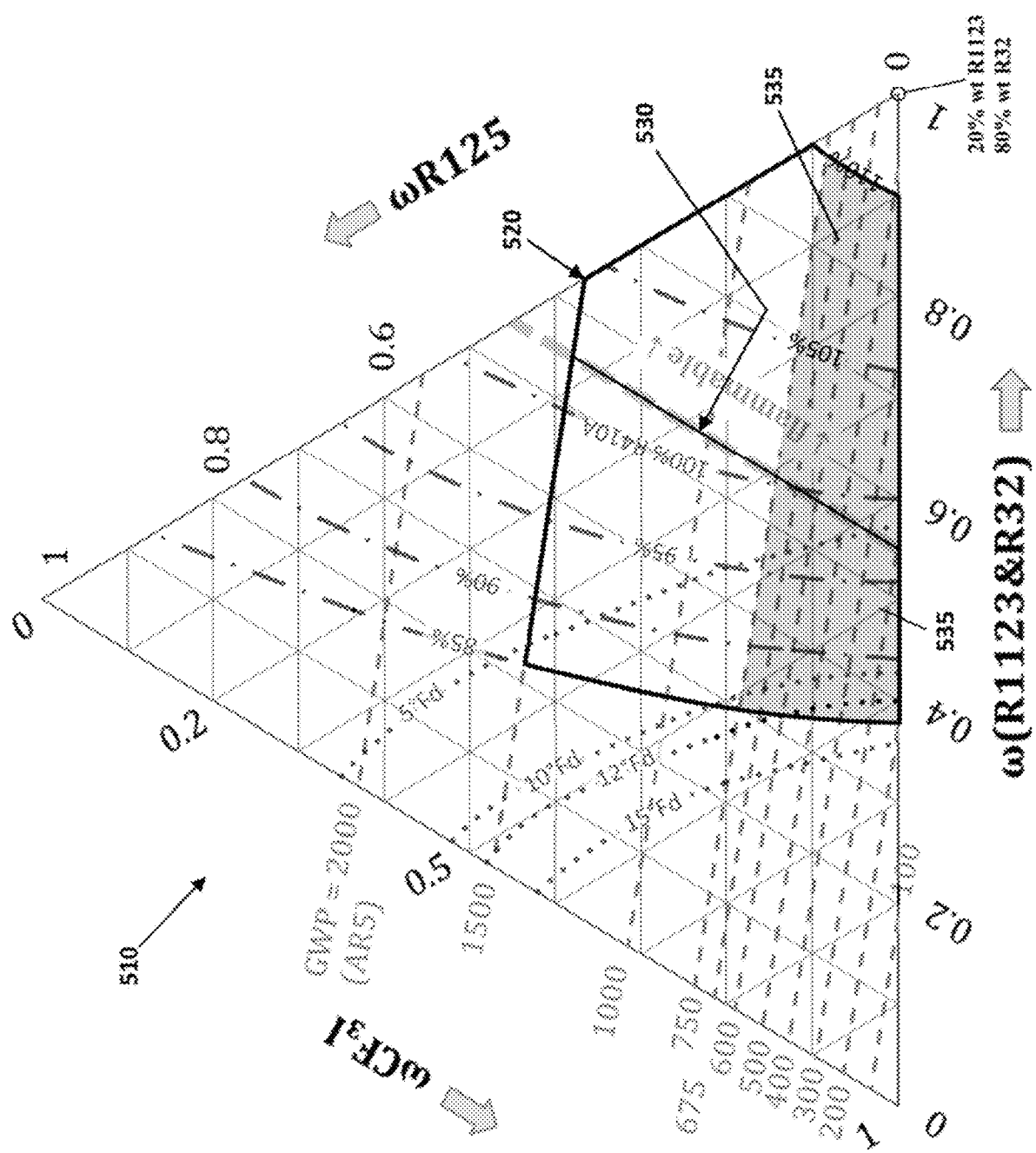
FIGS. 17-19 each illustrate a matrix based on a respective one of FIGS. 14-16 that can be used to select a refrigerant composition with a desired set of properties in an embodiment.
Figure 20:
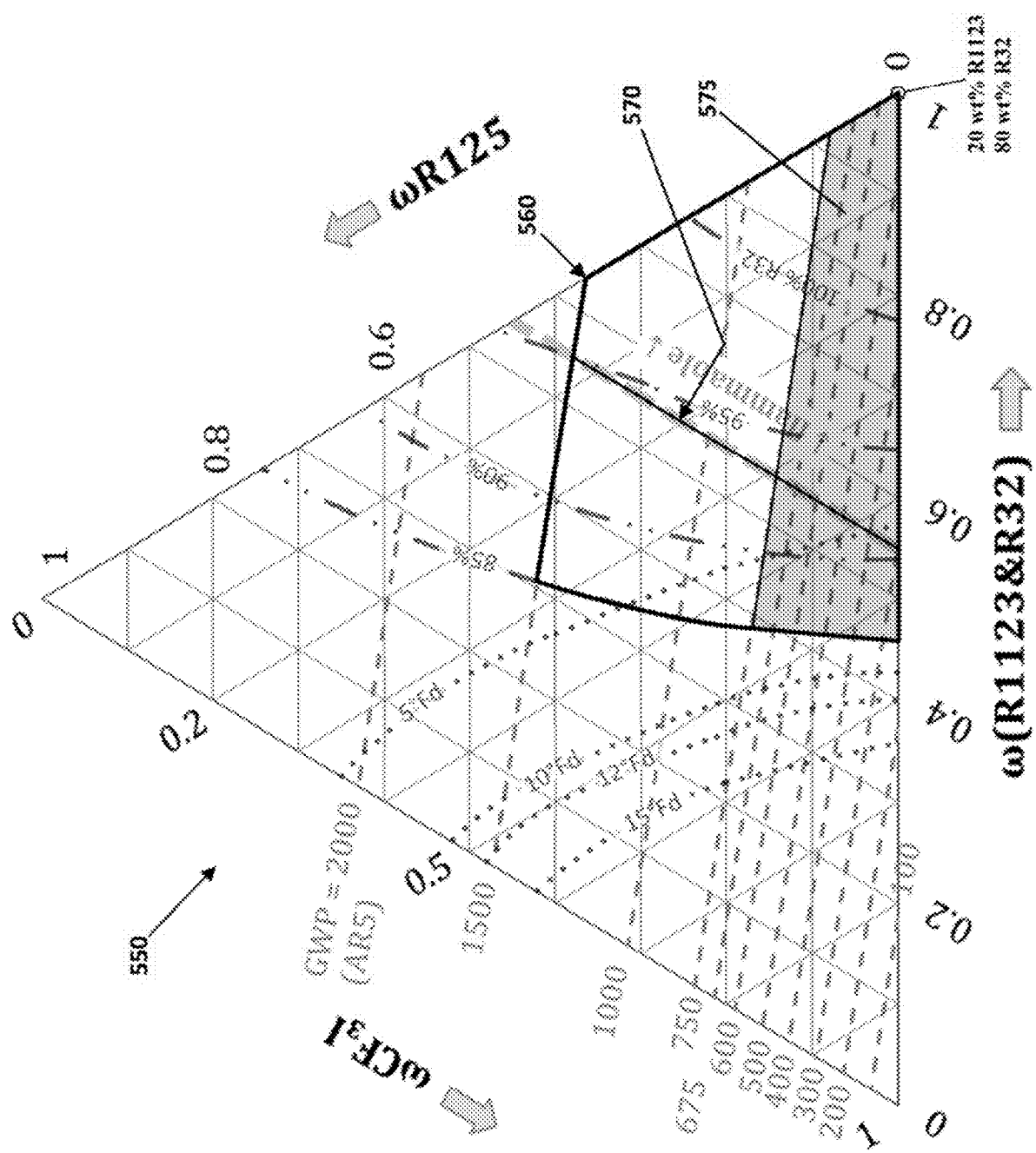
Figure 2I:
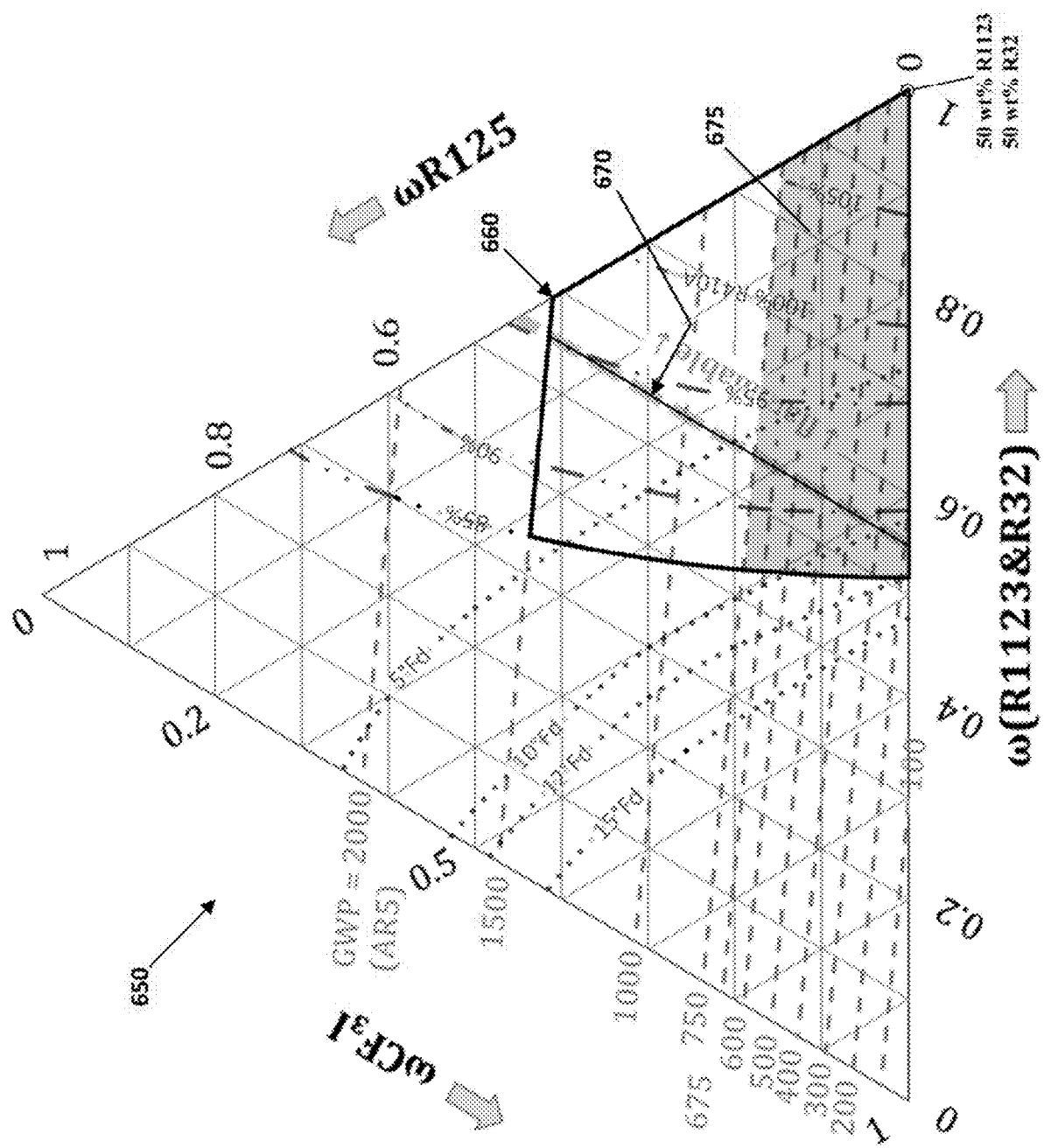

Each of FIGS. 17 and 20 illustrates a matrix 510, 550 based on matrix 500 of FIG. 14 and that has the same sides and vertices as the matrix 500. Matrix 510 of FIG. 17 is the same as matrix 500, except that the matrix 510 does not have the lines for capacities relative to R32 and illustrates ranges of refrigerant compositions that may be desired in particular embodiments. Matrix 550 of FIG. 20 is the same as matrix 500 of FIG. 14, except that the matrix 550 does not have the lines for capacities relative to R32 and illustrates ranges of refrigerant compositions that may be desired in particular embodiments.

Figure 18:
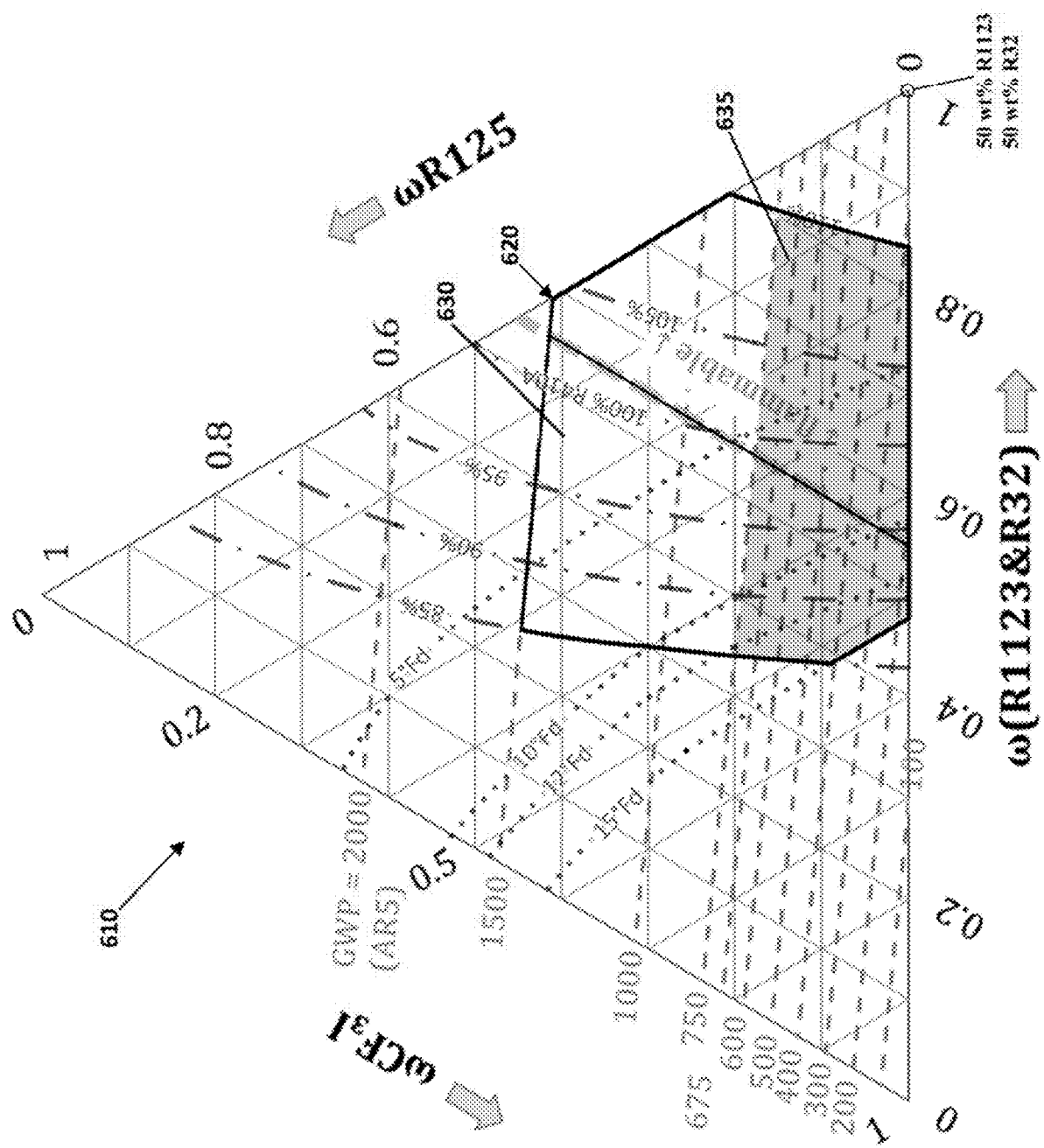

Each of FIGS. 18 and 21 illustrates a matrix 610, 650 based on matrix 600 of FIG. 15 and has the same sides and vertices as matrix 600. Matrix 610 of FIG. 18 is the same as matrix 600, except that the matrix 610 does not have the lines for capacities relative to R32 and illustrates ranges of refrigerant compositions that may be desired in particular embodiments. Matrix 650 of FIG. 21 is the same as matrix 600, except that the matrix 650 does not have the lines for capacities relative to R410A and illustrates ranges of refrigerant compositions that may be desired in particular embodiments.

Figure 19:
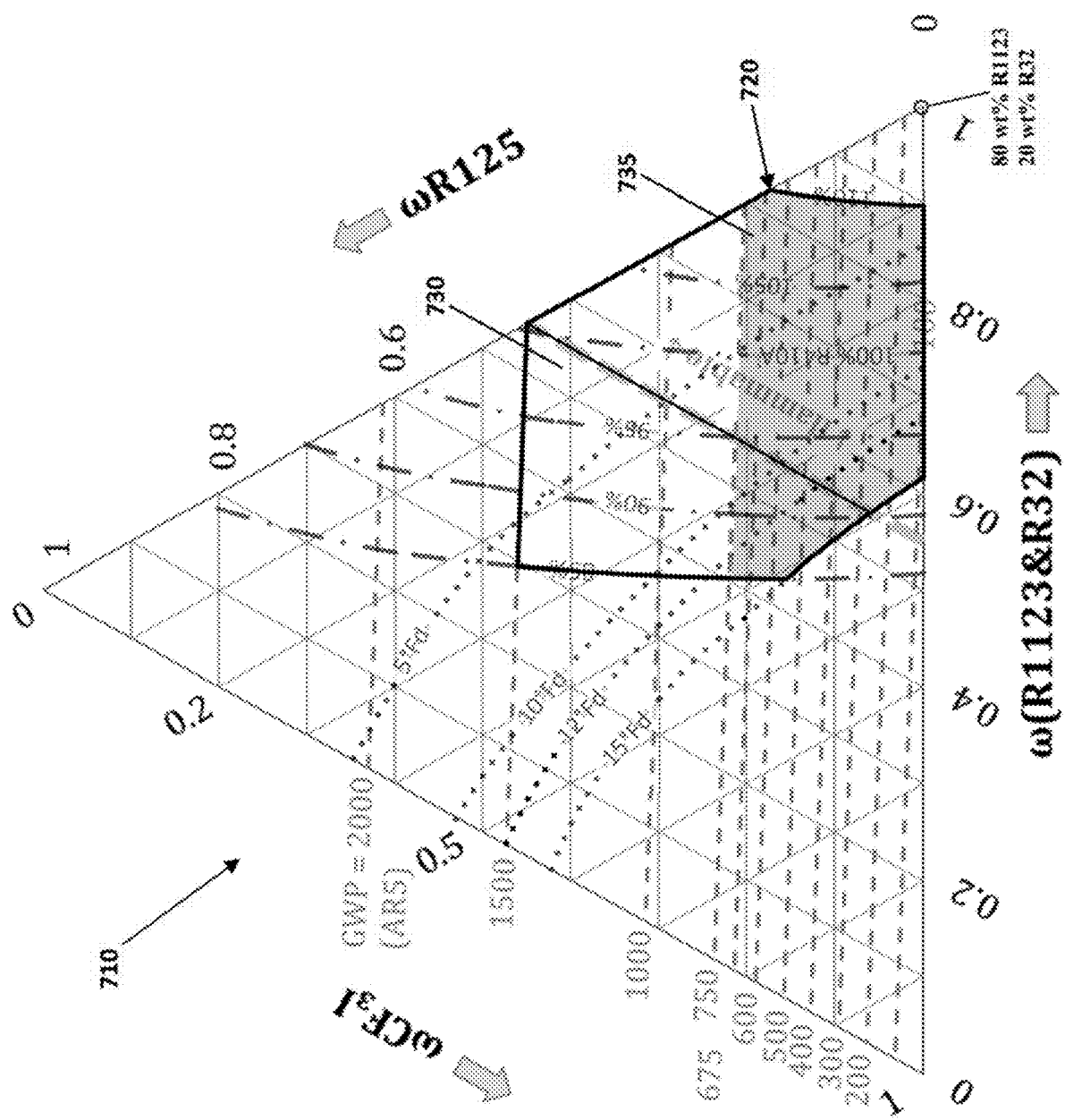
Figure 22:
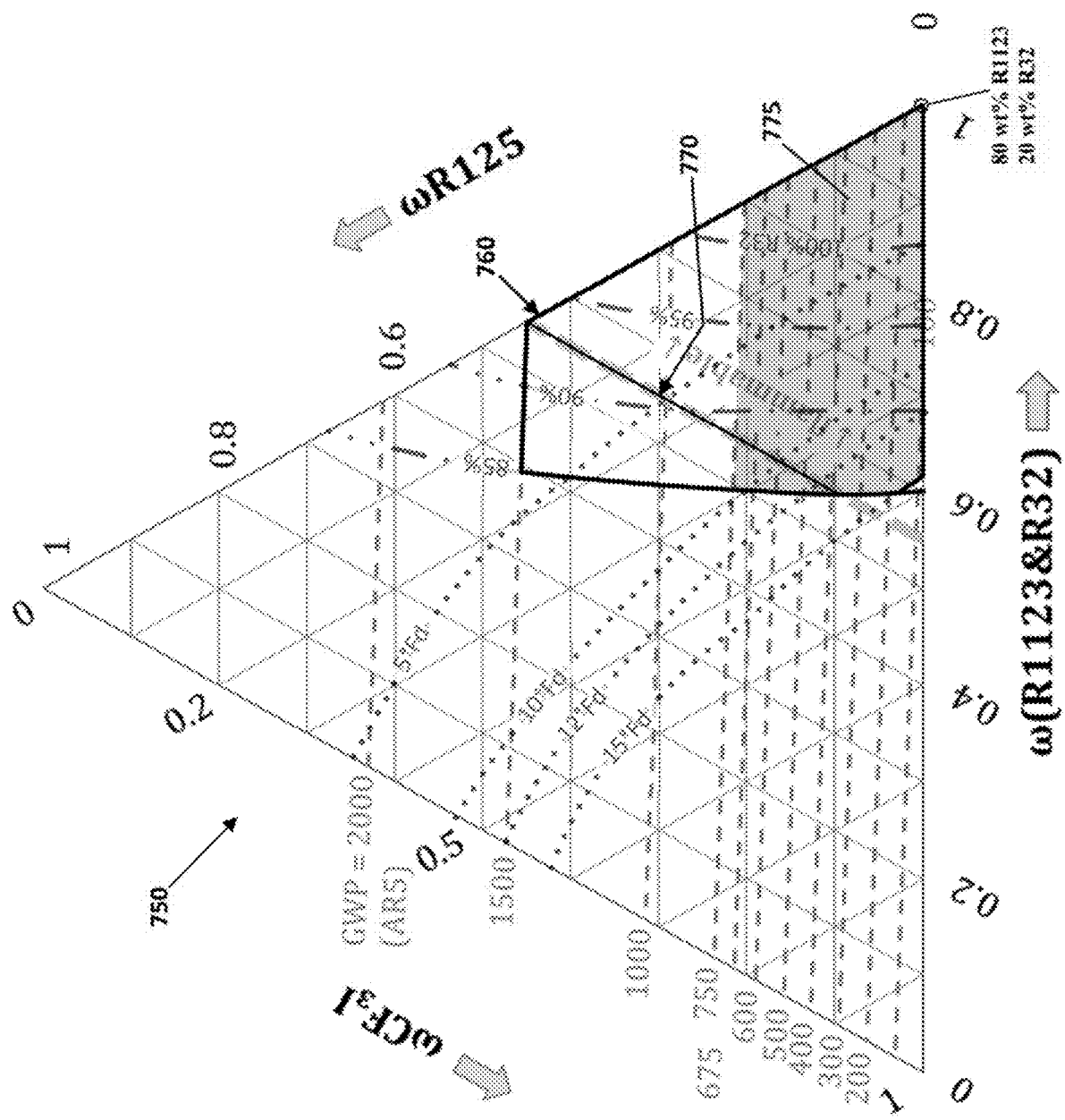

Each of FIGS. 19 and 22 illustrates a matrix 710, 750 based on matrix 700 of FIG. 16 and has the same sides and vertices as matrix 700. Matrix 710 of FIG. 19 is the same as matrix 700, except that the matrix 710 does not have the lines for capacities relative to R32 and illustrates ranges of refrigerant compositions that may be desired in particular embodiments. Matrix 750 of FIG. 22 is the same as matrix 700, except that the matrix 750 does not have the lines for capacities relative to R410A and illustrates ranges of refrigerant compositions that may be desired in particular embodiments.

One or more of the matrices 510, 550, 610, 650, 710, 750 can be used to determine composition(s) of R32, R1123, R125 and CF$_3$I with a desired set of properties. For example, matrices 510, 610, 710 in FIGS. 17-19 may be used together to determine compositions having properties comparable to R410. For example, matrices 550, 650, 750 in FIGS. 20-22 may be used together to determine compositions having properties comparable to R32.

Alternatively, a matrix similar to matrices 500, 600, 700, may be calculated in the same manner as discussed above for ratios of R32 to R1123 (R32:R1123) that are between 20:80 and 80:20 (other than 50:50). The upper limit of 80 wt % was selected for R1123 as R1123 may decompose when a composition contains greater than at or about 80 wt % R1123. Accordingly, it should be appreciated that the upper limit for R1123 (e.g., at or about 80 wt %) may be updated based on further testing. The upper limit of at or about 80% of R32 was selected as greater amounts of R32 result in compositions with higher GWPs.

In an embodiment, a desired set of properties of a refrigerant composition includes being stable (e.g., stable relative to R1123), a capacity that is in a range from at or about 85% to at or about 110% of the capacity of R410A, and has a temperature glide that is at or about 15° F. or less than 15° F. Based on these desired properties, a range of useful refrigerant compositions 520 is shown in matrix 510 of FIG. 17, a range of useful refrigerant compositions 620 is shown in matrix 610 of FIG. 18, and a range of useful refrigerant compositions 720 is shown in matrix 710 of FIG. 19.

The useful refrigerant compositions 520 in FIG. 17 include from at or about 18 wt % (80 wt % of R32 in mixture×22 wt % of mixture in composition) to at or about 72 wt % (80 wt % of R32 in mixture×90 wt % of mixture in composition) of R32; from at or about 4 wt % (20 wt % of R1123 in mixture×22 wt % of mixture in composition) to at or about 18 wt % (20 wt % of R1123 in mixture×90 wt % of mixture in composition) of R1123; at or about 44 wt %, or less than 44 wt % and greater than 0 wt % of R125; and at or about 62 wt %, or less than 62 wt % and greater than 0 wt % of CF$_3$I.

The useful refrigerant compositions 620 in FIG. 18 include from at or about 12 wt % (50 wt % of R32 in mixture×24 wt % of mixture in composition) to at or about 42 wt % (50 wt % of R32 in mixture×84 wt % of mixture in composition) of R32; from at or about 12 wt % (50 wt % of R1123 in mixture×24 wt % of mixture in composition) to at or about 42 wt % (50 wt % of R1123 in mixture×84 wt % of mixture in composition) of R1123; at or about 45 wt %, or less than 45 wt % and greater than 0 wt % of R125; and at or about 52 wt %, or less than 52 wt % and greater than 0 wt % of CF$_3$I.

The useful refrigerant compositions 720 in FIG. 19 include from at or about 6 wt % (20 wt % of R32 in mixture×29 wt % of mixture in composition) to at or about 18 wt % (20 wt % of R32 in mixture×90 wt % of mixture in composition) of R32; from at or about 23 wt % (80 wt % of R1123 in mixture×29 wt % of mixture in composition) to at or about 72 wt % (80 wt % of R1123 in mixture×90 wt % of mixture in composition) of R1123; at or about 46 wt %, or less than 46 wt % and greater than 0 wt % of R125; and at or about 41 wt %, or less than 41 wt % and greater than 0 wt % of CF$_3$I.

As discussed above, a composition having a ratio of R32 to R1123 from about 80:20 to about 20:80 may be desired as these compositions are stable with respect to R1123 and have lower GWPs. Accordingly, a range of useful refrigerant compositions may be interpolated from the useful refrigerant compositions 520, 620, 720 in FIGS. 17-19. Based on each of the useful refrigerant compositions 520, 620, 720, useful refrigerant compositions may include from at or about 6 wt % to at or about 72 wt % of R32; from at or about 4 wt % to at or about 72 wt % of R1123; at or about 45 wt %, or less than 45 wt % and greater than 0 wt % of R125; and at or about 62 wt %, or less than about 62 wt % and greater than 0 wt % of CF$_3$I.

In an embodiment, a composition having a ratio of R32 to R1123 (R32:R1123) from at or about 80:20 to at or about 50:50 may be desired. In such an embodiment, useful refrigerant compositions may be determined based on the useful refrigerant compositions 510 in FIG. 17 and the useful refrigerant compositions 510 in FIG. 18.

In an embodiment, a composition having a ratio of R32 to R1123 (R32:R1123) from at or about 50:50 to at or about 20:80 may be desired. In such an embodiment, useful refrigerant compositions may be determined based on the useful refrigerant compositions 610 in FIG. 18 and the useful refrigerant compositions 710 in FIG. 19.

In an embodiment, compositions having a ratio of R1123 to R32 that is from at or about 60:40 to at or about 40:60 provide higher stability. In some embodiments, a set of desired properties may include higher stability. In such an embodiment, desired compositions may be selected based on the useful refrigerant compositions 510, 710 in FIGS. 17 and 19 so as to include those compositions with the desired ratio of R1123 to R32 of at or about 60:40 to at or about 40:60.

As shown in FIGS. 17-19, useful compositions 520 may include preferred compositions 530, useful compositions 620 may include preferred compositions 630, and useful compositions 720 may include preferred compositions 730. The preferred compositions 530, 630, 730, may be desirable in an embodiment as they are stable (e.g., stable relative to R1123), have a capacity at or about 85% or greater than 85% of the capacity or R410A, have a temperature glide less than 15° F., and are nonflammable.

The preferred refrigerant compositions 530 in FIG. 17 include from at or about 18 wt % (80 wt % of R32 in mixture×22 wt % of mixture in composition) to at or about 44 wt % (80 wt % of R32 in mixture×55 wt % of mixture in composition) of R32; from at or about 4 wt % (20 wt % of R1123 in mixture×22 wt % of mixture in composition) to at or about 11 wt % (20 wt % of R1123 in mixture×55 wt % of mixture in composition) of R1123; at or about 44 wt %, or less than 44 wt % and greater than 0 wt % of R125; and at or about 7 wt % to at or about 62 wt % of $CF_3I$.

The preferred refrigerant compositions 630 in FIG. 18 include from at or about 12 wt % (50 wt % of R32 in mixture×24 wt % of mixture in composition) to at or about 28 wt % (50 wt % of R32 in mixture×55 wt % of mixture in composition) of R32; from at or about 12 wt % (50 wt % of R1123 in mixture×24 wt % of mixture in composition) to at or about 28 wt % (50 wt % of R1123 in mixture×55 wt % of mixture in composition) of R1123; at or about 45 wt %, or less than 45 wt % and greater than 0 wt % of R125; and at or about 5 wt % to about or about 52 wt % of $CF_3I$.

The preferred refrigerant compositions 730 in FIG. 19 include from at or about 6 wt % (20 wt % of R32 in mixture×29 wt % of mixture in composition) to at or about 11 wt % (20 wt % of R32 in mixture×55 wt % of mixture in composition) of R32; from at or about 23 wt % (80 wt % of R1123 in mixture×29 wt % of mixture in composition) to at or about 44 wt % (80 wt % of R1123 in mixture×55 wt % of mixture in composition) of R1123; at or about 6 wt % to at or about 44 wt % of R125; and at or about 41 wt %, or less than 41 wt % and greater than 0 wt % of $CF_3I$.

As discussed above, a composition having a ratio of R32 to R1123 from about 80:20 to about 20:80 may be desired as these compositions are stable with respect to R1123 and have lower GWPs. Accordingly, a range of preferred refrigerant compositions may be interpolated from the preferred refrigerant compositions 530, 630, 730 in FIGS. 17-19. Based on each of the preferred refrigerant compositions 530, 630, 730, useful refrigerant compositions may include from at or about 6 wt % to at or about 44 wt % of R32; from at or about 4 wt % to at or about 44 wt % of R1123; at or about 45 wt %, or less than 45 wt % and greater than 0 wt % of R125; and at or about 62 wt %, or less than about 62 wt % and greater than 0 wt % of $CF_3I$.

Of the useful compositions 520, 620, 720, compositions within the shaded areas 535, 635, and 735 in FIGS. 17-19 may be preferred as they have a GWP of at or about 750 or less than 750. In an embodiment, a range of desired compositions may be determined based on the shaded areas 535, 635, and 735 in FIGS. 17-19.

In an embodiment, the desired property of the GWP being at or about 1500 or less than 1500 or at or about 750 or less than 750 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the useful compositions, preferred compositions, and other specific compositions shown in FIGS. 17-19 and described with respect to FIGS. 17-19 so as to include those compositions with the desired GWP.

In an embodiment, the desired property of the capacity in the range of at or about 85% to at or about 110% of the capacity of R410A may be different. In an embodiment, a composition having a capacity in the range of at or about 85% to at or about 110% of the capacity of R410A may be desired. In an embodiment, a composition having a capacity in the range of at or about 85% to at or about 105% of the capacity of R410A may be desired. In an embodiment, a composition having a capacity in the range of at or about 85% to at or about 100% of the capacity of R410A may be desired. In an embodiment, a composition having a capacity in the range of at or about 85% to at or about 105% of the capacity of R410A may be desired. In an embodiment, a composition having a capacity in the range of at or about 90% to at or about 110% of the capacity of R410A may be desired. In an embodiment, a composition having a capacity in the range of at or about 90% to at or about 105% of the capacity of R410A may be desired. In an embodiment, a composition having a capacity in the range of at or about 90% to at or about 100% of the capacity of R410A may be desired. In an embodiment, a composition having a capacity in the range of at or about 90% to at or about 100% of the capacity of R410A may be desired. In an embodiment, a composition having a capacity in the range of at or about 95% to at or about 110% of the capacity of R410A may be desired. In an embodiment, a composition having a capacity in the range of at or about 95% to at or about 105% of the capacity of R410A may be desired. In an embodiment, a composition having a capacity in the range of at or about 100% to at or about 110% of the capacity of R410A may be desired. In an embodiment, a composition having a capacity in the range of at or about 100% to at or about 105% of the capacity of R410A may be desired. In such embodiments, desired compositions may be selected from the useful compositions, preferred compositions, and other specific compositions shown in FIGS. 17-19 and described with respect to FIGS. 17-19 so as to include those compositions with the desired capacity.

In an embodiment, the desired property of the temperature glide being at or about 15° F. or less than 15° F. may be different. In an embodiment, a composition having a temperature glide at or about 12° F. or less than 12° F. may be desired. In an embodiment, a composition having a temperature glide at or about 10° F. or less than 10° F. may be desired. In an embodiment, a composition having a temperature glide at or about 5° F. or less than 5° F. may be desired. In such embodiments, desired compositions may be selected from the useful compositions, preferred compositions, and other specific compositions shown in FIGS. 17-19 and described with respect to FIGS. 17-19 so as to include those compositions with the desired temperature glide.

In an embodiment, a desired set of properties of a refrigerant composition includes being stable (e.g., with respect to R1123), a capacity that is at or about 85% or greater than 85% of the capacity of R32, and a temperature glide that is at or about 15° F. or less than 15° F. Based on these desired properties, a range of useful refrigerant compositions 560 is shown in matrix 550 of FIG. 20, a range of useful refrigerant compositions 660 is shown in matrix 650 of FIG. 21, and a range of useful refrigerant compositions 760 is shown in matrix 750 of FIG. 22.

The useful refrigerant compositions 560 in FIG. 20 include from at or about 25 wt % (80 wt % of R32 in mixture×31 wt % of mixture in composition) to at or about 80 wt % (80 wt % of R32 in mixture×100 wt % of mixture in composition) of R32; from at or about 6 wt % (20 wt % of R1123 in mixture×31 wt % of mixture in composition) to at or about 20 wt % (20 wt % of R1123 in mixture×100 wt % of mixture in composition) of R1123; at or about 42 wt %, or less than 42 wt % and greater than 0 wt % of R125; and at or about 54 wt %, or less than about 54 wt % and greater than 0 wt % of CF$_3$I.

The useful refrigerant compositions 660 in FIG. 21 include from at or about 17 wt % (50 wt % of R32 in mixture×34 wt % of mixture in composition) to at or about 50 wt % (50 wt % of R32 in mixture×100 wt % of mixture in composition) of R32; from at or about 17 wt % (50 wt % of R1123 in mixture×34 wt % of mixture in composition) to at or about 50 wt % (50 wt % of R1123 in mixture×100 wt % of mixture in composition) of R1123; at or about 44 wt %, or less than 44 wt % and greater than 0 wt % of R125; and at or about 47 wt %, or less than 47 wt % and greater than 0 wt % of CF$_3$I.

The useful refrigerant compositions 760 in FIG. 22 include from at or about 8 wt % (20 wt % of R32 in mixture×39 wt % of mixture in composition) to at or about 20 wt % (20 wt % of R32 in mixture×100 wt % of mixture in composition) of R32; from at or about 23 wt % (80 wt % of R1123 in mixture×39 wt % of mixture in composition) to at or about 80 wt % (80 wt % of R1123 in mixture×100 wt % of mixture in composition) of R1123; at or about 46 wt %, or less than 46 wt % and greater than 0 wt % of R125; and at or about 39 wt %, or less than about 39 wt % and greater than 0 wt % of CF$_3$I.

As discussed above, a composition having a ratio of R32 to R1123 from about 80:20 to about 20:80 may be desired as this combination provides a composition that is stable and provides compositions with lower GWPs. Accordingly, a range of useful refrigerant compositions may be interpolated from the useful refrigerant compositions 560 shown in FIG. 20 and useful refrigerant compositions 760 shown in FIG. 21. Based on each of the useful refrigerant compositions 560, 660, 760, useful refrigerant compositions may include from at or about 8 wt % to at or about 80 wt % of R32; from at or about 6 wt % to at or about 80 wt % of R1123; at or about 46 wt %, or less than 46% R125 and greater than 0% of R125; and at or about 54 wt %, or less than 54 wt % and greater than 0 wt % of CF$_3$I.

In an embodiment, a composition having a ratio of R32 to R1123 from about 80:20 to about 20:80 may be desired as these compositions are stable with respect to R1123 and have lower GWPs. In such an embodiment, useful refrigerant compositions may be determined based on the useful refrigerant compositions 560 in FIG. 20 and the useful refrigerant compositions 660 in FIG. 21. In an embodiment, a composition having a ratio of R32 to R1123 (R32:R1123) from about 50:50 to about 20:80 may be desired. In such an embodiment, useful refrigerant compositions may be determined based on the useful refrigerant compositions 660 in FIG. 21 and the useful refrigerant compositions 760 in FIG. 22.

In an embodiment, compositions having a ratio of R1123 to R32 that is from about 60:40 to about 40:60 provide higher stability. In some embodiments, a set of desired properties may include higher stability. In such an embodiment, desired compositions may be selected based on the useful refrigerant compositions 560, 760 in FIGS. 20 and 22 so as to include those compositions with the desired ratio of R1123 to R32 of 60:40 to 40:60.

As shown in FIGS. 20-22, useful compositions 560 may include preferred compositions 570, useful compositions 660 may include preferred compositions 670, and useful compositions 760 may include preferred compositions 770. The preferred compositions 570, 670, 770, may be desirable in an embodiment as they are stable (e.g., stable relative to R1123), have a capacity at or about 85% or greater than 85% and less than 100% of the capacity of R410A, have a temperature glide less than 15° F., and are nonflammable.

The preferred refrigerant compositions 570 in FIG. 20 include from at or about 25 wt % (80 wt % of R32 in mixture×31 wt % of mixture in composition) to at or about 44 wt % (80 wt % of R32 in mixture×55 wt % of mixture in composition) of R32; from at or about 6 wt % (20 wt % of R1123 in mixture×31 wt % of mixture in composition) to at or about 11 wt % (20 wt % of R1123 in mixture×55 wt % of mixture in composition) of R1123; at or about 44 wt %, or less than 44 wt % and greater than 0 wt % of R125; and from at or about 7 wt % to at or about 54 wt % of CF$_3$I.

The preferred refrigerant compositions 670 in FIG. 21 include from at or about 17 wt % (50 wt % of R32 in mixture×34 wt % of mixture in composition) to at or about 28 wt % (50 wt % of R32 in mixture×55 wt % of mixture in composition) of R32; from at or about 17 wt % (50 wt % of R1123 in mixture×34 wt % of mixture in composition) to at or about 28 wt % (50 wt % of R1123 in mixture×55 wt % of mixture in composition) of R1123; at or about 44 wt %, or less than 44 wt % and greater than 0 wt % of R125; and at or about 5 wt % to about or about 47 wt % of CF$_3$I.

The preferred refrigerant compositions 770 in FIG. 22 include from at or about 8 wt % (20 wt % of R32 in mixture×39 wt % of mixture in composition) to at or about 11 wt % (20 wt % of R32 in mixture×55 wt % of mixture in composition) of R32; from at or about 31 wt % (80 wt % of R1123 in mixture×39 wt % of mixture in composition) to at or about 44 wt % (80 wt % of R1123 in mixture×55 wt % of mixture in composition) of R1123; from at or about 10 wt % to at or about 46 wt % of R125; and at or about 35 wt %, or less than 35 wt % and greater than 0 wt % of CF$_3$I.

As discussed above, a composition having a ratio of R32 to R1123 from about 80:20 to about 20:80 may be desired as these compositions are stable with respect to R1123 and have lower GWPs. Accordingly, a range of preferred refrigerant compositions may be interpolated from the preferred refrigerant compositions 570, 670, 770 in FIGS. 20-22. Based on each of the preferred refrigerant compositions 570, 670, 770, useful refrigerant compositions may include from at or about 8 wt % to at or about 44 wt % of R32; from at or about 6 wt % to at or about 44 wt % of R1123; at or about 46 wt %, or less than 46 wt % and greater than 0 wt % of R125; and at or about 54 wt %, or less than about 54 wt % and greater than 0 wt % of $CF_3I$.

Of the useful compositions 560, 660, 760, compositions within the shaded areas 575, 675, and 775 in FIGS. 20-22 may be preferred as they have a GWP of at or about 750 or less than 750. In an embodiment, desired compositions may be selected form the useful compositions, preferred compositions, and other specific compositions in FIGS. 20-22 and described with respect to FIGS. 20-22 based on the shaded areas 575, 675, and 775 in FIGS. 20-22.

In an embodiment, the desired property of the GWP being at or about 1500 or less than 1500 or at or about 750 or less than 750 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the useful compositions, preferred compositions, and other specific compositions shown in FIGS. 20-22 and described with respect to FIGS. 20-22 to include those compositions with the desired GWP.

In an embodiment, the desired property of the capacity being at or about 85% or greater than 85% of the capacity of R32 may be different. In an embodiment, a composition having a capacity in the range of at or about 85% to at or about 105% of the capacity of R32 may be desired. In an embodiment, a composition having a capacity at or about 90% or greater than 90% of the capacity of R32 may be desired. In an embodiment, a composition having a capacity in the range of at or about 90% to at or about 105% of the capacity of R32 may be desired. In an embodiment, a composition having a capacity in the range of at or about 90% to at or about 100% of the capacity of R32 may be desired. In an embodiment, a composition having a capacity at or about 95% or greater than 95% of the capacity of R32 may be desired. In an embodiment, a composition having a capacity in the range of at or about 95% to at or about 105% of the capacity of R32 may be desired. In an embodiment, a composition having a capacity in the range of at or about 95% to at or about 100% of the capacity of R32 may be desired. In an embodiment, a composition having a capacity at or about the capacity of R32 or greater than the capacity of R32 may be desired. In an embodiment, a composition having a capacity in the range of at or about 100% to at or about 105% of the capacity of R32 may be desired. In such embodiments, desired compositions may be selected from the useful compositions, preferred compositions, and other specific compositions shown in FIGS. 20-22 and described with respect to FIGS. 20-22 to include those compositions with the desired capacity.

In an embodiment, the desired property of the temperature glide being at or about 15° F. or less than 15° F. may be different. In an embodiment, a composition having a temperature glide at or about 12° F. or less than 12° F. may be desired. In an embodiment, a composition having a temperature glide at or about 10° F. or less than 10° F. may be desired. In an embodiment, a composition having a temperature glide at or about 5° F. or less than 5° F. may be desired. In such embodiments, desired compositions may be selected from the useful compositions, preferred compositions, and other specific compositions shown in FIGS. 20-22 and described with respect to FIGS. 20-22 to include those compositions with the desired temperature glide.

Figure 23A:
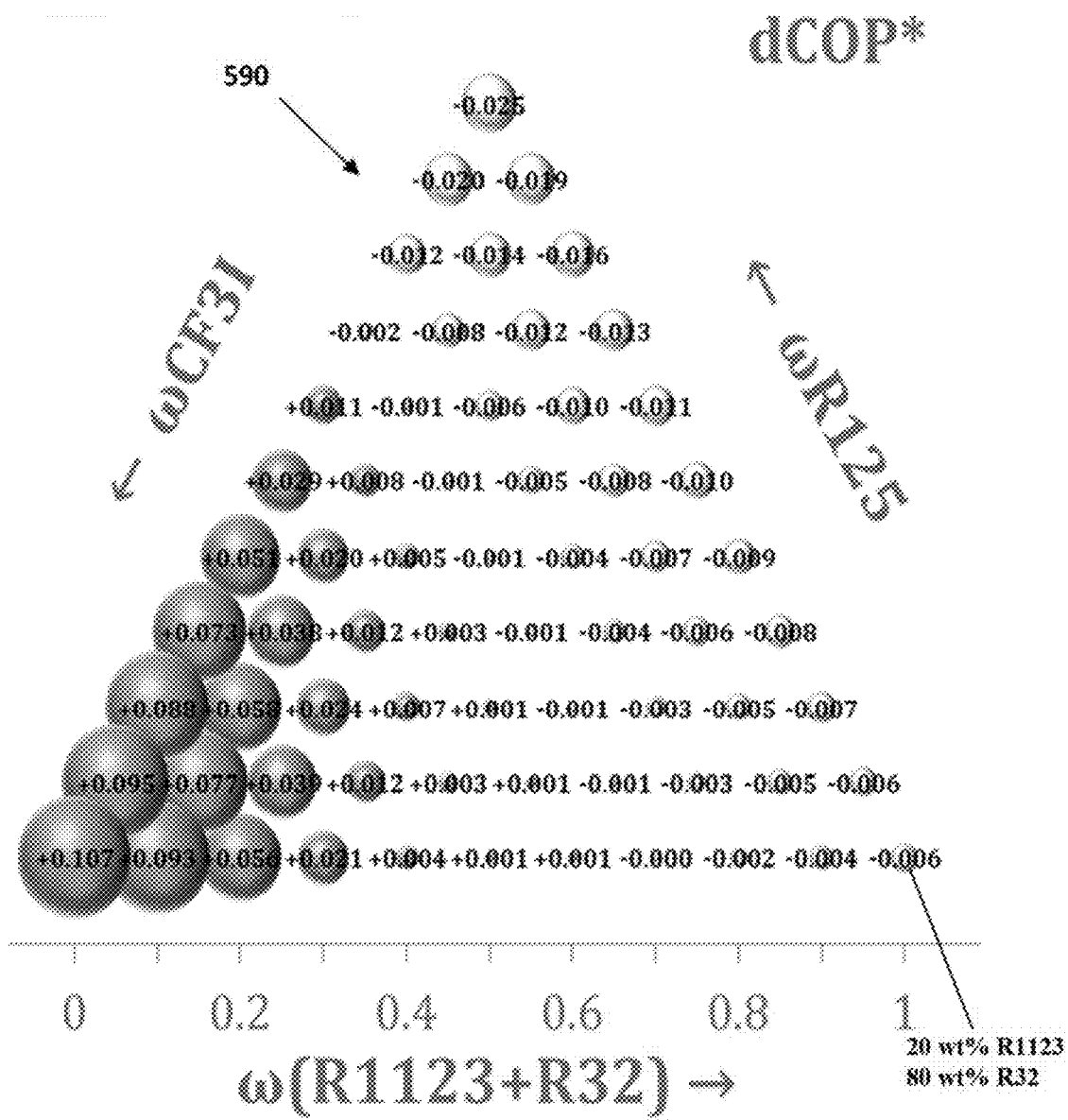
FIGS. 23A, 23B, 24A, 24B, 25A, 25B each illustrate a matrix of a thermodynamic property of compositions of R1123, R32, R125, and $CF_3I$.

Each of FIGS. 23A-25B illustrates a matrix 590, 592, 690, 692, 790, 792 of a thermodynamic property for compositions of R1123, R32, R125, and $CF_3I$ by weight percentage. In FIGS. 23A-25B, axes for R125 are horizontal and parallel to the side for the weight percentage of a mixture of R1123 and R32, axes for $CF_3I$ are parallel to the side for R125, and axes for the mixture of R1123 and 80 R32 are parallel to the side for $CF_3I$. In FIGS. 23A and 23B, the bottom side of the matrix 590, 592 is for weight percentages of a mixture of 80 wt % of R32 and 20 wt % of R1123. In FIGS. 24A and 24B, the bottom side of matrix 690, 692 is for weight percentages of a mixture of 50 wt % of R32 and 50 wt % of R1123. In FIGS. 24A and 24B, the bottom side of the matrix 790, 792 is for weight percentages of a mixture of 20 wt % of R32 and 80 wt % of R1123. Each matrix 590, 592, 690, 692, 790, 792 shows values at each 10 wt % of R125, $CF_3I$, and the mixture of R32 and R1123. Compositions in each matrix 590, 592, 690, 692, 790, 792 are calculated in a similar manner as discussed regarding matrix 200 in FIG. 7A.

Figure 23B:
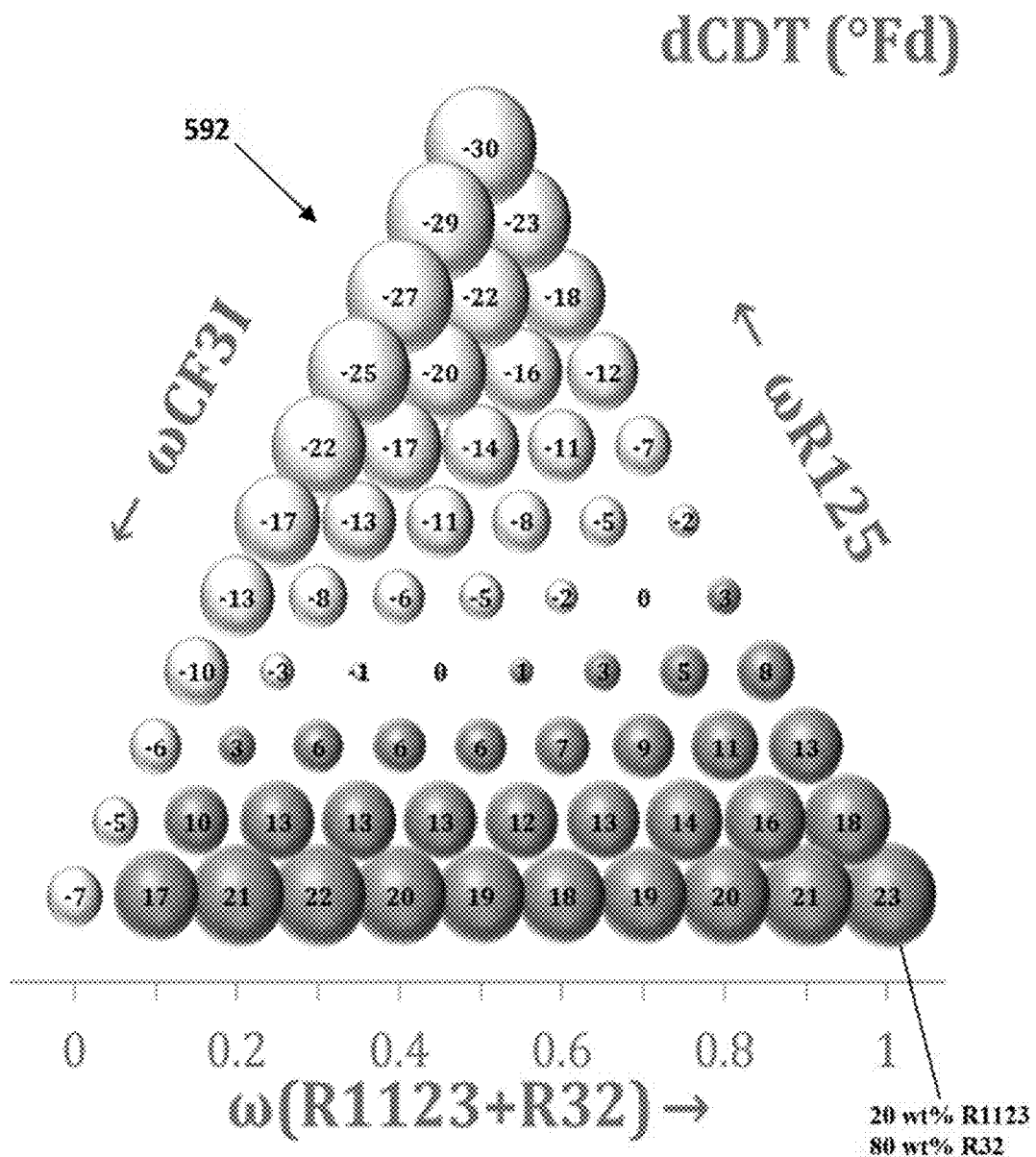
Figure 24A:
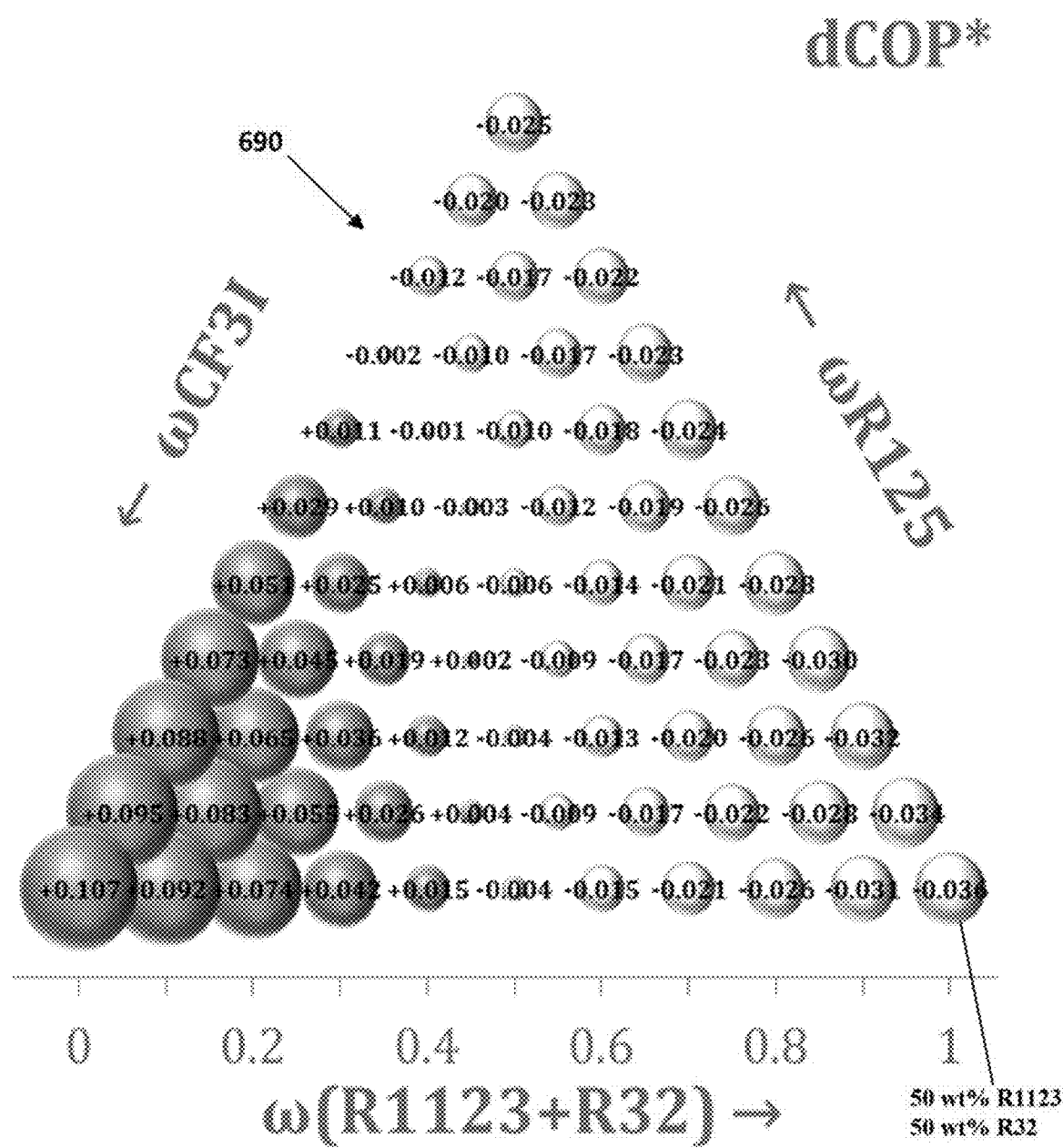
Figure 24B:
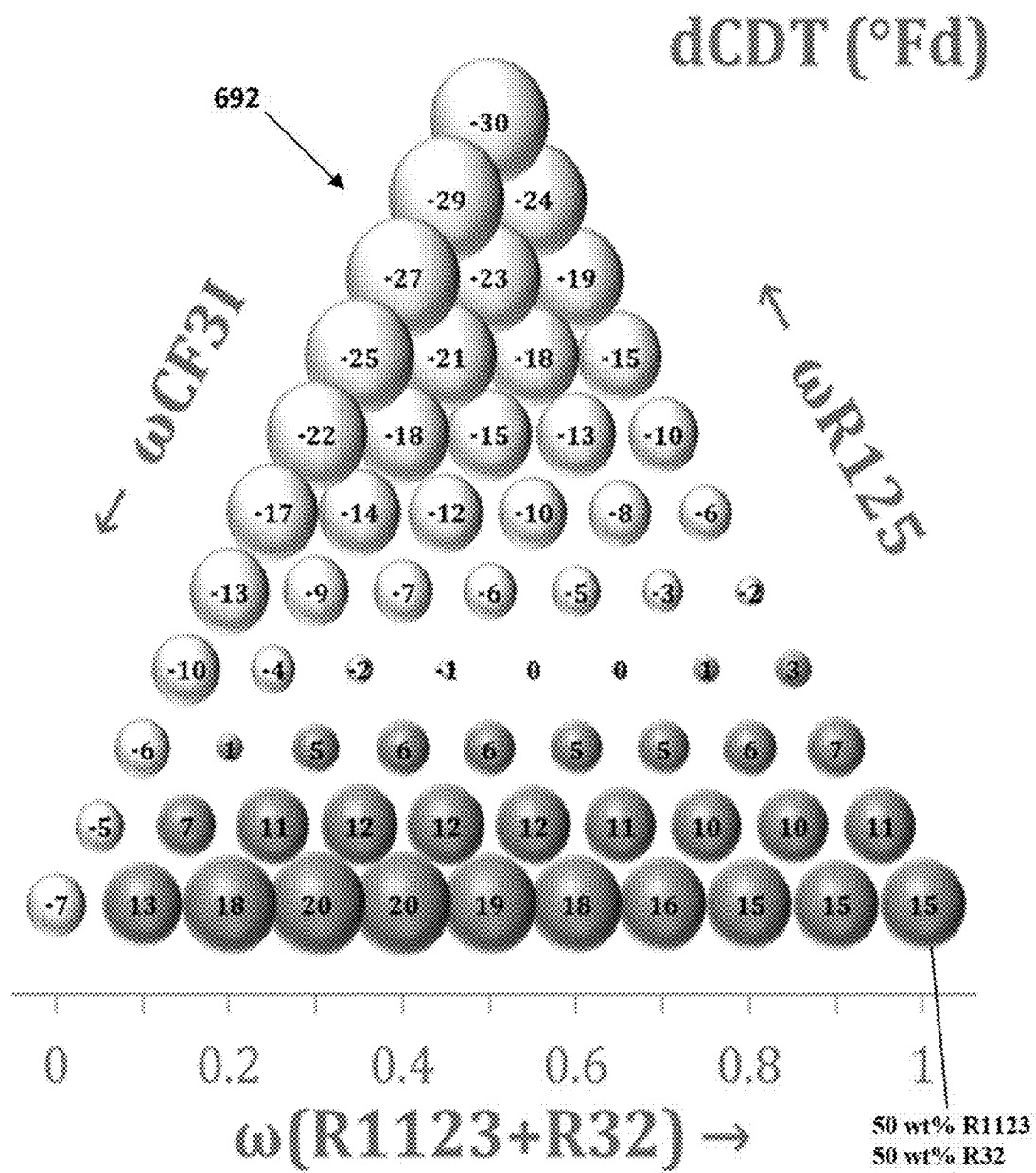
Figure 25A:
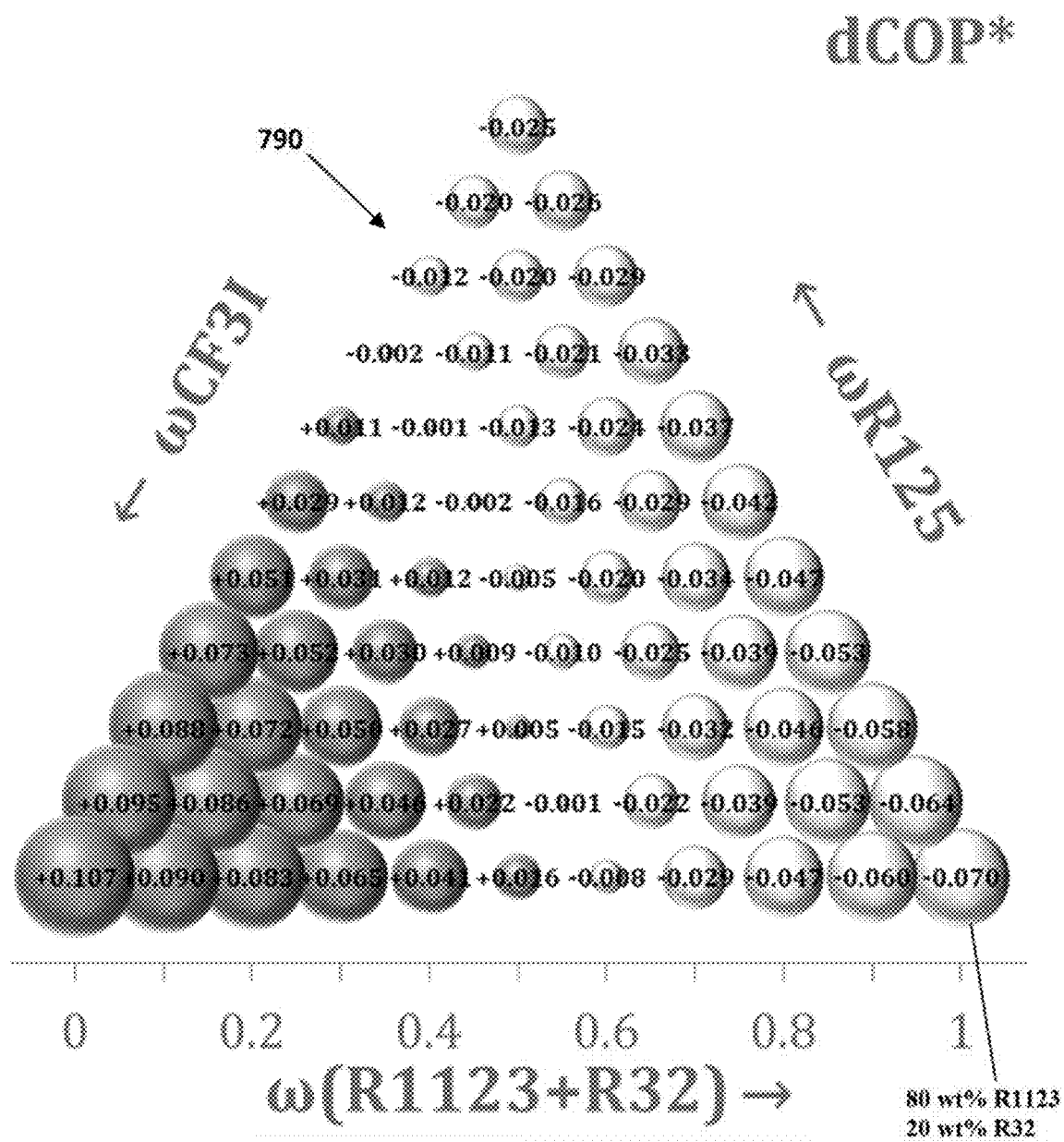
Figure 25B:
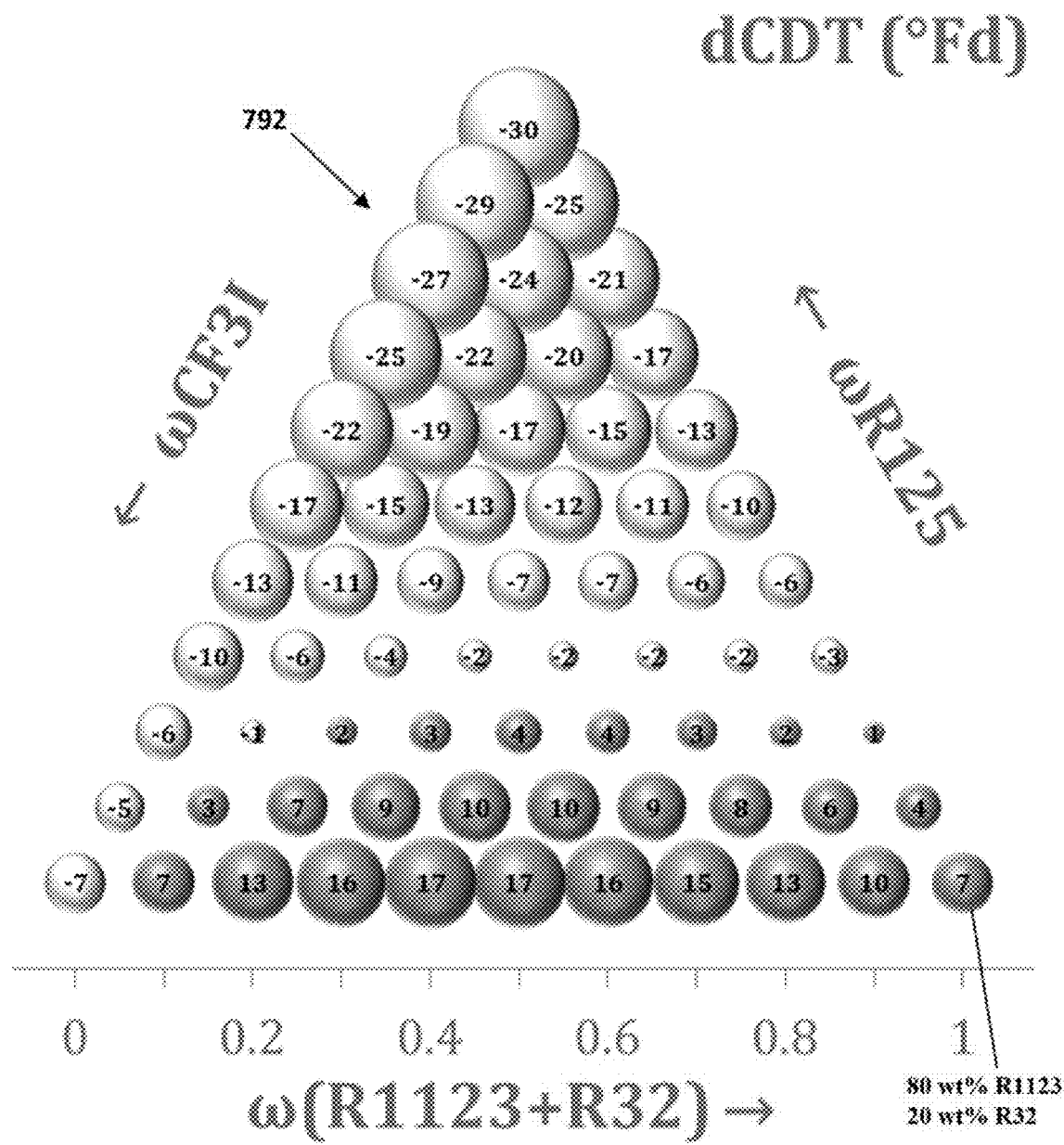

FIGS. 23A, 24A, and 25A each illustrate a matrix 590, 690, 790 of coefficients of performance relative to R410A (e.g., for compositions of R125, $CF_3I$, and a mixture of R32 and R1123. FIGS. 23B, 24B, 25B each illustrate a matrix 592, 692, 792 of compressor discharge temperatures in Fahrenheit (relative to R410A) for compositions of R125, $CF_3I$, and a mixture of R32 and R1123.

Performance of a refrigerant composition may be based on one or more of a coefficient of performance and compressor discharge temperature. In an embodiment, the desired set of properties may include one or more of a coefficient of performance and compressor discharge temperature. In an embodiment, a composition that has a coefficient of performance of greater than 97% relative to R410A may be desired. In an embodiment, a composition that results in a change in the compressor discharge temperature, relative to R410A, that is at or about 32° F. or less than 32° F. may be desired. In an embodiment, a composition that results in a change in the compressor discharge temperature, relative to R410A, that is at or about 20° F. or less than 20° F. may be desired. For values relative to R32, the matrices in FIGS. 23A-25 may be modified based on the values for R410 and R32 in Tables 2 and 3 to approximate values relative to R32. In such embodiments, one or more of FIGS. 23A-25B may be utilized to select compositions having a desired coefficient of performance and/or compressor discharge temperature. For example, desired compositions may be selected from the compositions shown in and/or described with respect to one or more of the FIGS. 17-22 to have a desired coefficient of performance and/or compressor discharge temperature by utilizing one or more of FIGS. 23A-25B.

In an embodiment, a method of making a refrigerant composition and/or a method of retrofitting a refrigerant composition utilizes one or more of the matrices of FIGS. 17-25B so that the resulting refrigerant composition or retrofitted refrigerant composition has the desired set of properties.

Compositions Including R125, R1234yf, R32, and R1123

Figure 26:
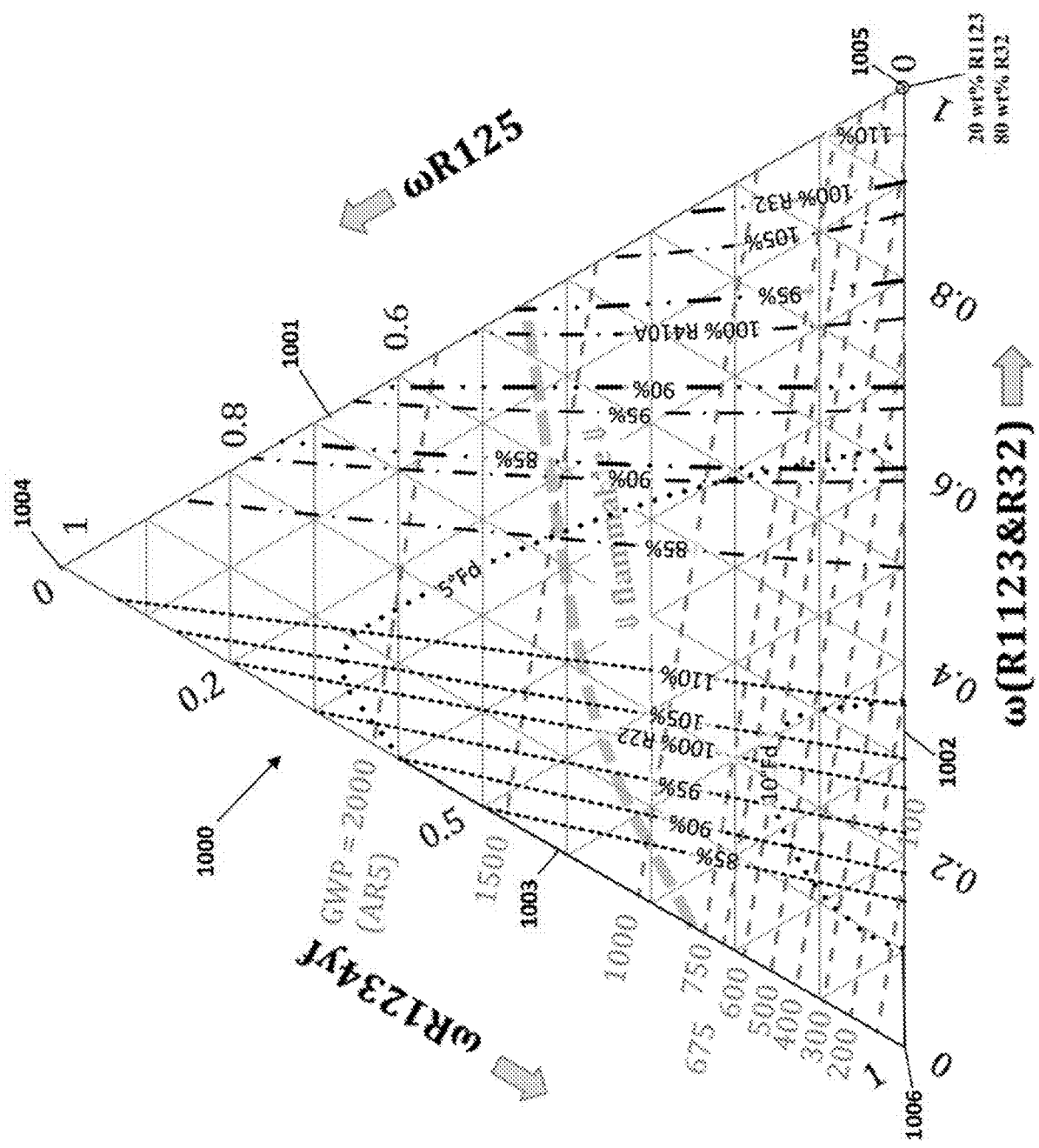
FIGS. 26-29 illustrate a matrix of compositions of R1123, R32, R125, and 1234yf that includes plots of GWP, flammability, temperature glide, capacity relative to R410A, capacity relative to R32, and capacity relative to R22.

FIG. 26 illustrates a matrix 1000 that was developed to show plots of GWP, flammability, temperature glide, capacity relative to R410A, capacity relative to R32, and capacity relative to R22 as a function of the concentration of R125, a mixture of 20 wt % R1123 and 80 wt % of R32, and R1234yf. The sides 1001, 1002, 1003 of the triangle correspond to weight percentages of R125, the mixture of 20 wt % R1123 and 80 wt % of R32, and R1234yf, respectively. The vertices 1004, 1005, 1006 of the triangle correspond to 100 wt % R125, 20 wt % R1123 and 80 wt % R32, and 100 wt % R1234yf, respectively.

Figure 27:
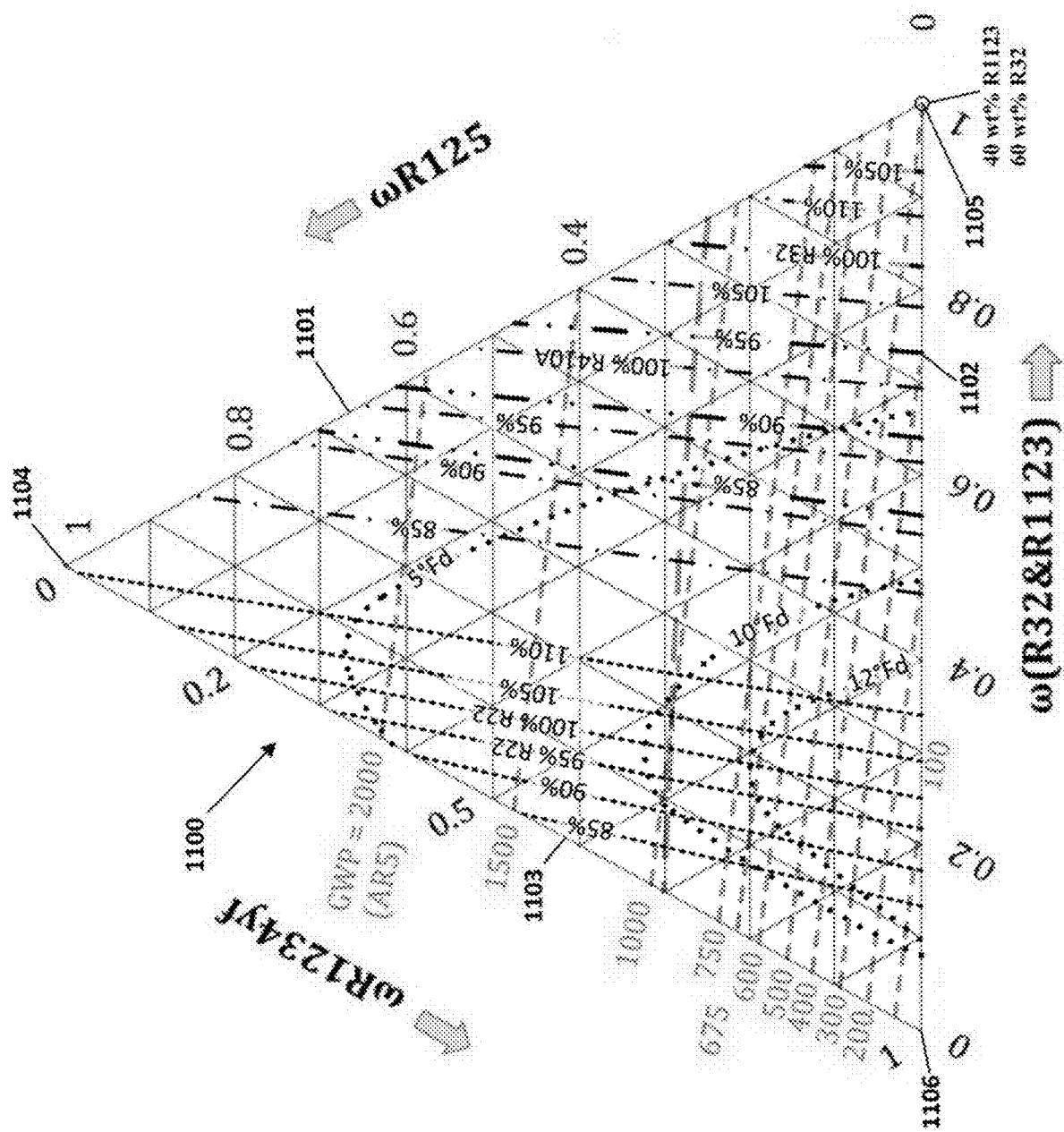

FIG. 27 illustrates a matrix 1100 that was developed to show plots of GWP, flammability, temperature glide, capacity relative to R410A, capacity relative to R32, and capacity relative to R22 as a function of the concentration of R125, a mixture of 40 wt % R1123 and 60 wt % of R32, and R1234yf. The sides 1101, 1102, 1103 of the triangle corresponds to weight percentages of R125, the mixture of 40 wt % R1123 and 60 wt % of R32, and R1234yf, respectively. The vertices 1104, 1105, 1106 of the triangle correspond to 100 wt % R125, 40 wt % R1123 and 60 wt % R32, and 100 wt % R1234yf, respectively.

Figure 28:
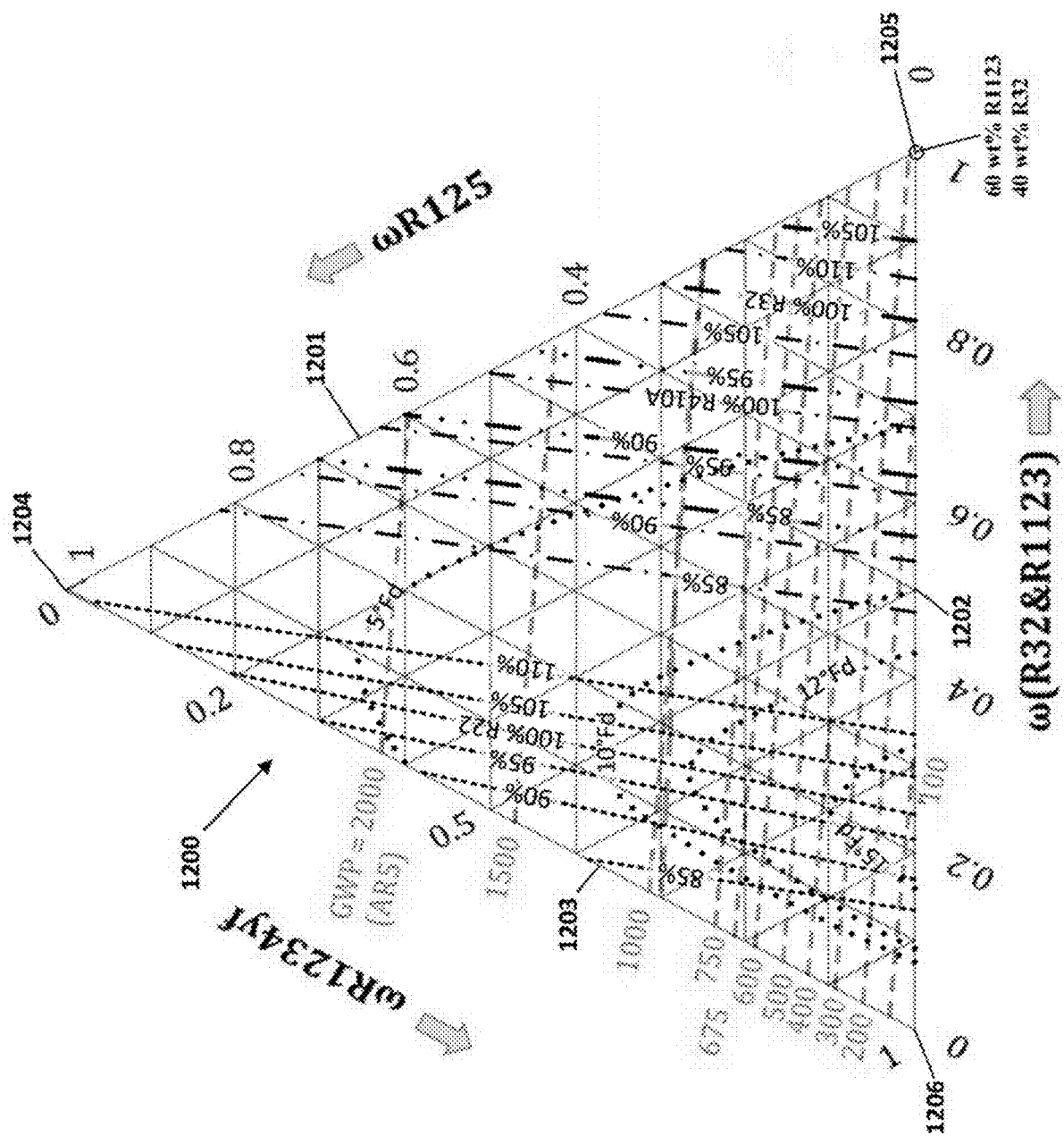

FIG. 28 illustrates a matrix 1200 that was developed to show plots of GWP, flammability, temperature glide, capacity relative to R410A, capacity relative to R32, and capacity relative to R22 as a function of the concentration of R125, a mixture of 60 wt % R1123 and 40 wt % of R32, and R1234yf. The sides 1201, 1202, 1203 of the triangle correspond to weight percentages of R125, the mixture of 60 wt % R1123 and 40 wt % of R32, and R1234yf, respectively. The vertices 1204, 1205, 1206 of the triangle correspond to 100 wt % R125, 60 wt % R1123 and 40 wt % R32, and 100 wt % R1234yf, respectively.

Figure 29:
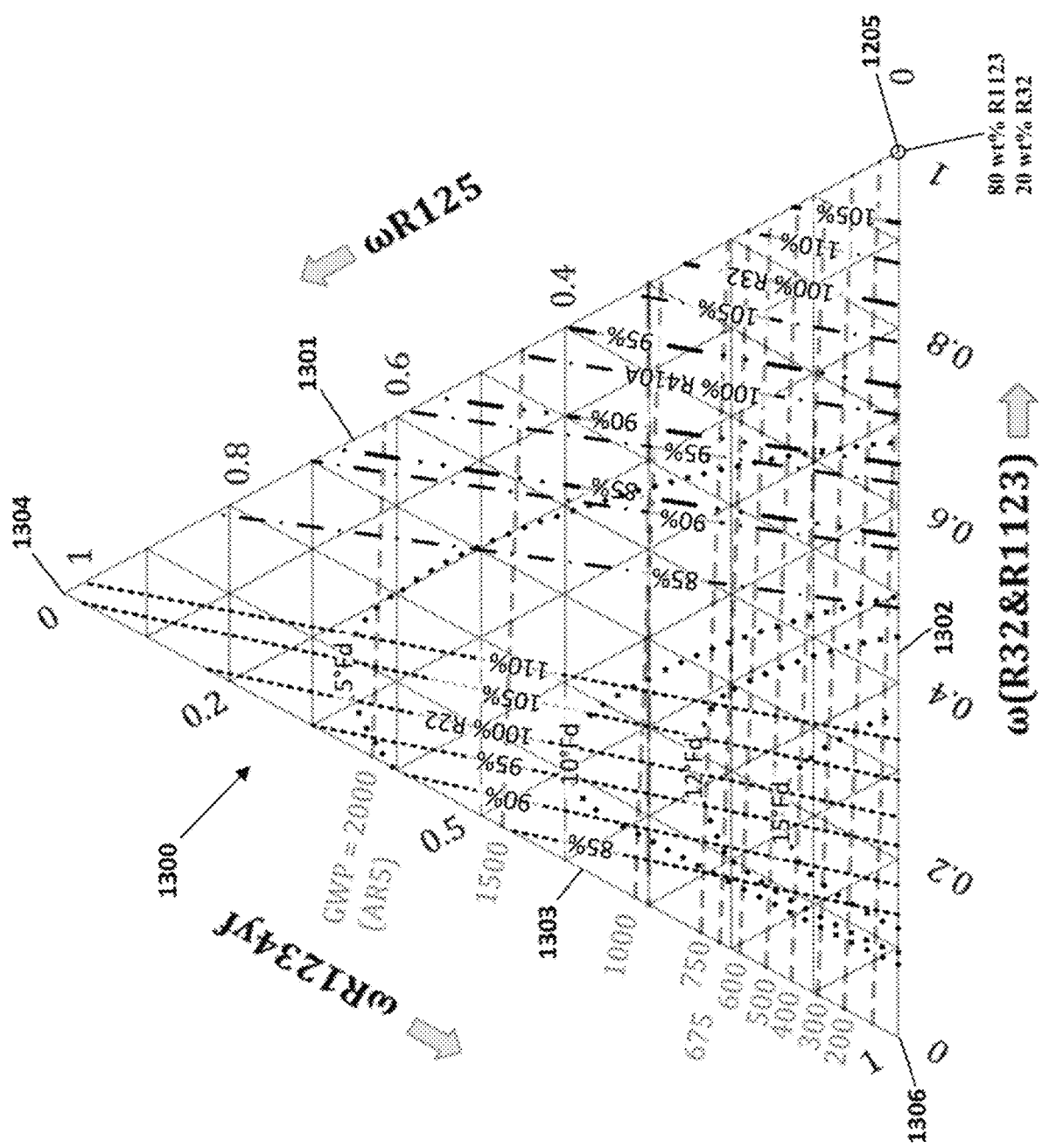

FIG. 29 illustrates a matrix 1300 that was developed to show plots of GWP, flammability, temperature glide, capacity relative to R410A, capacity relative to R32, and capacity relative to R22 as a function of the concentration of R125, a mixture of 80 wt % R1123 and 20 wt % of R32, and R1234yf. The sides 1301, 1302, 1303 of the triangle corresponds to weight percentages of R125, the mixture of 80 wt % R1123 and 20 wt % of R32, and R1234yf, respectively. The vertices 1304, 1305, 1306 of the triangle correspond to 100 wt % R125, 80 wt % R1123 and 20 wt % R32, and 100 wt % R1234yf, respectively.

Properties of the compositions for each matrix 1000, 1100, 1200, 1300 were estimated using a thermodynamic model. The boundary between flammable and non-flammable compositions is shown by a large dashed line in each of FIGS. 26-29, which extends between the left and right sides of the triangle. Flammable compositions are below the boundary. The boundary is based on the flammability characteristics of R1123, R32, R1234yf, R410A, and R125. GWP is based on the GWP of the individual components and the method described in ASHRAE Standard 34 for calculating the GWP of refrigerant blends. The flammability boundary is estimated based on characteristics of the individual components and various binary mixtures of the components. Accordingly, the amount of each refrigerant in a composition along the flammability boundary may, for example, vary by up to about 5 percent in an embodiment. It should be appreciated the compositions and ranges shown and/or described may be updated based on further testing to confirm the location of the flammability boundary.

Figure 30:
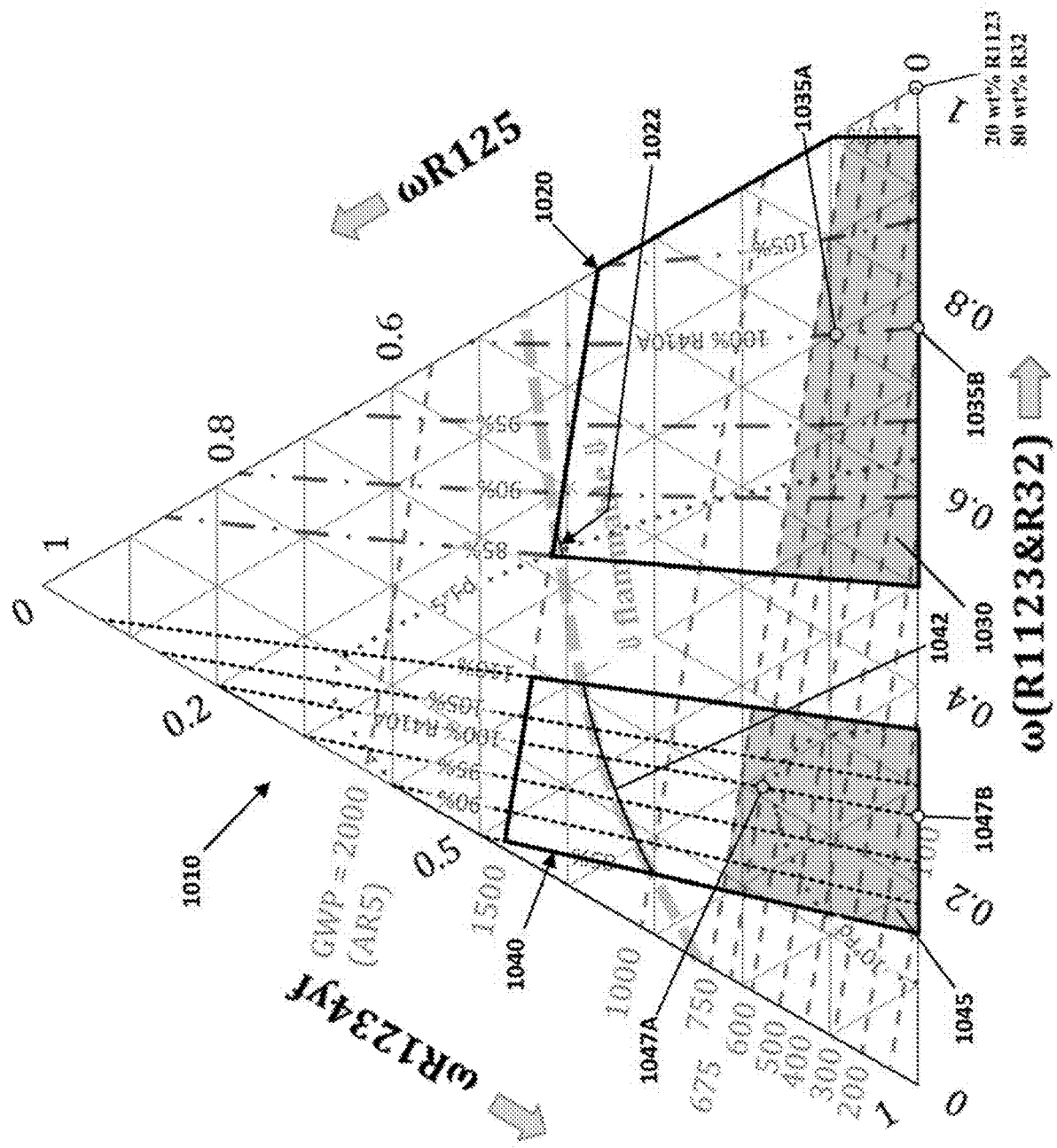
FIGS. 30-33 each illustrate a matrix based on a respective one of FIGS. 26-29 that can be used to select a refrigerant composition with a desired set of properties in an embodiment.
Figure 34:
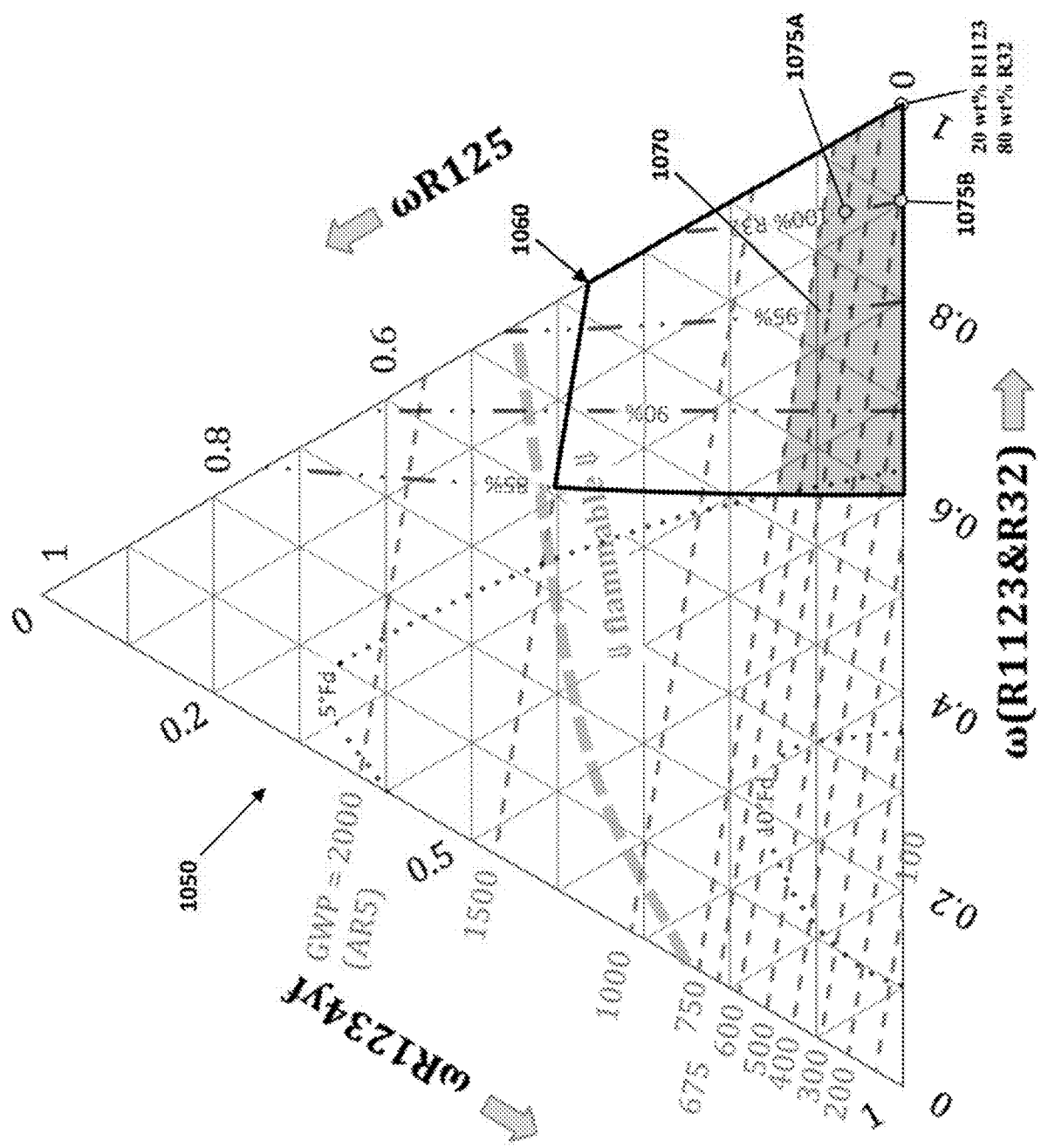
FIGS. 34-37 each illustrate a matrix based on a respective one of FIGS. 26-29 that can be used to select a refrigerant composition with a desired set of properties in an embodiment.

Each of FIGS. 30 and 34 illustrates a matrix 1010, 1050 based on matrix 1000 of FIG. 26 and has the same sides and vertices as matrix 1000. Matrix 1010 of FIG. 30 is the same as matrix 1000, except that the matrix 1010 does not have the lines for capacities relative to R32 and illustrates ranges of refrigerant compositions that may be desired in particular embodiments. Matrix 1050 of FIG. 34 is the same as matrix 1000, except that the matrix 1050 does not have the lines for capacities relative to R410A or R22 and illustrates ranges of refrigerant compositions that may be desired in particular embodiments.

Figure 31:
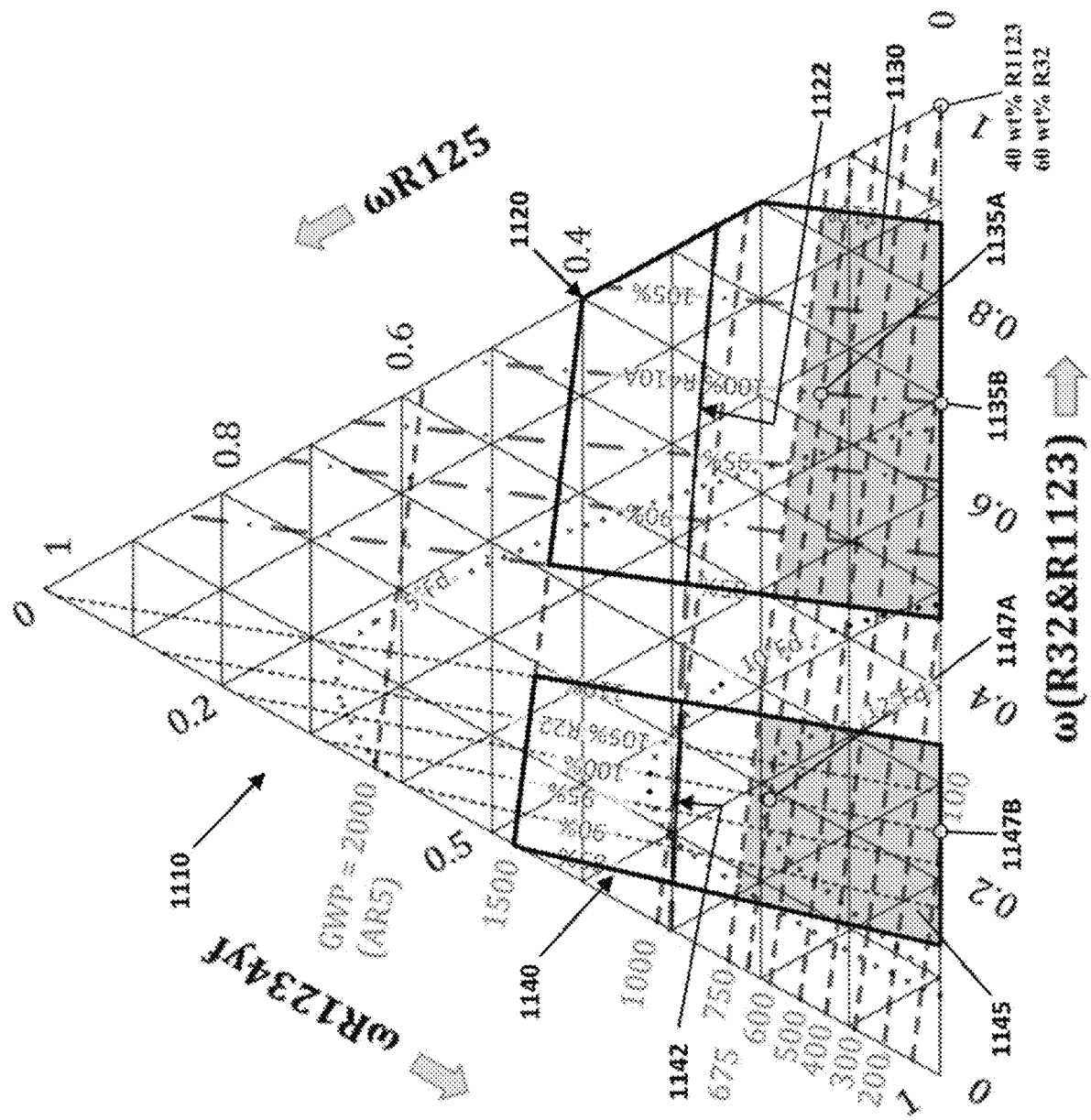
Figure 35:
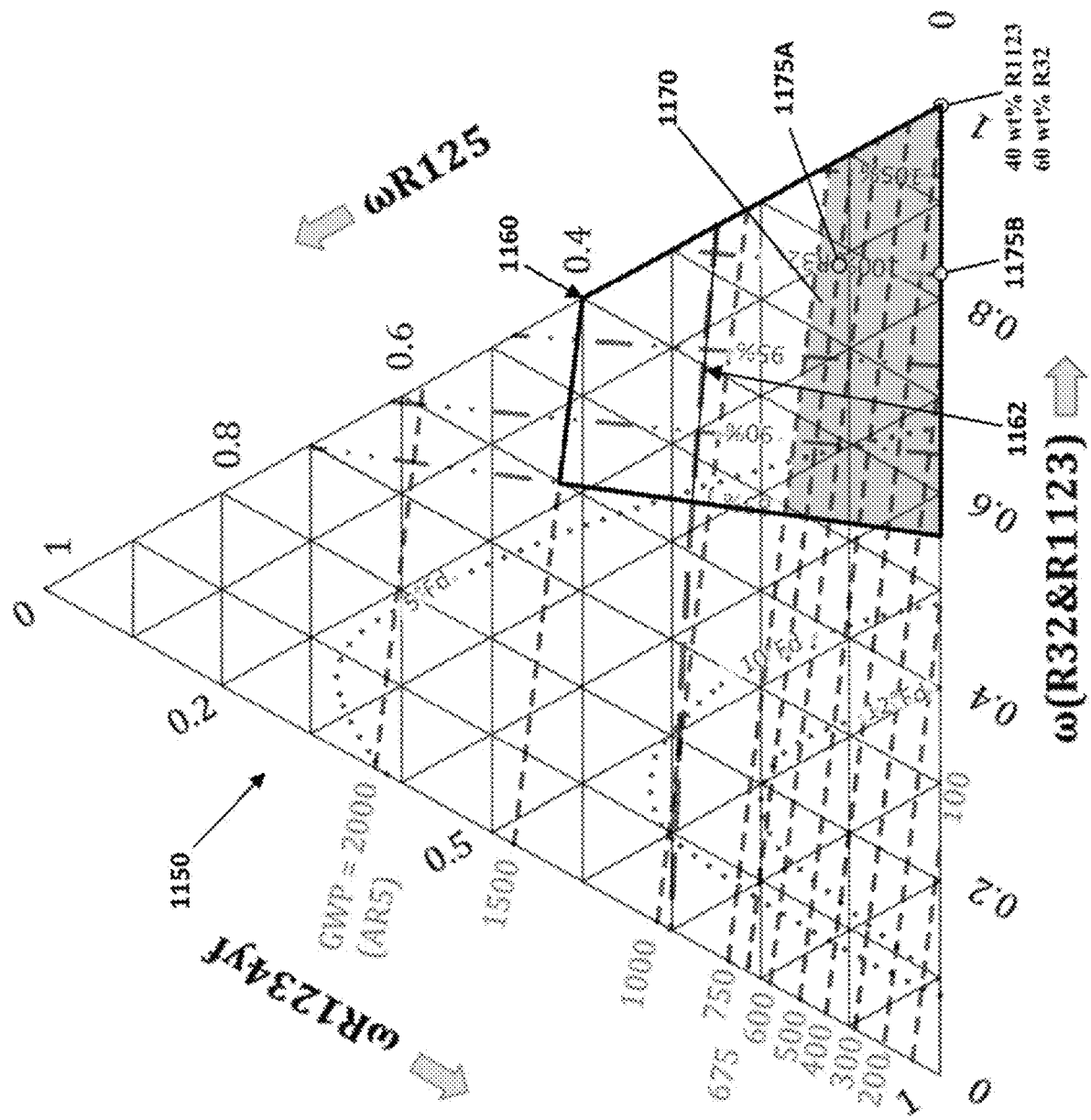

Each of FIGS. 31 and 35 illustrates a matrix 1110, 1150 based on matrix 1100 of FIG. 27 and has the same sides and vertices as the matrix 1100. Matrix 1110 of FIG. 31 is the same as matrix 1100, except that the matrix 1110 does not have the lines for capacities relative to R32 and illustrates ranges of refrigerant compositions that may be desired in particular embodiments. Matrix 1150 of FIG. 35 is the same as matrix 1100 of FIG. 27, except that the matrix 1150 does not have the lines for capacities relative to R410A or R22 and illustrates ranges of refrigerant compositions that may be desired in particular embodiments.

Figure 32:
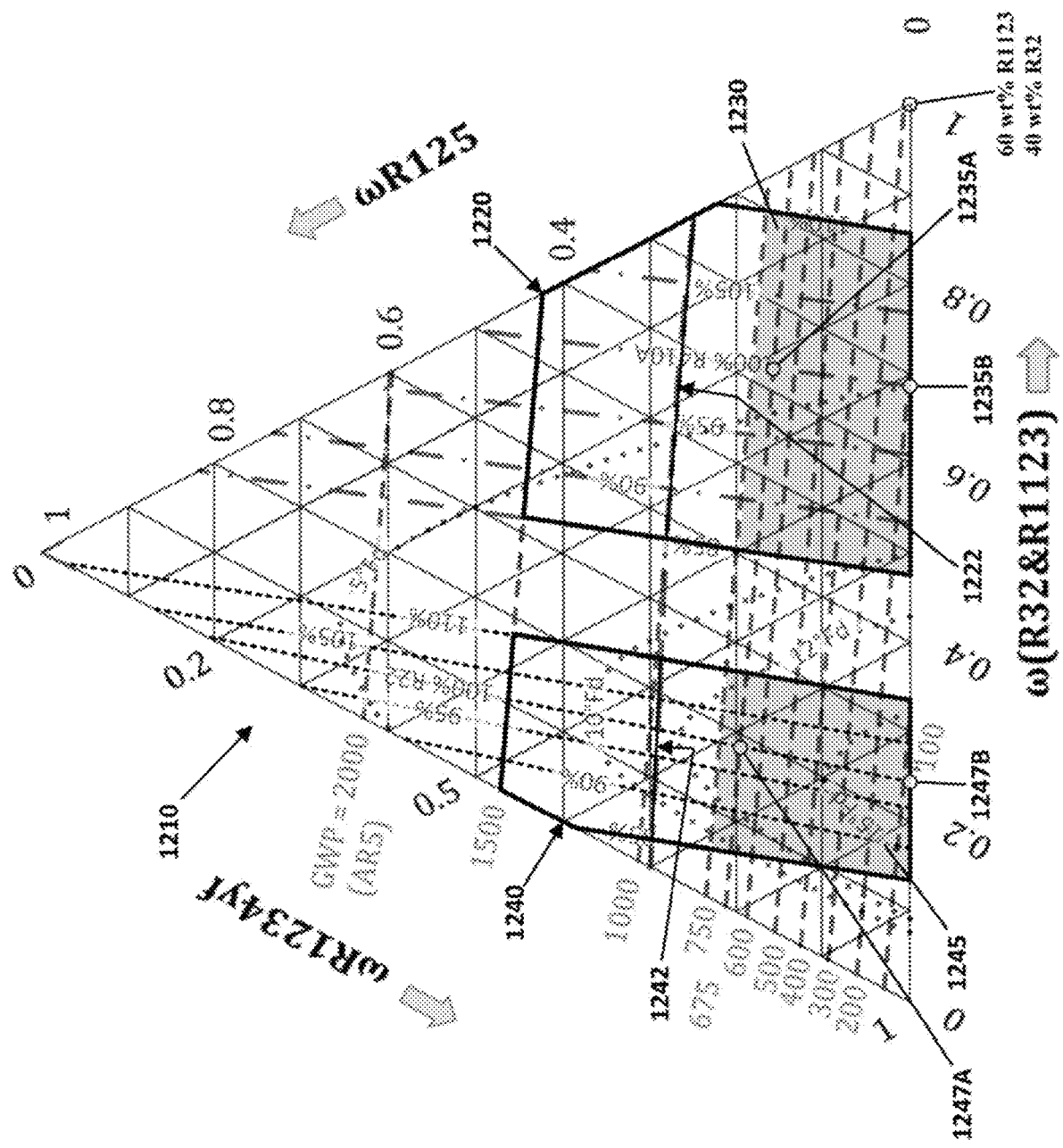
Figure 36:
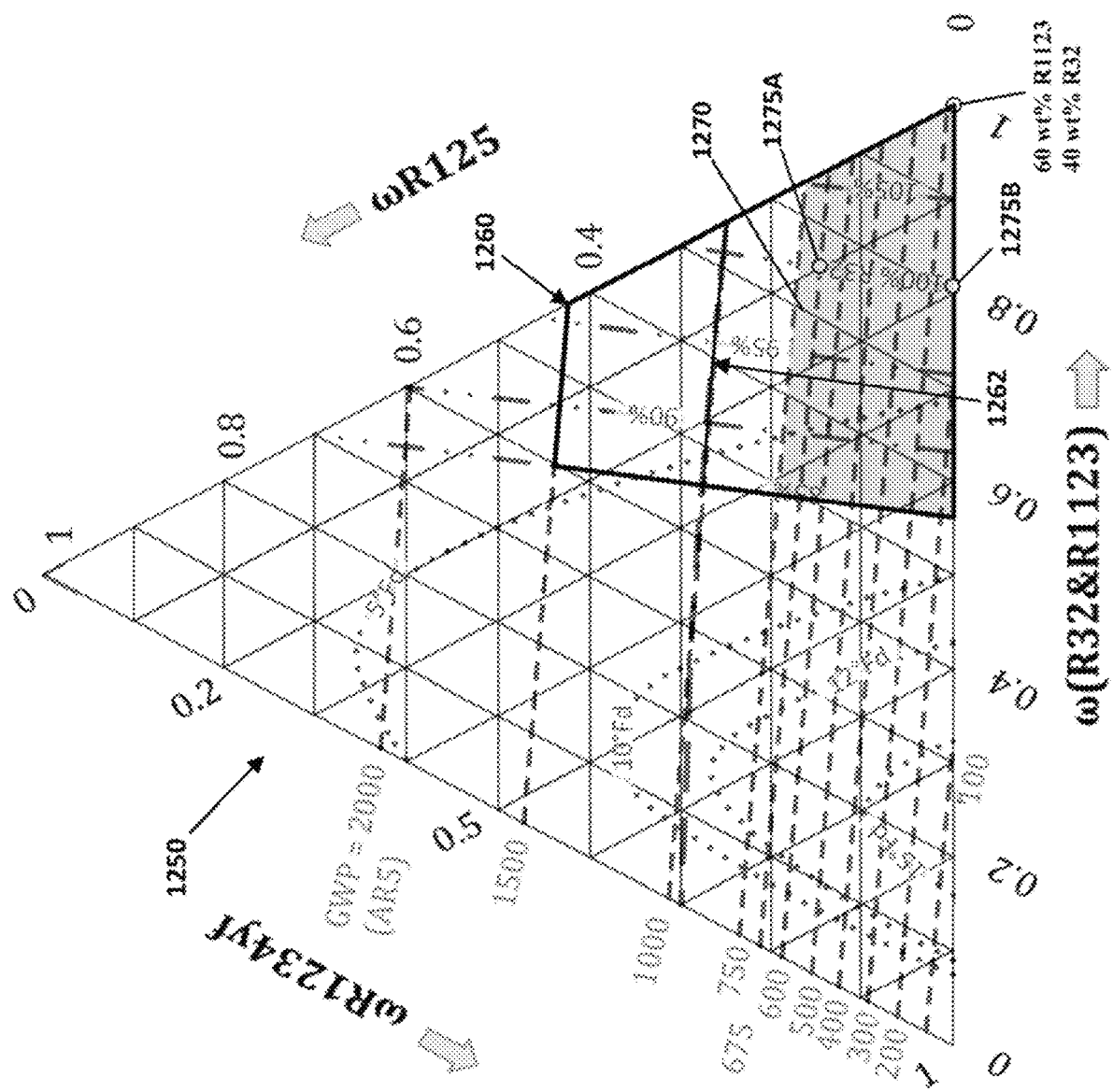

Each of FIGS. 32 and 36 illustrates a matrix 1210, 1250 based on matrix 1200 of FIG. 28 and has the same sides and vertices as matrix 1200. Matrix 1210 of FIG. 32 is the same as matrix 1200, except that the matrix 1210 does not have the lines for capacities relative to R32 and illustrates ranges of refrigerant compositions that may be desired in particular embodiments. Matrix 1250 of FIG. 36 is the same as matrix 1200, except that the matrix 1250 does not have the lines for capacities relative to R410A or R22 and illustrates ranges of refrigerant compositions that may be desired in particular embodiments.

Figure 33:
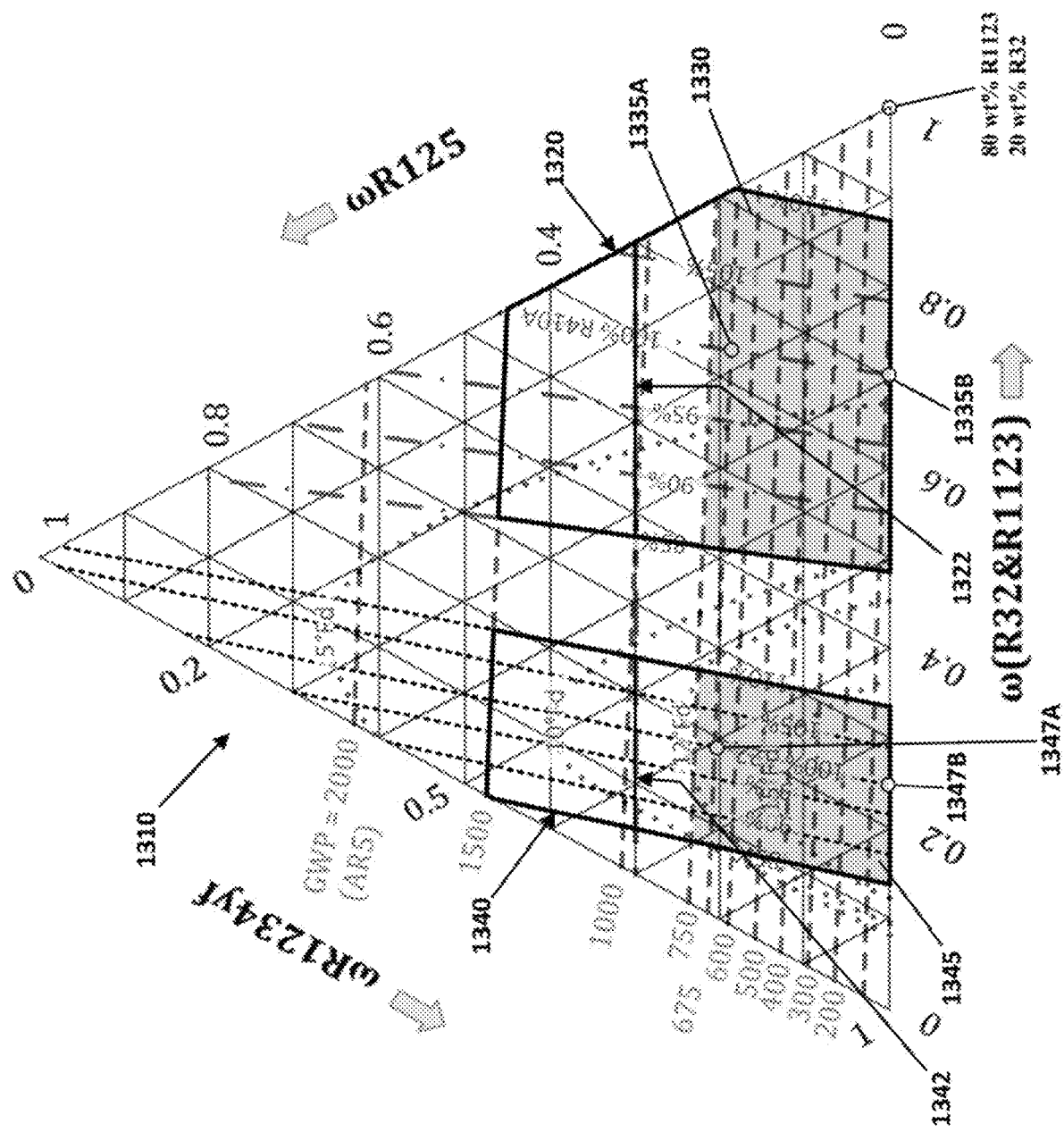
Figure 37:
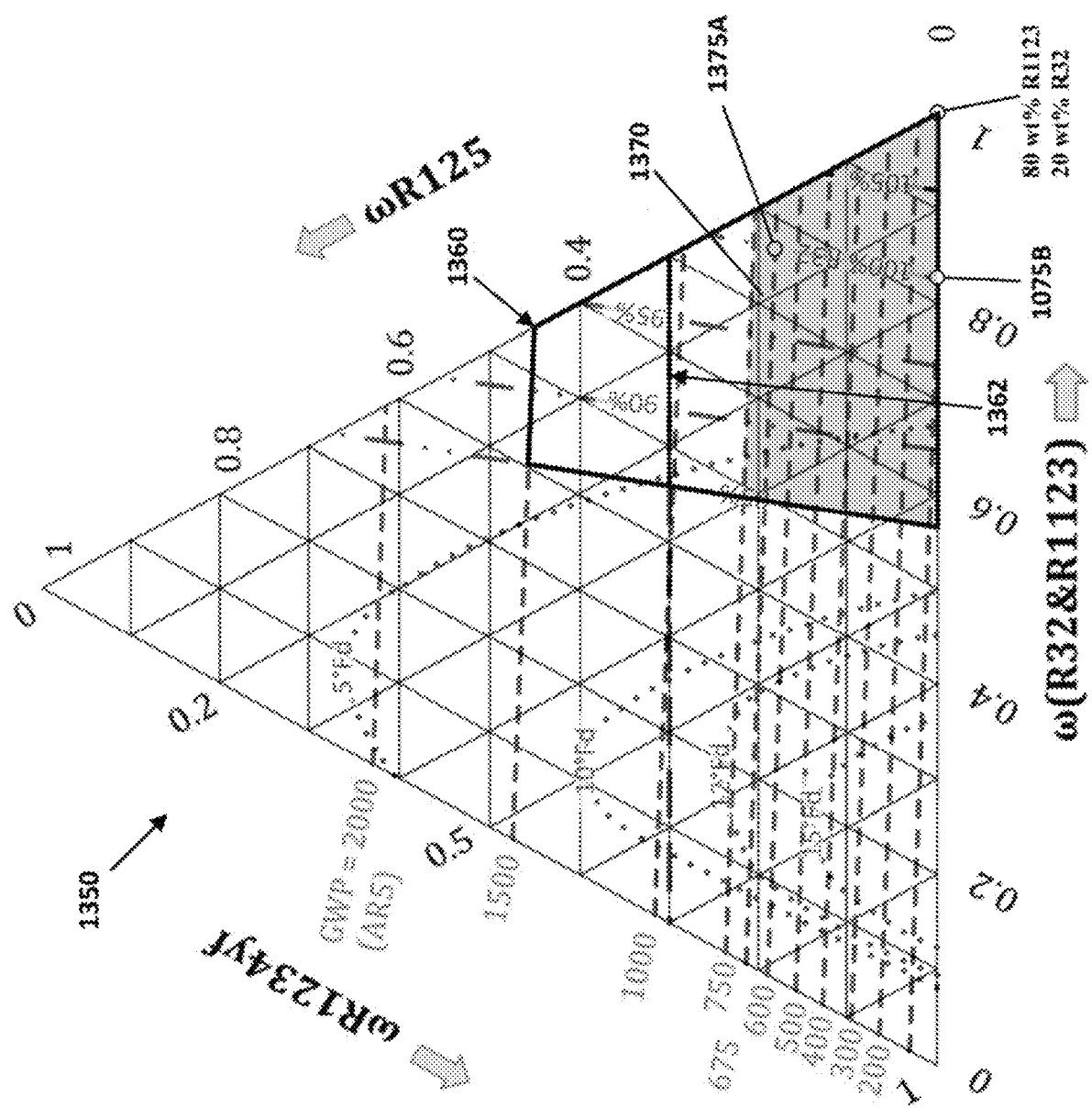

Each of FIGS. 33 and 37 illustrates a matrix 1310, 1350 based on matrix 1300 of FIG. 29 and has the same sides and vertices as matrix 1300. Matrix 1310 of FIG. 33 is the same as matrix 1300, except that the matrix 1310 does not have the lines for capacities relative to R32 and illustrates ranges of refrigerant compositions that may be desired in particular embodiments. Matrix 1350 of FIG. 37 is the same as matrix 1300, except that the matrix 1350 does not have the lines for capacities relative to R410A or R22 and illustrates ranges of refrigerant compositions that may be desired in particular embodiments.

One or more of the matrices 1010, 1050, 1110, 1150, 1210, 1250, 1310, 1350 can be used to determine composition(s) of R125, R1234yf, R1123, and R32 having one or more desired properties. For example, matrices 1010, 1110, 1210, 1310 in FIGS. 30-33 may be used to determine compositions having properties comparable to R410 or compositions with properties comparable to R22, and matrices 1050, 1150, 1250, 1350 in FIGS. 34-37 may be used to determine compositions having properties comparable to R32. Alternatively, a matrix similar to matrices 1000, 1100, 1200, 1300 may be calculated in the same manner as discussed above for ratios of R32 to R1123 (R32:R1123) that are between 20:80 and 80:20 (other than 40:60 and 60:40). The upper limit of 80 wt % was selected for R1123 as R1123 may decompose when a composition contains greater than at or about 80 wt % R1123. Accordingly, it should be appreciated that the upper limit for R1123 (e.g., at or about 80 wt %) may be updated based on further testing. The upper limit of at or about 80% of R32 was selected as greater amounts of R32 result in compositions with higher GWPs.

In an embodiment, a desired set of properties of a refrigerant composition includes being stable (e.g., regarding R1123), a capacity that is in a range from at or about 85% to at or about 110% of the capacity of R410A, and having a GWP of at or about 1500 or less than 1500. Based on these desired properties, a range of useful refrigerant compositions 1020 is shown in matrix 1010 of FIG. 30, a range of useful refrigerant compositions 1120 is shown in matrix 1110 of FIG. 31, a range of useful refrigerant compositions 1220 is shown in matrix 1210 of FIG. 32, and a range of useful refrigerant compositions 1320 is shown in matrix 1310 of FIG. 33.

The useful refrigerant compositions 1020 in FIG. 30 include from at or about 26 wt % (80 wt % of R32 in mixture×32 wt % of mixture in composition) to at or about 76 wt % (80 wt % of R32 in mixture×95 wt % of mixture in composition) of R32; from at or about 6 wt % (20 wt % of R1123 in mixture×32 wt % of mixture in composition) to at or about 19 wt % (20 wt % of R1123 in mixture×95 wt % of mixture in composition) of R1123; at or about 42 wt %, or less than 42 wt % and greater than 0 wt % of R125; and at or about 50 wt %, or less than 50 wt % and greater than 0 wt % of R1234yf.

The useful refrigerant compositions 1120 in FIG. 31 include from at or about 19 wt % (60 wt % of R32 in mixture×31 wt % of mixture in composition) to at or about 52 wt % (60 wt % of R32 in mixture×87 wt % of mixture in composition) of R32; from at or about 12 wt % (40 wt % of R1123 in mixture×31 wt % of mixture in composition) to at or about 35 wt % (40 wt % of R1123 in mixture×87 wt % of mixture in composition) of R1123; at or about 44 wt %, or less than 44 wt % and greater than 0 wt % of R125; and at or about 53 wt %, or less than 53 wt % and greater than 0 wt % of R1234yf.

The useful refrigerant compositions 1220 in FIG. 32 include from at or about 12 wt % (40 wt % of R32 in mixture×31 wt % of mixture in composition) to at or about 34 wt % (40 wt % of R32 in mixture×85 wt % of mixture in composition) of R32; from at or about 19 wt % (60 wt % of R1123 in mixture×31 wt % of mixture in composition) to at or about 51 wt % (60 wt % of R1123 in mixture×85 wt % of mixture in composition) of R1123; at or about 44 wt %, or less than 44 wt % and greater than 0 wt % of R125; and at or about 52 wt %, or less than 52 wt % and greater than 0 wt % of R1234yf.

The useful refrigerant compositions 1320 in FIG. 33 include from at or about 6 wt % (20 wt % of R32 in mixture×31 wt % of mixture in composition) to at or about 17 wt % (20 wt % of R32 in mixture×86 wt % of mixture in composition) of R32; from at or about 25 wt % (80 wt % of R1123 in mixture×31 wt % of mixture in composition) to at or about 69 wt % (80 wt % of R1123 in mixture×86 wt % of mixture in composition) of R1123; at or about 46 wt %, or less than 46 wt % and greater than 0 wt % of R125; and at or about 51 wt %, or less than 51 wt % and greater than 0 wt % of R1234yf.

As discussed above, a composition having a ratio of R32 to R1123 from about 80:20 to about 20:80 may be desired as these compositions are stable with respect to R1123 and have lower GWPs. Accordingly, a range of useful refrigerant compositions may be determined from the useful refrigerant compositions 1020, 1120, 1220, 1320 in FIGS. 30-33. Based on each of the useful refrigerant compositions 1020, 1120, 1220, 1320, useful refrigerant compositions may include from at or about 6 wt % to at or about 76 wt % of R32; from at or about 6 wt % to at or about 69 wt % of R1123; at or about 46 wt %, or less than 46 wt % and greater than 0% of R125; and at or about 53 wt %, or less than 53 wt % and greater than 0 wt % of R1234yf.

In an embodiment, a composition having a ratio of R32 to R1123 (R32:R1123) from about 40:60 to about 60:40 may be desired to provide additional stability. In such an embodiment, useful refrigerant compositions may be determined based on the useful refrigerant compositions 1120 and 1220 in FIGS. 31 and 32.

In an embodiment, a composition having a ratio of R32 to R1123 (R32:R1123) from about 20:80 to about 60:40 may be desired to have a lower amount of R1123 so as to provide additional stability. In such an embodiment, useful refrigerant compositions may be determined based on the useful refrigerant compositions 1020, 1120, 1220 in FIGS. 30-32.

In an embodiment, a composition having a ratio of R32 to R1123 (R32:R1123) from about 40:60 to about 80:20 may be desired to provide a lower GWP. In such an embodiment, useful refrigerant compositions may be determined based on the useful refrigerant compositions 1120, 1220, 1320 in FIGS. 31-33.

As shown in FIGS. 30-33, useful compositions 1020 may include preferred compositions 1022, useful compositions 1120 may include preferred compositions 1122, useful compositions 1220 may include preferred compositions 1222, and useful compositions 1320 may include preferred compositions 1322 in an embodiment. The preferred compositions 1022, 1122, 1222, 1322 may be desirable in an embodiment as they are stable (e.g., relative to R1123), have a capacity at or about 85% or greater than 85% and less than 110% of the capacity of R410A, have a GWP that is at or about 1500 or less than 1500, have a temperature glide less than 10° F., and are nonflammable.

The preferred refrigerant compositions 1022 in FIG. 30 include from at or about 26 wt % (80 wt % of R32 in mixture×32 wt % of mixture in composition) to at or about 27 wt % (80 wt % of R32 in mixture×34 wt % of mixture in composition) of R32; from at or about 6 wt % (20 wt % of R1123 in mixture×32 wt % of mixture in composition) to at or about 7 wt % (20 wt % of R1123 in mixture×34 wt % of mixture in composition) of R1123; from at or about 41 wt % to at or about 42 wt % of R125; and from at or about 24 wt % to at or about 27 wt % of R1234yf. The preferred refrigerant compositions 1122 in FIG. 31 include from at or about 19 wt % (60 wt % of R32 in mixture×31 wt % of mixture in composition) to at or about 45 wt % (60 wt % of R32 in mixture×75 wt % of mixture in composition) of R32; from at or about 12 wt % (40 wt % of R1123 in mixture×31 wt % of mixture in composition) to at or about 30 wt % (40 wt % of R1123 in mixture×75 wt % of mixture in composition) of R1123; from at or about 25 wt % to at or about 44 wt % of R125; and at or about 36 wt %, or less than 36 wt % and greater than 0 wt % of R1234yf.

The preferred refrigerant compositions 1222 in FIG. 32 include from at or about 12 wt % (40 wt % of R32 in mixture×31 wt % of mixture in composition) to at or about 30 wt % (40 wt % of R32 in mixture×75 wt % of mixture in composition) of R32; from at or about 12 wt % (60 wt % of R1123 in mixture×31 wt % of mixture in composition) to at or about 45 wt % (60 wt % of R1123 in mixture×75 wt % of mixture in composition) of R1123; from at or about 25 wt % to at or about 44 wt % of R125; and at or about 37 wt %, or less than 37 wt % and greater than 0 wt % of R1234yf.

The preferred refrigerant compositions 1322 in FIG. 33 include from at or about 6 wt % (20 wt % of R32 in mixture×31 wt % of mixture in composition) to at or about 14 wt % (20 wt % of R32 in mixture×70 wt % of mixture in composition) of R32; from at or about 25 wt % (80 wt % of R1123 in mixture×31 wt % of mixture in composition) to at or about 56 wt % (80 wt % of R1123 in mixture×70 wt % of mixture in composition) of R1123; from at or about 30 wt % to at or about 46 wt % of R125; and at or about 33 wt %, or less than 33 wt % and greater than 0 wt % of R1234yf.

As discussed above, a composition having a ratio of R32 to R1123 from about 80:20 to about 20:80 may be desired as these compositions are stable with respect to R1123 and have lower GWPs. Accordingly, a range of preferred refrigerant compositions may be determined from the preferred refrigerant compositions 1022, 1122, 1222, 1322 in FIGS. 30-33. Based on each of the preferred refrigerant compositions 1022, 1122, 1222, 1322, preferred refrigerant compositions may include from at or about 6 wt % to at or about 45 wt % of R32; from at or about 6 wt % to at or about 56 wt % of R1123; from at or about 25 wt % to at or about 46 wt % of R125; and at or about 37 wt %, or less than 37 wt % and greater than 0 wt % of R1234yf.

In an embodiment, a composition having a ratio of R32 to R1123 (R32:R1123) from about 40:60 to about 60:40 may be desired to provide additional stability. In such an embodiment, preferred refrigerant compositions may be determined based on the preferred refrigerant compositions 1122 and 1222 in FIGS. 31 and 32.

In an embodiment, a composition having a ratio of R32 to R1123 (R32:R1123) from about 20:80 to about 60:40 may be desired to have a lower amount of R1123 so as to provide additional stability. In such an embodiment, preferred refrigerant compositions may be determined based on the preferred refrigerant compositions 1022, 1122, 1222 in FIGS. 30-32.

In an embodiment, a composition having a ratio of R32 to R1123 (R32:R1123) from about 40:60 to about 80:20 may be desired to provide a lower GWP. In such an embodiment, useful refrigerant compositions may be determined based on the preferred refrigerant compositions 1122, 1222, 1322 in FIGS. 31-33.

Of the useful compositions 1020, 1120, 1230, 1320, compositions within the shaded areas 1030, 1130, 1230, 1330 in FIGS. 30-33 may be preferred as they have a GWP of at or about 750 or less than 750. In an embodiment, preferred compositions may be determined based on the shaded areas 1030, 1130, 1230, and 1330 in FIGS. 30-33.

Of the compositions in the shaded areas 1030, 1130, 1230, 1330, compositions 1035A and 1035B in FIG. 30, compositions 1135A and 1135 in FIG. 31, compositions 1235A and 1235B in FIG. 32, and compositions 1335A and 1335B in FIG. 33 may be desired as they have a capacity that similar to R410A. Characteristics of these compositions (along with R32 and R452B for comparison) are provided below in Table 4 for reference.

TABLE 4

Performance Characteristics of Potential Alternatives to R410A

| Composition (percent by weight) | CAP | COP | GWP | BV (est) (cm/s) | Glide (° F. d) | ΔCDT (° F. d) |
|---|---|---|---|---|---|---|
| R410A (reference) | 1.000 | 1.000 | 1924 | 0 (non-flam) | 0.2 | 0 |
| R32 | 1.074 | 1.007 | 677 | 6.7 | 0 | +30 |
| R452B = 67% R32 + 7% R125 + 26% R1234yf | 0.973 | 1.011 | 675 | 3 | 2 | +9 |
| 1135A = 63.5% (R1123/R32 40/60) + 13% R125 + 23.5% R1234yf | 0.999 | 0.983 | 671 | <1 | 4 | +2 |
| 1130B = 69% (R1123/R32 40/60) + 0% R125 + 31% R1234yf | 0.999 | 0.983 | 281 | 2.1 | 5 | +4 |

TABLE 4-continued

Performance Characteristics of Potential Alternatives to R410A

| Composition (percent by weight) | CAP | COP | GWP | BV (est) (cm/s) | Glide (° F. d) | ΔCDT (° F. d) |
|---|---|---|---|---|---|---|
| 1235A = 62.5% (R1123/R32 60/40) + 16% R125 + 21.5% R1234yf | 1.000 | 0.968 | 677 | <1 | 4 | −2 |
| 1235B = 68.5% (R1123/R32 60/40) + 0% R125 + 31.5% R1234yf | 0.999 | 0.965 | 186 | 2.1 | 5 | +1 |
| 1235A = 64% (R1123/R32 80/20) + 18.5% R125 + 17.5% R1234yf | 1.002 | 0.952 | 674 | 1 | 3 | −5 |
| R1235B = 70.5% (R1123/R32 80/20) + 0% R125 + 29.5% R1234yf | 1.001 | 0.945 | 96 | 3 | 4 | −3 |

Tevap, sat = 50° F. w/20° F. SH
Tcond, sat = 115° F. w/15° F. d Sc
ηcmpr = 0.7

Performance estimated from thermodynamic properties at operating conditions representative of a unitary air-conditioning equipment running at the AHRI 210/240 "A" rating point.

In an embodiment, a composition having a ratio of R32 to R1123 (R32:R1123) from about 40:60 to about 60:40 may also be desired to provide additional stability. In such an embodiment, preferred compositions may be determined based on the compositions 1130 in FIG. 31 and compositions 1330 in FIG. 32.

In an embodiment, a composition having a ratio of R32 to R1123 (R32:R1123) from about 20:80 to about 60:40 may also be desired to have a lower amount of R1123 so as to provide additional stability. In such an embodiment, preferred compositions may be determined based on the compositions 1030, 1130, and 1230 in FIGS. 30-33.

In an embodiment, a composition having a ratio of R32 to R1123 (R32:R1123) from about 40:60 to about 80:20 may be desired to provide a lower GWP. In such an embodiment, preferred compositions may be determined based on compositions 1130, 1230, and 1330 in FIGS. 31-33.

In an embodiment, the desired property of the GWP being equal or less than 1500 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the useful compositions, preferred compositions, and other specific compositions shown in FIGS. 30-33 and described with respect to FIGS. 30-33 to include compositions with the desired GWP.

In an embodiment, the desired property of the capacity being in the range of at or about 85% to at or about 110% of the capacity of R410A may be different. In an embodiment, a composition having a capacity in the range of at or about 90% to at or about 110% of the capacity of R410A may be desired. In an embodiment, a composition having a capacity in the range of at or about 95% to at or about 110% of the capacity of R410A may be desired. In an embodiment, a composition having a capacity in the range of at or about 95% to at or about 105% of the capacity of R410A may be desired. In an embodiment, a composition having a capacity in the range of at or about 95% to at or about 110% of the capacity of R410A may be desired. In an embodiment, a composition having a capacity in the range of at or about 100% to at or about 105% of the capacity of R410A may be desired. In an embodiment, a composition having a capacity in the range of at or about 100% to at or about 110% of the capacity of R410A may be desired. In such embodiments, desired compositions may be selected from the useful compositions, the preferred compositions, and the other specific compositions shown in FIGS. 30-33 and described with respect to FIGS. 30-33 so as to include those compositions with the desired capacity.

In an embodiment, a desired set of properties of a refrigerant composition includes being stable (e.g., relative to R1123), a capacity that in the range from at or about 85% to at or about 110% of the capacity of R22, and a GWP of at or about 1500 or less than 1500. Based on these desired properties, a range of useful refrigerant compositions 1040 is shown in matrix 1010 of FIG. 30, a range of useful refrigerant compositions 1140 is shown in matrix 1110 of FIG. 31, a range of useful refrigerant compositions 1240 is shown in matrix 1210 of FIG. 32, and a range of useful refrigerant compositions 1340 is shown in matrix 1310 of FIG. 33.

The useful refrigerant compositions 1040 in FIG. 30 include from at or about 1 wt % (80 wt % of R32 in mixture×1 wt % of mixture in composition) to at or about 29 wt % (80 wt % of R32 in mixture×36 wt % of mixture in composition) of R32; from at or about 0.2 wt % (20 wt % of R1123 in mixture×1 wt % of mixture in composition) to at or about 7 wt % (20 wt % of R1123 in mixture×36 wt % of mixture in composition) of R1123; at or about 47 wt %, or less than 47 wt % and greater than 0 wt % of R125; and from at or about 37 wt % to at or about 85 wt % of R1234yf.

The useful refrigerant compositions 1140 in FIG. 31 include at or about 20 wt % (60 wt % of R32 in mixture×34 wt % of mixture in composition), or less than 20 wt % and greater than 0 wt % of R32; at or about 14 wt % (40 wt % of R1123 in mixture×34 wt % of mixture in composition), or less than 14 wt % and greater than 0 wt % of R1123; at or about 47 wt %, or less than 47 wt % and greater than 0 wt % of R125; and from at or about 36 wt % to at or about 86 wt % of R1234yf.

The useful refrigerant compositions 1240 in FIG. 32 include at or about 13 wt % (40 wt % of R32 in mixture×33 wt % of mixture in composition), or less than 13 wt % and greater than 0 wt % of R32; at or about 20 wt % (60 wt % of R32 in mixture×33 wt % of mixture in composition), or less than 20 wt % and greater than 0 wt % of R1123; at or about 47 wt %, or less than 47 wt % and greater than 0 wt % of R125; and from at or about 37 wt % to at or about 87 wt % of R1234yf.

The useful refrigerant compositions 1340 in FIG. 33 include at or about 7 wt % (20 wt % of R32 in mixture×33 wt % of mixture in composition), or less than 7 wt % and greater than 0 wt % of R32; at or about 26 wt % (80 wt % of R1123 in mixture×33 wt % of mixture in composition), or less than 26 wt % and greater than 0 wt % of R1123; at or about 47 wt %, or less than 47 wt % and greater than 0 wt % of R125; and from at or about 35 wt % to at or about 85 wt % of R1234yf.

As discussed above, a composition having a ratio of R32 to R1123 (R32:R1123) from about 80:20 to about 20:80 may be desired as these compositions are stable with respect to R1123 and have lower GWPs. Accordingly, a range of useful refrigerant compositions may be determined from the useful refrigerant compositions 1040, 1140, 1240, 1340 in FIGS. 30-33. Based on each of the useful refrigerant compositions 1040, 1140, 1240, 1340, useful refrigerant compositions may include at or about 29 wt %, or less than 29 wt % and greater than 0 wt % of R32; at or about 26 wt %, or less than 26 wt % and greater than 0 wt % of R1123; at or about 47 wt %, or less than 47 wt % and greater than 0 wt % of R125; and from at or about 35 wt % to at or about 87 wt % of R1234yf.

In an embodiment, a composition having a ratio of R32 to R1123 (R32:R1123) from about 40:60 to about 60:40 may be desired to provide additional stability. In such an embodiment, useful refrigerant compositions may be determined based on the useful refrigerant compositions 1140 and 1240 in FIGS. 31 and 32.

In an embodiment, a composition having a ratio of R32 to R1123 (R32:R1123) from about 20:80 to about 60:40 may be desired to have a lower amount of R1123 so as to provide additional stability. In such an embodiment, useful refrigerant compositions may be determined based on the useful refrigerant compositions 1040, 1140, 1240 in FIGS. 30-32.

In an embodiment, a composition having a ratio of R32 to R1123 (R32:R1123) from about 40:60 to about 80:20 may be desired to provide compositions with lower GWP. In such an embodiment, useful refrigerant compositions may be determined based on the useful refrigerant compositions 1140, 1240, 1340 in FIGS. 31-33.

As shown in FIGS. 30-33, useful compositions 1040 may include preferred compositions 1042, useful compositions 1140 may include preferred compositions 1142, useful compositions 1240 may include preferred compositions 1242, and useful compositions 1340 may include preferred compositions 1342 in an embodiment. The preferred compositions 1022, 1122, 1222, 1322 may be desirable in an embodiment as they are stable (e.g., relative to R1123), have a capacity at or about 85% to at or about 110% of the capacity of R22, and have GWP that is at or about 1500 or less than 1500, and are nonflammable.

The preferred refrigerant compositions 1042 in FIG. 30 include from at or about 1 wt % (80 wt % of R32 in mixture×1 wt % of mixture in composition) to at or about 17 wt % (80 wt % of R32 in mixture×21 wt % of mixture in composition) of R32; from at or about 0.2 wt % (20 wt % of R1123 in mixture×1 wt % of mixture in composition) to at or about 4 wt % (20 wt % of R1123 in mixture×21 wt % of mixture in composition) of R1123; from at or about 30 wt % to at or about 47 wt % of R125; and from at or about 37 wt % to at or about 64 wt % of R1234yf.

The preferred refrigerant compositions 1142 in FIG. 31 include at or about 14 wt % (60 wt % of R32 in mixture×24 wt % of mixture in composition), or less than 14 wt % and greater than 0 wt % of R32; at or about 10 wt % (40 wt % of R1123 in mixture×24 wt % of mixture in composition), or less than 10 wt % and greater than 0 wt % of R1123; from at or about 29 wt % to at or about 47 wt % of R125; and from at or about 36 wt % to at or about 66 wt % of R1234yf.

The preferred refrigerant compositions 1242 in FIG. 32 include at or about 10 wt % (40 wt % of R32 in mixture×24 wt % of mixture in composition), or less than 10 wt % and greater than 0 wt % of R32; at or about 14 wt % (60 wt % of R32 in mixture×24 wt % of mixture in composition), or less than 14 wt % and greater than 0 wt % of R1123; from at or about 29 wt % to at or about 47 wt % of R125; and from at or about 37 wt % to at or about 67 wt % of R1234yf.

The preferred refrigerant compositions 1342 in FIG. 33 include at or about 5 wt % (20 wt % of R32 in mixture×24 wt % of mixture in composition), or less than 5 wt % and greater than 0 wt % of R32; at or about 19 wt % (80 wt % of R1123 in mixture×24 wt % of mixture in composition), or less than 19 wt % and greater than 0 wt % of R1123; from at or about 30 wt % to at or about 47 wt % of R125; and from at or about 35 wt % to at or about 66 wt % of R1234yf.

As discussed above, a composition having a ratio of R32 to R1123 (R32:R1123) from about 80:20 to about 20:80 may be desired as these compositions are stable with respect to R1123 and have lower GWPs. Accordingly, a range of preferred refrigerant compositions may be determined from the preferred refrigerant compositions 1042, 1142, 1242, 1342 in FIGS. 30-33. Based on the preferred refrigerant compositions 1042, 1142, 1242, 1342, preferred refrigerant compositions may include at or about 24 wt %, or less than 24 wt % and greater than 0 wt % of R32; at or about 19 wt %, or less than 19 wt % and greater than 0 wt % of R1123; at or about 29 wt % to at or about 47 wt % of R125; and from at or about 35 wt % to at or about 67 wt % of R1234yf.

In an embodiment, a composition having a ratio of R32 to R1123 (R32:R1123) from about 40:60 to about 60:40 may be desired to provide additional stability. In such an embodiment, preferred refrigerant compositions may be determined based on the preferred refrigerant compositions 1142 and 1242 in FIGS. 31 and 32.

In an embodiment, a composition having a ratio of R32 to R1123 (R32:R1123) from about 20:80 to about 60:40 may be desired to have a lower amount of R1123 so as to provide additional stability. In such an embodiment, preferred refrigerant compositions may be determined based on the preferred refrigerant compositions 1042, 1142, 1242 in FIGS. 30-32.

In an embodiment, a composition having a ratio of R32 to R1123 (R32:R1123) from about 40:60 to about 80:20 may be desired to provide a lower GWP. In such an embodiment, preferred compositions may be determined based on the preferred refrigerant compositions 1142, 1242, 1342 in FIGS. 31-33.

Of the useful compositions 1040, 1140, 1240 1340, compositions within the shaded areas 1045, 1145, 1245, 1345 in FIGS. 30-33 may be preferred in an embodiment as they have a GWP of at or about 750 or less than 750. In an embodiment, desired compositions may be determined based on the shaded areas 1045, 1145, 1245, and 1345 in FIGS. 30-33.

Compositions 1047A and 1047B in FIG. 30, compositions 1147A and 1147B in FIG. 31, compositions 1247A and 1247B in FIG. 32, and compositions 1347A and 1347B in FIG. 33 may be desired as they have a capacity that is similar to R410A. Characteristics of these compositions (and R453C) relative to R22 are provided below in Table 5 for comparison.

TABLE 5

Performance Characteristics of Potential Alternatives to R22

| Composition (percent by weight) | CAP | COP | GWP | BV (est) cm/s | Glide (° F. d) | ΔCDT (° F. d) |
|---|---|---|---|---|---|---|
| R22 (reference) | 1.000 | 1.000 | 1790 | 0 Non-flammable | 0 | 0 |
| R454C (DR-3) = 21.5% R32/0% R125/78.5% R1234yf | 0.955 | 0.979 | 146 | 1.7 | 11 | −21 |
| 19% R32 + 17% R125 + 64% R1234yf (for comparison) | 0.997 | 0.974 | 668 | 1.3 | 10 | −22 |
| 1147A = 19% (R1123/R32 40/60) + 19% R125 + 62% R1234yf | 1.002 | 0.970 | 680 | <1 | 12 | −23 |
| 1147B = 24.5% (R1123/R32 40/60) + 0% R125 + 75.5% R1234yf | 0.996 | 0.972 | 100 | 1.7 | 15 | −20 |
| 1247A = 19% (R1123/R32 60/40) + 19.5% R125 + 61.5% R1234yf | 1.000 | 0.970 | 670 | <1 | 13 | −24 |
| 1247B = 25% (R1123/R32 60/40) + 0% R125 + 75% R1234yf | 1.003 | 0.971 | 69 | 1.7 | 16 | −20 |
| 1347A = 19% (R1123/R32 80/20) + 20.5% R125 + 60.5% R1234yf | 1.001 | 0.969 | 676 | <1 | 14 | −25 |
| 1347B = 25% (R1123/R32 80/20) + 0% R125 + 75% R1234yf | 1.003 | 0.972 | 35 | 1.7 | 18 | −21 |

Tevap, sat = 50° F. w/20° F. SH
Tcond, sat = 115° F. w/15° F. d Sc
η cmpr = 0.7

Performance estimated from thermodynamic properties at operating conditions representative of a unitary air-conditioning equipment running at the AHRI 210/240 "A" rating point.

In an embodiment, a composition having a ratio of R32 to R1123 (R32:R1123) from about 40:60 to about 60:40 may be preferred to provide additional stability. In such an embodiment, preferred compositions may be determined based on the shaded area 1145 in FIG. 31 and the shaded area 1245 in FIG. 32.

In an embodiment, a composition having a ratio of R32 to R1123 (R32:R1123) from about 20:80 to about 60:40 may be preferred as to have a lower amount of R1123 and provide additional stability. In such an embodiment, preferred compositions may be determined based on the shaded areas 1045, 1145, and 1245 in FIGS. 30-32.

In an embodiment, a composition having a ratio of R32 to R1123 (R32:R1123) from about 40:60 to about 80:20 may be desired to provide a lower GWP. In such an embodiment, preferred compositions may be determined based on the shaded areas 1130 in FIGS. 31-33.

In an embodiment, the desired property of the GWP being equal or less than 1500 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the useful compositions, preferred compositions, and other specific compositions shown in FIGS. 30-33 and described with respect to FIGS. 30-33 so as to include those compositions that have the desired GWP.

In an embodiment, the desired property of the capacity being in the range of at or about 85% to at or about 110% of the capacity of R22 may be different. In an embodiment, a composition having a capacity in the range of at or about 90% to at or about 110% of the capacity of R22 may be desired. In an embodiment, a composition having a capacity in the range of at or about 95% to at or about 110% of the capacity of R22 may be desired. In an embodiment, a composition having a capacity in the range of at or about 95% to at or about 105% of the capacity of R22 may be desired. In an embodiment, a composition having a capacity in the range of at or about 95% to at or about 110% of the capacity of R22 may be desired. In an embodiment, a composition having a capacity in the range of at or about 100% to at or about 110% of the capacity of R410A may be desired. In an embodiment, a composition having a capacity in the range of at or about 100% to at or about 105% of the capacity of R22 may be desired. In such embodiments, desired compositions may be selected from the useful compositions, the preferred compositions, and the other specific compositions shown in FIGS. 30-33 and described with respect to FIGS. 30-33 so as to include those compositions with the desired capacity.

In an embodiment, a desired set of properties of a refrigerant composition may include a specific temperature glide. In an embodiment, a refrigerant compositions having a temperature glide of at or about 15° F. or less than 15° F. may be desired. In an embodiment, a refrigerant compositions having a temperature glide of at or about 12° F. or less than 12° F. may be desired. In an embodiment, a refrigerant compositions having a temperature glide of at or about 10° F. or less than 10° F. may be desired. In such embodiments, desired compositions may be selected from the useful compositions, the preferred compositions, and the other specific compositions shown in FIGS. 30-33 and described with respect to FIGS. 30-33 so as to include those compositions with the desired temperature glide.

In an embodiment, a desired set of properties of a refrigerant composition includes being stable (e.g., relative to R1123), a capacity in a range from at or about 85% to at or about 110% of the capacity of R32, and a GWP of at or about 1500 or less than 1500. Based on these desired properties, a range of useful refrigerant compositions 1060 is shown in matrix 1050 of FIG. 34, a range of useful refrigerant compositions 1160 is shown in matrix 1150 of FIG. 35, a range of useful refrigerant compositions 1260 is shown in matrix 1250 of FIG. 36, and a range of useful refrigerant compositions 1360 is shown in matrix 1350 of FIG. 37.

The useful refrigerant compositions 1060 in FIG. 34 include from at or about 33 wt % (80 wt % of R32 in mixture×41 wt % of mixture in composition) to at or about 80 wt % (80 wt % of R32 in mixture×100 wt % of mixture in composition) of R32; from at or about 8 wt % (20 wt % of R1123 in mixture×41 wt % of mixture in composition) to at or about 20 wt % (20 wt % of R1123 in mixture×100 wt % of mixture in composition) of R1123; at or about 41 wt %, or less than 41 wt % and greater than 0 wt % of R125; at or about 40 wt %, or less than 40 wt % and greater than 0 wt % of R1234yf.

The useful refrigerant compositions 1160 in FIG. 35 include from at or about 24 wt % (60 wt % of R32 in mixture×40 wt % of mixture in composition) to at or about 60 wt % (60 wt % of R32 in mixture×100 wt % of mixture in composition) of R32; from at or about 16 wt % (40 wt % of R1123 in mixture×40 wt % of mixture in composition) to at or about 40 wt % (40 wt % of R1123 in mixture×100 wt % of mixture in composition) of R1123; at or about 43 wt %, or less than 43 wt % and greater than 0 wt % of R125; at or about 44 wt %, or less than 44 wt % and greater than 0 wt % of R1234yf.

The useful refrigerant compositions 1260 in FIG. 36 include from at or about 16 wt % (40 wt % of R32 in mixture×40 wt % of mixture in composition) to at or about 40 wt % (40 wt % of R32 in mixture×100 wt % of mixture in composition) of R32; from at or about 24 wt % (60 wt % of R1123 in mixture×40 wt % of mixture in composition) to at or about 60 wt % (60 wt % of R1123 in mixture×100 wt % of mixture in composition) of R1123; at or about 44 wt %, or less than 44 wt % and greater than 0 wt % of R125; at or about 44 wt %, or less than 44 wt % and greater than 0 wt % of R1234yf.

The useful refrigerant compositions 1360 in FIG. 37 include from at or about 8 wt % (20 wt % of R32 in mixture×40% of mixture in composition) to at or about 20 wt % (20 wt % of R32 in mixture×100% of mixture in composition) of R32; from at or about 32 wt % (80 wt % of R1123 in mixture×40% of mixture in composition) to at or about 80 wt % (80 wt % of R1123 in mixture×100% of mixture in composition) of R1123; at or about 46 wt %, or less than 46 wt % and greater than 0 wt % of R125; at or about 43 wt %, or less than 43 wt % and greater than 0 wt % of R1234yf.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of useful refrigerant compositions may be determined from the useful refrigerant compositions 1060, 1160, 1260, 1360 in FIGS. 34-37. Based on the useful refrigerant compositions 1060, 1160, 1260, 1360, useful refrigerant compositions may include from at or about 8 wt % to at or about 80 wt % of R32; from at or about 8 wt % to at or about 80 wt % of R1123; at or about 46 wt %, or less than 46% and greater than 0 wt % of R125; at or about 44 wt %, or less than 44 wt % and greater than 0 wt % of R1234yf.

In an embodiment, a composition having a ratio of R32 to R1123 (R32:R1123) from about 40:60 to about 60:40 may be desired to provide additional stability. In such an embodiment, useful refrigerant compositions may be determined based on the useful refrigerant compositions 1160 and 1260 in FIGS. 35 and 36.

In an embodiment, a composition having a ratio of R32 to R1123 (R32:R1123) from about 20:80 to about 60:40 may be desired to have a lower amount of R1123 and provide additional stability. In such an embodiment, useful refrigerant compositions may be determined based on the useful refrigerant compositions 1060, 1160, 1260 in FIGS. 34-36.

In an embodiment, a composition having a ratio of R32 to R1123 (R32:R1123) from about 40:60 to about 80:20 may be desired to provide lower GWPs. In such an embodiment, useful refrigerant compositions may be determined based on the useful refrigerant compositions 1160, 1260, 1360 in FIGS. 34-36.

As shown in FIGS. 35-37, useful compositions 1160 may include preferred compositions 1162, useful compositions 1260 may include preferred compositions 1262, and useful compositions 1360 may include preferred compositions 1362 in an embodiment. The preferred compositions 1162, 1262, 1362 may be desirable in an embodiment as they are stable (e.g., relative to R1123), have a capacity at or about 85% or greater than 85% and less than 110% of the capacity of R22, have a GWP that is at or about 1500 or less than 1500, and are nonflammable.

The preferred refrigerant compositions 1162 in FIG. 35 include from at or about 24 wt % (60 wt % of R32 in mixture×40 wt % of mixture in composition) to at or about 45 wt % (60 wt % of R32 in mixture×70 wt % of mixture in composition) of R32; from at or about 16 wt % (40 wt % of R1123 in mixture×40 wt % of mixture in composition) to at or about 30 wt % (40 wt % of R1123 in mixture×70 wt % of mixture in composition) of R1123; from at or about 25 wt % to at or about 43 wt % of R125; at or about 27 wt %, or less than 27 wt % and greater than 0 wt % of R1234yf.

The preferred refrigerant compositions 1262 in FIG. 36 include from at or about 16 wt % (40 wt % of R32 in mixture×40 wt % of mixture in composition) to at or about 30 wt % (40 wt % of R32 in mixture×75 wt % of mixture in composition) of R32; from at or about 24 wt % (60 wt % of R1123 in mixture×40 wt % of mixture in composition) to at or about 45 wt % (60 wt % of R1123 in mixture×75 wt % of mixture in composition) of R1123; from at or about 25 wt % to at or about 44 wt % of R125; at or about 27 wt %, or less than 27 wt % and greater than 0 wt % of R1234yf.

The preferred refrigerant compositions 1362 in FIG. 37 include from at or about 8 wt % (20 wt % of R32 in mixture×40% of mixture in composition) to at or about 14 wt % (20 wt % of R32 in mixture×70% of mixture in composition) of R32; from at or about 32 wt % (80 wt % of R1123 in mixture×40% of mixture in composition) to at or about 56 wt % (80 wt % of R1123 in mixture×70% of mixture in composition) of R1123; from at or about 30 wt % to at or about 46 wt % of R125; at or about 25 wt %, or less than 25 wt % and greater than 0 wt % of R1234yf.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of preferred refrigerant compositions may be determined from the preferred refrigerant compositions 1162, 1262, 1362 in FIGS. 35-37. Based on the preferred refrigerant compositions 1162, 1262, 1362, preferred refrigerant compositions may include from at or about 8 wt % to at or about 45 wt % of R32; from at or about 16 wt % to at or about 56 wt % of R1123; from at or about 25 wt % to at or about 46 wt % of R125; at or about 27 wt %, or less than 27 wt % and greater than 0 wt % of R1234yf.

Of the useful compositions 1060, 1160, 1260, and 1360, compositions within the shaded areas 1070, 1170, 1270, and 1370 in FIGS. 34-37 may be desired as they have a GWP of at or about 750 or less than 750. In an embodiment, a range of desired compositions may be determined based on the shaded areas 1070, 1170, 1270, and 1370 in FIGS. 34-37.

Compositions 1075A and 1075B in FIG. 34, compositions 1175A and 1175 in FIG. 35, compositions 1275A and 1275B in FIG. 36, and compositions 1375A and 1375B in FIG. 33 may be desired as these compositions have a capacity that is similar to R410As. Properties of these compositions relative to R32 are provided below in Table 6 for comparison.

TABLE 6

Performance Characteristics of Potential Alternatives to R32

| Composition (percent by weight) | CAP* | COP* | GWP | BV (est) (cm/s) | Glide (° F. d) | ΔCDT (° F. d) |
|---|---|---|---|---|---|---|
| R32 (reference) | 1.000 | 1.000 | 677 | 6.7 | 0 | 0 |
| 1175A = 78% (R1123/R32 40/60) + 11.5% R125 + 10.5% R1234yf | 1.002 | 0.971 | 682 | <1 | 2 | −22 |
| 1175B = 82% (R1123/R32 40/60) + 0% R125 + 18% R1234yf | 0.999 | 0.971 | 334 | 2.5 | 2.5 | −20 |
| 1275A = 75% (R1123/R32 60/40) + 15% R125 + 10% R1234yf | 0.999 | 0.954 | 679 | <1 | 2 | −27 |
| 1275B = 81% (R1123/R32 60/40) + 0% R125 + 19% R1234yf | 1.001 | 0.951 | 220 | 2.5 | 2.5 | −25 |
| 1375A = 76.5% (R1123/R32 80/20) + 18% R125 + 5.5% R1234yf | 0.998 | 0.937 | 675 | <1 | 1 | −31 |

TABLE 6-continued

Performance Characteristics of Potential Alternatives to R32

| Composition (percent by weight) | CAP* | COP* | GWP | BV (est) (cm/s) | Glide (° F. d) | ΔCDT (° F. d) |
|---|---|---|---|---|---|---|
| 1375B = 83% (R1123/R32 80/20) + 0% R125 + 17% R1234yf | 1.001 | 0.930 | 113 | 2.6 | 2 | −29 |

Tevap, sat = 50° F. w/20° F. SH
Tcond, sat = 115° F. w/15° F. d Sc
ηcmpr = 0.7
*Performance estimated from thermodynamic properties at operating conditions representative of unitary air-conditioning equipment running at the AHRI 210/240 "A" rating point.

It will be appreciated that in any of the Tables 4 to 6 above, any specific amount in percent by weight of the listed ratios of R1123/R32, the listed R125, and the listed R1234yf may be respectively employed as an end point in a range, including as an upper end point or as a lower end point, relative to another specific amount which is respectively lower or higher than the specific amount selected. For example in Table 6, 78% R1123/R32 (of composition 1175A) may be a lower end point relative amount relative to 82% R1123/R32 (of composition 1175B) or an upper end point relative to 75% R1123/R32 (of compositions 1275A) in a range of R1123/R32. It will be appreciate that ranges may be made using any of the specific amounts of the individual components, respectively.

In an embodiment, a composition having a ratio of R32 to R1123 (R32:R1123) from about 40:60 to about 60:40 may be desired to provide additional stability. In such an embodiment, desired compositions may be determined based on the shaded areas 1170 and 1270 in FIGS. 35 and 36.

In an embodiment, a composition having a ratio of R32 to R1123 (R32:R1123) from about 20:80 to about 60:40 may be desired so as to have a lower amount of R1123 and provide additional stability. In such an embodiment, preferred compositions may be determined based on the shaded areas 1070, 1170, and 1270 in FIGS. 34-36.

In an embodiment, a composition having a ratio of R32 to R1123 (R32:R1123) from about 40:60 to about 80:20 may be desired to provide compositions with lower GWPs. In such an embodiment, preferred compositions may be determined based on the shaded areas 1170, 1270, 1370 in FIGS. 35-37.

In an embodiment, a set of desired properties may include a particular temperature glide. In an embodiment, a composition having a temperature glide at or about 5° F. or less than 5° F. may be desired. In such an embodiment, desired compositions may be selected from the useful compositions, the preferred compositions, and the other specific compositions shown in FIGS. 34-37 and described with respect to FIGS. 34-37 to include those compositions with the desired temperature glide.

In an embodiment, the desired property of the GWP being at or about 1500 or less than 1500 or 750 may be different. In an embodiment, a composition having a GWP of at or about 1000 or less than 1000 may be desired. In an embodiment, a composition having a GWP of at or about 675 or less than 675 may be desired. In an embodiment, a composition having a GWP of at or about 600 or less than 600 may be desired. In an embodiment, a composition having a GWP of at or about 500 or less than 500 may be desired. In an embodiment, a composition having a GWP of at or about 400 or less than 400 may be desired. In an embodiment, a composition having a GWP of at or about 200 or less than 200 may be desired. In such embodiments, desired compositions may be selected from the useful compositions, the preferred compositions, and the other specific compositions shown in FIGS. 34-37 and described with respect to FIGS. 34-37 to include those compositions with the desired GWP.

In an embodiment, the desired property of the capacity being in the range of at or about 85% to at or about 110% of the capacity of R32 may be different. In an embodiment, a composition having a capacity in the range of at or about 85% to at or about 105% of the capacity of R32 may be desired. In an embodiment, a composition having a capacity in the range of at or about 85% to at or about 100% of the capacity of R32 may be desired. In an embodiment, a composition having a capacity in the range of at or about 95% to at or about 110% of the capacity of R32 may be desired. In an embodiment, a composition having a capacity in the range of at or about 95% to at or about 105% of the capacity of R32 may be desired. In an embodiment, a composition having a capacity in the range of at or about 95% to at or about 100% of the capacity of R32 may be desired. In an embodiment, a composition having a capacity in the range of at or about 100% to at or about 110% of the capacity of R32 may be desired. In an embodiment, a composition having a capacity in the range of at or about 100% to at or about 105% of the capacity of R32 may be desired. In such embodiments, desired compositions may be selected from the useful compositions, preferred compositions, and other specific compositions shown in FIGS. 34-37 and described with respect to FIGS. 34-37 so as to include compositions with the desired capacity.

Each of FIGS. 38A-41B illustrates a matrix of a thermodynamic property for compositions of R1123, R32, R125, and R1234yf by weight percentage. In FIGS. 38A-41B, axes for R125 are horizontal and parallel to the side for the weight percentage of a mixture of R1123 and R32, axes for R1234yf are parallel to the side for R125, and axes for the mixture of R1123 and R32 are parallel to the side for R134yf.

Figure 38A:
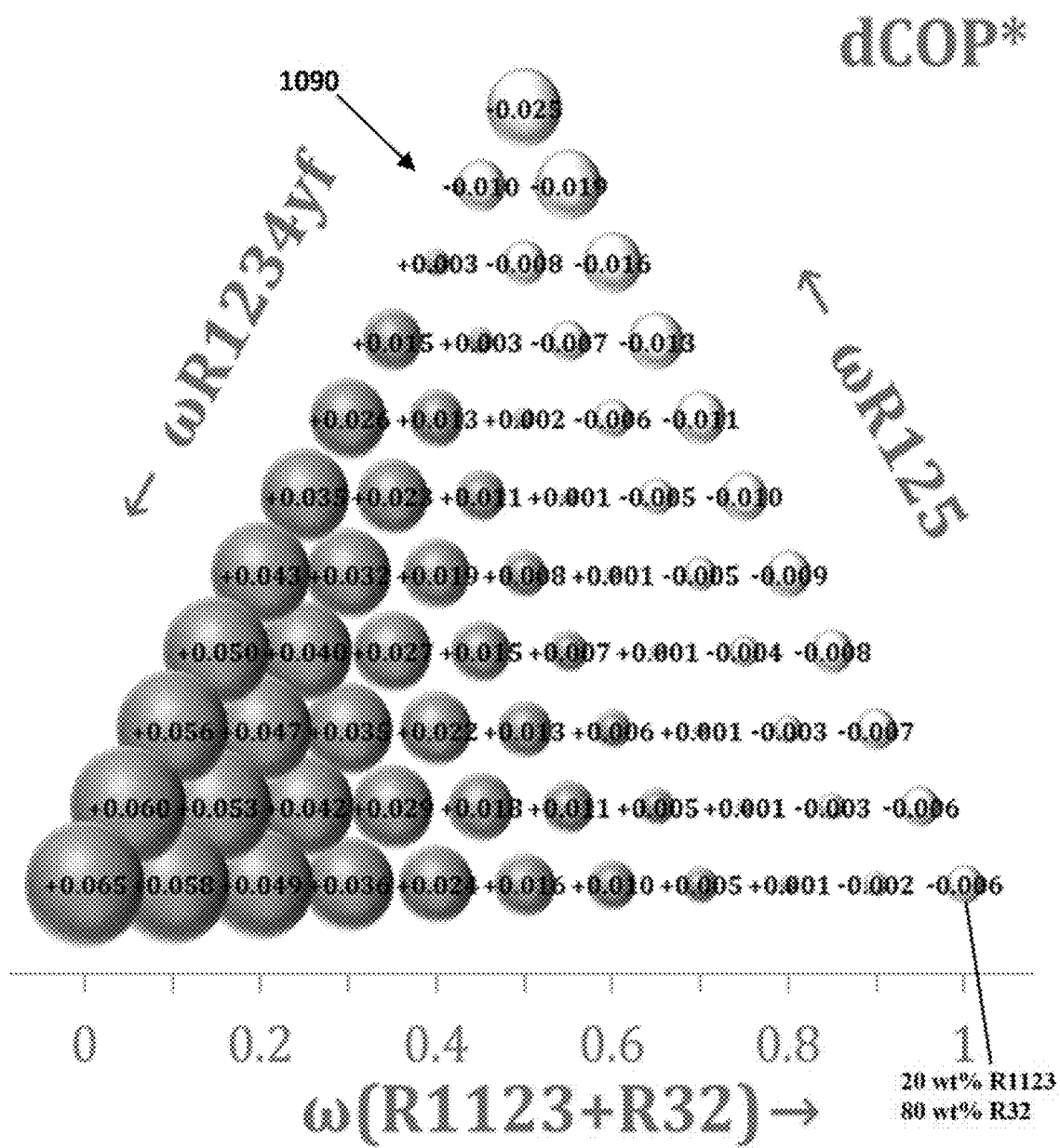
FIGS. 38A, 38B, 39A, 39B, 40A, 40B, 41A, 41B each illustrate a matrix of a thermodynamic property of compositions of R1123, R32, R125, and R1234yf FIGS. 42 and 43 each illustrate a matrix of compositions of R1123, R32, $CF_3I$, and R1234yf that includes plots of GWP, flammability, temperature glide, capacity relative to R410A, and capacity relative to R32.
Figure 38B:
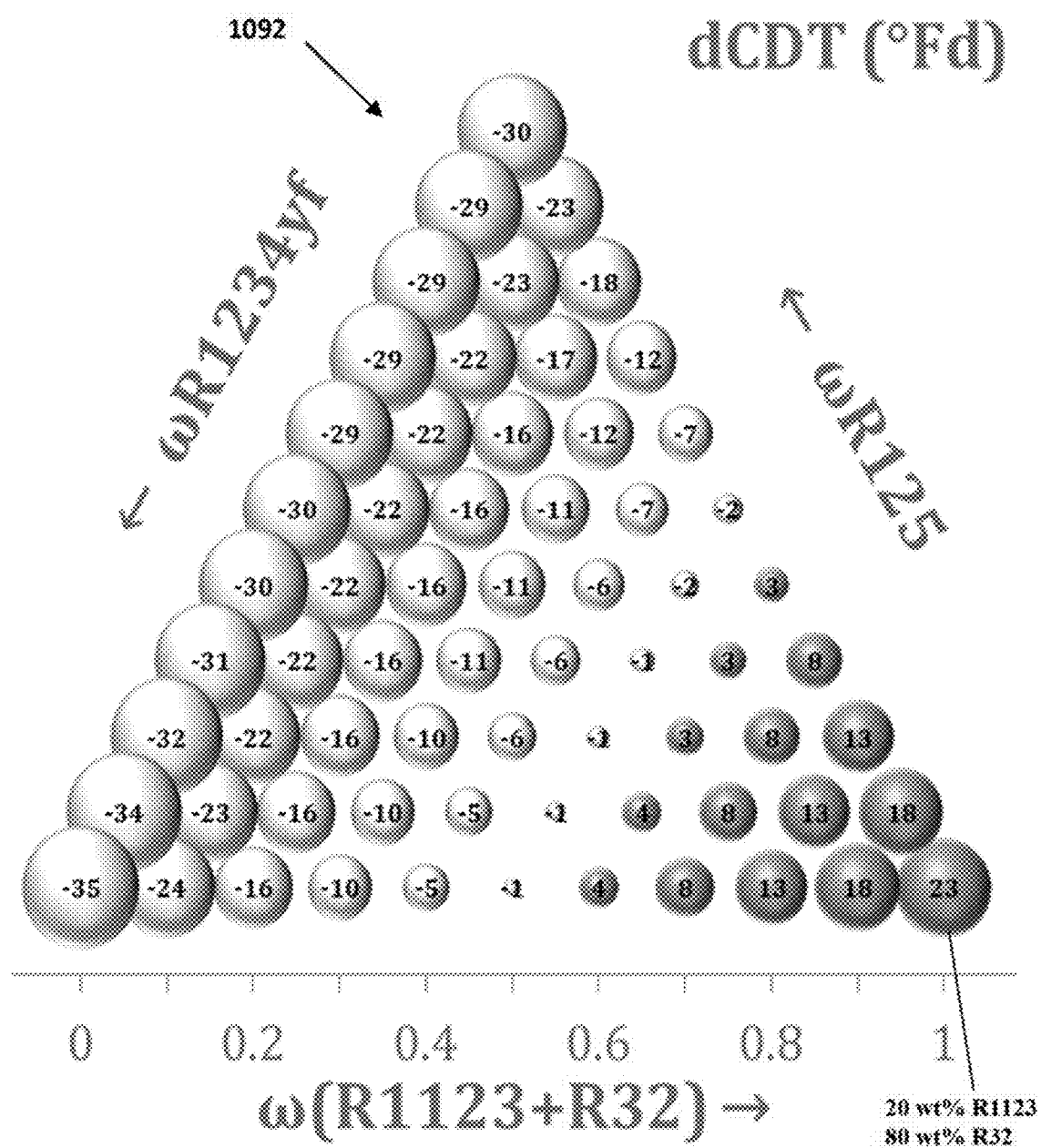
Figure 39A:
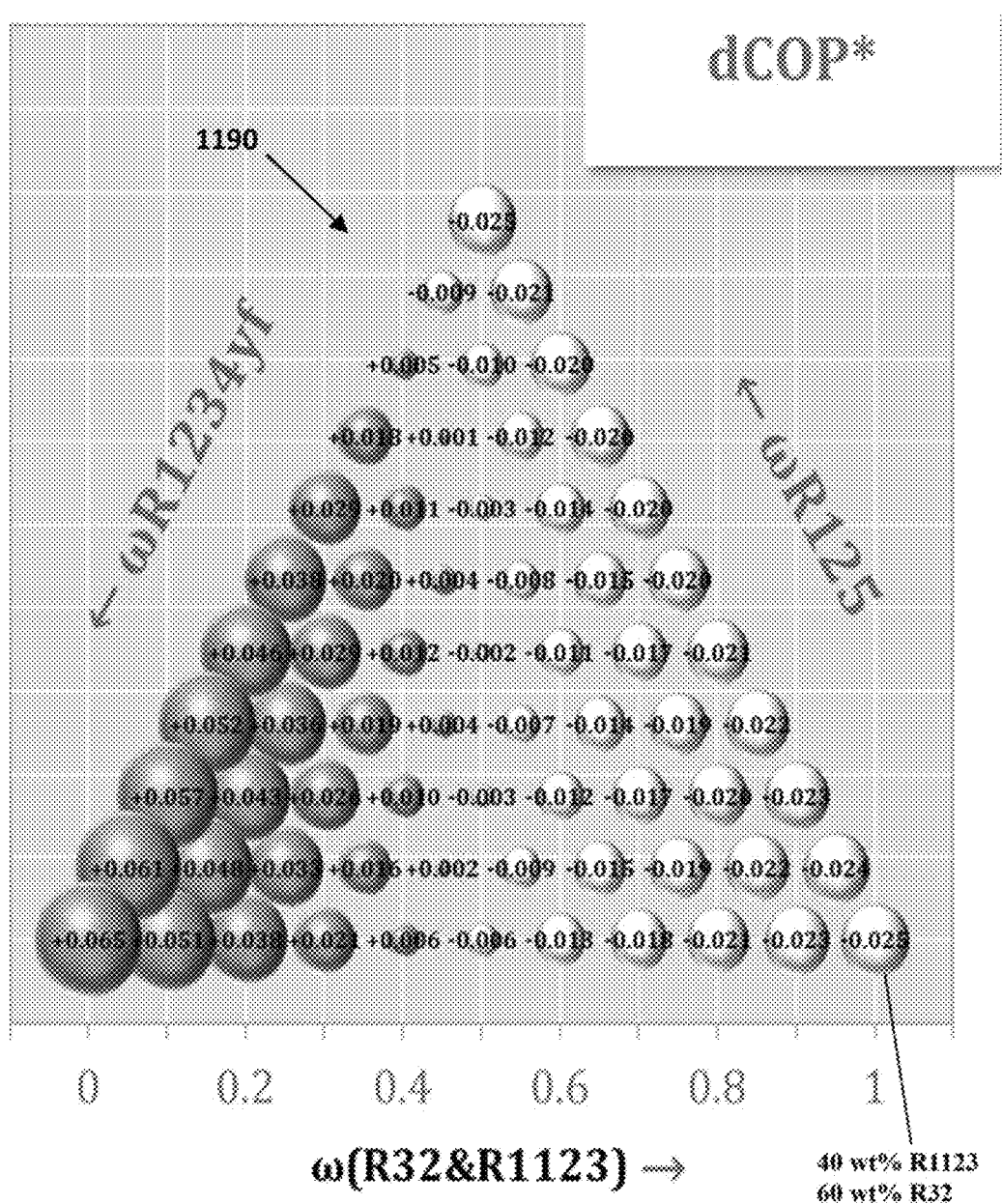
Figure 39B:
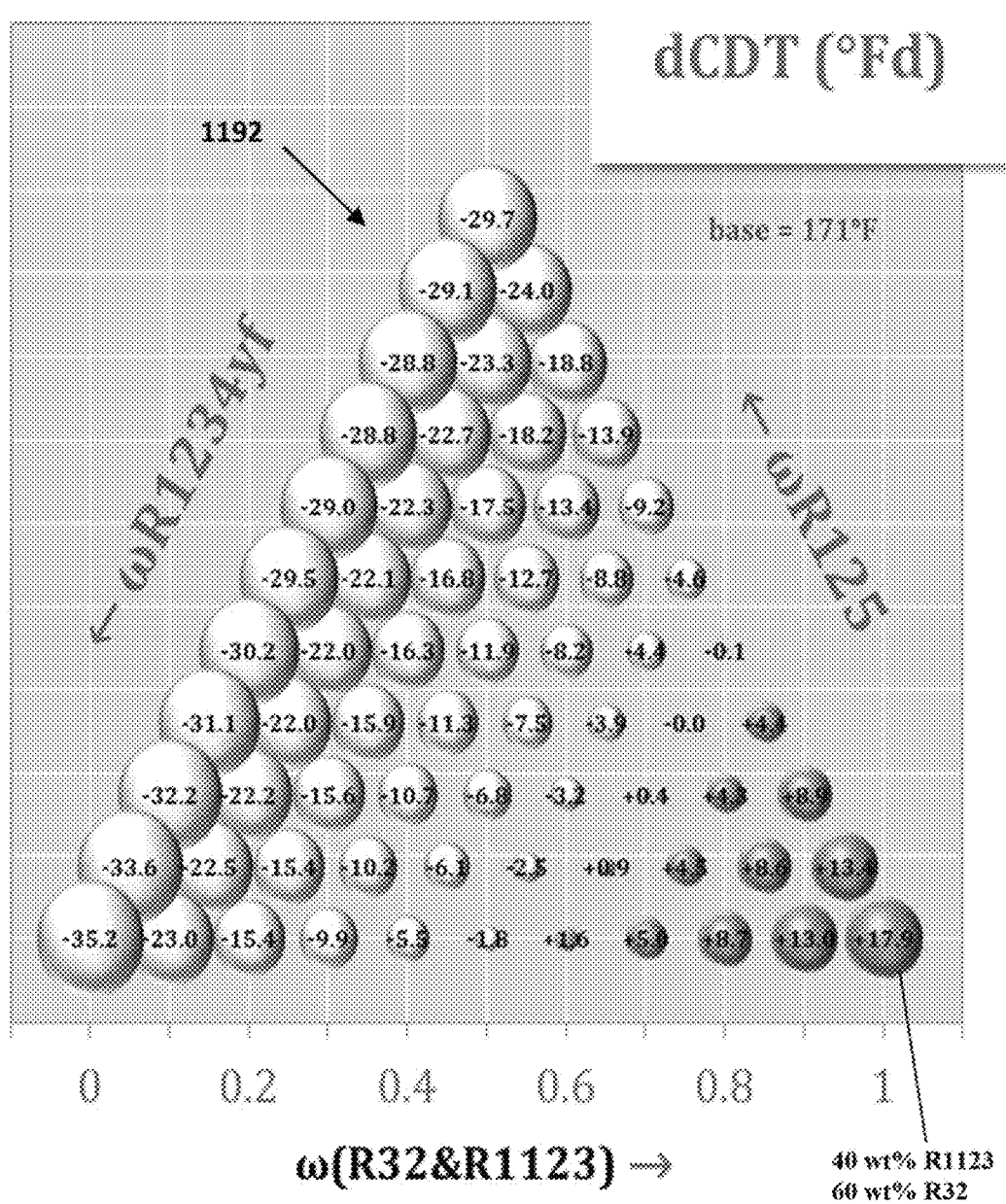
Figure 40A:
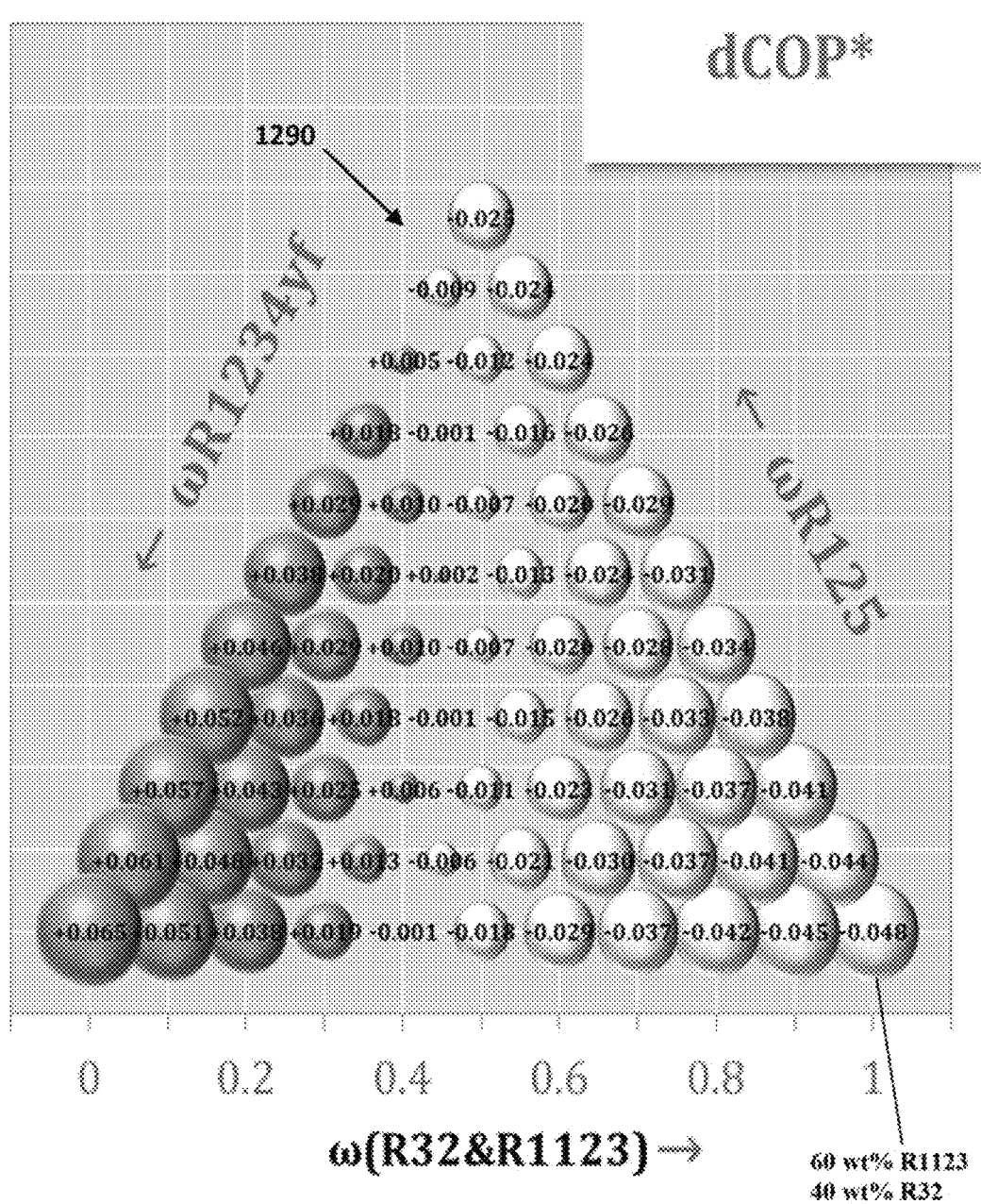
Figure 40B:
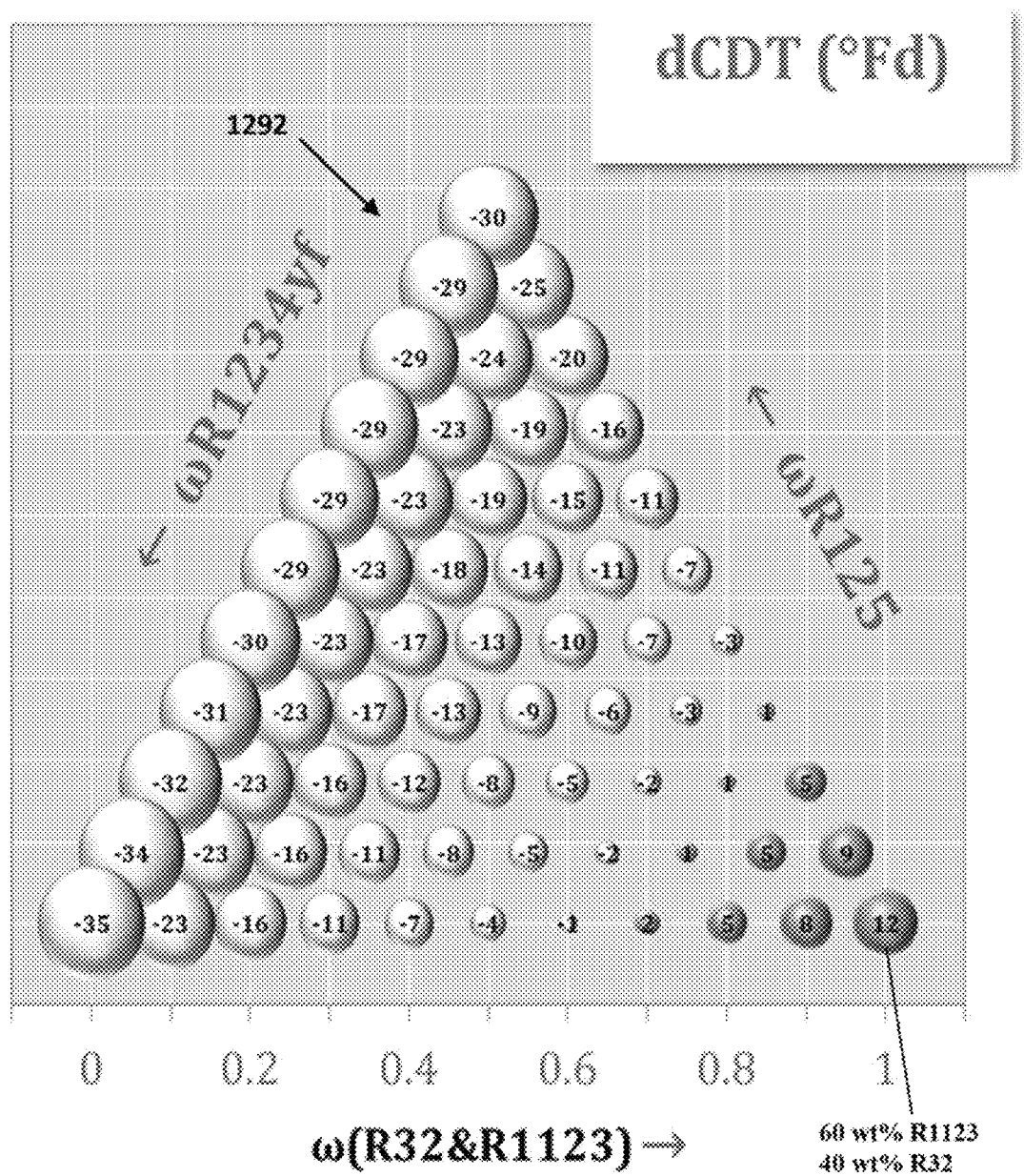
Figure 41A:
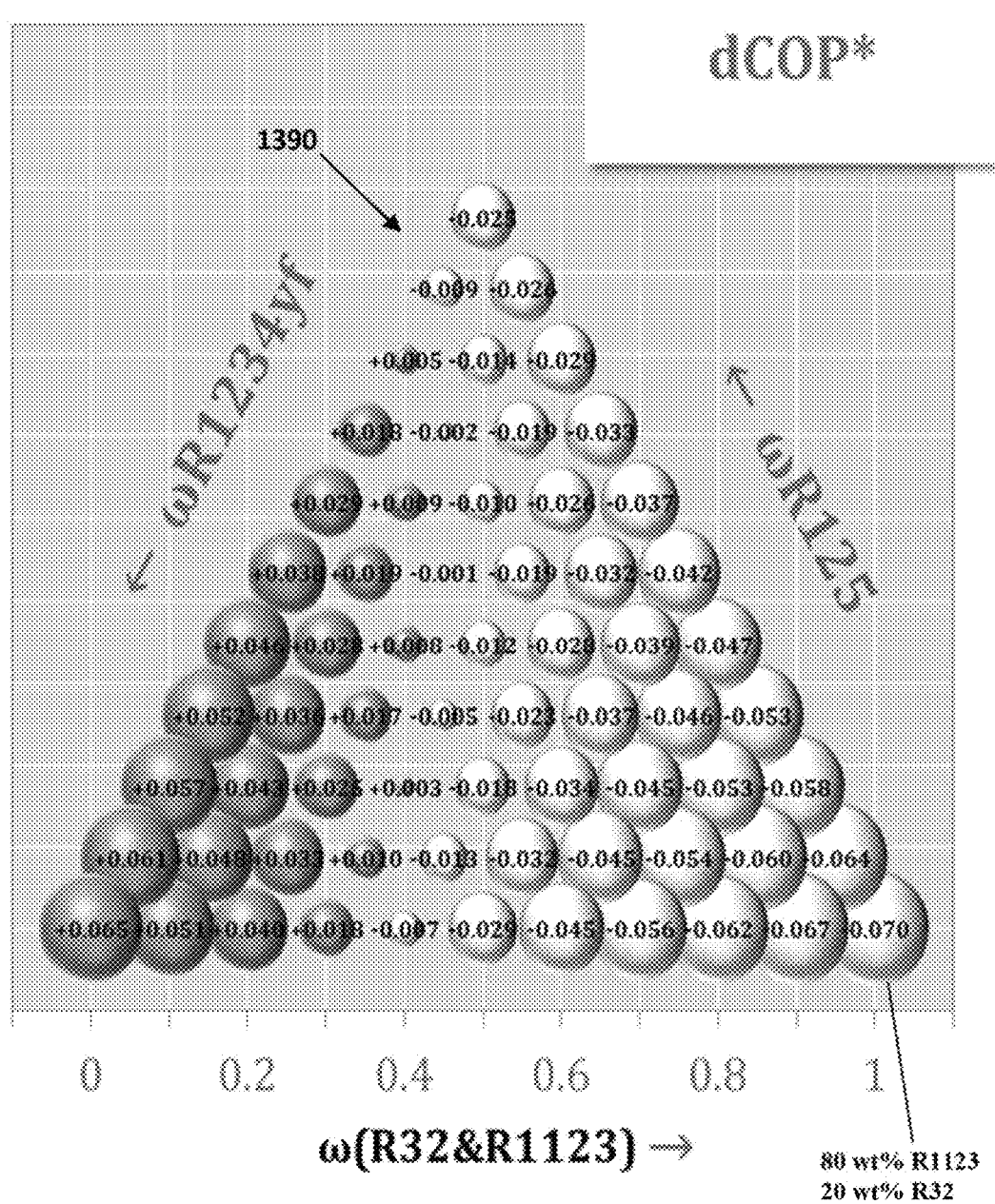
Figure 41B:
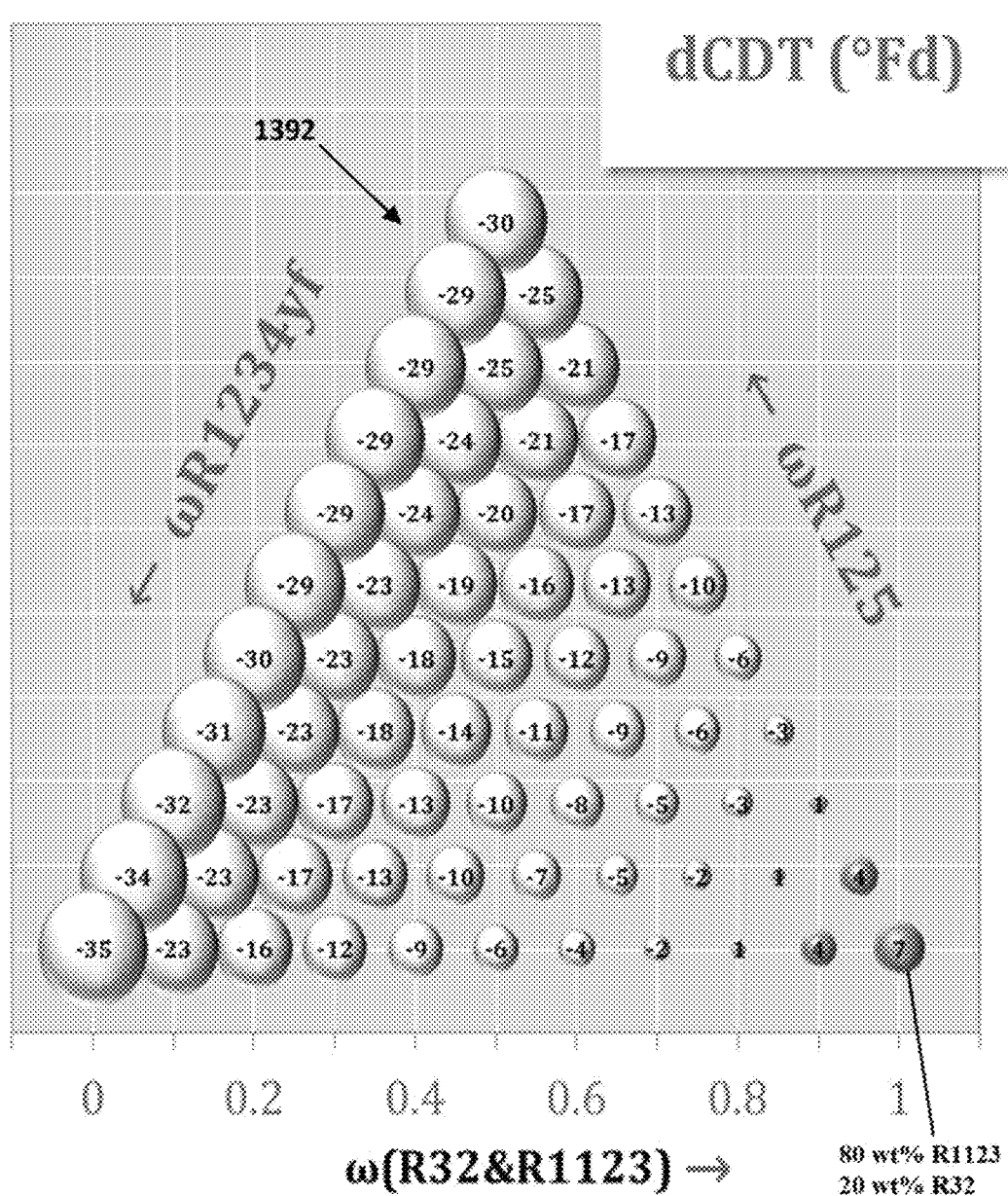

In FIGS. 38A and 38B, the bottom side of the matrices 1090, 1092 is for weight percentages of a mixture of 20 wt % R1123 and 80 wt % R32. In FIGS. 39A and 39B, the bottom side of the matrices 1190, 1192 is for weight percentages of a mixture of 40 wt % R1123 and 60 wt % R32. In FIGS. 40A and 40B, the bottom side of the matrices 1290, 1292 is for weight percentages of a mixture of 60 wt % R1123 and 40 wt % R32. In FIGS. 41A and 41B, the bottom side of the matrices 1390, 1392 is for weight percentages of a mixture of 80 wt % R1123 and 20 wt % R32. Each matrix 1090, 1092, 1190, 1192, 1290, 1292, 1390, 1392 shows values at each 10 wt % of R125, R1234yf, and the mixture of R32 and R1123. Compositions in each matrix 1090, 1092, 1190, 1192, 1290, 1292, 1390, 1392 are calculated in a similar manner as discussed regarding matrix 200 in FIG. 7A.

Each of FIGS. 38A, 39A, 40A, 41A illustrates a matrix 1090, 1190, 1290, 1390 of coefficients of performance relative to R410A (e.g., a coefficient of performance of a composition minus the coefficient of performance for R410A divided by the coefficient of performance for R410A) for compositions of R125, R1234yf, R1123, and R32. As shown in FIGS. 38A, 39A, 40A, and 41A, efficiency increases as the concentration of R1234yf increases (e.g., the efficiency is largest in the lower left corners), and the increase in the concentration of R1123 decreases the efficiency of the composition.

Each of FIGS. 38B, 39B, 40B, 41B illustrates a matrix 1092, 1192, 1292, 1392 of compressor discharge temperatures in Fahrenheit relative to R410A (e.g., a compressor discharge temperatures of a composition minus the compressor discharge temperature for R410A) for compositions of R125, R1234yf, R1123, and R32. As shown in FIGS. 38B, 39B, 40B, and 41B, the compressor discharge temperature increases as the concentration of R32 and R1123 increases, and increasing the concentration of R32 causes a larger increase relative to increasing the concentration of R1123.

Performance of a refrigerant composition may be based on one or more of a coefficient of performance and compressor discharge temperature. In an embodiment, the desired set of properties includes one or more of a coefficient of performance (relative to R410A) and compressor discharge temperature (relative to R410A). In an embodiment, a composition that has a coefficient of performance of greater than 97% relative to R410A may be preferred. In an embodiment, a composition that results in a change in the compressor discharge temperature (relative to R410A) that is at or about 32° F. or less than 32° F. may be desired. In an embodiment, a composition that results in a change in the compressor discharge temperature (relative to R410A) that is at or about 20° F. or less than 20° F. may be preferred. For values relative to R32, the matrices in FIGS. 38A-41B may be modified based on the values for R410 and R32 in Tables 2 and 3 to approximate values relative to R32. In such embodiments, one or more of FIGS. 38A-41B may be utilized to select compositions having the desired coefficient or performance and/or compressor discharge temperature. For example, desired compositions may be selected from the compositions shown in and/or described with respect to FIGS. 34-37 so as to have a desired coefficient of performance and/or compressor discharge temperature by utilizing one or more of FIGS. 38A-41B.

In an embodiment, a method of making a refrigerant composition and/or a method of retrofitting a refrigerant composition utilizes one or more of the matrices of FIGS. 34-41B so that the resulting refrigerant composition or retrofitted refrigerant composition has the desired set of properties.

Refrigerant Compositions Including R32, R1123, $CF_3I$, and R1234yf

Figure 42:
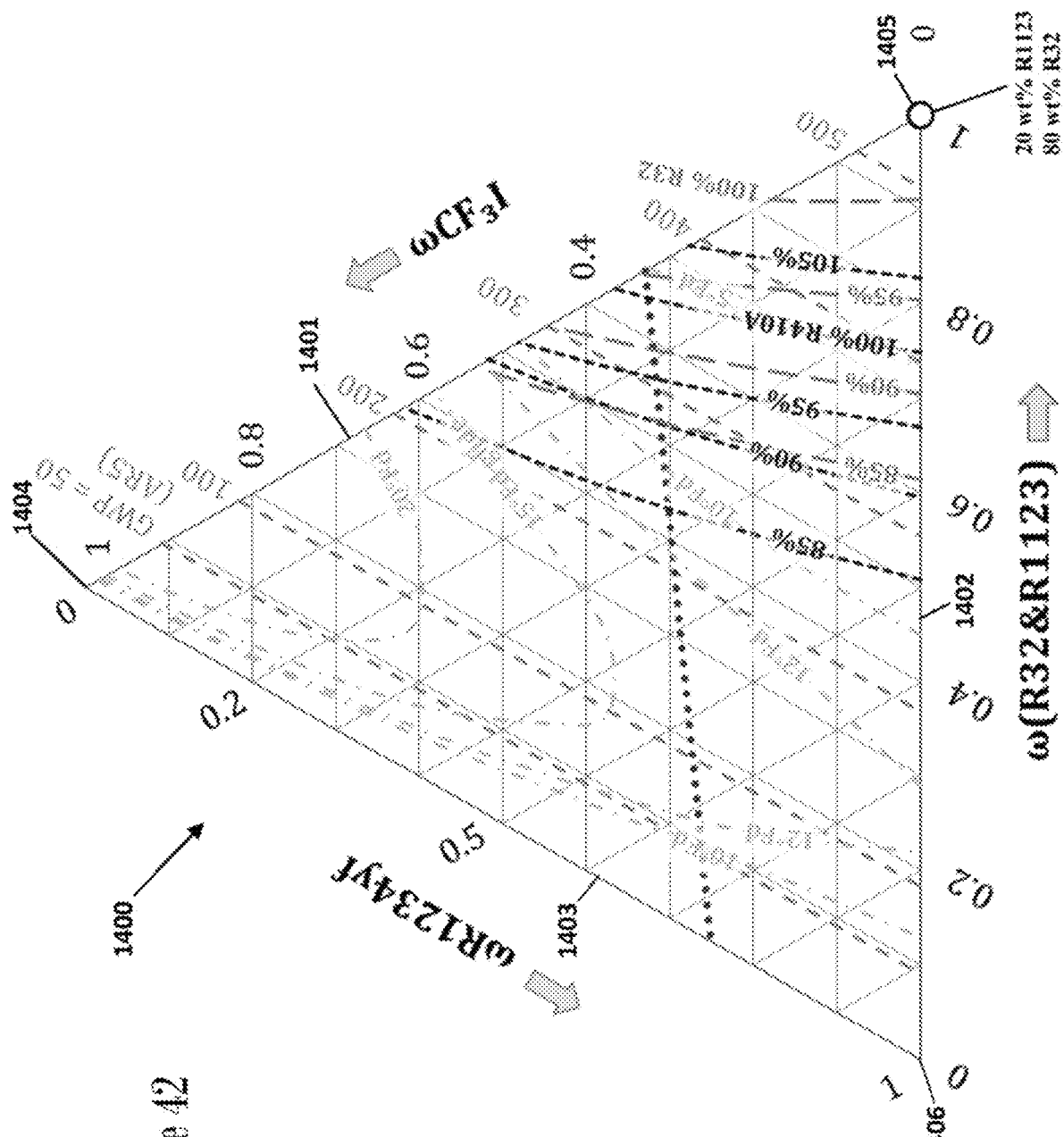

FIG. 42 illustrates a matrix 1400 that was developed to show plots of GWP, flammability, temperature glide, capacity relative to R410A, and capacity relative to R32 as a function of the concentration of R1234yf, a mixture of 80 wt % of R32 and 20 wt % of R1123, and $CF_3I$. Each side 1401, 1402, 1403 of the triangle corresponds to weight percentages of $CF_3I$, the mixture of 80 wt % R32 and 20 wt % R1123, and R1234yf, respectively. Each vertex 404, 405, 406 corresponds to a composition of 100 wt % R1123; the mixture of 80 wt % R32 and 20% R1123; and $CF_3I$, respectively.

Figure 43:
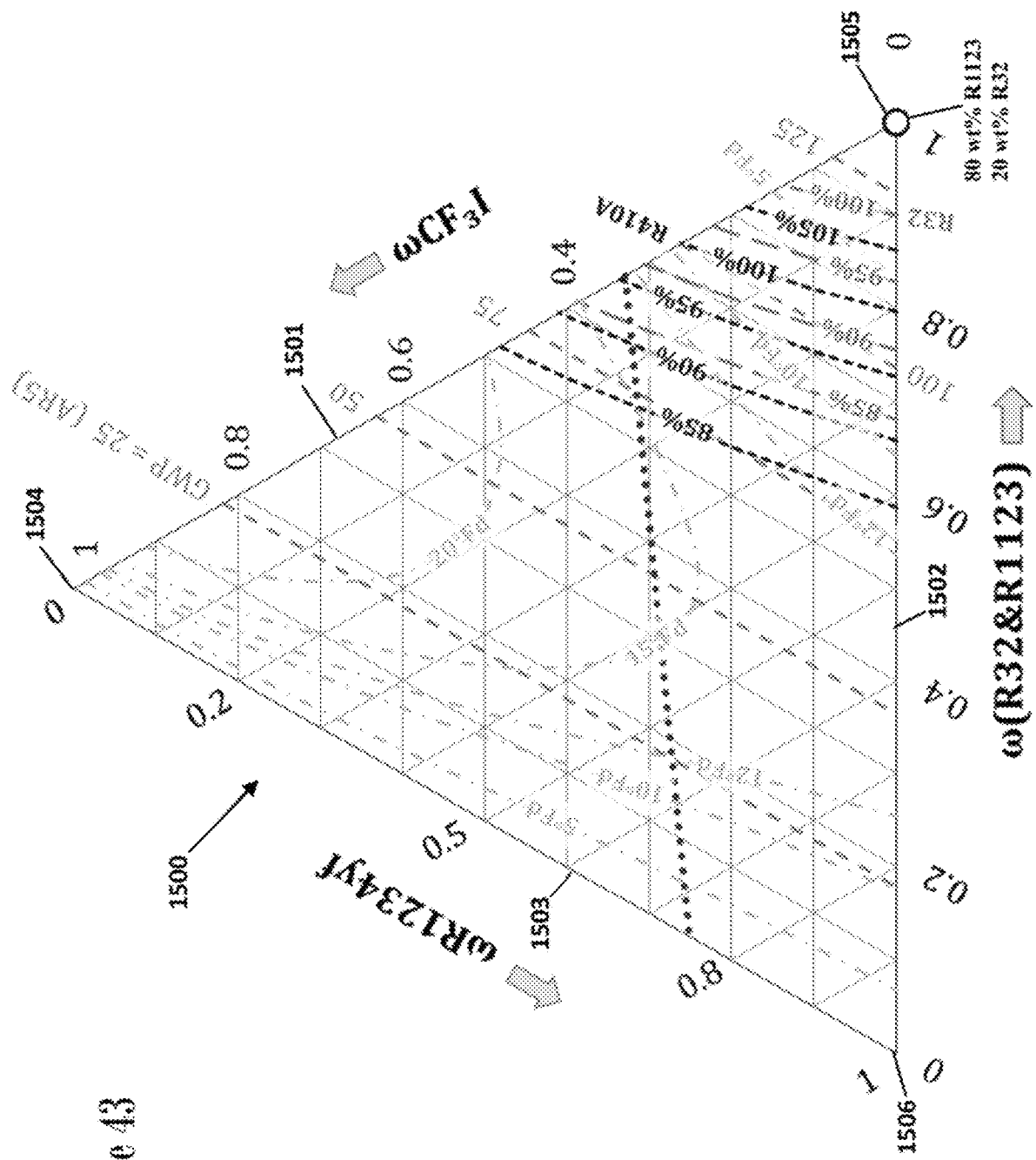

FIG. 43 illustrates a matrix 1500 that was developed to show plots of GWP, flammability, temperature glide, capacity relative to R410A, and capacity relative to R32 as function of the concentration of R1234yf, a mixture of 80 wt % and 20 wt % of R1123, and $CF_3I$. Each side 1501, 1502, 1503 of the triangle corresponds to weight percentages of $CF_3I$, the mixture of 20 wt % R32 and 80 wt % R1123, and R1234yf, respectively. Each vertex 1504, 1505, 1506 corresponds to a composition of 100 wt % R1123; the mixture of 20 wt % R32 and 80% R1123; and $CF_3I$, respectively.

Properties of the compositions for each matrix 1400, 1500 were estimated using a thermodynamic model. The boundary between flammable and non-flammable compositions is shown by the dotted line extending in an almost horizontal direction. Flammable compositions are below the boundary and non-flammable compositions are above boundary. The boundary is based on the flammability characteristics of R1123, R32, $CF_3I$, R410A, and R1234yf, and the flame suppressant properties of $CF_3I$. GWP is based on the GWP of individual components and the method described in ASHRAE Standard 34 for calculating the GWP of refrigerant blends. The flammability boundary is estimated based on characteristics of the individual components and various binary mixtures of the components. The flammability line was estimated based on the ratio of R32 to R1123 being 50:50 in a composition, while the amounts of R1234yf and $CF_3I$ in the composition were varied. Accordingly, the amount of each refrigerant in a composition along the flammability boundary may, for example, vary by up to about 5 percent in an embodiment. It should be appreciated the compositions and ranges shown and/or described may be updated based on further testing to confirm the location of the flammability boundary.

Figure 44:
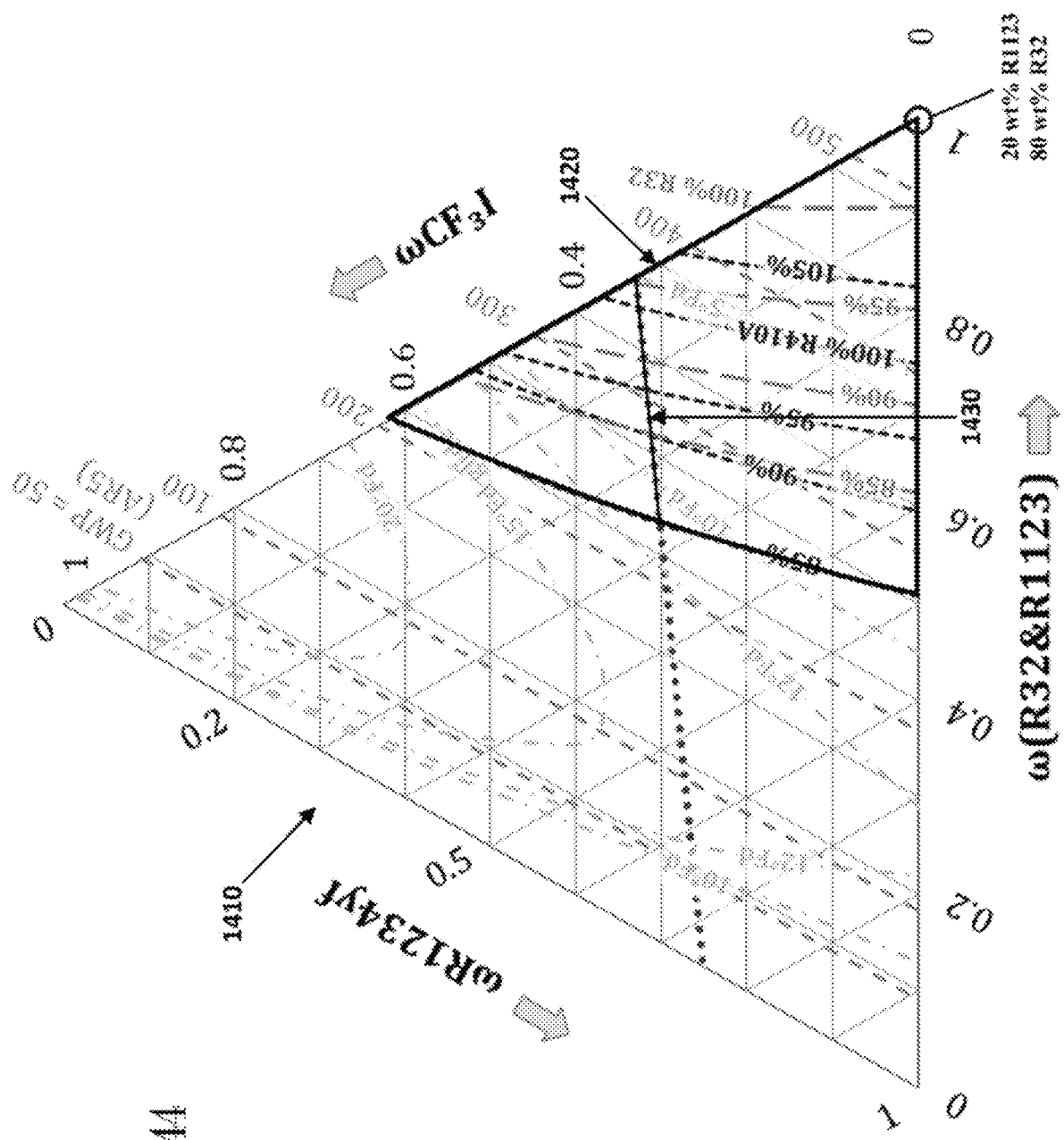
FIGS. 44 and 45 each illustrate a matrix based on a respective one of FIGS. 43 and 44 that can be used to select a refrigerant composition with a desired set of properties in an embodiment.
Figure 46:
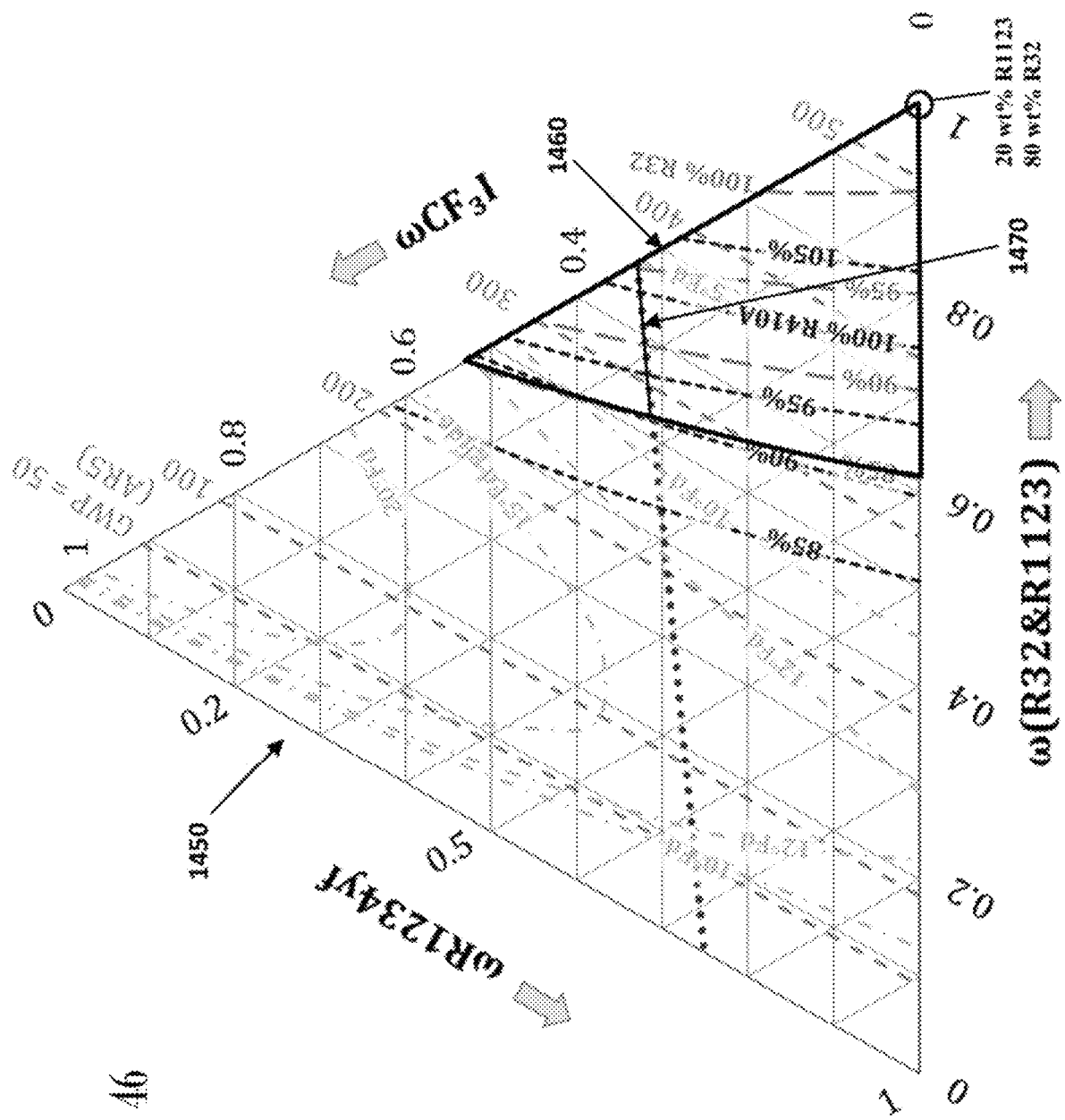
FIGS. 46 and 47 each illustrate a matrix based on a respective one of FIGS. 43 and 44 that can be used to select a refrigerant composition with a desired set of properties in an embodiment.

Each of FIGS. 44 and 46 illustrate a matrix 1410, 1450 based on matrix 1400 and has the same sides and vertices as the matrix 1400. Each matrix 1410, 1450 is the same as the matrix 1400, except that the matrices 1410, 1450 illustrates ranges of refrigerant compositions that may be desired in particular embodiments.

Figure 45:
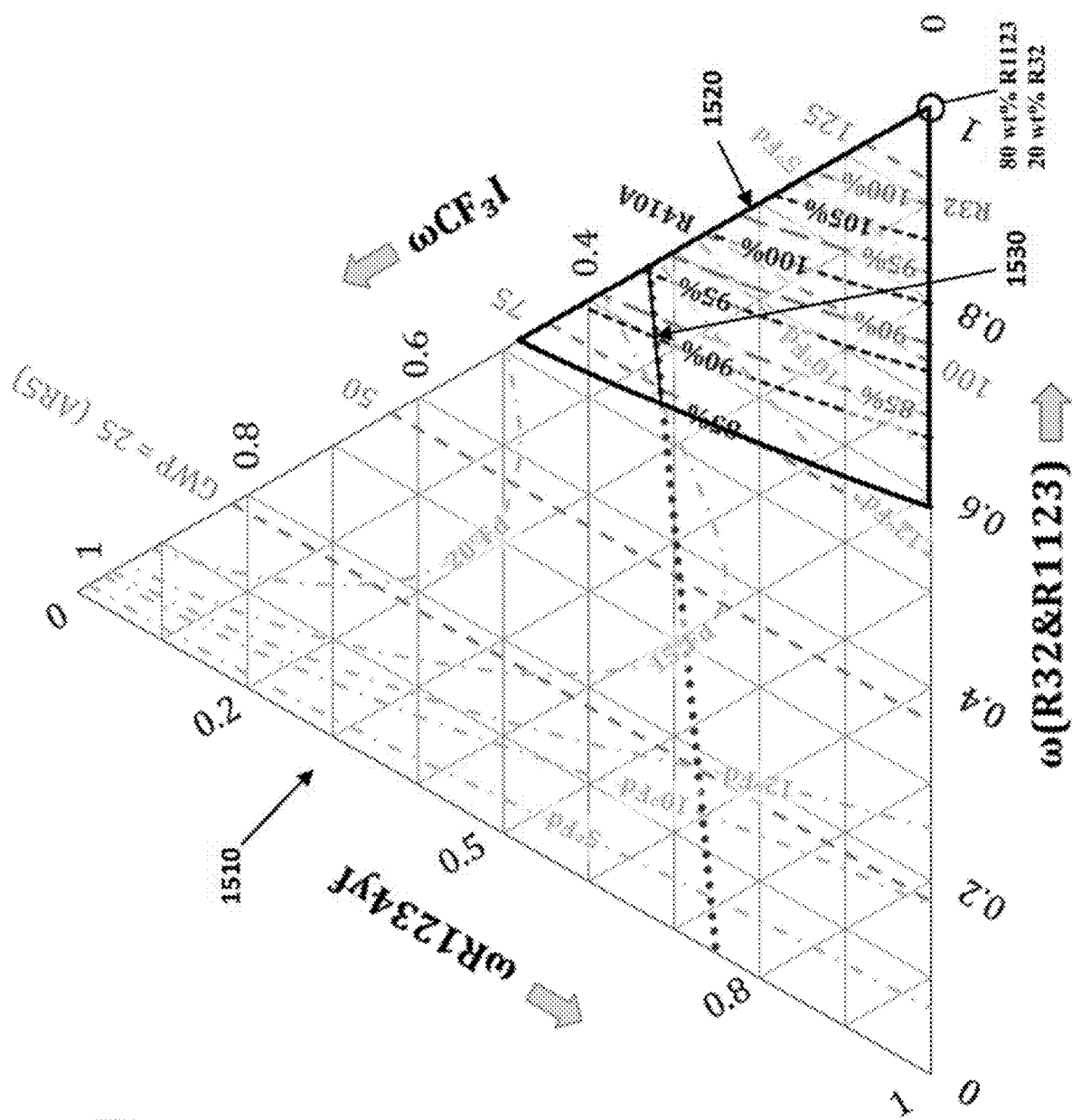
Figure 47:
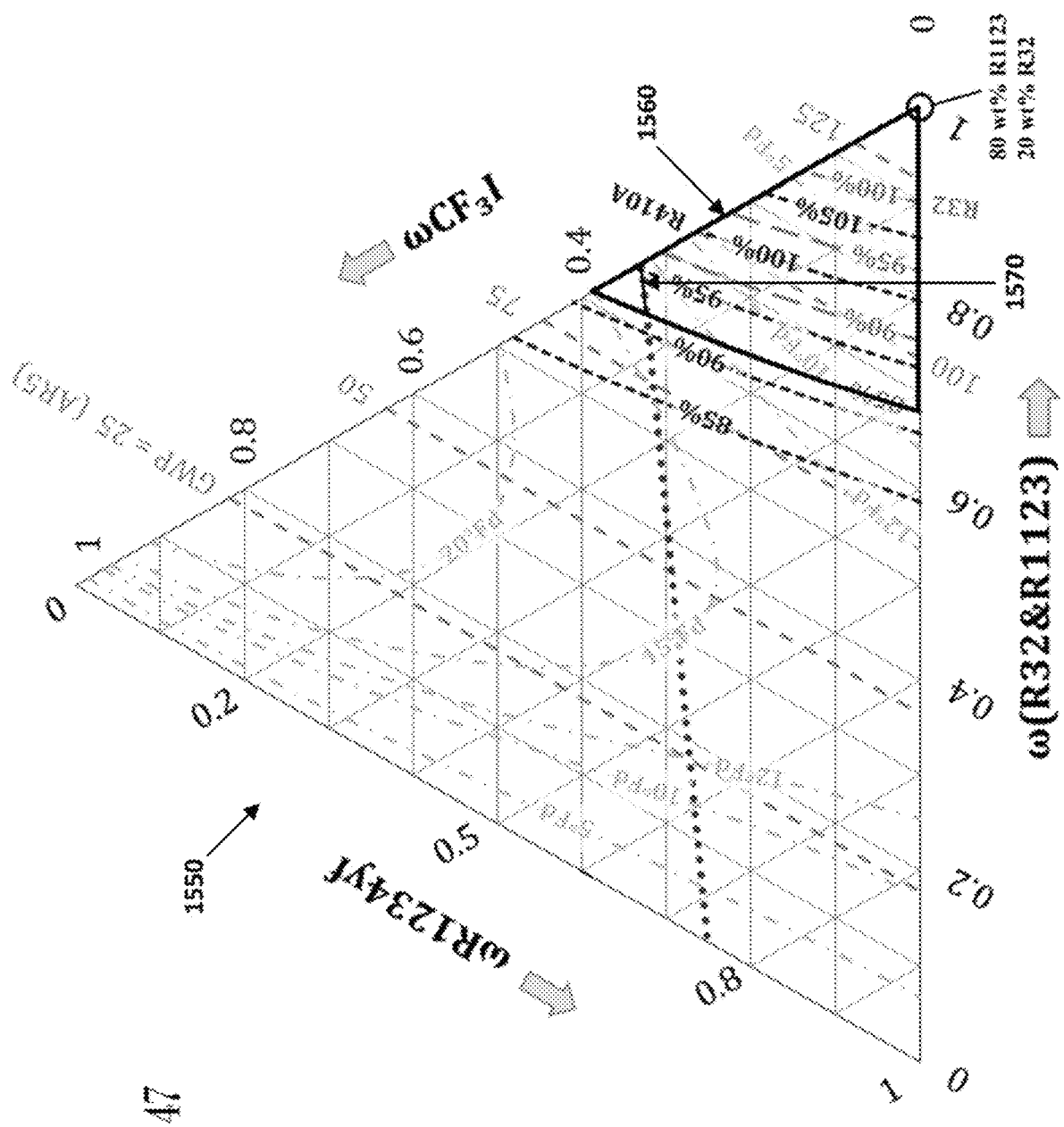

Each of FIGS. 45 and 47 illustrate a matrix 1510, 1550 based on matrix 1500 of FIG. 9 and has the same sides and vertices as matrix 1500. Each matrix 1510, 1550 is the same as matrix 1500, except that matrices 1510, 1550 illustrate ranges of refrigerant blends that may be desired in particular embodiments.

One or more of the matrices 1410, 1450, 1510, 1550 can be used to determine composition(s) of R32, R1123, $CF_3I$, and R1234yf having one or more desired properties (e.g., GWP, flammability, temperature glide, capacity relative to R410A or R32). For example, matrices 1410, 1450 in FIGS. 45 and 46 may be used to determine compositions having properties comparable to R410, and matrices 1450, 1550 in FIGS. 47 and 48 may be used to determine compositions having properties comparable to R32. Alternatively, a matrix similar to matrices 1400, 1500 may be calculated in the same manner as discussed above for ratios of R32 to R1123 (R32:R1123) that are between 20:80 and 80:20. The upper limit of 80 wt % was selected for R1123 as R1123 may decompose when a composition contains greater than 80 wt % R1123. Accordingly, it should be appreciated that the upper limit for R1123 (e.g., at or about 80 wt %) may be updated based on further testing. The upper limit of at or about 80% of R32 was selected as greater amounts of R32 result in compositions with higher GWPs.

In an embodiment, a desired set of properties of a refrigerant composition includes being stable (e.g., with respect to R1123) and a capacity that is in the range from at or about 85% to at or about 110% of the capacity of R410A. Based on these desired properties, a range of useful refrigerant compositions 1420 is shown in FIG. 44 and a range of useful refrigerant compositions 1520 is shown in FIG. 45.

The useful refrigerant compositions 1420 in FIG. 44 include from at or about 30 wt % (80 wt % of R32 in mixture×38% of mixture in composition) to at or about 80 wt % (80 wt % of R32 in mixture×100 wt % of mixture in composition) of R32; from at or about 8 wt % (20 wt % of R1123 in mixture×38 wt % of mixture in composition) to at or about 20 wt % (20 wt % of R1123 in mixture×100 wt % of mixture in composition) of R1123; at or about 49 wt %, or less than 49 wt % and greater than 0% of R1234yf; and at or about 62 wt %, or less than 62 wt % and greater than 0 wt % of $CF_3I$.

The useful refrigerant compositions 1520 in FIG. 45 include from at or about 10 wt % (20 wt % of R32 in mixture×52 wt % of mixture in composition) to at or about 20 wt % (20 wt % of R32 in mixture×100 wt % of mixture in composition) of R32; from at or about 42 wt % (80 wt % of R1123 in mixture×52% of mixture in composition) to at or about 80 wt % of R1123 (80 wt % of R1123 in mixture× 100 wt % of mixture in composition) of R125; at or about 42 wt %, or less than 42 wt % and greater than 0 wt % of R1234yf; and at or about 48 wt %, or less than about 48 wt % and greater than 0 wt % of $CF_3I$.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of useful refrigerant compositions may be determined from the preferred refrigerant compositions 1420, 1520 in FIGS. 44 and 45. Based on the useful refrigerant compositions 1420, 1520, useful refrigerant compositions may include from at or about 10 wt % to at or about 30 wt % of R32; from at or about 8 wt % to at or about 41 wt % of R1123; at or about 49 wt %, or less than about 49 wt % and greater than 0 wt % of R1234yf; and at or about 62 wt %, or less than about 62 wt % and greater than 0 wt % of $CF_3I$.

In an embodiment, a composition having a ratio of R32 to R1123 (R32:R1123) from about 40:60 to about 60:40 may be desired to provide additional stability.

As shown in FIGS. 44 and 45, useful compositions 1420 may include preferred compositions 1430 and useful refrigerant compositions 1520 may include preferred refrigerant compositions 1530. The preferred compositions 1430, 1530 may be desirable in an embodiment as they are stable (e.g., relative to R1123), have a capacity at or about 85% or greater than 85% and less than 105% of the capacity of R410A, have a GWP that is less than 400, have a temperature glide less than 20° F., and are nonflammable.

The preferred refrigerant compositions 1430 in FIG. 44 include at or about 27 wt %, or less than 27 wt % and greater than 0% of R1234yf; from at or about 30 wt % (80 wt % of R32 in mixture×38 wt % of mixture in composition) to at or about 54 wt % (80 wt % of R32 in mixture×67 wt % of mixture in composition) of R32; from at or about 8 wt % (20 wt % of R1123 in mixture×38 wt % of mixture in composition) to at or about 13 wt % (20 wt % of R1123 in mixture×67 wt % of mixture in composition) of R1123; and from at or about 30 wt % to at or about 62 wt % of $CF_3I$.

The preferred refrigerant compositions 1530 in FIG. 45 include at or about 15 wt %, or less than 15 wt % of R1234yf and greater than 0% of R1234yf; from at or about 10 wt % (20 wt % of R32 in mixture×52 wt % of mixture in composition) to at or about 13 wt % (20 wt % of R32 in mixture×67 wt % of mixture in composition) of R32; from at or about 42 wt % (80 wt % of R1123 in mixture×52 wt % of mixture in composition) to at or about 54 wt % (80 wt % of R1123 in mixture×67% of mixture in composition) of R1123; and from at or about 31 wt % to at or about 48 wt % of $CF_3I$.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of preferred refrigerant compositions may be determined from the preferred refrigerant compositions 1430, 1530 in FIGS. 44 and 45. Based on the preferred refrigerant compositions 1430, 1530, preferred refrigerant compositions may include from at or about 10 wt % to at or about 54 wt % of R32; from at or about 8 wt % to at or about 54 wt % of R1123; at or about 27 wt %, or less than 27 wt % and greater than 0 wt % of R1234yf; and from at or about 30 wt % to at or about 62 wt % of $CF_3I$ In an embodiment, a composition having a ratio of R32 to R1123 (R32:R1123) from about 40:60 to about 60:40 may be desired to provide additional stability.

In an embodiment, the set of desired properties may include a specific GWP. In an embodiment, a composition having a GWP from at or about 500 or less than 500 may be desired. In an embodiment, a composition having a GWP from at or about 400 or less than 400 may be desired. In an embodiment, a composition having a GWP from at or about 300 or less than 300 may be desired. In an embodiment, a composition having a GWP from at or about 150 or less than 150 may be desired. In an embodiment, a composition having a GWP from at or about 150 to at or about 300 may be desired. In such embodiments, desired compositions may be selected from the compositions shown in FIGS. 44 and 45 (e.g., useful compositions 1420, 1520 and/or preferred compositions 1430, 1530) and described with respect to FIGS. 44 and 45 to include those compositions with the desired GWP.

In an embodiment, the desired property of the capacity being in the range of at or about 85% to at or about 110% of the capacity of R410A may be different. In an embodiment, a composition having a capacity in the range of at or about 85% to at or about 105% of the capacity of R410A may be desired. In an embodiment, a composition having a capacity in the range of at or about 85% to at or about 105% of the capacity of R410A may be desired. In an embodiment, a composition having a capacity in the range of at or about 90% to at or about 110% of R410A may be desired. In an embodiment, a composition having a capacity in the range of at or about 90% to at or about 105% of R410A may be desired. In an embodiment, a composition having a capacity in the range of at or about 90% to at or about 100% of R410A may be desired. In an embodiment, a composition having a capacity in the range of at or about 95% to at or about 110% of R410A may be desired. In an embodiment, a composition having a capacity in the range of at or about 95% to at or about 105% of R410A may be desired. In an embodiment, a composition having a capacity in the range of at or about 95% to at or about 100% of R410A may be desired. In an embodiment, a composition having a capacity in the range of at or about 100% to at or about 110% of R410A may be desired. In an embodiment, a composition having a capacity in the range of at or about 100% to at or about 105% of R410A may be desired. In such embodiments, desired compositions may be selected from the compositions shown in FIGS. 44 and 45 (e.g., useful compositions 1420, 1520 and/or preferred compositions 1430, 1530) and described with respect to FIGS. 44 and 45 to include those compositions with the desired GWP.

In an embodiment, the set of desired properties may include a specific temperature glide. In an embodiment, a composition having a temperature glide at or about 15° F. or less than 15° F. may be desired. In an embodiment, a composition having a temperature glide at or about 12° F. or less than 12° F. may be desired. In an embodiment, a composition having a temperature glide at or about 10° F. or less than 10° F. may be desired. In an embodiment, a composition having a temperature glide at or about 5° F. or less than 5° F. may be desired. In such embodiments, desired compositions may be selected from the compositions shown in FIGS. 44 and 45 (e.g., useful compositions 1420, 1520 and/or preferred compositions 1430, 1530) and described with respect to FIGS. 44 and 45 to include those compositions with the desired GWP.

In an embodiment, a desired set of properties of a refrigerant composition includes being stable and having a capacity in a range from at or about 85% to 110% of the capacity of R32. Based on these desired properties, a range of useful refrigerant compositions 1460 is shown in FIG. 46 and a range of useful refrigerant compositions 1560 is shown in FIG. 47.

The useful refrigerant compositions 1460 in FIG. 46 include from at or about 38 wt % (80 wt % of R32 in mixture×47 wt % of mixture in composition) to at or about 80 wt % (80 wt % of R32 in mixture×100 wt % of mixture in composition) of R32; from at or about 9.4 wt % (20 wt % of R1123 in mixture×47 wt % of mixture in composition) to at or about 20 wt % (20 wt % of R1123 in mixture×100 wt % of mixture in composition) of R1123; at or about 38 wt %, or less than 28 wt % and greater than 0 wt % of R1234yf; and at or about 52 wt %, or less than about 52 wt % and greater than 0 wt % of $CF_3I$.

The useful refrigerant compositions 1560 in FIG. 47 include from at or about 12 wt % (20 wt % of R32 in mixture×61% of mixture in composition) to at or about 20 wt % (20 wt % of R32 in mixture×61% of mixture in composition) of R32; from at or about 49 wt % (80 wt % of R1123 in mixture×61 wt % of mixture in composition) to at or about 80 wt % (80 wt % of R1123 in mixture×100 wt % of mixture in composition) of R1123; at or about 32 wt %, or less than 32 wt % and greater than 0 wt % of R1234yf; and at or about 39 wt %, or less than about 39 wt % and greater than 0 wt % of $CF_3I$.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of useful refrigerant compositions may be determined from the useful refrigerant compositions 1460, 1560 in FIGS. 46 and 47. Based on the ranges of each useful refrigerant compositions 1460, 1560, useful refrigerant compositions may include from at or about 12 wt % to at or about 38 wt % of R32; from at or about 9 wt % to at or about 49 wt % of R1123; at or about 38 wt %, or less than 38% R1234yf and greater than 0% of R1234yf; and at or about 52 wt %, or less than about 52 wt % and greater than 0 wt % of $CF_3I$.

In an embodiment, a composition having a ratio of R32 to R1123 (R32:R1123) from about 40:60 to about 60:40 may be desired to provide additional stability.

As shown in FIGS. 46 and 47, useful compositions 1460 may include preferred compositions 1470 and useful refrigerant compositions 1560 may include preferred refrigerant compositions 1570. The preferred compositions 1470, 1570 may be desirable in an embodiment as they are stable (e.g., relative to R1123), have a capacity at or about 85% or greater than 85% and less than 105% of the capacity of R410A, have a GWP that is less than 400, have a temperature glide at or about 12° F. or less than 12° F., and are nonflammable.

The preferred refrigerant compositions 1470 of FIG. 46 include from at or about 38 wt % (80 wt % of R32 in mixture×47 wt % of mixture in composition) to at or about 54 wt % (80 wt % of R32 in mixture×67 wt % of mixture in composition) of R32; from at or about 9 wt % (20 wt % of R1123 in mixture×47 wt % of mixture in composition) to at or about 13 wt % (20 wt % of R1123 in mixture×67 wt % of mixture in composition) of R1123; at or about 17 wt %, or less than 17 wt % and greater than 0 wt % of R1234yf; and from at or about 31 wt % to at or about 53 wt % of $CF_3I$.

The preferred refrigerant compositions 1570 in FIG. 47 include from at or about 12 wt % (20 wt % of R32 in mixture×61 wt % of mixture in composition) to at or about 13 wt % (20 wt % of R32 in mixture×67 wt % of mixture in composition) of R32; from at or about 49 wt % (80 wt % of R1123 in mixture×61 wt % of mixture in composition) to at or about 54 wt % (80 wt % of R1123 in mixture×67 wt % of mixture in composition) of R1123; at or about 7 wt %, or less than 7 wt % of R1234yf and greater than 0 wt % of R1234yf; and from at or about 32 wt % to at or about 39 wt % of $CF_3I$.

As discussed above, a composition having a ratio of R32 to R1123 (R32:R1123) from about 80:20 to about 20:80 may be desired in an embodiment as these compositions are stable with respect to R1123 and have lower GWPs. Accordingly, a range of preferred refrigerant compositions may be determined from the preferred refrigerant compositions 1470, 1570 in FIGS. 46 and 47. Based on the ranges of each preferred refrigerant compositions 470, 570, refrigerant compositions include from at or about 12 wt % to at or about 54 wt % of R32; from at or about 9 wt % to at or about 54 wt % of R1123; at or about 17 wt %, or less than 17 wt % and greater than 0 wt % of R1234yf; and from at or about 31 wt % to at or about 53 wt % of $CF_3I$.

In an embodiment, the set of desired properties may include a specific GWP. In an embodiment, a composition having a GWP of at or about 500 or less than 500 may be desired. In an embodiment, a composition having a GWP of at or about 400 or less than 400 may be desired. In an embodiment, a composition having a GWP of at or about 300 or less than 300 may be desired. In an embodiment, a composition having a GWP of at or about 150 or less than 150 may be desired. In an embodiment, a composition having a GWP of at or about 150 to at or about 300 may be desired. In such embodiments, desired compositions may be selected from the compositions shown in FIGS. 46 and 47 (e.g., useful compositions 1460, 1560 and/or preferred compositions 1470, 1570) and described with respect to FIGS. 44 and 45 to include those compositions with the desired GWP.

In an embodiment, the desired property of the capacity being in the range of at or about 85% to at or about 110% of the capacity of R32 may be different. In an embodiment, a composition having a capacity in the range of at or about 85% to at or about 105% of the capacity of R32 may be desired. In an embodiment, a composition having a capacity in the range of at or about 85% to at or about 100% of the capacity of R32 may be desired. In an embodiment, a composition having a capacity in the range of at or about 90% to at or about 110% of R32 may be desired. In an embodiment, a composition having a capacity in the range of at or about 90% to at or about 105% of R32 may be desired. In an embodiment, a composition having a capacity in the range of at or about 90% to at or about 100% of R32 may be desired. In an embodiment, a composition having a capacity in the range of at or about 95% to at or about 110% of R32 may be desired. In an embodiment, a composition having a capacity in the range of at or about 95% to at or about 105% of R32 may be desired. In an embodiment, a composition having a capacity in the range of at or about 95% to at or about 100% of R32 may be desired. In an embodiment, a composition having a capacity in the range of at or about 100% to at or about 110% of R32 may be desired. In an embodiment, a composition having a capacity in the range of at or about 100% to at or about 105% of R32 may be desired. In such embodiments, desired compositions may be selected from the compositions shown in FIGS. 46 and 47 (e.g., useful compositions 1460, 1560 and/or preferred compositions 1470, 1570) and described with respect to FIGS. 44 and 45 to include those compositions with the desired capacity.

In an embodiment, the set of desired properties may include a specific temperature glide. In an embodiment, a composition having a temperature glide at or about 12° F. or less than 12° F. may be desired. In an embodiment, a composition having a temperature glide at or about 10° F. or less than 10° F. may be desired. In an embodiment, a composition having a temperature glide at or about 5° F. or less than 5° F. may be desired. In such embodiments, desired compositions may be selected from the compositions shown in FIGS. 46 and 47 (e.g., useful compositions 1460, 1560 and/or preferred compositions 1470, 1570) and described with respect to FIGS. 44 and 45 to include those compositions with the desired temperature glide.

In an embodiment, a method of making a refrigerant composition and/or a method of retrofitting a refrigerant composition utilizes one or more of the matrices of FIGS. 44-47 so that the resulting refrigerant composition or retrofitted refrigerant composition has the desired set of properties.

It should be noted that a working fluid may include one or more additional non-refrigerant components in addition to a refrigerant composition. Additional components may be, for example impurities, lubricants, refrigeration system additives, tracers, ultraviolet ("UV") dyes, and solubilizing agents. In general, these additional components are present in small amounts relative to the refrigerant composition. For example, up to 3% of each additional component may be present in a working fluid. A working fluid, depending upon its components, may have at or about 5 wt % or less than 5 wt % of some additives, such as lubricants, in a particular location or piece of equipment in a heat transfer circuit. In an embodiment, one or more additional components would be added in addition to the refrigerant compositions described.

In an embodiment, a working fluid may include one or more impurities. An impurity may be, for example, a previous refrigerant or refrigerant blend used in an HVACR system. An impurity may be, for example, particulates (e.g., metal particles, metal salts, elastomer particles) from equipment of the HVACR system and other contaminants that may adversely affect a working fluid.

In an embodiment, a working fluid may include one or more lubricants that are compatible with the refrigerant composition. For example, a lubricant may be a lubricant that is designed for use with and is compatible with refrigerant compositions described herein (e.g., R1123, R32, $CF_3I$, 1234yf, R125). Further, the lubricant may be based on the HVACR system that will be using the working fluid. For example, a lubricant may be selected based on being suitable for use with the HVACR system and its equipment (e.g., compressor 2 in FIG. 1), the environment in which the refrigerant may be exposed to.

Lubricants include those conventionally used in compression refrigeration apparatus utilizing chlorofluorocarbon refrigerants. For example, such lubricants and their properties are discussed in the 1990 ASHRAE Handbook, Refrigeration Systems and Applications, chapter 8, titled "Lubricants in Refrigeration Systems", pages 8.1 through 8.21. Lubricants may include those that have been designed for use with hydrofluorocarbon refrigerants and are miscible with refrigerant compositions described herein under compression refrigeration, air-conditioning, or heat pump apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources.

Lubricants may include those lubricants known as "mineral oils" and/or those lubricants known as "synthetic oils" in the field of compression refrigeration lubrication. For example, mineral oils may include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). For example, synthetic oils may include alkylaryls (i.e. linear and branched alkyl alkylbenzenes), synthetic paraffins and naphthenes, and poly(alphaolefins). Representative conventional lubricants may include the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals), and HAB 22 (branched alkylbenzene sold by Nippon Oil).

In an embodiment, refrigeration system additives may include lubrication enhancing additives and anti-wear additives. Lubrication enhancing additives may include, for example, alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other anti-wear additives include natural product oils and asymmetrical polyhydroxyl lubrication additives such as Synergol TMS (International Lubricants). Similarly, stabilizers such as antioxidants, free radical scavengers, and water scavengers may be employed. Compounds in this category can include, but are not limited to, butylated hydroxy toluene (BHT) and epoxides.

Lubricants may be selected by considering a given compressor's requirements and the environment to which the lubricant will be exposed. In some embodiments, lubricants may have a kinematic viscosity of at least about 5 cs (centistokes) at 40° C.

In an embodiment, a working fluid may include one or more tracers. The tracers may be used in detecting if any dilution, contamination, or other alteration of the working fluid (which includes the refrigerant composition) has occurred. The tracers may be selected from, for example, the group including hydrofluorocarbons (HFCs), deuterated hydrocarbons, deuterated hydrofluorocarbons, perfluorocarbons, fluoroethers, brominated compounds, iodated compounds, alcohols, aldehydes, ketones, nitrous oxide (N2O) and combinations thereof. The tracer compounds are added to the working fluid in previously determined quantities to allow detection of any dilution, contamination or other alteration of the composition. Single tracer compounds may be used in combination with a refrigeration composition in the working fluid or multiple tracer compounds may be combined in any proportion to serve as a tracer blend. The tracer blend may contain multiple tracer compounds from the same class of compounds or multiple tracer compounds from different classes of compounds. For example, a tracer blend may contain two or more deuterated hydrofluorocarbons, or one deuterated hydrofluorocarbon in combination with one or more perfluorocarbons.

In an embodiment, a working fluid may include one or more UV dyes. A UV dye may allow a person (e.g., operator, field technician) to observe leaks in or near the HVACR system. Due to the low solubility of some UV dyes with some refrigerant compositions, a solubilizing agent may be included with the UV dye. An "ultra-violet" (UV) dye is a UV fluorescent composition that absorbs light in the ultra-violet or "near" ultra-violet region of the electromagnetic spectrum. The fluorescence produced by the UV fluorescent dye under illumination by a UV light that emits radiation with wavelength from 10 nanometers to 750 nanometers may be detected. Therefore, if a composition containing such a UV fluorescent dye is leaking from a given point in a refrigeration, air-conditioning, or heat pump apparatus, the fluorescence can be detected at the leak point. Such UV fluorescent dyes include but are not limited to naphthalimides, perylenes, coumarins, anthracenes, phenanthracenes, xanthenes, thioxanthenes, naphthoxanthenes, fluoresceins, and derivatives or combinations thereof.

In an embodiment, solubilizing agents may include at least one compound selected from the group including hydrocarbons, hydrocarbon ethers, dimethylether, polyoxyalkylene glycol ethers, amides, nitriles, ketones, chlorocarbons, esters, lactones, aryl ethers, fluoroethers and 1,1,1-trifluoroalkanes. The polyoxyalkylene glycol ethers, amides, nitriles, ketones, chlorocarbons, esters, lactones, aryl ethers, fluoroethers and 1,1,1-trifluoroalkanes solubilizing agents are defined herein as being compatibilizers for use with conventional refrigeration lubricants.

In an embodiment, hydrocarbon solubilizing agents may include hydrocarbons including straight chained, branched chain or cyclic alkanes or alkenes containing five or fewer carbon atoms and only hydrogen with no other functional groups. Representative hydrocarbon solubilizing agents include propane, propylene, cyclopropane, n-butane, isobutane, 2-methylbutane and n-pentane. It is appreciated that if the composition contains a hydrocarbon, then the solubilizing agent may not be the same hydrocarbon. Hydrocarbon ether solubilizing agents may include ethers containing only carbon, hydrogen and oxygen, such as dimethyl ether (DME).

Solubilizing agents may be present as a single compound, or may be present as a mixture of more than one solubilizing agent. Mixtures of solubilizing agents may contain two solubilizing agents from the same class of compounds for example two lactones, or two solubilizing agents from two different classes, such as a lactone and a polyoxyalkylene glycol ether.

Solubilizing agents such as ketones may have an objectionable odor, which can be masked by addition of an odor masking agent or fragrance. Typical examples of odor masking agents or fragrances may include Evergreen, Fresh Lemon, Cherry, Cinnamon, Peppermint, Floral or Orange Peel all commercially available, as well as d-limonene and pinene. Such odor masking agents may be used at concentrations of from about 0.001% to as much as about 15% by weight based on the combined weight of odor masking agent and solubilizing agent.

Often replacement refrigerants are most useful if capable of being used in the original refrigeration equipment designed for a different refrigerant. Refrigerant compositions disclosed herein may be useful as replacements in the original equipment.

In some embodiments, the properties (e.g. capacity, glide, efficiency, compressor discharge temperature) of the refrigerant compositions herein may be made to resemble or match (e.g., have similar properties) an existing refrigerant (e.g. R410A, R32, R22, and/or R404A), so that the refrigerant composition can be used to replace (e.g. drop in) the existing refrigerant. In some embodiments, the refrigerant composition may be used to replace the existing refrigerant in a HVAC system. The replaced refrigerant may be reclaimed and/or repurposed to other applications. In some embodiments, the refrigerant composition may be used in a HVAC system with a screw compressor, a scroll compressor, a reciprocating compressor, or other suitable compressors.

In an embodiment, a refrigerant composition in a HVACR system may be retrofitted. The refrigerant composition is an existing refrigerant composition of the HVACR is retrofitted to have a desired set of properties. An existing refrigerant composition is retrofitted so as to result in a retrofitted refrigerant composition that includes R1123, R32, and one or more additional refrigerants. In an embodiment, the one or more refrigerants include $CF_3I$, R125, and R1234yf. In an embodiment, the existing refrigerant composition includes one or more of R1123, R32, $CF_3I$, R125, and R1234yf.

In an embodiment, an existing refrigerant composition is retrofitted so as to result in a retrofitted refrigerant composition that includes R1123, R32, and $CF_3I$. In an embodiment, a refrigerant composition is retrofitted so as to result in a retrofitted refrigerant composition that includes R1123, R32, $CF_3I$, and R1234yf. In an embodiment, a refrigerant composition is retrofitted so as to result in a retrofitted refrigerant composition that includes R1123, R32, and R125. In an embodiment, a refrigerant composition is retrofitted so as to result in a retrofitted refrigerant composition that includes R1123, R32, and R125, and R1234yf. In an embodiment, a refrigerant composition is retrofitted so as to result in a retrofitted refrigerant composition that includes R1123, R32, R125, and $CF_3I$.

In an embodiment, an HVACR utilizes an existing refrigerant composition including at least one of R32, R1123, and R1234yf, and a method of retrofitting the refrigerant composition includes adding an amount of at least one refrigerant to an existing refrigerant composition to produce a retrofitted refrigerant composition. The retrofitted refrigerant composition includes at least R1123, R32, and one of R125 and $CF_3I$ and has a GWP of at or about 1500 or less than 1500. The amounts of the one or more refrigerants are added results in a retrofitted refrigerant composition with the desired set of properties. In an embodiment, an amount of one or more refrigerants may include one or more of an amount of R32, an amount of R1123, an amount of R125, an amount of R1234yf, and an amount of $CF_3I$.

In an embodiment where the HVACR system is designed to utilize a refrigerant composition similar to R410A, retrofitted refrigerant composition(s) with the desired properties can be determined using, for example, one or more of the matrices in FIGS. 2-4, 7A-7D, 8-11, 13A, 13B, 14-19, 23A-25B, 26-33, 38A-41C, and 42-45 and their accompanying description. In an embodiment where the HVACR system is designed to utilize a refrigerant composition similar to R32, retrofitted refrigerant composition(s) that would have the desired set of properties can be determined using, for example, one or more of the matrices in FIGS. 2, 5-7D, 8, 11-13B, 14-16, 20-25B, 26-29, 34-41C, 42, 43, 46, and 47 and their accompanying description. In an embodiment where the HVACR system is designed to utilize a refrigerant composition similar to R22, retrofitted refrigerant composition(s) that would have the desired set of properties can be determined using, for example, one or more of the matrices in FIGS. 26-33.

Generally, a method of making a refrigerant composition with a desired set of properties may include determining the desired set of properties, and selecting at least one refrigerant for each of the properties in the desired set of properties. The refrigerant(s) selected to exhibit the desired property has a property value that is better than the property value of the desired property exhibited by the other refrigerants in the composition. The method may also include mixing the selected refrigerants in a suitable mass fraction so that the resulting refrigerant composition has the desired set of properties. In some embodiments, a matrix can be made to represent a correlation of property value changes in response to mass fraction changes in the selected refrigerants. Suitable refrigerant composition ranges to achieve the desired set of properties may be selected from the matrix by defining boundary property values in the matrix. The method disclosed herein can provide flexibility in making a refrigerant to satisfy, for example, different design requirements.

In some embodiments, the method of making a refrigerant composition for a HVACR system includes reducing the flammability of a refrigerant composition and balancing performance characteristics, flammability, and GWP of the refrigerant composition (e.g. minimizing flammability, minimizing GWP, and maximizing performance characteristics). In some embodiments, the method of reducing flammability of a refrigerant composition may include adding a non-flammable refrigerant (e.g. R125) to a relatively flammable refrigerant composition so that the resulting refrigerant composition can match a design requirement (e.g. flammability of the refrigerant) of a HVAC system.

In an embodiment, a method for making a refrigerant composition for a HVACR system includes mixing at least an amount of R1123, an amount of R32, and an amount of one or more refrigerants to obtain a refrigerant composition that has a GWP of at or about 1500 or less than 1500. In an embodiment, the one or more refrigerants includes at least one of R125, and $CF_3I$. The amounts of the R1123, R32, the one or more refrigerants may be selected so that the refrigerant composition has one or more desired properties. A desired property may be, for example, flammability, GWP, temperature glide, a coefficient of performance, compressor discharge ratio, mass flow rate, or fluid density.

In an embodiment where the HVACR system is designed to utilize a refrigerant composition similar to R410A, refrigerant composition(s) with the desired properties can be determined using, for example, one or more of the matrices in FIGS. 2-4, 7A-7D, 8-11, 13A, 13B, 14-19, 23A-25B, 26-33, 38A-41C, and 42-45 and their accompanying description. In an embodiment where the HVACR system is designed to utilize a refrigerant composition similar to R32, refrigerant composition(s) that would have the desired set of properties can be determined using, for example, one or more of the matrices in FIGS. 2, 5-7D, 8, 11-13B, 14-16, 20-25B, 26-29, 34-41C, 42, 43, 46, and 47 and their accompanying description. In an embodiment where the HVACR system is designed to utilize a refrigerant composition similar to R22, retrofitted refrigerant composition(s) that would have the desired set of properties can be determined using, for example, one or more of the matrices in FIGS. 26-33.

In some embodiments, the performance characteristic(s) of the resulting refrigerant composition may be simulated and/or estimated by an Excel-based thermodynamic cycle calculation tool, such as for example NIST's REFPROP program. In some embodiments, a burn velocity (BV, cm/sec) may be simulated and/or estimated by an Excel-based thermodynamic cycle calculation tool, such as for example NIST's REFPROP program.

In some embodiments, the properties (e.g. GWP and/or capacity) of the refrigerant compositions herein may be made to resemble or match an existing refrigerant (e.g. R410A, R22, and/or R404A), so that the refrigerant composition can be used to replace (e.g. drop in) the existing refrigerant. In some embodiments, the refrigerant composition may be used to replace the existing refrigerant in a HVAC system. The replaced refrigerant may be reclaimed and/or repurposed to other applications. In some embodiments, the refrigerant composition may be used in a HVAC system with a screw compressor, a scroll compressor, a reciprocating compressor or other suitable compressors.

Generally, a refrigerant composition as disclosed herein may include suitable amounts of different refrigerants, each of which is selected to help achieve at least one property of the refrigerant composition. In some embodiments, the refrigerant composition may include a suitable amount of a first refrigerant that is selected to address (e.g. reduce) flammability of the refrigerant composition, a suitable amount of a second refrigerant that is selected to address (e.g. reduce) GWP of the refrigerant composition, and a suitable amount of a third refrigerant that is selected to address (e.g. increase) capacity of the refrigerant composition. It is to be noted that in some embodiments, one refrigerant may be able to address more than one property of the refrigerant composition.

It is noted that the capacity may be provided, for example, in a measurement performed in a lab and/or in a computer based simulation. The capacity may be provided based on operation conditions provided in Standard for Performance Rating of Unitary Air-Conditioning & Air-source Heat Pump Equipment (e.g. Air-Conditioning, Heating and Refrigeration Institute Standard (AHRI Std) 210/240).

It is to be appreciated that other refrigerants may be used to achieve the desired properties as listed herein. It is also to be appreciated that the method described herein may be used to achieve other desired properties in the refrigerant compositions.

Certain of the refrigerant compositions herein are non-azeotropic compositions. A non-azeotropic composition may have certain advantages over azeotropic or near azeotropic mixtures. A non-azeotropic composition is a mixture of two or more substances that behaves as a mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

The refrigerant compositions may be prepared by any convenient method to combine the desired amounts of the individual components. A preferred method is to weigh the desired component amounts and thereafter combine the components in an appropriate vessel. Agitation may be used, if desired.

A refrigerant container may be any container in which is stored a refrigerant blend composition that has been used in a refrigeration apparatus, air-conditioning apparatus or heat pump apparatus. The refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be removed sufficiently to allow reuse of the refrigerant blend or refrigerant blend component without adversely affecting the performance or equipment within which the refrigerant blend or refrigerant blend component will be used.

The refrigerant compositions herein may have low ozone depletion potential and low global warming potential (GWP). Additionally, the refrigerant compositions may have global warming potentials that are less than many hydrofluorocarbon refrigerants currently in use. One aspect of the embodiments described herein is to reduce the net GWP of refrigerant mixtures by adding fluoroolefins to the refrigerant compositions.

The embodiments disclosed herein provide HVACR system, such as a refrigeration, air-conditioning, or heat pump apparatus, that contains a refrigerant composition as described herein. In some embodiments, the refrigeration or air-conditioning apparatus may be a mobile apparatus. As used herein, mobile refrigeration apparatus or mobile air-conditioning apparatus refers to any refrigeration or air-conditioning apparatus incorporated into a transportation unit for the road, rail, sea, or air. In addition, apparatuses meant to provide refrigeration or air-conditioning for a system independent of any moving carrier, known as "intermodal" systems, may also implement the compositions and methods described herein. Such intermodal systems include "containers" (combined sea/land transport) as well as "swap bodies" (combined road and rail transport). The compositions and methods described herein can be useful for road transport refrigerating or air-conditioning apparatus, such as automobile air-conditioning apparatus or refrigerated road transport equipment.

The refrigerant compositions and method as disclosed herein may also be useful in stationary air-conditioning and heat pumps, e.g. chillers, high temperature heat pumps, residential and light commercial and commercial air-conditioning systems. In stationary refrigeration applications, the refrigerant compositions may be useful in equipment such as domestic refrigerators, ice machines, walk-in and reach-in coolers and freezers, and supermarket systems.

The compositions and methods described herein further relate uses as a heat transfer fluid composition. The method comprises transporting the refrigerant composition from a heat source to a heat sink. Heat transfer fluids are utilized to transfer, move or remove heat from one space, location, object or body to a different space, location, object or body by radiation, conduction, or convection. A heat transfer fluid may function as a secondary coolant by providing thermal transfer for cooling (or heating) from a remote refrigeration (or heating) system. In some systems, the heat transfer fluid may remain in a constant state throughout the transfer process (i.e., not evaporate or condense). Alternatively, evaporative cooling processes may utilize heat transfer fluids as well.

A heat source may be defined as any space, location, object or body from which it is desirable to transfer, move or remove heat. Examples of heat sources may be spaces (open or enclosed) requiring refrigeration or cooling, such as refrigerator or freezer cases in a supermarket, building spaces requiring air-conditioning, or the passenger compartment of an automobile requiring air-conditioning. A heat sink may be defined as any space, location, object or body capable of absorbing heat. A vapor compression refrigeration system is one example of such a heat sink.

The compositions and methods can be applied to various equipment and controls of HVAC systems, including for example chillers including the motors and various compressor types thereof, electronics cooling, bearings, air handlers, purges, evaporators and condensers and the fluid management therein. The compositions and methods can be applied to such equipment in the retrofitting and servicing thereof, as well as in the flammability detection and prevention including sensors and methods of ventilation to reduce the probability of flammable mixtures.

Aspects:

Any of aspects 1-20 can be combined with any of aspects 21-62 and any of aspects 21-40 can be combined with aspects 41-62.

Aspect 1. A refrigerant composition for an HVACR system comprising:
about 80 wt % or less of R1123 refrigerant;
R32 refrigerant; and
at least one of $CF_3I$ and R125, wherein
the refrigerant composition has a GWP that is about 1500 or less than 1500.

Aspect 2. The refrigerant composition of aspect 1, wherein the refrigerant composition comprises the R125 refrigerant.

Aspect 3. The refrigerant composition of either aspects 1 or 2, wherein the refrigerant composition comprises the $CF_3I$ refrigerant.

Aspect 4. The refrigerant composition of any one of aspects 1-3, further comprising:
R1234yf refrigerant Aspect 5. The refrigerant composition of any one of aspects 1-4, wherein the refrigerant composition is nonflammable.

Aspect 6. The refrigerant composition of any one of aspects 1-5, wherein the GWP of the refrigerant composition is about 750 or less than 750.

Aspect 7. The refrigerant composition of any one of aspects 1-6, wherein the GWP of the refrigerant composition is about 675 or less than 675.

Aspect 8. The refrigerant composition of any one of aspects 1-7, wherein the GWP of the refrigerant composition is about 300 or less than 300.

Aspect 9. The refrigerant composition of any one of aspects 1-8, wherein a ratio (R32:R1123) of the weight percentage of the R32 refrigerant in the refrigerant composition to the weight percentage of the R1123 refrigerant in the refrigerant composition is at or about 20:80 to at or about 80:20.

Aspect 10. The refrigerant composition of any one of aspects 1-9, wherein a ratio (R32:R1123) of the weight percentage of the R32 refrigerant in the refrigerant composition to the weight percentage of the R1123 refrigerant in the refrigerant composition is at or about 60:40 to at or about 40:60.

Aspect 11. The refrigerant composition of any one of aspects 1-10, wherein a temperature glide of the refrigerant composition is about 15° F. or less than 15° F.

Aspect 12. The refrigerant composition of any one of aspects 1-11, wherein the temperature glide of the refrigerant composition is about 12° F. or less than 12° F.

Aspect 13. The refrigerant composition of any one of aspects 1-12, wherein the temperature glide of the refrigerant composition is about 10° F. or less than 10° F.

Aspect 14. The refrigerant composition of any one of aspects 1-13, wherein the temperature glide of the refrigerant composition is about 5° F. or less than 5° F.

Aspect 15. The refrigerant composition of any one of aspects 1-14, wherein a capacity of the refrigerant composition at or about 85% or greater than 85% of the capacity of R410A refrigerant.

Aspect 16. The refrigerant composition of any one of aspects 1-15, wherein a capacity of the refrigerant composition at or about 110% or less than 110% of the capacity of R410A refrigerant.

Aspect 17. The refrigerant composition of any one of aspects 1-14, wherein a capacity of the refrigerant composition is at or about 85% or greater than 85% of the capacity of R32 refrigerant alone.

Aspect 18. The refrigerant composition of any one of aspects 1-14 and 17, wherein a capacity of the refrigerant composition is at or about 110% or less than 110% of the capacity of R32 refrigerant alone.

Aspect 19. The refrigerant composition of any one of aspects 1-14, wherein a capacity of the refrigerant composition is at or about 85% or greater than 85% of the capacity of R22 refrigerant.

Aspect 20. The refrigerant composition of any one of aspects 1-14 and 19, wherein a capacity of the refrigerant composition is at or about 110% or less than 110% of the capacity of R22 refrigerant.

Aspect 21. A method of making a refrigerant composition for a HVACR system, the method including:
mixing at least an amount of R1123, an amount of R32, and an amount of one or more refrigerants to obtain a refrigerant composition, the one more refrigerants including at least one of R125 refrigerant and $CF_3I$, wherein
the amount of R1123 is about or less than 80 wt % of the refrigerant composition, and
the refrigerant composition has a GWP that is about 1500 or less than 1500.

Aspect 22. The method of aspect 21, wherein the one more refrigerants includes the R125 refrigerant.

Aspect 23. The method of either one of aspects 21 or 22, wherein the one or more refrigerants includes the $CF_3I$.

Aspect 24. The method of any one of aspects 21-23, wherein the one or more refrigerants includes R1234yf refrigerant.

Aspect 25. The method of any one of aspects 21-24, wherein the refrigerant composition is nonflammable.

Aspect 26. The method of any one of aspects 21-25, wherein the GWP of the refrigerant composition is about 750 or less than 750.

Aspect 27. The method of any one of aspects 21-26, wherein the GWP of the refrigerant composition is about 675 or less than 675.

Aspect 28. The method of any one of aspects 21-27, wherein the GWP of the refrigerant composition is about 300 or less than 300.

Aspect 29. The method of any one of aspects 21-28, wherein a ratio (R32:R1123) of the weight percentage of the R32 refrigerant in the refrigerant composition to the weight percentage of the R1123 refrigerant in the refrigerant composition is at or about 20:80 to at or about 80:20.

Aspect 30. The method of any one of aspects 21-29, wherein a ratio (R32:R1123) of the weight percentage of the R32 refrigerant in the refrigerant composition to the weight percentage of the R1123 refrigerant in the refrigerant composition is at or about 60:40 to at or about 40:60.

Aspect 31. The method of any one of aspects 21-30, wherein a temperature glide of the refrigerant composition is about 15° F. or less than 15° F.

Aspect 32. The method of any one of aspects 21-31, wherein the temperature glide of the refrigerant composition is about 12° F. or less than 12° F.

Aspect 33. The method of any one of aspects 21-32, wherein the temperature glide of the refrigerant composition is about 10° F. or less than 10° F.

Aspect 34. The method of any one of aspects 21-33, wherein the temperature glide of the refrigerant composition is about 5° F. or less than 5° F.

Aspect 35. The refrigerant composition of any one of aspects 21-34, wherein a capacity of the refrigerant composition at or about 85% or greater than 85% of the capacity of R410A refrigerant.

Aspect 36. The refrigerant composition of any one of aspects 21-35, wherein a capacity of the refrigerant composition at or about 110% or less than 110% of the capacity of R410A refrigerant.

Aspect 37. The refrigerant composition of any one of aspects 21-34, wherein a capacity of the refrigerant composition is at or about 85% or greater than 85% of the capacity of R32 refrigerant alone.

Aspect 38. The refrigerant composition of any one of aspects 21-34 and 37, wherein a capacity of the refrigerant composition is at or about 110% or less than 110% of the capacity of R32 refrigerant alone.

Aspect 39. The refrigerant composition of any one of aspects 21-34, wherein a capacity of the refrigerant composition is at or about 85% or greater than 85% of the capacity of R22 refrigerant.

Aspect 40. The refrigerant composition of any one of aspects 21-34 and 39, wherein a capacity of the refrigerant composition is at or about 110% or less than 110% of the capacity of R22 refrigerant.

Aspect 41. A method of retrofitting a refrigerant composition in an HVACR system, comprising:
adding an amount of at least one refrigerant to an existing refrigerant composition to produce a retrofitted refrigerant composition, the retrofitted refrigerant composition including R1123 refrigerant, R32 refrigerant, and at least one of R125 refrigerant and $CF_3I$, wherein
the existing refrigerant composition includes at least one of R32 refrigerant, R1123 refrigerant, R125 refrigerant, and R1234yf, and
the retrofitted refrigerant composition has a GWP that is about 1500 or less than 1500.

Aspect 42. The method of aspect 41, wherein the at least one refrigerant includes at least one of R32 refrigerant, R1123 refrigerant, R125 refrigerant, R1234yf refrigerant, and $CF_3I$.

Aspect 43. The method of either one of aspects 41 or 42, wherein the retrofitted refrigerant composition includes the R1123 refrigerant, the R32 refrigerant, and the R125 refrigerant.

Aspect 44. The method of either one of aspects 41 or 42, wherein the retrofitted refrigerant composition includes the R1123 refrigerant, the R32 refrigerant, and the $CF_3I$.

Aspect 45. The method of any one of aspects 41-44, wherein the retrofitted refrigerant includes the R1123 refrigerant, the R32 refrigerant, the R125 refrigerant, and the $CF_3I$.

Aspect 46. The method of any one of aspects 41-45, wherein the retrofitted refrigerant includes the R1123 refrigerant, the R32 refrigerant, the R125 refrigerant, and R1234yf refrigerant.

Aspect 47. The method of any one of aspects 41-46, wherein the retrofitted refrigerant composition is nonflammable.

Aspect 48. The method of any one of aspects 41-47, wherein the GWP of the retrofitted refrigerant composition is about 750 or less than 750.

Aspect 49. The method of any one of aspects 41-48, wherein the GWP of the retrofitted refrigerant composition is about 675 or less than 675.

Aspect 50. The method of any one of aspects 41-49, wherein the GWP of the retrofitted refrigerant composition is about 300 or less than 300.

Aspect 51. The method of any one of aspects 41-50, wherein a ratio (R32:R1123) of the weight percentage of the R32 refrigerant in the retrofitted refrigerant composition to the weight percentage of the R1123 refrigerant in the retrofitted refrigerant composition is at or about 20:80 to at or about 80:20.

Aspect 52. The method of any one of aspects 41-50, wherein a ratio (R32:R1123) of the weight percentage of the R32 refrigerant in the retrofitted refrigerant composition to the weight percentage of the R1123 refrigerant in the retrofitted refrigerant composition is at or about 60:40 to at or about 40:60.

Aspect 53. The method of any one of aspects 41-52, wherein a temperature glide of the retrofitted refrigerant composition is about or less than 15° F.

Aspect 54. The method of any one of aspects 41-53, wherein the temperature glide of the retrofitted refrigerant composition is about 12° F. or less than 12° F.

Aspect 55. The method of any one of aspects 41-54, wherein the temperature glide of the retrofitted refrigerant composition is about 10° F. or less than 10° F.

Aspect 56. The method of any one of aspects 41-55, wherein the temperature glide of the retrofitted refrigerant composition is about 5° F. or less than 5° F.

Aspect 57. The refrigerant composition of any one of aspects 41-56, wherein a capacity of the refrigerant composition at or about 85% or greater than 85% of the capacity of R410A refrigerant.

Aspect 58. The refrigerant composition of any one of aspects 41-57, wherein a capacity of the refrigerant composition at or about 110% or less than 110% of the capacity of R410A refrigerant.

Aspect 59. The refrigerant composition of any one of aspects 41-56, wherein a capacity of the refrigerant composition is at or about 85% or greater than 85% of the capacity of R32 refrigerant alone.

Aspect 60. The refrigerant composition of any one of aspects 41-56 and 59, wherein a capacity of the refrigerant composition is at or about 110% or less than 110% of the capacity of R32 refrigerant alone.

Aspect 61. The refrigerant composition of any one of aspects 41-56, wherein a capacity of the refrigerant composition is at or about 85% or greater than 85% of the capacity of R22 refrigerant.

Aspect 62. The refrigerant composition of any one of aspects 41-56 and 61, wherein a capacity of the refrigerant composition is at or about 110% or less than 110% of the capacity of R22 refrigerant.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A refrigerant composition for an HVACR system comprising:
    from about 8 wt % to about 80 wt % of R1123 refrigerant;
    from about 10 wt % to about 80 wt % of R32 refrigerant;
    at or about 49 wt %, or less than 49 wt % and greater than 0 wt % of R1234yf refrigerant; and
    at or about 62 wt %, or less than 62 wt % and greater than 0 wt % of $CF_3I$, wherein
    the refrigerant composition has a capacity that is greater than 85% of the capacity of R410A refrigerant alone.

2. The refrigerant composition of claim 1, wherein the $CF_3I$ is from about 30 wt % to about 62 wt % of the refrigerant composition, the refrigerant composition being nonflammable.

3. The refrigerant composition of claim 1, wherein
    the R32 refrigerant is from about 10 wt % to about 54 wt % of the refrigerant composition,
    the R1123 refrigerant is from about 8 wt % to about 54 wt % of the refrigerant composition,
    the R1234yf refrigerant is at or about 27 wt %, or greater than 0 wt % and less than 27 wt % of the refrigerant composition,
    the $CF_3I$ is from about 30 wt % to about 62 wt % of the refrigerant composition, and
    the refrigerant composition being nonflammable, the GWP of the refrigerant composition being less than 400.

4. The refrigerant composition of claim 1, wherein
    the R32 refrigerant is from about 12 wt % to about 80 wt % of the refrigerant composition,
    the R1123 refrigerant is from about 9 wt % to about 80 wt % of the refrigerant composition,
    the R1234yf refrigerant is at or about 32 wt %, or greater than 0 wt % and less than 32 wt % of the refrigerant composition,
    the $CF_3I$ is at or about 39 wt %, or greater than 0 wt % and less than 39 wt % of the refrigerant composition, and
    the refrigerant composition having a capacity that is greater than 85% of the capacity of R32 refrigerant alone.

5. The refrigerant composition of claim 4, wherein
    the R32 refrigerant is from about 12 wt % to about 54 wt % of the refrigerant composition,
    the R1123 refrigerant is from about 9 wt % to about 54 wt % of the refrigerant composition,
    the R1234yf refrigerant is at or about 17 wt %, or greater than 0 wt % and less than 17 wt % of the refrigerant composition,
    the $CF_3I$ is from about 31 wt % to about 53 wt % of the refrigerant composition, and
    the refrigerant composition being nonflammable.

6. The refrigerant composition of claim 1, wherein the refrigerant portion of the refrigerant composition consists of the R32 refrigerant, the R1123 refrigerant, the R1234yf refrigerant, and the $CF_3I$.

7. A method of making a refrigerant composition for a HVACR system, the method including:
    mixing at least an amount of R1123 refrigerant, an amount of R32 refrigerant, an amount of R1234yf refrigerant, and an amount of $CF_3I$ to obtain a refrigerant composition, wherein the R1123 refrigerant is from 8 wt % to about 80 wt % of the refrigerant composition, the R32 refrigerant is from about 10 wt % to about 80 wt % of the refrigerant composition, the R1234yf refrigerant is at or about 49 wt %, or less than 49 wt % and greater than 0 wt % of the refrigerant composition, the $CF_3I$ is at or about 62 wt %, or less than 62 wt % and greater than 0 wt % of the refrigerant composition, and the refrigerant composition has a GWP that is about 1500 or less than 1500 and has a capacity that is greater than 85% of the capacity of R410A refrigerant alone.

8. The method of claim 7, wherein the $CF_3I$ is from about 30 wt % to about 62 wt % of the refrigerant composition, the refrigerant composition being nonflammable.

9. The method of claim 7, wherein
the R32 refrigerant is from about 10 wt % to about 54 wt % of the refrigerant composition,
the R1123 refrigerant is from about 8 wt % to about 54 wt % of the refrigerant composition,
the R1234yf refrigerant is at or about 27 wt %, or greater than 0 wt % and less than 27 wt % of the refrigerant composition,
the $CF_3I$ is from about 30 wt % to about 62 wt % of the refrigerant composition, and
the refrigerant composition being nonflammable, the GWP of the refrigerant composition being less than 400.

10. The method of claim 7, wherein
the R32 refrigerant is from about 12 wt % to about 80 wt % of the refrigerant composition,
the R1123 refrigerant is from about 9 wt % to about 80 wt % of the refrigerant composition,
the R1234yf refrigerant is at or about 32 wt %, or greater than 0 wt % and less than 32 wt % of the refrigerant composition,
the $CF_3I$ is at or about 39 wt %, or greater than 0 wt % and less than 39 wt % of the refrigerant composition, and
the refrigerant composition having a capacity that is greater than 85% of the capacity of R32 refrigerant alone.

11. The method of claim 10, wherein
the R32 refrigerant is from about 12 wt % to about 54 wt % of the refrigerant composition,
the R1123 refrigerant is from about 9 wt % to about 54 wt % of the refrigerant composition,
the R1234yf refrigerant is at or about 17 wt %, or greater than 0 wt % and less than 17 wt % of the refrigerant composition,
the $CF_3I$ is from about 31 wt % to about 53 wt % of the refrigerant composition, and
the refrigerant composition being nonflammable.

12. The method of claim 7, wherein the refrigerant portion of the refrigerant composition consists of the R32 refrigerant, the R1123 refrigerant, the R1234yf refrigerant, and the $CF_3I$.

13. A method of retrofitting a refrigerant composition in an HVACR system, comprising:
adding an amount of at least one refrigerant to an existing refrigerant composition to produce a retrofitted refrigerant composition, the retrofitted refrigerant composition including R1123 refrigerant, R32 refrigerant, R1234yf refrigerant, and $CF_3I$, wherein the existing refrigerant composition includes at least one of R32 refrigerant, R1123 refrigerant, and R1234yf refrigerant, the R32 refrigerant is from about 10 wt % to about 80 wt % of the retrofitted refrigerant composition, the R1123 refrigerant is from about 8 wt % to about 80 wt % of the retrofitted refrigerant composition, the R1234yf refrigerant is at or about 49 wt %, or greater than 0 wt % and less than 49 wt % of the retrofitted refrigerant composition, the $CF_3I$ is at or about 62 wt %, or less than 62 wt % and greater than 0 wt % of the retrofitted refrigerant composition, and the retrofitted refrigerant composition has a GWP that is about 1500 or less than 1500 and having a capacity that is greater than 85% of the capacity of R410A refrigerant alone.

14. The method of claim 13, wherein the $CF_3I$ is from about 30 wt % to about 62 wt % of the retrofitted refrigerant composition, the retrofitted refrigerant composition being nonflammable.

15. The method of claim 13, wherein
the R32 refrigerant is from about 10 wt % to about 54 wt % of the retrofitted refrigerant composition,
the R1123 refrigerant is from about 8 wt % to about 54 wt % of the retrofitted refrigerant composition,
the R1234yf refrigerant is at or about 27 wt %, or greater than 0 wt % and less than 27 wt % of the retrofitted refrigerant composition,
the $CF_3I$ is from about 30 wt % to about 62 wt % of the retrofitted refrigerant composition,
the retrofitted refrigerant composition being nonflammable, and
the GWP of the retrofitted refrigerant composition being less than 400.

16. The method of claim 13, wherein
the R32 refrigerant is from about 12 wt % to about 80 wt % of the retrofitted refrigerant composition,
the R1123 refrigerant is from about 9 wt % to about 80 wt % of the retrofitted refrigerant composition,
the R1234yf refrigerant is at or about 32 wt %, or greater than 0 wt % and less than 32 wt % of the retrofitted refrigerant composition,
the $CF_3I$ is at or about 39 wt %, or greater than 0 wt % and less than 39 wt % of the retrofitted refrigerant composition, and
the retrofitted refrigerant composition having a capacity that is greater than 85% of the capacity of R32 refrigerant alone.

17. The method of claim 13, wherein
the R32 refrigerant is from about 12 wt % to about 54 wt % of the retrofitted refrigerant composition,
the R1123 refrigerant is from about 9 wt % to about 54 wt % of the retrofitted refrigerant composition,
the R1234yf refrigerant is at or about 17 wt %, or greater than 0 wt % and less than 17 wt % of the retrofitted refrigerant composition,
the $CF_3I$ is from about 31 wt % to about 53 wt % of the retrofitted refrigerant composition, and
the retrofitted refrigerant composition being nonflammable.

* * * * *